United States Patent [19]
Satou et al.

[11] Patent Number: 5,717,946
[45] Date of Patent: Feb. 10, 1998

[54] DATA PROCESSOR

[75] Inventors: Mitsugu Satou; Toyohiko Yoshida; Shunichi Iwata, all of Itami, Japan

[73] Assignee: Mitsubishi Denki Kabushiki Kaisha, Tokyo, Japan

[21] Appl. No.: 783,531

[22] Filed: Jan. 14, 1997

Related U.S. Application Data

[63] Continuation of Ser. No. 324,644, Oct. 18, 1994, abandoned.

[30] Foreign Application Priority Data

Oct. 18, 1993 [JP] Japan ................... 5-260199

[51] Int. Cl.$^6$ .................................................. G06F 13/00
[52] U.S. Cl. ................. 395/800; 395/855; 364/238.4; 364/240; 364/DIG. 1
[58] Field of Search ........................... 395/800, 825, 395/855, 307; 364/238.4, 240, DIG. 1

[56] References Cited

U.S. PATENT DOCUMENTS

| | | | |
|---|---|---|---|
| 4,837,688 | 6/1989 | Cronauer et al. | 395/650 |
| 4,977,497 | 12/1990 | Sakamura et al. | 395/375 |
| 4,994,962 | 2/1991 | Mageau et al. | 395/403 |
| 5,029,069 | 7/1991 | Sakamura | 395/375 |
| 5,113,369 | 5/1992 | Kinoshita | 395/307 |
| 5,121,474 | 6/1992 | Sakamura et al. | 395/800 |
| 5,165,037 | 11/1992 | Culley | 395/800 |
| 5,201,039 | 4/1993 | Sakamura | 395/375 |
| 5,416,907 | 5/1995 | Polzin et al. | 395/886 |
| 5,438,670 | 8/1995 | Baror et al. | 395/483 |

FOREIGN PATENT DOCUMENTS 4-109337  4/1992  Japan.

Primary Examiner—Alyssa H. Bowler
Assistant Examiner—John Harrity
Attorney, Agent, or Firm—Lowe, Price, LeBlanc & Becker

[57] ABSTRACT

A data processor having a string operation instruction and a bit map operation instruction, and comprises a bus interface unit 157 which inputs/outputs data by the burst transfer function, and an integer operation unit 155 building-in a main ALU and a sub-ALU, wherein data is repeatedly transferred to/from an external memory via a data bus 102 in unit greater than a width of the data bus 102. Further, is can be accessed in a high speed by the block transfer in the burst mode to efficiently execute the above instructions, therefore the data string and bit map data can be executed quickly even when a low-cost slow memory system is connected thereto.

8 Claims, 100 Drawing Sheets

SMOV/eeee/b.sx sx   :ELEMENT SIZE,
      TRAP CONDITION(R3) SIZE
b    :PROCESSING DIRECTION
      b=0 INCREASING DIRECTION
          OF ADD. (/F)
      b=1 DECREASING DIRECTION
          OF ADD. (/B)
eeee:TRAP CONDITION

FIG. 9

SCMP/eeee.sx

| 00eeee | sx | 11100000 | sx : ELEMENT SIZE,
     TRAP CONDITION(R3) SIZE
eeee: TRAP CONDITION

SSCH/eeee/r.sx sx   : ELEMENT SIZE,
       TRAP CONDITION(R3) SIZE
eeee : TRAP CONDITION
r    : UPDATING METHOD OF POINTER
       r=0  INCREMENT BY
            ELEMENT SIZE(/F)
       r=1  SPECIFY INCREMENT/
            DECREMENT VALUE
            BY REG.5(/R)

FIG. 11

SSTR.sx

| 001001 | sx | 11110111 | sx : ELEMENT SIZE,
    TRAP CONDITION(R3) SIZE

FIG. 12

BVSCH/d/b

| 0001bd+ | 0 | 11110111 | d  : BIT VALUE TO BE SEARCHED
    d=0    SEARCH  " 0 "  (/0)
    d=1    SEARCH  " 1 "  (/1)
b  : SEARCH DIRECTION
    b=0    BIT NUMBER INCREMENT DIRECTION(/F)
    b=1    BIT NUMBER DECREMENT DIRECTION(/B)
R0    base
R1.s : offset
       BECOME OPERAND OF "read-modify-write", AND
       INCLUDS RETREIVAL START OFFSET AS PARAMETER
       AND RETREIVAL RESULT OFFSET AS RETURN PARA-
       METER. UNTIL BIT OF VALUE SPECIFIED BY "d"
       IS FOUND, OFFSET CROSSES WORD BOUNDARY ANY
       TIME. AT INTERRUTION OF INSTRUCTION, OFFSET
       UNDER RETREAVING AT THAT TIME IS ENTERED.
       OFFSET (R1) IS HANDLED AS SIGNED AND NEGATIVE
       NUMBER IS APPLICABLE
R2.s : width
       LENGTH OF BIT FIELD FOR RETREAVING OFFSET
       (NUMBER OF BIT).
       "width(R2)" IS ALSO HANDLED AS SIGNED. BUT
       IN CASE width $\leq$ 0, ONLY V_flag IS SET AND
       INSTRUCTION IS FINISHED.

FIG. 13

BVMAP/b

| 0011b00 | 0 | 11110111 | b : PROCESSING DIRECTION
    b=0    BIT NUMBER INCREMENT DIRECTION(/F)
    b=1    BIT NUMBER DECREMENT DIRECTION(/B)

R0    : base(src_base) OF BIT FIELD OF src
R1.s : offset(src_offset) OF BIT FIELD OF src
    HANDLED AS SIGNED, AND NEGATIVE IS APPLICABLE.
R2.s : width
    LENGTH (NIMBER OF BIT) OF BIT FIELD TO
    BE OPERATED.
    width(R2) IS HANDLED AS SIGNED.
    IN CASE OF width $\leq$ 0,
    INSTRUCTION IS FINISHED WITH NO OPERATION.
R3    : base(dest_base) OF BIT FIELD OF dest.
R4.s : offset(dest_offset) OF BIT FIELD OF dest.
    HANDLED AS SIGNED, AND NEGATIVE IS APPLICABLE.
R5    : KIND OF OPERATION
    LOWER 4 bits IS USED.

| | | | |
|---|---|---|---|
| 0000 | F   | False     | 0==>dest |
| 0001 | NAN | NotAndNot | #rest.and. #src==>dest |
| 0010 | AN  | AndNot    | dest.and. #src==>dest |
| 0011 | NS  | NotSrc    | #src==>dest |
| 0100 | NA  | NotAnd    | #dest.and. src==>dest |
| 0101 | ND  | NotDest   | #dest==>dest |
| 0110 | X   | Xor       | dest.xor.src==>dest |
| 0111 | NON | NotOrNot  | #dest.or. #src==>dest |
| 1000 | A   | And       | dest.and.src==>dest |
| 1001 | NX  | NotXor    | #dest.xor.src==>dest |
| 1010 | D   | Dest      | dest==>dest |
| 1011 | ON  | OrNot     | dest.or. #src==>dest |
| 1100 | S   | Src       | src==>dest |
| 1101 | NO  | NotOr     | #dest.or.src==>dest |
| 1110 | O   | Or        | dest.or.src==>dest |
| 1111 | T   | True      | 1==>dest |

※ .and. IS LOGICAL PRODUCT, .or. IS LOGICAL SUM,
   # IS BIT INVERSION
※ OPERATION RESULT OF src=0,dest=0 IS SET IN BIT $2^0$
   OPERATION RESULT OF src=0,dest=1 IS SET IN BIT $2^1$
   OPERATION RESULT OF src=1,dest=0 IS SET IN BIT $2^2$
   OPERATION RESULT OF src=0,dest=1 IS SET IN BIT $2^3$

FIG. 14

BVCPY/b

| 0011b01 | 0 | 11110111 | b      : PROCESSING DIRECTION
         b=0     BIT NUMBER INCREMENT DIRECTION(/F)
         b=1     BIT NUMBER DECREMENT DIRECTION(/B)
R0     : base(src_base) OF BIT FIELD OF src
R1.s   : offset(src_offset) OF BIT FIELD OF src
         HANDLED AS SIGNED, AND NEGATIVE IS APPLICABLE.
R2.s   : width
         LENGTH (NIMBER OF BIT) OF BIT FIELD TO
         BE OPERATED.
         width(R2) IS HANDLED AS SIGNED.
         IN CASE OF width $\leq$ 0,
         INSTRUCTION IS FINISHED WITH NO OPERATION.
R3     : base(dest_base) OF BIT FIELD OF dest.
R4.s   : offset(dest_offset) OF BIT FIELD OF dest.
         HANDLED AS SIGNED, AND NEGATIVE IS APPLICABLE.

FIG. 15

BVPAT.s

| 000001+ | 0 | 11110111 |

R0.s : pattern
R1   : NOT USED
R2.s : width
       LENGTH (NIMBER OF BIT) OF BIT FIELD TO
       BE OPERATED.
       width(R2) IS HANDLED AS SIGNED.
       IN CASE OF width ≦ 0,
       INSTRUCTION IS FINISHED WITH NO OPERATION.
R3   : base(dest_base) OF BIT FIELD OF dest.
R4.s : offset(dest_offset) OF BIT FIELD OF dest.
       HANDLED AS SIGNED, AND NEGATIVE IS APPLICABLE.
R5   : KIND OF OPERATION
       LOWER 4 bita IS USED.
       COMMON WITH BVMAP INSTRUCTION.

TWO-OPERAND SIMULTANEOUS TRANSFER OF DATA PROCESSOR OF THE INVENTION

CONVENTIONAL SUCCESSIVE TRANSFER

FIG. 35

| REG. LIST | LOWER ADD. | TRANSFER METHOD |
|---|---|---|
| CONTINUOUS | B'100 | FROM 2nd OPERAND IN TWO-OPERAND UNIT |
| CONTINUOUS | OTHER THAN B'100 (*) | FROM 1st OPERAND IN TWO-OPERAND UNIT |
| NON-CONTINUOUS | DON'T CARE | ALWAYS SEQUENCIALLY ONE OPERAND |

*: B'000 IS DESIRABLE. OTHER THAN B'000 ARE LOW TRANSFER EFFICIENCY BECAUSE OF NON-ALIGNED MEMORY ACCESS.

FIG. 38

| INSTRUC-TION | PERFORMANCE (CLOCK CYCLE) | NOTE |
|---|---|---|
| SMOV | 8/3 BYTE<br>2 BYTE<br>1/3 ELEMENT | eeee=N OR, eeee=EQ AND R3=0<br>eeee=NE OR, eeee=EQ AND R3≠0<br>OTHER THAN eeee=N, EQ, NE |
| SCMP | 8/3 BYTE<br>2 BYTE<br>1/3 ELEMENT | eeee=N OR, eeee=EQ AND R3=0<br>eeee=NE OR, eeee=EQ AND R3≠0<br>OTHER THAN eeee=N, EQ, NE |
| SSCH | 8/3 BYTE<br>1/3 ELEMENT | eeee=N, EQ, NE<br>OTHER THAN eeee=N, EQ, NE |
| SSTR | 4 BYTE | |

FIG. 39

| INSTRUC-TION | PERFORMANCE (CLOCK CYCLE) | NOTE |
|---|---|---|
| BVSCH | 32 BIT | |
| BVMAP | 32 BIT<br>64/3 BIT<br>16 BIT | R5=F,T<br>R5=NS,S,ND,D<br>R5=NAN,AN,NA,X,NON,A,NX,ON,NO,O |
| BVCPY | 64/3 BIT | |
| BVPAT | 32 BIT<br>64/3 BIT | R5=F,T,NS,S<br>R5=NAN,AN,NA,ND,X,NON,A,NX,D,ON,NO,O |

FIG. 40

| STAGE | PROCESSED JUMP INSTRUCTION | HARDWARE FOR JUMP INSTRUCTION |
|---|---|---|
| IF | — | TWO SYSTEM INSTRUCTION QUEUE |
| D | BRA,Bcc,BSR,ACB, SCB,RTS,EXITD, PART OF ADDRESS- ING OF JMP,JSR | TWO BRANCH DESTINATION ADD. ADDERS, BRANCH PREDICTION TABLE, PC STACK |
| A | JMP,JSR OTHER THAN D STAGE JUMP | ADD. ADDER (OPERAND ADD. ADDER IS SERVED) |
| F | — | — |
| E | Bcc,ACB,SCB,RTS, EXITD FOR WHICH BRANCH PREDICTION HAS MISTAKEN | INTEGER OPERATION MECHANISM SUCH AS ALU |
| S | — | — |

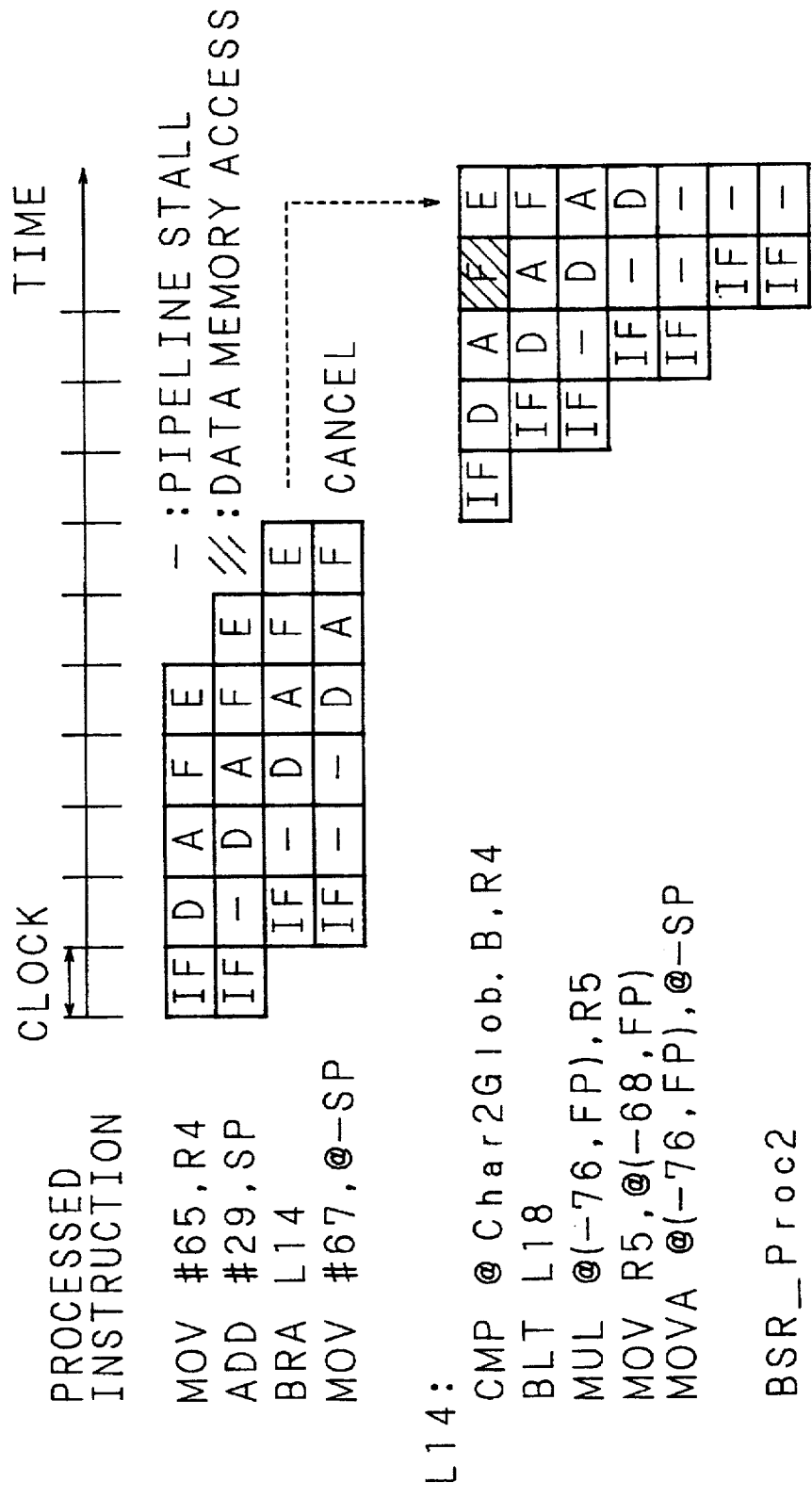

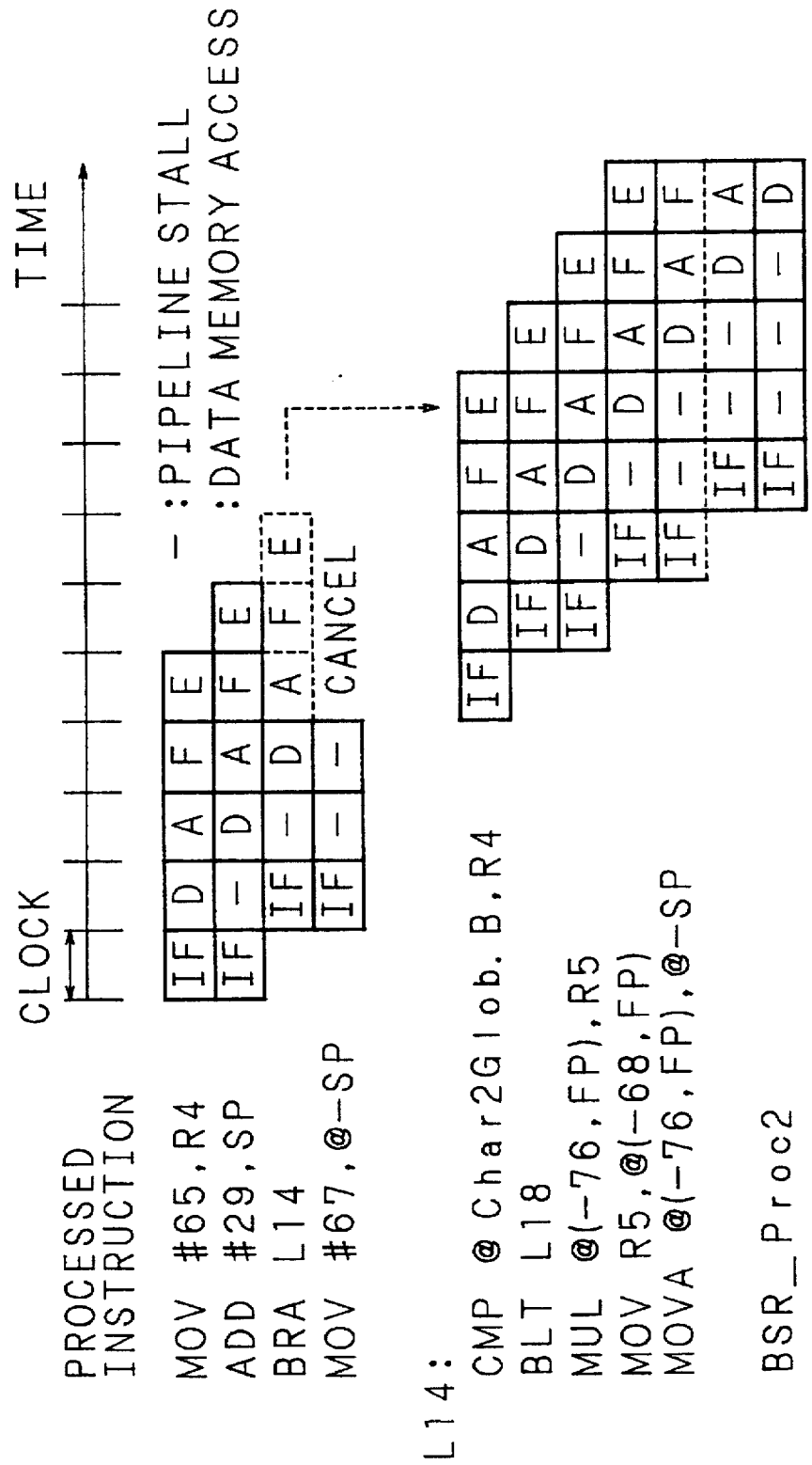

FIG. 44

| INSTRUCTION | PRE-JUMP | PROCESS-ING TIME | COMMENT |
|---|---|---|---|
| BRA | D stage | 2 | |
| Bcc ;Case1 | D stage | 2 | PREDICTION BY HYSTERESIS SHOWS BRANCH PREDICTION IS INCORRECT, 4 CLK |
| Bcc ;Case2 | Nop | 1 | PREDICTION BY HYSTERESIS SHOWS BRANCH PREDICTION IS INCORRECT, 4 CLK |
| ACB QR d.B | D stage | 2 | PROCESSING TIME IS 7 CLK WITHOUT JUMP |
| ACB GE d.B | D stage | 4 | PROCESSING TIME IS 8 CLK WITHOUT JUMP |
| ACB etc. | D stage | 3 | PROCESSING TIME IS 8 CLK WITHOUT JUMP |
| SCB QR d.B | D stage | 2 | PROCESSING TIME IS 7 CLK WITHOUT JUMP |
| SCB GE d.B | D stage | 4 | PROCESSING TIME IS 8 CLK WITHOUT JUMP |
| SCB etc. | D stage | 3 | PROCESSING TIME IS 8 CLK WITHOUT JUMP |
| JMP eaddr1 | D stage | 2 | ONLY @abs, @(PC,disp:32) |
| JMP eaddr2 | A stage | 3 | MORE PROCESSING TIME IS NEED AT SPECIFYING CHAINED MODE |
| JSR eaddr1 | D stage | 2 | ONLY @abs, @(PC,disp:32) |
| JSR eaddr2 | A stage | 3 | MORE PROCESSING TIME IS NEED AT SPECIFYING CHAINED MODE |
| BSR | D stage | 2 | |
| RTS | D stage | 2 | 6 CLK IS NEED AT INCORRECT PRE-RETURN |
| ENTER:G | NO JUMP | 6+2m | m: NUMBER OF SAVED REF. |
| ENTER:E | NO JUMP | 5+2m | m: NUMBER OF SAVED REF. |
| EXITD:G | D stage | 9+m | m:NUMBER OF RETURN REG. AT PC STACK HIT |
| EXITD:E | D stage | 7+m | m:NUMBER OF RETURN REG. AT PC STACK HIT |
| NOP | NO JUMP | 1 | |
| FBcc | Nop | 8 | CONDITIONAL BRANCH BY FLOATING-POINT |
| FNOP | Nop | 1 | |
| COP_JCC | Nop | 7 | CO-PROCESSER CONDITIONAL JUMP |

NOTE) QR d.B : Q,R FORMAT AND pcdisp IS 8 BITS IN ACB, SCB INSTRUCTION
GE d.B : G,E FORMAT AND pcdisp IS 8 BITS IN ACB, SCB INSTRCTION
OTHER : OTHER THAN (QR d.B), (GE d.B) IN ACB, SCB INSTRUCTION
eaddr1 : ABSOLUTE ADD. OR PC RELATIVE ADD. OF 32-BIT OFFSET
eaddr2 : ADD. OTHER THAN PC RELATIVE ADD. OF 32-BIT OFFSET

FIG. 45

BRA:D,BCC:D,BSR:D

| OP_CODE | PCDISP |
|---|---|
| 0 | 8  15 |

BRA:D,BCC:G,BSR:G,JMP ⊚(PC,PCDISP:32),JSR
⊚(PC,PCDISP:32),PART OF ACB AND SCB

| OP_CODE | 00000000 | PCDISP:8 |
|---|---|---|

| OP_CODE | PCDISP:16 |
|---|---|
| 0 | 16  31 |

| OP_CODE | PCDISP:32 |
|---|---|
| 0 | 16  24  47 |

JMP ⊚ABS, JSR ⊚ABS

| OP_CODE | ABS:16 |
|---|---|
| 0 | 16  31 |

| OP_CODE | ABS:32 |
|---|---|
| 0 | 16  47 |

FIG. 48 IN THE CASE WHERE PRE-RETURN ADD. IS CORRECT

FIG. 58

| DEST OPERAND OF PRE-CEDING INSTRUCTION | ADDRESSING MODE OF SUCCEEDING INSTRUCTION | STALL |
|---|---|---|
| Rm (m=0~14) | @(Rn), @(exp, Rn)   n=m | OCCUR |
| | @(Rn), @(exp, Rn)   n≠m | NO |
| | Rn, @abs, #imm, @SP+, @-SP | NO |
| | @(exp, PC), @(PC:b, exp, Rn) | NO |
| | @(Rb:B, exp, Rx)   b=m | OCCUR |
| | @(Rb:B, exp, Rx)   x=m | OCCUR |
| | @(Rb:B, exp, Rx)   b≠m AND X≠m | NO |
| | @@(Rb:B, exp, Rx)   b=m | OCCUR |
| | @@(Rb:B, exp, Rx)   x=m | OCCUR |
| | @@(Rb:B, exp, Rx)   b≠m AND X≠m | NO |
| R15 | @(R15), @(exp, R15) | OCCUR |
| | @(Rn), @(exp, Rn)   n≠15 | NO |
| | @SP+(INCLUDING src, RTS OF POP) | OCCUR |
| | @-SP(INCLUDING dest, BSR, JSR OF PUSH) | OCCUR |
| | Rn, @abs, #imm | NO |
| | @(exp, PC), @(PC:b, exp, Rn) | NO |
| | @(R15:B, exp, Rx) | OCCUR |
| | @(Rb:B, exp, R15) | OCCUR |
| | @(Rb:B, exp, Rx)   b≠15 AND X≠15 | NO |
| | @@(R15:B, exp, Rx) | OCCUR |
| | @@(Rb:B, exp, R15) | OCCUR |
| | @@(Rb:B, exp, Rx)   b≠15 AND X≠15 | NO |

FIG. 63

| OPERAND STORE DESTINATION OF PRECEDING INSTRUCTION | OPERAND OF SUBSEQUENT INSTRUCTION | STALL TIME |
|---|---|---|
| REG. | DON'T CARE | 0 CLOCK CYCLE |
| MEMORY (WITHOUT 8-BYTE CROSS) | REG. | 0 CLOCK CYCLE |
| | MEMORY | 1 CLOCK CYCLE * |
| MEMORY (WITH 8-BYTE CROSS) | REG. | 0 CLOCK CYCLE |
| | MEMORY | 2 CLOCK CYCLE * |

*: AT FULL OF STORE BUFFER, STALL TIME IS FURTHER LONG.

FIG. 64

```
        MOV #0,R0
        BSR Func1
        MOV @R0,R1  ;NOTHING OF MEMORY
                          ACCESS TO ADD. 0
Func1:  MOV @(R5,disp),R0
        RTS
```

FIG. 65

```
        CMP R0,R5
        BGT L1
        MOV @R0,R4  ;ACCESS TO ADD. R0 IS
                     SUPPRESSED UNTIL
                     CONDITION OF BGT
                     DETERMINES

L1:     ADD R2,R0
        MOV @R0,R1  ;ACCESS TO ADD. R0 IS
                     SUPPRESSED UNTIL
                     CONDITION OF BGT
                     DETERMINES
```

FIG. 66

```
        CMP  R0,R5
        BGT  L1
        JSR  @R6    ;JUMP DESTINATION ADD.
                     CALCULATION IS
                     SUPPRESSED UNTIL
                     CONDITION OF BGT
                     DETERMINES
   L1:  JSR  @R7    ;JUMP DESTINATION ADD.
                     CALCULATION IS
                     SUPPRESSED UNTIL
                     CONDITION OF BGT
                     DETERMINES
```

FIG. 76

| FIELD | OP. | FUNCTION |
|---|---|---|
| maai | s1<br>0 | INPUT S1 BUS VALUE<br>ZERO CLEAR |
| mabi | s2<br>0 | INPUT S2 BUS VALUE<br>ZERO CLEAR |
| maop | +<br>+1<br>-<br>-1<br>$<br>$1<br>and<br>#and<br>and#<br>or<br>#or<br>or#<br>eopf_e<br>eopf_n<br>eopb_e<br>eopb_n | A + B<br>A + B + 1<br>A - B<br>A - B - 1<br>B - A<br>B - A - 1<br>A and B<br>#A and B<br>A and #B<br>A or B<br>#A or B<br>A or #B<br>FORWARD COINCIDENT DETECTION OP.<br>FORWARD IN-COINCIDENT DETECTION OP.<br>REVERSE COINCIDENT DETECTION OP.<br>REVERSE IN-COINCIDENT DETECTION OP. |
| masu | s<br>u | SIGNED EXTENSION<br>ZERO EXTENSION |
| maaz | 1<br>2<br>4<br>oz | 1 BYTE<br>2 BYTES<br>4 BYTES<br>USE oz REG. AS SIZE |
| mabz | 1<br>2<br>4 | 1 BYTE<br>2 BYTES<br>4 BYTES |
| mafz | 1<br>2<br>4 | 1 BYTE<br>2 BYTES<br>4 BYTES |
| maot | d1<br>d3<br>d1 \| d3<br>x | OUTPUT TO D1 BUS<br>OUTPUT TO D3 BUS<br>OUTPUT TO D1 BUS AND D3 BUS<br>NO OUTPUT |

FIG. 77

| FIELD | OP. | FUNCTION |
|---|---|---|
| saai | s1<br>s2<br>s3<br>0 | INPUT S1 BUS VALUE<br>INPUT S2 BUS VALUE<br>INPUT S3 BUS VALUE<br>ZERO CLEAR |
| sabi | s2<br>s4<br>0 | INPUT S2 BUS VALUE<br>INPUT S4 BUS VALUE<br>ZERO CLEAR |
| saop | +<br>+1<br>-<br>-1<br>$<br>$1<br>and<br>#and<br>and#<br>or<br>eopf_e<br>eopf_n<br>eopb_e<br>eopb_n | A + B<br>A + B + 1<br>A - B<br>A - B - 1<br>B - A<br>B - A - 1<br>A and B<br>#A and B<br>A and #B<br>A or B<br>FORWARD COINCIDENT DETECTION OP.<br>FORWARD IN-COINCIDENT DETECTION OP.<br>REVERSE COINCIDENT DETECTION OP.<br>REVERSE IN-COINCIDENT DETECTION OP. |
| sasu | s<br>u | SIGNED EXTENSION<br>ZERO EXTENSION |
| saaz | 1<br>2<br>4<br>oz | 1 BYTE<br>2 BYTES<br>4 BYTES<br>USE oz REG. AS SIZE |
| sabz | 1<br>2<br>4 | 1 BYTE<br>2 BYTES<br>4 BYTES |
| safz | 1<br>2<br>4 | 1 BYTE<br>2 BYTES<br>4 BYTES |

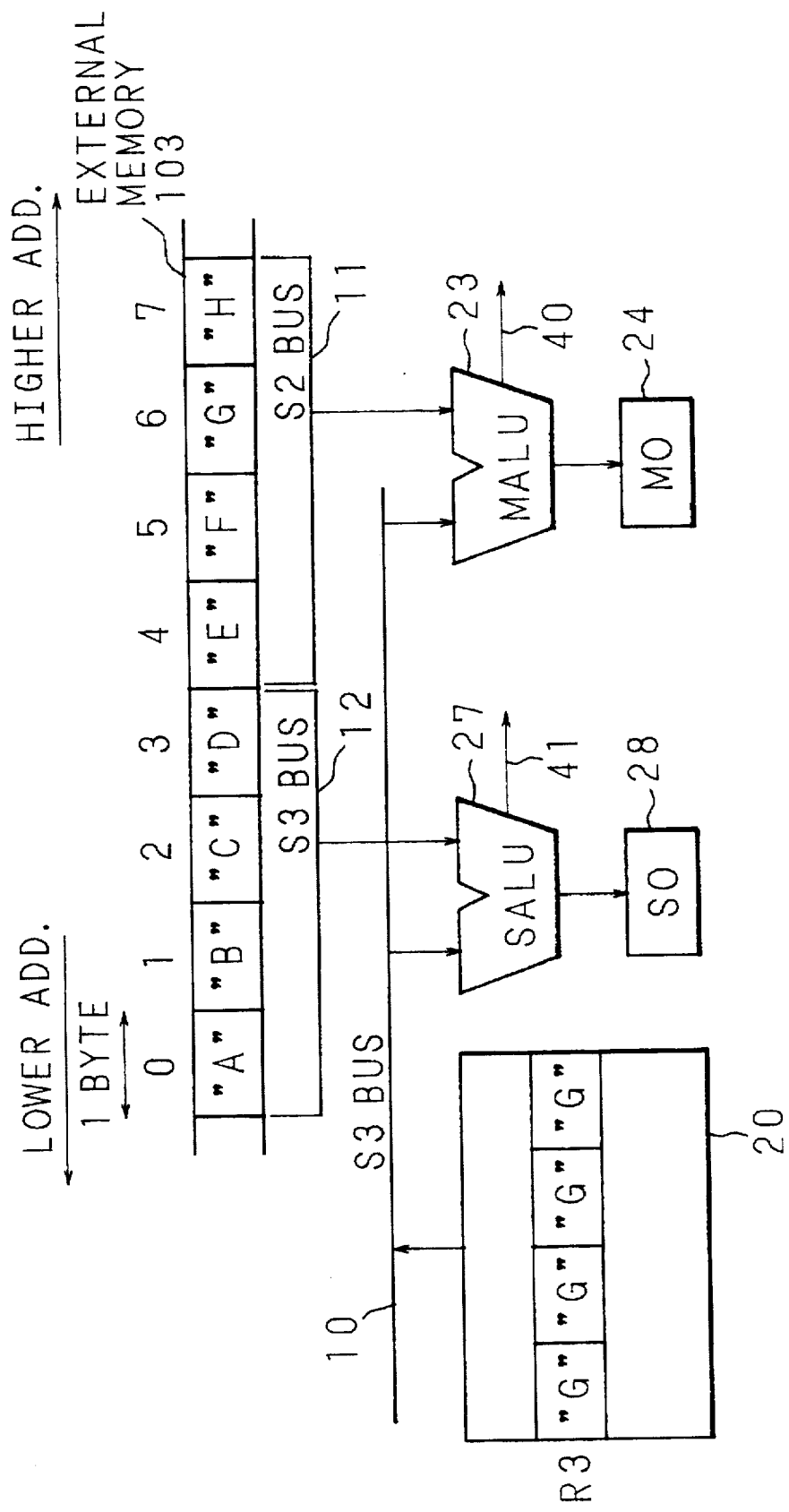
F I G. 78

FIG. 87

| WAIT NUMBERS OF EXTERNAL MEMORY | DATA PROCESSING EFFICIENCY OF SMOV INSTRUCTION |
|---|---|
| 0 - 0 | 18.3 BITS/CLOCK |
| 1 - 0 | 18.3 BITS/CLOCK |
| 2 - 0 | 16 BITS/CLOCK |
| 3 - 0 | 14.2 BITS/CLOCK |

FIG. 89

| R0 REG. | ADD. OF SOURCE SIDE BIT FIELD (SOURCE ADD.) |
|---|---|
| R1 REG. | BIT OFFSET OF SOURCE SIDE BIT FIELD (SOURCE OFFSET) |
| R2 REG. | LENGTH OF PROCESSED BIT FIELD (NUMBER OF BIT) |
| R3 REG. | ADD. OF DESTINATION SIDE BIT FIELD (DESTINATION ADD.) |
| R4 REG. | BIT OFFSET OF DESTINATION SIDE BIT FIELD (DESTINATION OFFSET) |
| R5 REG. | SPECIFICATION OPERATION |

FIG. 96

| WAIT NUMBERS OF EXTERNAL MEMORY | DATA PROCESSING EFFICIENCY OF BVMAP INSTRUCTION |
|---|---|
| 0 - 0<br>1 - 0<br>2 - 0<br>3 - 0 | 16 BITS/CLOCK<br>16 BITS/CLOCK<br>16 BITS/CLOCK<br>14.2 BITS/CLOCK |

FIG. 97

| CUT OFF CONDITION<br>=TERMINATE CONDITION<br>(=RETRIEVE CONDITION)<br>(=REVERCE OF PROCESS)<br>(CONTINUE CONDITION) | MNEMONIC OF OPTION | eeee |
|---|---|---|
| < R3 | LTU : LESS THAN (UNSIGNED) | 0000 |
| ≧ R3 | GEU : GREATER OR EQUAL (UNSIGNED) | 0001 |
| = R3 | EQ : EQUAL | 0010 |
| ≠ R3 | NE : NOT EQUAL | 0011 |
| < R3 | LT : LESS THAN (SIGNED) | 0100 |
| ≧ R3 | GE : GREATER OR EQUAL (SIGNED) | 0101 |
| NO CUT OFF CONDITION | N : NEVER (OR NO OPTION) | 0110 |

DATA PROCESSOR

This application is a continuation of application Ser. No. 08/324,644 filed Oct. 18, 1994 now abandoned.

BACKGROUND OF THE INVENTION

1. Field of the Invention

The present invention is related to a data processor having the string operation instructions and bit map operation instructions, wherein these instructions are processed as high speed by burst transferred between a CPU and a memory.

2. Description of The Related Art

When a string in which a plurality of 8-bit, 16-bit or 32-bit data elements continue is transferred, compared and retrieved in the conventional data processor, the entire string is processed by repeating an operation in element unit several times.

When a bit string longer than a word length is operated, an operation of bit strings equal to or shorter than the word length is repeated several times for the operation of the entire bit string in the conventional data processor.

An instruction, which accesses the memory in an element unit or performs operation of bit string equal to or shorter than the word length is the one for accessing to the memory at random. Consequently, to operate data in the memory by such instructions means that consecutive data stored originally in a continuous memory area is divided into the small access units for the tedious operations by the instruction.

In order to solve the above stated problem, a data processor having a string operation instructions for operating strings, or a bit map operation instruction for operating the bit trains longer than word length, wherein these instructions are executed by a microprogram to access strings or bit trains in a data bus width unit for the efficient operations, is proposed. For example, there is a well known invention of a data processor disclosed in Japanese Patent Application Laid-Open NO. 4-109337 (1992) wherein the string operation instruction is efficiently executed. On the other hand, there is another well known data processor disclosed in Japanese Patent Application Laid-Open NO. 64-88837 (1989) wherein the bit map operation instruction is efficiently executed.

In the conventional data processor, only the data which coincides with one word or data bus width could be transferred in one bus cycle when performing the string operations or bit train operations, therefore the performance of the data processor heavily relied on the data transfer speeds of the individual buses connecting the memory thereto. Particularly when a dynamic RAM chip (DRAM) is used as the memory, the operating speed thereof is lower than the bus access speed of the CPU, therefore one or two wait cycles must have been inserted in the bus access; that is, the performance of the bus access restricted the operation speed of the data processor.

SUMMARY OF THE INVENTION

The present invention is conceived in the above stated circumstance and is comprising the following four invention items.

The data processor related to the present invention comprises, in a first, second and third aspects, an external memory connected to a data bus of a first bit width, an instruction decoder for decoding instructions, an execution control unit for generating control signals which control executions of the instructions by being given the signals indicating the decode results of the instructions by the instruction decoder, a data register for holding the data to be processed of the instruction to be executed, an address register for holding the address in an external memory of the data to be processed, at least one operation unit performing the operations in unit of a second bit width equal to or longer than the first bit width, an instruction execution unit for executing the instructions in according to the control signals outputted from the execution control unit, and a bus interface unit for outputting/inputting the data of a third bit width greater than the second bit width necessary to execute the instruction to/from the external memory by burst transfer wherein the data is transferred n (integer, 2 or greater) times for one address output via the bus.

In a fourth aspect of the invention, the data processor comprises a plurality of internal registers holding the internal status in addition to the configuration of the above first, second and third aspects.

In the data processor related to the present invention of the first aspect, when the instruction decoder decodes a multi-bit data string operation instruction which stores each bit, resultant from a predetermined operation which is executed successively between each bit of a first multi-data string continuously stored in a first memory area of the external memory and a second multi-bit data string continuously stored in a second memory area of the external memory, into the first or second memory area, the execution control unit performs a first control for, by setting an address for sequentially reading data from the first and second memory areas in the address register in response to the signal given from the instruction decoder, reading each of first and second multi-bit data strings stored in the first and second memory areas respectively from the external memory by the third bit width by burst transferring via the bus interface unit, and for storing the data strings in the data register, according to the address set in the address register, a second control for, by giving the signal specifying the predetermined operation to the operation unit based on the signal given from the instruction decoder, performing the predetermined operation between the first data string of the third bit width and the second data string of the third bit width having been stored in the data register in unit of the second bit width, and for storing the operation result again in the data register as a third data string of the third bit width, a third control for, by setting an address for sequentially storing data in the first or second memory area in the address register in response to the signal sent from the instruction decoder, storing the third data string of the third bit width having been stored in the data register in the first or second memory area by burst transferring via the bus interface unit, according to the address set in the address register, and a fourth control for, by repeating the first, second and third controls for predetermined times in response to the signal sent from the instruction decoder, storing the third data string successively into the first or second memory area.

In the data processor related to the present invention of the second aspect, when the instruction decoder decodes a multi-bit data string operation instruction which stores each bit, resultant from a predetermined operation which is executed successively on a multi-bit data string continuously stored in a first memory area of the external memory, into the first memory or in a second memory area other than the first memory area, the execution control unit performs a first control for, by setting an address for sequentially reading data from the first memory area in the address register in response to the signal sent from the instruction decoder, reading the multi-bit data string stored in the first memory area from the external memory by the third bit width by burst transferring via the bus interface unit, and for storing the data string in the data register, according to the address set in the address register, a second control for, by giving the signal specifying the predetermined operation to the operation unit based on the signal given from the instruction decoder, performing the predetermined operation on a first data string of the third bit width stored in the data register in unit of the second bit width, and store the operation result again as a second data string of the third bit width, a third control for, by setting an address for sequentially storing data in the first or second memory area in the address register in response to the signal sent from the instruction decoder, storing the second data string of the third bit width having been stored in the data register in the first or second memory area by burst transferring via the bus interface unit, according to the address set in the address register, and a fourth control for, by repeating the first, second and third controls for predetermined times in response to the signal sent from the instruction decoder, and storing the second data string successively into the first or second memory area.

In the data processor related to the present invention of the third aspect, when the instruction decoder decodes a multi-bit data string operation instruction which repeatedly stores a predetermined bit pattern into an arbitrary memory area of the external memory, the execution control unit performs a first control for, based on the signal given from the instruction decoder, making the operation unit store the predetermined bit pattern in the data register in unit of the second bit width as a data string of the third bit width, a second control for, by setting an address for sequentially storing data in the arbitrary memory area in the address register in response to the signal given from the instruction decoder, storing the data string of the third bit width having been stored in the data register in the arbitrary memory area by burst transferring via the bus interface unit, according to the address set in the address register, and a third control for, by repeating the first and second controls for predetermined times based on the signal given from the instruction decoder, successively storing the data string stored in the data register into the arbitrary memory area.

In the data processor related to the present invention of the fourth aspect, when the instruction decoder decodes a multi-bit data string operation instruction which successively stores the data held in the plurality of internal registers into an arbitrary memory area of the external memory, the execution control unit performs a first control for, based on the signal given from the instruction decoder, making the operation unit store the data held in the plurality of internal registers into the data register in unit of the second bit width as a data of the third bit width, a second control for, by setting an address for sequentially storing data into the arbitrary memory area in the address register in response to the signal given from the instruction decoder, storing the data string of the third bit width having been stored in the data register into the arbitrary memory area by burst transferring via the bus interface unit, according to the address set in the address register, and a third control for, by repeating the first and second controls for predetermined times in response to the signal given from the instruction decoder, successively storing the data string stored in the data register into the arbitrary memory area, and when the instruction decoder decodes a multi-bit data string operation instruction which successively stores the data stored in the arbitrary memory area of the external memory into the plurality of internal registers by the third control, the execution control unit performs a fourth control for, by setting an address for sequentially reading data from the arbitrary memory area in the address register in response to the signal given from the instruction decoder, reading the multi-bit data string having been stored in the arbitrary memory area from the external memory by the third bit width by burst transferring via the bus interface unit, and for storing it into the data register, according to the address set in the address register, a fifth control for, based on the signal given from the instruction decoder, making the operation unit store the data string having been stored in the data register into the plurality of internal registers in unit of the third bit width, and a sixth control for, by repeating the first and second controls for predetermined times in response to the signal given from the instruction decoder, successively storing the data string stored in the data register into the plurality of internal registers.

The above and further objects and features of the invention will more fully be apparent from the following detailed description with accompanying drawings.

BRIEF DESCRIPTION OF THE DRAWINGS

FIG. 9 is a schematic diagram showing a bit pattern of an SCMP instruction and options of the data processor related to the present invention;

FIG. 11 is a schematic diagram showing the bit pattern of an SSTR instruction and options of data processor related to the present invention;

FIG. 12 is a schematic diagram showing a bit pattern of a BVSCH instruction and options of the data processor related to the present invention;

FIG. 13 is a schematic diagram showing a bit pattern of a BVMAP instruction and options of the data processor related to the present invention;

FIG. 14 is a schematic diagram showing a bit pattern of a BVCPY instruction and options of the data processor related to the present invention;

FIG. 15 is a schematic diagram showing a bit pattern of a BVPAT instruction and options of the data processor related to the present invention;

FIG. 35 is a table showing conditions wherein two operands can be simultaneously parallel-transferred in the data processor related to the present invention;

FIG. 38 is a table of peak values of processing speeds of individual string instructions executed by the data processor related to the present invention;

FIG. 39 is a table of a peak value of processing speed of an arbitrary length bit field instruction executed by the data processor related to the present invention;

FIG. 40 is a table showing a correspondence between a instructions executing pre-jump processing and devices used for pre-jump in the data processor related to the present invention;

FIG. 42 is a timing chart showing a flow of instructions in the pipeline in the case where a jump occurs in an E stage in response to an unconditional branch instruction (BRA) in the data processor related to the present invention;

FIG. 43 is a timing chart showing a flow of instructions in the pipeline in the case where jump takes place in a D stage in response to the unconditional branch instruction (BRA) in the data processor related to the present invention;

FIG. 44 is a table showing the presence or absence of pre-jump processings and minimum processing times for each jump instruction of the data processor related to the present invention;

FIG. 45 is a schematic diagram showing the four types of pcdisp fields wherein the address is calculated for a jump to a PC relative address and two types of abs fields wherein cutting-out and sign extension operation are done for a JMP and JSR instructions to an absolute address in the data processor related to the present invention;

FIG. 58 is a table showing the combinations of the operands of preceding instructions and addressing modes of subsequent instructions, and presence or absence of pipeline stall by the combinations in the data processor related to the present invention;

FIG. 63 is a table showing stall times caused by the RAW data hazards between the memory operands in the data processor related to the present invention;

FIG. 64 is a schematic diagram showing an instruction train to avoid a read operation to unreasonable address by not executing an instruction (nonjump side instruction) following an unconditional jump instruction in the data processor related to the present invention;

FIG. 65 is a schematic diagram showing an instruction train to avoid a read operation to unreasonable address by not prefetching the operands of all the subsequent instructions from the external memory before jump/nonjump of instruction (Bcc, ACB, SCB, TRAP) which executes conditional jump is determined in the data processor related to the present invention;

FIG. 66 is a schematic diagram showing an instruction train to avoid a read operation to unreasonable address by not calculating a jump destination addresses other than an absolute address and a PC relative addresses for the subsequent instructions before jump/nonjump of instruction (Bcc, ACB, SCB, TRAP) which executes conditional jump is determined in the data processor related to the present invention;

FIG. 76 is a table showing microprogram fields and the contents of microoperations specifyable therein provided for controlling the first ALU of the data processor related to the present invention;

FIG. 77 is a table showing microprogram fields and the contents of microoperations specifyable thereby provided for controlling the second ALU of the data processor related to the present invention;

FIG. 78 is a schematic diagram showing a procedure of the coincidence/uncoincidence detection operation using the first ALU and second ALU related to the present invention;

FIG. 87 is a table of the wait numbers for data processing efficiencies at the execution of the SMOV instruction by the data processor related to the present invention;

FIG. 89 is a schematic diagram showing operands of the BVMAP instruction of the data processor related to the present invention;

FIG. 96 is a table of the wait numbers for data processing efficiencies at the execution of the BVMAP instruction by the data processor related to the present invention; and FIG. 97 is a table showing conditions (eeee) specifyable by the BVMAP instruction and their bit patterns of the data processor related to the present invention.

DESCRIPTION OF PREFERRED EMBODIMENTS

The present invention is described with reference to the drawings showing the embodiments thereof.

Figure 1:
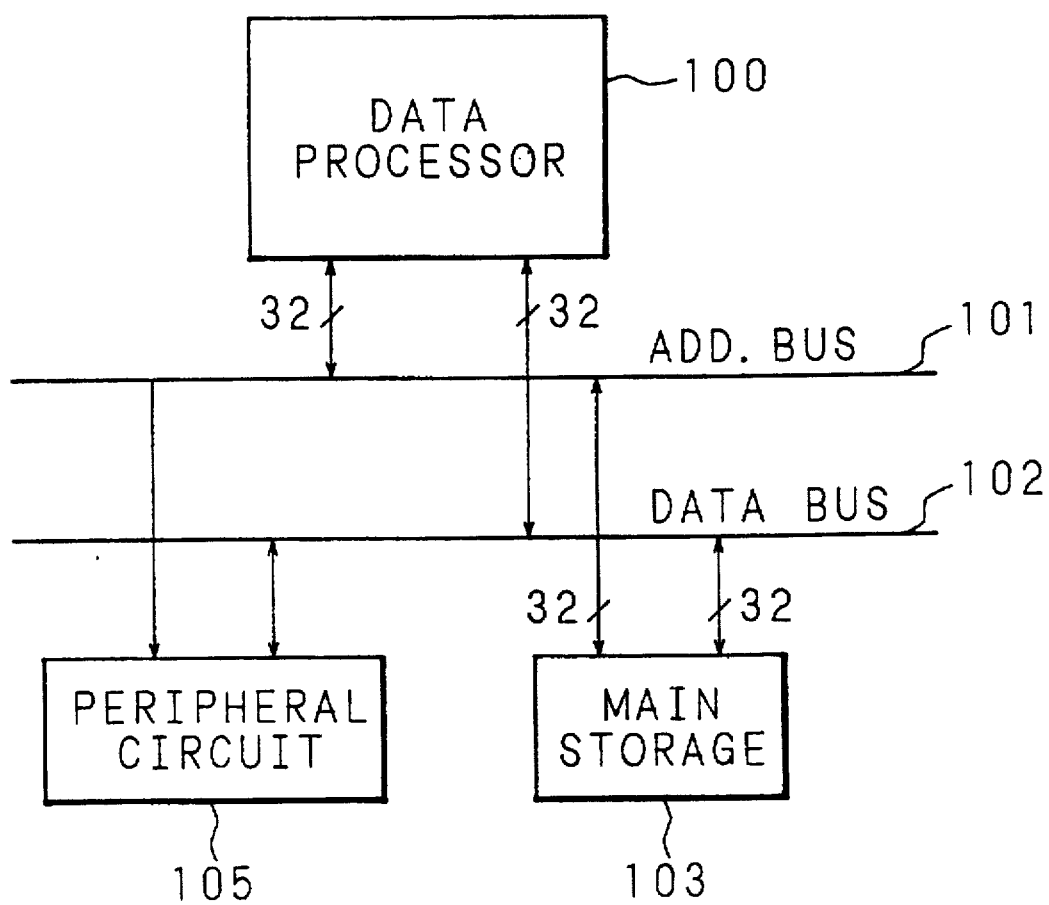
FIG. 1 is a block diagram showing a configuration of a system using a data processor related to the present invention.

(1) Configuration of a system wherein the data processor related to the present invention is used In a block diagram of FIG. 1, a configuration example of a system wherein the data processor related to the present invention is used is shown. In addition, the data processor related to the present invention is indicated by the reference number 100 in FIG. 1.

The data processor 100 related to the present invention is connected to a main storage 103 and a peripheral circuit 105 via a 32-bit width address bus 101 and a 32-bit width data bus 102, respectively, to access them. It is assumed that, a control circuit, a DMAC, a timer and the like that are needed by the users for their special purposes are built in the peripheral circuit 105, therefore they are not built in the data processor 100 related to the present.

The peripheral circuit 105 can be configured in a form of an ASIC building-in the control circuit, DMAC, timer and the like which are necessary for the individual users.

The main storage 103 can be configured by a DRAM or a PROM.

The main storage 103 can be accessed by single transfer wherein one address is outputted in one bus cycle to access equal to or less-than 32 bits of data, or by burst transfer wherein one address is outputted in one bus cycle to access four 32-bit data (16 bytes total).

Figure 2:
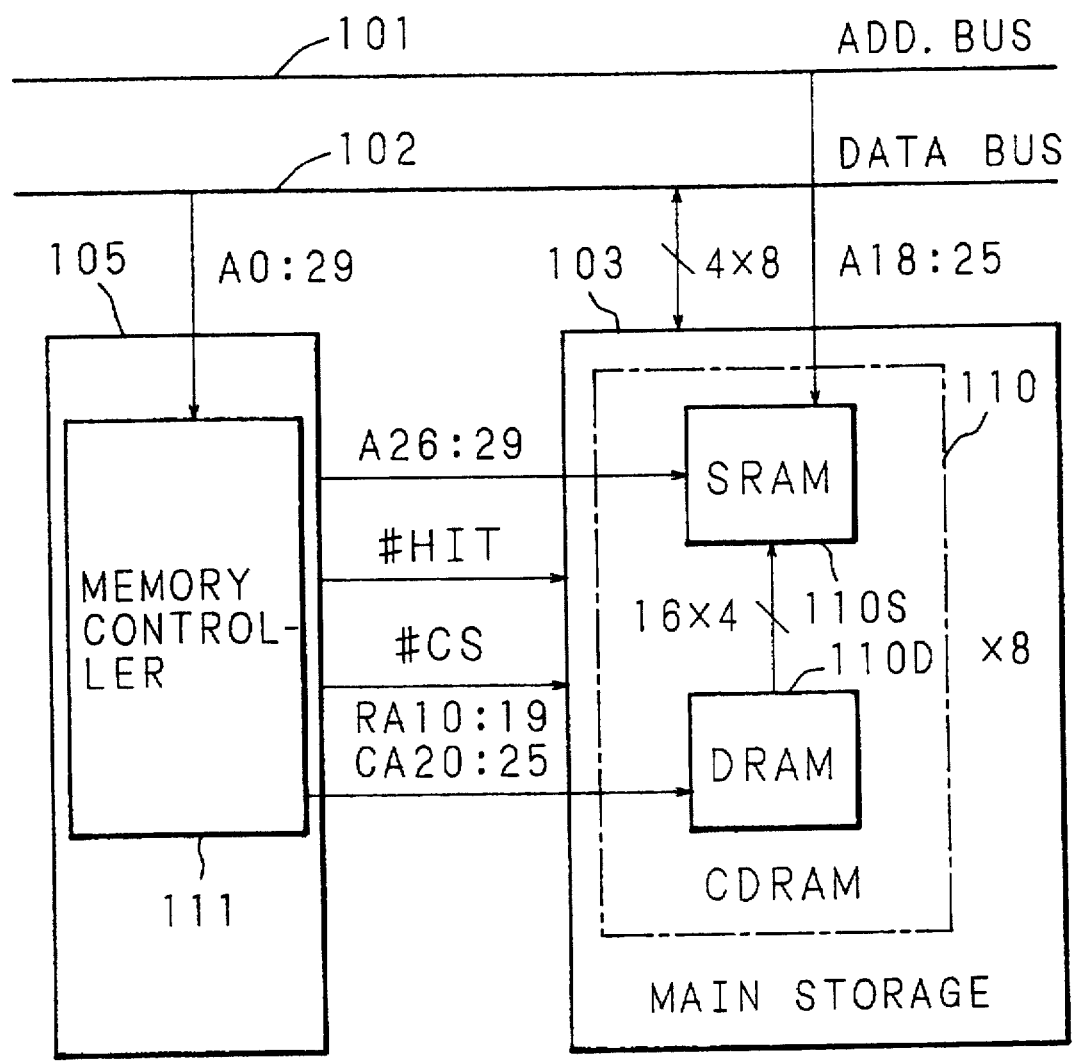
FIG. 2 is a block diagram showing a configuration of a memory system of the data processor related to the present invention.

FIG. 2 is a block diagram showing a configuration example of the main storage 103 and its controller. In this example, a memory system in which a CDRAM (Cache-DRAM) is used as the main storage 103 is shown.

Reference numeral 111 indicates a memory controller which is built in the peripheral circuit 105. In this example, eight pieces of MSM44409 manufactured by Mitsubishi Electric Corporation are used for the CDRAM 110, so that 4M byte memory having a direct mapping cache of 16-words×256 entries is realized. Each piece of the MSM44409 builds in a 16K-byte SRAM 110S and 4M-byte DRAM 110D, and is a 4M-byte synchronous DRAM in which the SRAM 110S operates as a cache memory of a block size of 16 words. In the CDRAM 110, the SRAM 110S performs as a store buffer for a write access to the DRAM 110D; therefore when the SRAM 110S is hit, write access can be done same timing with a read access in a high speed.

When the CDRAM 110 is hit, the data processor 100 related to the present invention can perform a block transfer in the single transfer mode or burst transfer mode with zero wait. Even when the CDRAM 110 misses, the second to fourth transfers can be accomplished by a block transfer in the burst transfer mode with zero wait. When the block transfer in the burst mode is to be done, a memory controller 111 asserts a #HIT signal and wraps around the bits 28 and 29 of the address in the ascending order to access the CDRAM 110.

Figure 3:
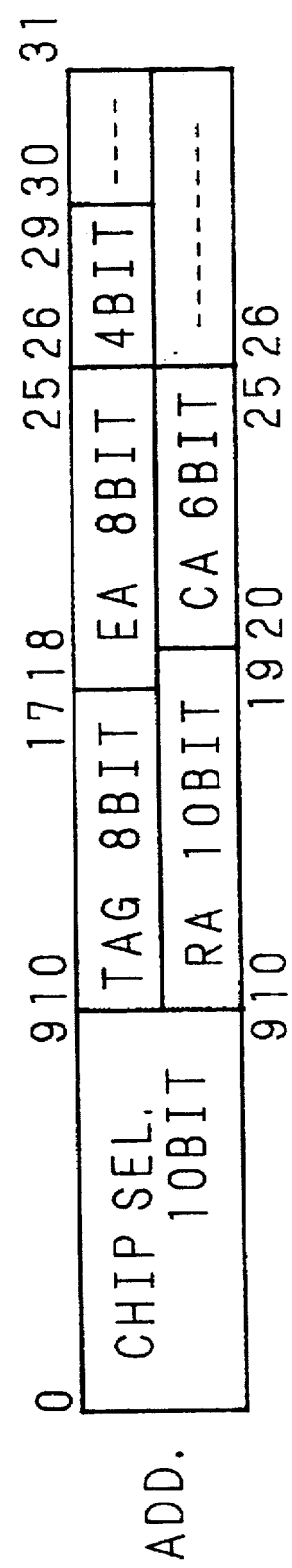
FIG. 3 is a schematic diagram showing an address allocation of the memory system of the data processor related to the present invention.

FIG. 3 shows an address allocating method for the memory system using the CDRAM 110.

Bits 0 to 9 (A0:9) of the address is a chip select address for selecting the 4M-byte memory space. At cache accessing, bits 10 to 17 (A10:17) are used as tag address of the cache. Bits 18 to 25 (A18:25) are used for specifying an entry address. Bits 26 to 29 (A26:29) are used for specifying a word address in the block. Furthermore, at accessing the DRAM, bits 10 to 19 (A10:19) are used as a row address and bits 20 to 25 (A20:25) are used as a column address.

The instruction system, processing mechanism and bus operation mechanism of the data processor 100 related to the present invention are described and then detail operations of the string operation instructions and bit map operation instructions are explained.

(2) Instructions of the data processor related to the present invention (2.1) Instruction format The instructions of the data processor 100 related to the present invention are variable-length in 16-bit unit there is no odd-number byte length instruction.

In the data processor 100 related to the present invention, the instructions which are frequently used are in a short format, therefore it has a special instruction format system. For example, its basic configuration is "4 bytes+extension part" for two-operand. It has two types of formats: general format wherein all the addressing modes can be used, and short format wherein only frequently-used instructions and addressing modes can be used.

FIG. 4, FIG. 5, FIG. 6 and FIG. 7 are the schematic diagrams showing the instruction formats of the data processor 100 related to the present invention. The symbols used in the drawings have the following meanings.

—: indicates a portion wherein an operation code enters

Figure 4:
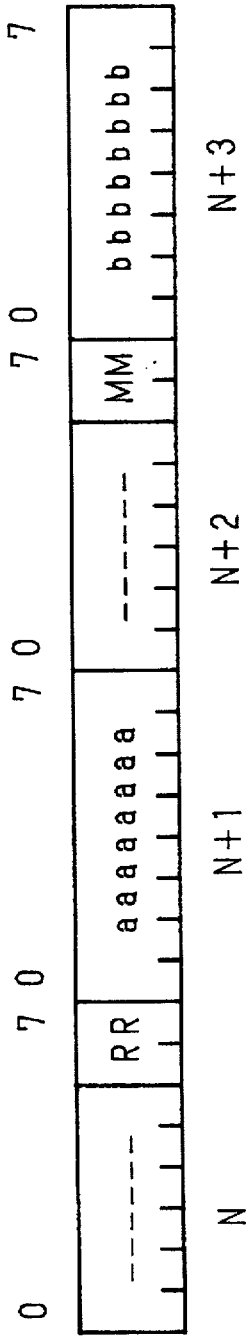
FIG. 4 is a schematic diagram showing an instruction format of the data processor related to the present invention.
Figure 5:
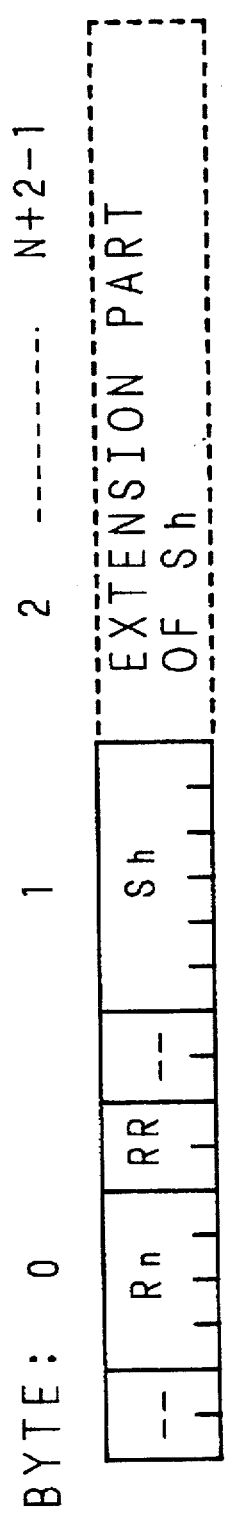
FIG. 5 is a schematic diagram showing an instruction format of the data processor related to the present invention.
Figure 6:
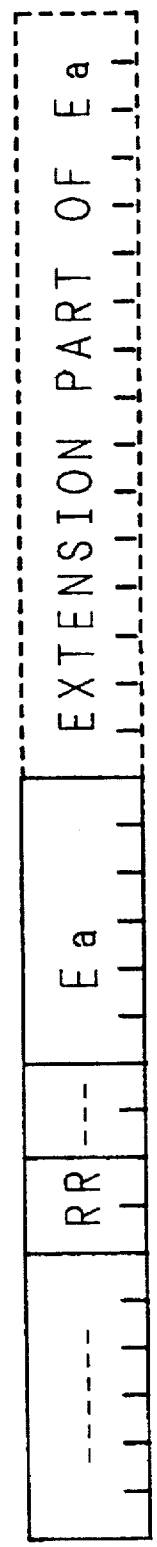
FIG. 6 is a schematic diagram showing an instruction format of the data processor related to the present invention.
Figure 7:
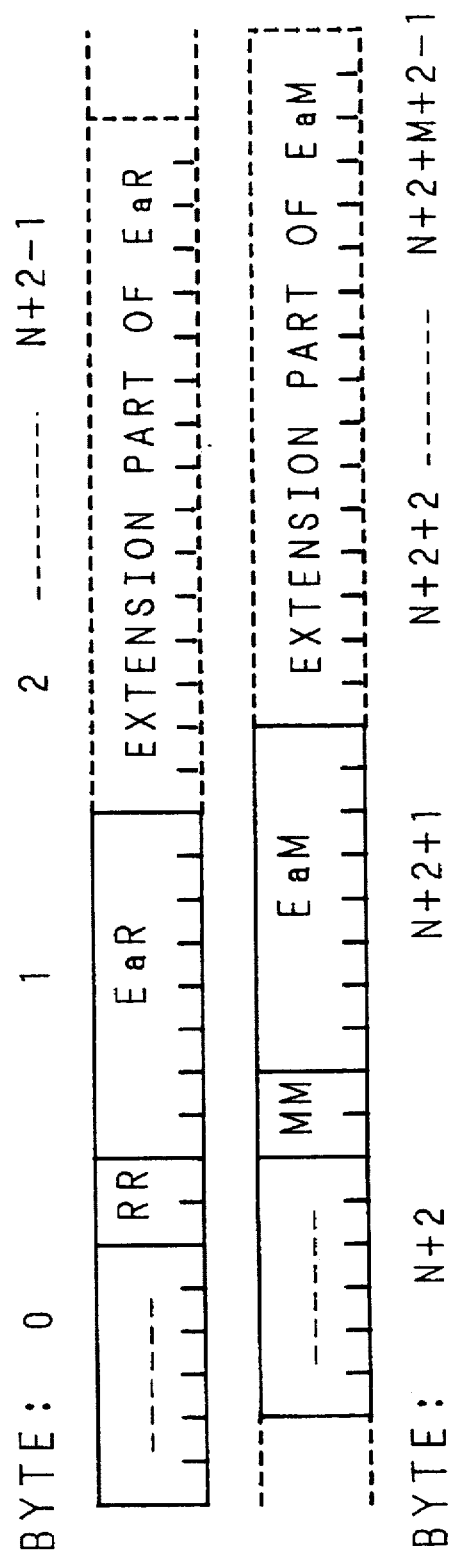
FIG. 7 is a schematic diagram showing an instruction format of the data processor related to the present invention.

Ea: indicates a portion wherein an operand is specified by 8-bit general type addressing mode Sh: indicates a portion wherein an operand is specified by 6-bit short type addressing mode Rh: indicates a portion wherein an operand on the register file is specified by the register number In the formats, the right side is the LSB and higher address as shown in FIG. 4. The instruction format can be determined only after the two bytes of address N and address N+1 are seen; this is because the instructions are premised to be fetched and decoded in 16-bit (half word) unit.

In all the formats of the instructions of the data processor 100 related to the present invention, an extension part of the Ea or Sh of each operand is placed just after the 16 bits (half word) including the basic part of the Ea or Sh. These has priority over the immediate data implicitly specified by the instructions and an extension part of the instructions. Consequently, an operation code of the instruction may be decomposed by the extension part of the Ea in an instruction comprising more than 4 or more bytes.

The instruction formats of the data processor 100 related to the present invention are disclosed in Japanese Patent Application Laid-Open No. 64-91228 (1989) and U.S. Pat. No. 5,029,069.

(2.2) Addressing modes

There are two method for specifying addressing mode of the instructions of the data processor 100 related to the present invention as follows: short format wherein the addressing mode is specified by 6 bits including a register, and general format wherein it is specified by 8 bits including the same.

When an undefined addressing mode is specified or a combination of the addressing modes which are apparently unreasonable in regard of their meanings is specified, an reserved instruction exception is generated and an exception processing starts in the same way when an undefined instruction is executed. This applies to the cases such that the destination is in the immediate mode, and the immediate mode is used in an addressing mode specifying field which must accompany with address calculation.

The data processor 100 related to the present invention supports various addressing modes. Register direct mode, register indirect mode, register relative indirect mode, immediate mode, absolute mode, PC relative indirect mode, stack pop mode, stack push mode and chained mode are supported by the data processor 100 related to the present invention.

In the register direct mode, the contents of the register is designated intact as the operand.

In the register indirect mode, the data stored in the address which is the contents of the general purpose register of the memory is designated as the operand.

There are two cases for the register relative indirect mode: the displacement value is composed of 16 bits, and it is composed of 32 bits. In either case, the data stored in the address, which is the value obtained by adding the contents of the general-purpose register and 16-bit/32-bit displacement value, of the memory is designated as the operand. The displacement value is handled as a signed value.

In the immediate mode, a bit pattern specified in the instruction code is regarded as a binary number and designated as the operand. The size of the immediate is specified as the operand size in the instruction.

There are two cases for the absolute mode: the address value is indicated by 16 bits, or it is indicated by 32 bits. In either case, the data stored in the address, which is the bit pattern composed of 16 bits or 32 bits specified in the instruction code, of the memory is designated as the operand. When the address is specified by 16 bits, specified address value is sign-extended to 32 bits.

There are two cases for the PC relative indirect mode: the displacement value is composed of 16 bits, or it is composed of 32 bits. In either case, the data stored in the address, which is the value obtained by adding contents of the program counter and the 16-bit/32-bit displacement value, of the memory is designated as the operand. The displacement value is handled as a value with a code. The contents of the program counter referenced in the PC relative indirect mode is the start address of the instruction including the operand.

The stack pop mode is an addressing mode wherein the data stored in the address, which is the contents of the stack pointer (SP), of the memory is designated as the operand. After the operand accessing, the SP is incremented by the operand size. For example, when 32-bit data is handled, the SP is incremented by "4" after the operand accessed. The stack pop mode can be specified for a 8-bit, 16-bit or 64-bit operand, and the SP is incremented by "1", "2" or "8", respectively.

The stack push mode is an addressing mode wherein the data stored in the address, which is the value obtained by decrementing the contents of the SP from the operand size, of the memory is designated as the operand. In this mode, the SP is decremented before the operand accessing. For example, when 32-bit data is handled, the SP is decremented by "4" before the operand accessing. The stack push mode can be specified for a 8-bit, 16-bit or 64 bit operand, and the SP is decremented by "1", "2" and "8", respectively.

The chained mode is an addressing mode wherein the value of the general-purpose register or PC is designated as the base address, and the index register value or displacement value is added thereto to obtain an address, or memory indirect addressing is done on the basis of the address.

The addressing modes for the instructions of the data processor 100 related to the present invention are also described in details in Japanese Patent Application Laid-Open NO. 84-91253 (1989).

(2.3) String operation instruction

The string is a data type in which 8-bit, 16-bit or 32-bit data elements are continuously arranged in arbitrarily length. There are no restrictions on the contents of individual data, and there are cases in which each data becomes character codes, integers or floating decimal points. Each case is interpreted by the user. The size of the string is specified as a part of instruction options. The element sizes (sx) and corresponding bit patterns which can be specified by the string operation instructions of the data processor 100 related to the present invention are as follows.

sx=00: 1 byte
sx=01: 2 bytes
sx=10: 4 bytes
sx=11: can not be specified

The range of string is indicated by specifying the length of string (number of data), or the character (terminator) indicating the end of string. Either one of them can be selected according to the purposes for use. In the string operation instructions of the data processor 100 related to the present invention, the number of strings becomes is a parameter. Furthermore, the terminator as a trap condition or the termination condition of instruction can be given and both specifying methods also can be used. The trap condition is specified as a part of the instruction option.

In the data processor 100 related to the present invention, many conditions can be specified including greater/smaller comparison or two-value comparison as the trap condition of the string operation instruction (SMOV, SCMP and SSCH); this is a great feature of the present invention. Particularly, for the SSCH instruction for string search, a retrieval condition is specified as the trap condition; therefore only the trap condition is meaningful for the instruction. The conditions that can be specified by the string operation instructions of the data processor 100 related to the present invention and their bit patterns (eeee) are shown in FIG. 99.

In the string search (SSCH) instruction, not only the data group placed in a consecutive area but also the data group placed in the addresses separated from each other with a certain interval is supported as a string. That is, the increase and decrease of pointer can be set arbitrarily for this instruction and it can be used for table retrieval or multidimensional arrangement scanning.

On the other hand, the string operation instructions can be used for searching a specific bit pattern, block transfer to the memory, assigning a structure, clearing memory area, etc. in addition to 8-bit/16-bit character string processing to the letter.

Since the string operation instructions handle data of uncertain lengths like an arbitrary bit field instruction described later, interrupt service during execution and the resumption of execution are the must. On the other hand, the string operation instructions do not likely to become the codes generated by the compiler but are offered as the subroutines described by the assembler in many cases. Consequently, the restrictions on symmetry or addressing mode is not significant. In this circumstance, the built-in fixed-number registers (R0 to R4) are used for the string operation instructions of the data processor 100 related to the present invention to hold the operands or the intermediate status during executions. The registers are mainly used for the following purposes.

R0: for start address of the source-side string (arc)
R1: for start address of the destination-side string (dest).
R2: for length of string, number of elements
R3: for reference value of trap condition Among the above, the R2 expresses the length of string by the number of elements not by the number of bytes. It is handled as number without sign. When R2=0, it means that the execution of an instruction does not end by the number of elements. That is, when it is not required to terminate the execution of the instruction by the number of elements, R2=0 must be specified when executing it.

Figure 8:
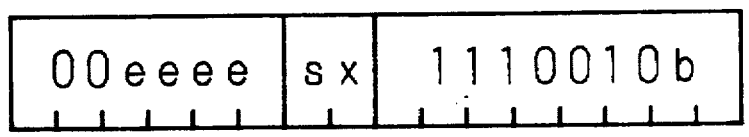
FIG. 8 is a schematic diagram showing a bit pattern of an SMOV instruction and options of the data processor related to the present invention.

The SMOV instruction is the instruction for transferring the string. The bit pattern of the instruction and its optional functions are shown in FIG. 8.

The SCMP instruction is the instruction for comparing two strings. The bit pattern of the instruction and its optional functions are shown in FIG. 9.

Figure 10:
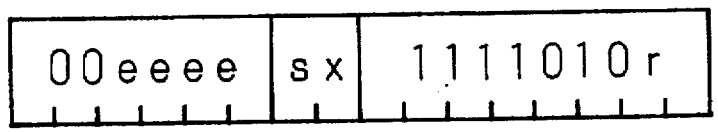
FIG. 10 is a schematic diagram showing a bit pattern of an SSCH instruction and options of the data processor related to the present invention.

The SSCH instruction is the instruction for searching the string. The bit pattern of the instruction and its optional functions are shown in FIG. 10.

The SSTR instruction is the instruction for storing the elements specified by the R3 register in a plurality of memories. The bit pattern of the instruction and its optional functions are shown in FIG. 11.

(2.4) Bit map operation instructions

The data processor 100 related to the present invention has the bit map operation instructions which operate the bit string of an arbitrary length exceeding the word length, and are useful when operating the bit map display. As the bit map operation instructions, there are a BVMAP instruction for executing the general operations and transfer of bit strings, a BVCPY instruction executing transfer of bit string, the BVPAT instruction for executing operations and transfer of repeating patterns, and a BVSCH instruction for searching the bits "0" or "1" in the bit string. Among the above, the BVMAP, BVPAT and BVCPY instructions are the instructions whose primary purpose are window operation (bitblt) on the bit map display.

The bit map operation instructions have many operands and their execution times are long. Consequently, mechanism for receiving interrupt during the instruction execution and resuming execution of the instruction after receiving the interrupt are necessary. The data processor 100 related to the present invention uses the fixed-number registers for specifying the operands and expressing the proceeding status of operations. Therefore, even when an interrupt is generated while the bit map operation instruction is being executed, the execution of the bit map operation instruction can be resumed after the interrupt processing when the register is correctly saved and returned in the interrupt processing handler. That is, even when the status is saved after the saving the execution of the instruction or the context is switched, or the same bit map operation instruction is executed after the context switching in the other context and then the execution of the bit map operation instruction is resumed by returning to the previous context, the operations are performed with no trouble.

The BVSCH instruction is the instruction for searching the bits "0" or "1" in a bit string of an arbitrary length. The bit pattern of the instruction, its optional functions, and the parameters on the register are shown in FIG. 12.

The BVMVP instruction is the instruction for performing operations of a bit string of an arbitrary length. The bit pattern of the instruction, its optional functions and the parameters on the register are shown in FIG. 13.

The BVCPY instruction is the instruction for copying a bit string of an arbitrary length. The bit pattern of the instruction, its optional functions and the parameters on the register are shown in FIG. 14.

The BVPAT instruction is the instruction for performing the operations of a bit string of an arbitrary length and pattern. The bit pattern of the instruction, its optional functions and the parameters on the register are shown in FIG. 15.

Figure 16:
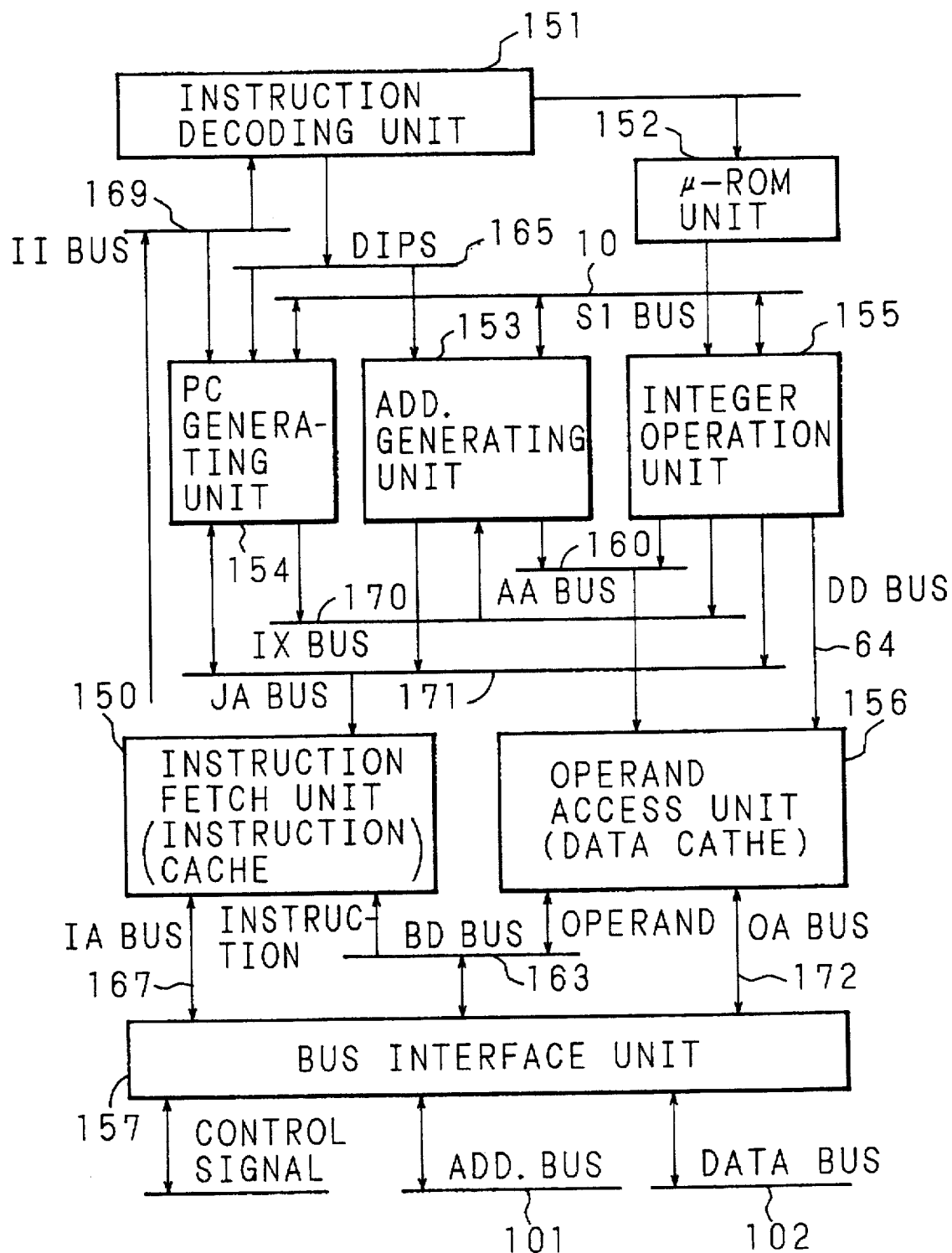
FIG. 16 is a block diagram showing a configuration example of the data processor related to the present invention.

(3) Functional blocks of the data processor related to the present invention
(3.1) Configuration of functional blocks The block diagram of the data processor 100 related to the present invention is shown in FIG. 16.

From the functional viewpoint, the data processor 100 related to the present invention is roughly divided into an instruction fetch unit (IFU) 150, an instruction decoding unit (DU) 151, a micro-ROM unit (RU) 152, an address generating unit (AGU) 153, a PC generating unit (PCU) 154, an integer operation unit (IU) 155, an operand access unit (OAU) 156 and a bus interface unit (BIU) 157. The bus interface unit 157 is connected to the external devices via the address bus 101 (A00:31), the data bus 102 (D00:31) and the various signals.

The instruction fetch unit 150 fetches the instructions from a built-in instruction cache 200 (see FIG. 18) or the external memory (main storage 103).

The instruction decoding unit 151 decodes the instructions transferred from the instruction fetch unit 150 via the II bus 169.

The micro-ROM unit 152 controls the integer operation unit 155 according to the microprogram.

The PC generating unit 154 calculates a PC value of the instruction. The address generating unit 153 calculates an address of the operand.

The operand access unit 156 fetches the operand from the built-in data cache 200 or the external memory and stores the operand in the external memory.

The instruction is fetched from the bus interface unit 157 to the instruction fetch unit 150, decoded by the instruction decoding unit 151 and executed in the integer operation unit 155 by the microprogram control of the micro-ROM unit 152. The PC value calculation of the instruction, address calculation of the operand and access to the operand are performed by the hard-wired control in the other block independent of integer operation.

The addresses of the instructions are transferred from the individual units to the instruction fetch unit 150 via a JA bus 171. The operands are transferred from the individual units to the operand access unit 156 via an AA bus 160. Transfer of the operands between the integer operation unit 155 and the operand access unit 156 are performed by a DD bus 164.

(3.2) Bus interface unit

The bus interface unit 157 issues bus cycles in response to the request for the instruction fetch unit 150 or operand access unit 156, and accesses the external memory, that is, the main storage 103.

memory accessing of the data processor 100 related to the present invention is performed by clock-synchronous protocol. One bus cycle needs at least two clock cycles.

There are two transfer methods of read cycles as follows: single transfer method wherein the instruction codes or data within 4-byte boundaries are fetched by one bus transfer, and block transfer method where in the instruction codes or data within 16-byte boundaries are fetched at one time by four bus transfers. Furthermore, there are two modes of block transfers as follows: burst mode wherein one address is outputted one time to fetch the instruction codes or data four times consecutively, and quad move mode wherein one address is outputted four times to fetch the instruction codes or data four times consecutively.

In the same manner as for the read cycle as stated above, there are two transfer methods for the write cycle as follows: single transfer method wherein the data within the 4-byte boundaries is stored by one bus transfer, and block transfer method wherein the data within the 16-byte boundaries is stored at once by four bus transfers. Furthermore, there are two block transfer modes for the write cycle as follows: burst mode wherein one address is outputted one time to store the data four times consecutively, and quad move mode wherein one address is outputted four times to store the data four times consecutively. The bus cycles and the inputs/outputs of various signals are controlled by the hard wired control in the bus interface unit 157.

Figure 17:
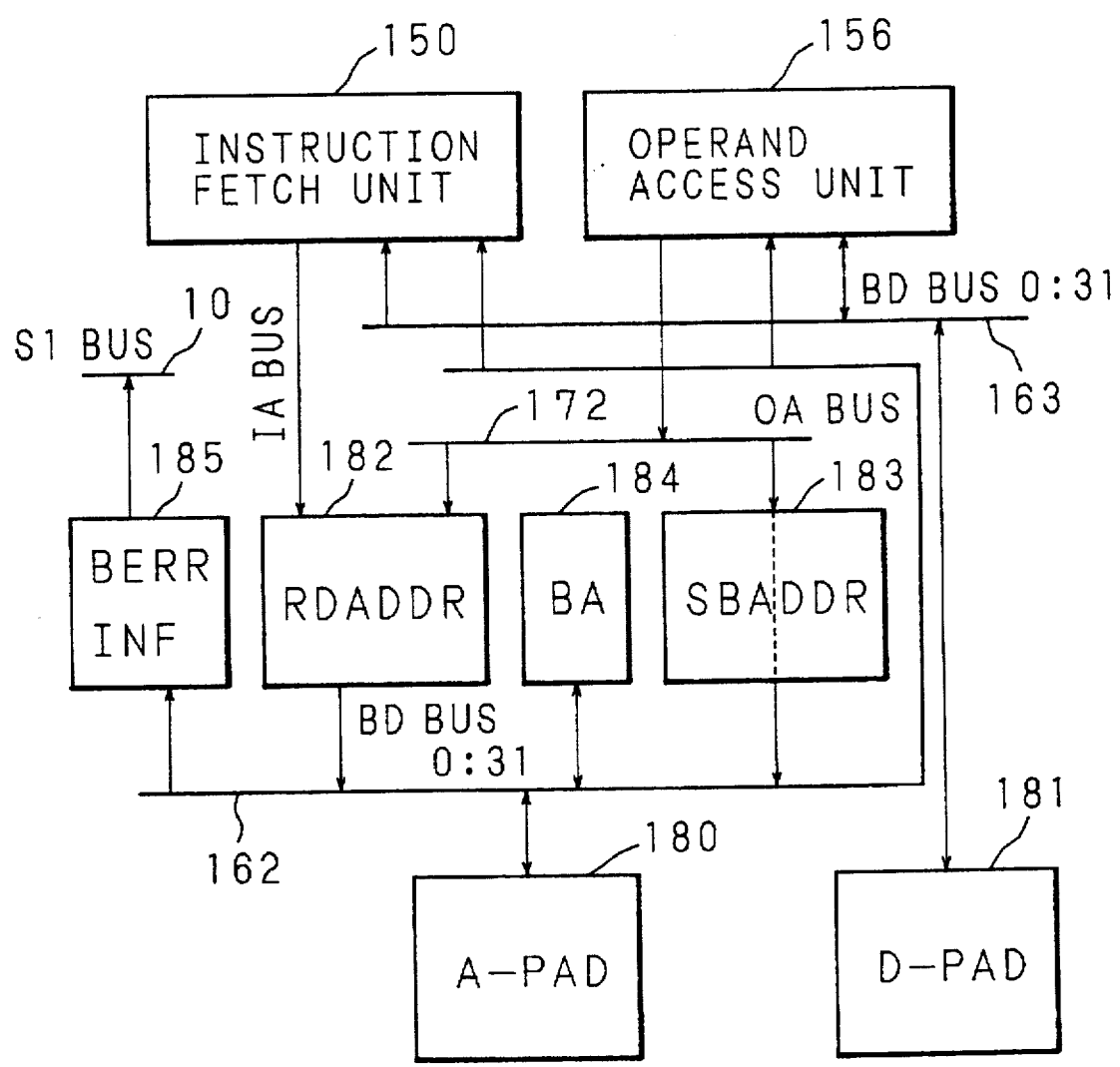
FIG. 17 is a block diagram showing a configuration example of a bus interface unit of the data processor related to the present invention.

The block diagram of the bus interface unit 157 is shown in FIG. 17. It also shows the instruction fetch unit 150 and operand access unit 156.

The operand access unit 156, the instruction fetch unit 150 and an address pad 180 (A-pad) are connected to each other by a BA bus 162.

An RDADDR 182 is a register which outputs the address sent from the IA bus 167 or an OA bus 172 to the BA bus 162 at the time of instruction fetch or data read.

An SBADDR 183 is an address holding unit (register) of a store buffer 292, and holds two addresses.

A BA 184 is a circuit which increments the address at the time of block transfer of data or instructions. When an bus error has occurred, the address and input/output information are held in a bus error information register BERRINF 185 of the bus interface unit 157, and outputted to an SI bus 10.

The operand access unit 156 and instruction fetch unit 150 are connected to a BD bus 163 via a data pad 181 (D-pad).

At data reading, the bus interface unit 157 fetches data from the OA bus 172 according to the address outputted from the operand access unit 156 to the external address bus 101 via the OA bus 172, RDADDR 182 and BA bus 162, and then transfers it to the operand access unit 156 via the BD bus 163. When data is fetched by the quad move mode of block transfer, one address is outputted from the operand access unit 156, and the BA register 184 wraps around the lower bits of the remaining three addresses and outputs them.

At data writing, an address is outputted from the operand access unit 156 to the address bus 101 via the OA bus 172, SBSADDR 183 and BA bus 162, and then data is outputted to the data bus 102 via the BD bus 163. When writing data by the quad mode of block transfer, one address is outputted from the operand access unit 156 and the BA register 184 wraps around the lower bits of the remaining three addresses and then outputs them.

At instruction fetching, the bus interface unit 157 fetches the instruction code from the data bus 102 according to the address outputted from the instruction fetch unit 150 to the external address bus 101 via the IA bus 167, RDADDR 182 and BA bus 162, and then transfers it to the instruction fetch unit 150 via the BD bus 163. When fetching the instruction code by the quad move mode of block transfer, one address is outputted from the instruction fetch unit 150 and the BA register 184 wraps around the lower bits of the remaining three addresses and then output them.

The bus interface unit 157 receives external interrupts and controls bus arbitration as well as accesses the memory. When an external device other than the data processor 100 related to the present invention is a bus master and the data processor 100 related to the present invention is performing a snoop operation, the bus interface unit 157 fetches the address outputted to the address bus 101 and transfers it to the instruction fetch unit 150 and operand access unit 156 via the BA bus 162 in the case where the external device executes data write or an invalid cycle. Address fetch operation in the bus snoop operation is executed asynchronously with the clock in the case where a #DS signal 604 is asserted at the time when the bus right is released (while a #HACK signal 609 later described is being asserted).

(3.3) Instruction fetch unit

Figure 18:
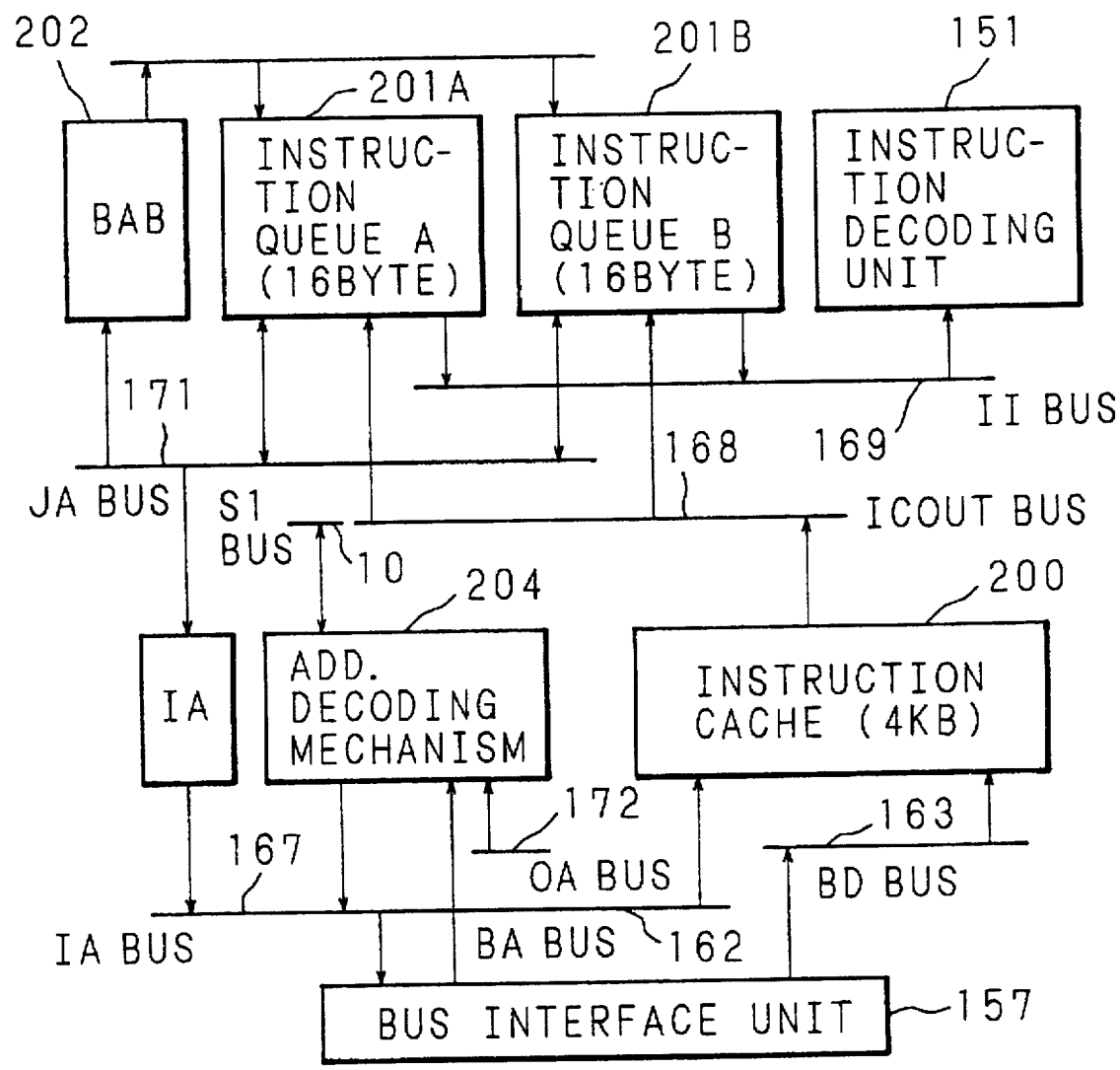
FIG. 18 is a block diagram showing a configuration example of an instruction fetch unit of the data processor related to the present invention.

The block diagram of the instruction fetch unit 150 is shown in FIG. 18. The instruction decoding unit 151 and bus interface unit 157 are also shown in FIG. 18.

The instruction fetch unit 150 has the 4KB built-in instruction cache 200, 16-byte instruction queue (A, B) 201, and their controllers.

The instruction fetch unit 150 fetches the instruction code from the built-in instruction cache 200 according to the address of the instruction to be fetched next and transfers it to the instruction decoding unit 151 via the instruction queue 201.

The bus interface unit 157 and the instruction cache 200 are connected by a 32-bit address bus 101 (IA bus 167) and 32-bit data bus 102 (BD bus 163). The instruction cache 200 and the instruction queue 201 are connected by a 64-bit ICOUT bus 168.

An instruction outputted from the bus interface unit 157 is transferred to the instruction cache 200 via the BD bus 163. An instruction code outputted from the instruction queue 201 is transferred to the instruction decoding unit 151 via an II bus 169.

An address of instruction is inputted to the address decoding mechanism 204 and instruction cache 200 from the JA bus 171 via the IA register 203.

The instruction cache 200 is operated by the direct map control with the configuration of 16 bytes×256 entries. The instruction cache 200 outputs a cache address tag and instruction code according to the lower 12 bits of the address transferred from the IA register 203. The cache address tag is compared with the higher 20 bits of the address. When they are equal, the instruction cache 200 is hit and the instruction code is transferred to the instruction queue 201 via the ICOUT bus 168. When the instruction queue 201 is empty at this time, the instruction code is transferred to the instruction decoding unit 151 at the same timing via the II bus 169 bypassing the instruction queue 201. When the instruction cache 200 is missed, the instruction address is outputted from the address decoding mechanism 204 to the bus interface unit 157 via the IA bus 167, the external memory (main storage 103) is accessed by block transfer to fetch the instruction code, and an entry of the instruction cache 200 is updated.

The address decoding mechanism 204 has registers: IOADDR, IOMASK and NCADDR. It checks whether the instruction address enters the I/O area or not, and enters the non-cache area or not. Furthermore, the address decoding mechanism 204 checks whether the operand address transferred from the OA bus 172 enters the I/O area or not, and enters the non-cache area or not.

One of the instruction queue 201 prefetches the instruction code following a conditional branch instruction and queues it, and the other element thereof prefetches the instruction code of the destination of the conditional branch instruction and queues it. The branch destination address at the time when the two of the instruction queue 201 have fetched the instructions and have decoded a conditional branch instruction is held in the branch destination address register (BAB) 202, and the instruction is newly fetched from the address after the preceding conditional branch instruction is executed and either one of the instruction queue 201 is cleared. An instruction address other than the jump destination address is calculated by a dedicated counter provided in each element of the instruction queue 201. When a jump occurs, a new instruction address is loaded to the counter of each element of the instruction queue 201 from the address generating unit 153, PC generating unit 154 or integer operation unit 155 via the JA bus 171.

When the data processor 100 related to the present invention is performing the bus snoop operation, the bus interface unit 157 monitors addresses on the external address bus 101 and the result is transferred to the instruction cache 200 via the BA bus 162. The bus interface unit 157 transfers the address of the memory whereto the data processor 100 related to the present invention has written data to the instruction cache 200 too.

(3.4) Instruction decoding unit

Figure 19:
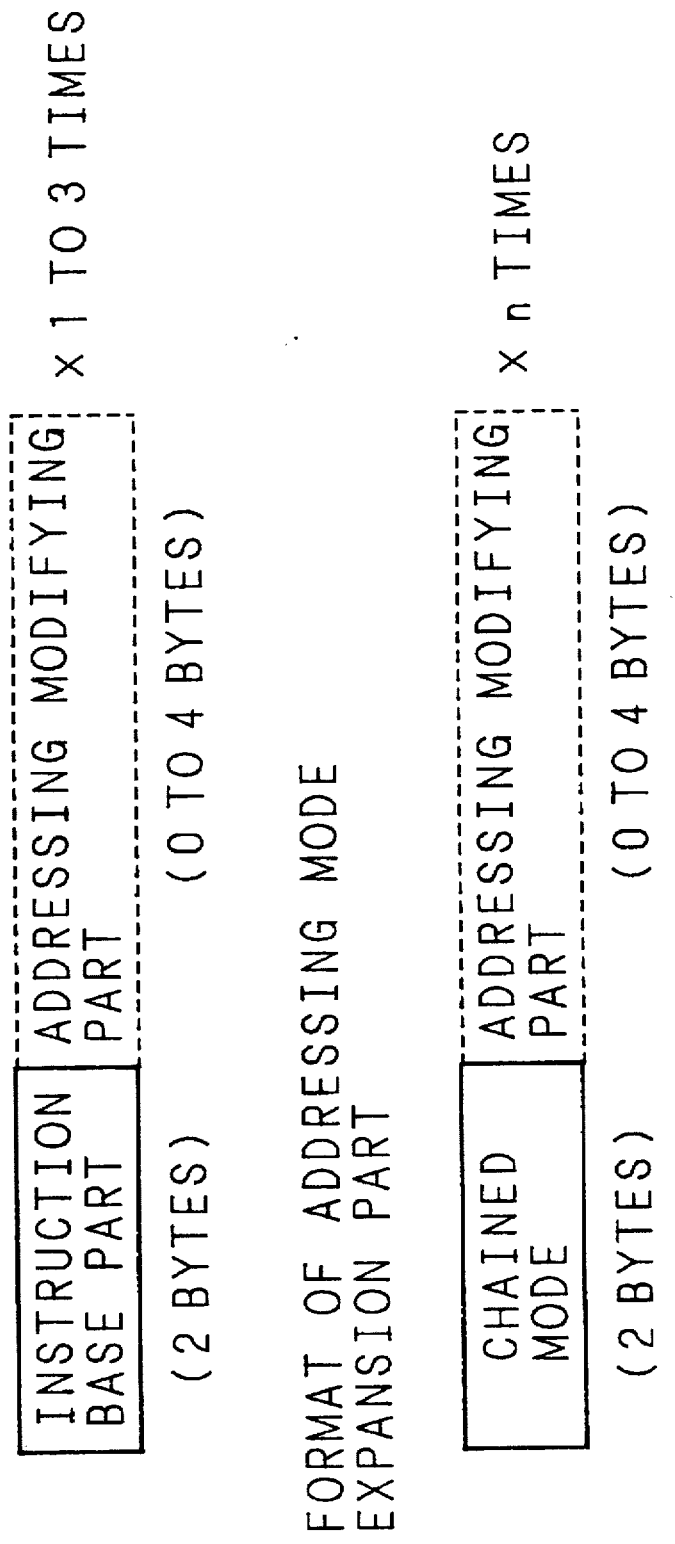
FIG. 19 is a block diagram showing an instruction format of the data processor related to the present invention.

The instructions used in the data processor 100 related to the present invention are variable length instruction in the unit of two bytes as shown in the schematic diagram in FIG. 19. Their basic configuration is one, two or three times repetition of "2-byte basic part of instruction+0 to 4-byte addressing modifying part".

The instruction base part has an operation code part and an addressing mode specification part. When index addressing or memory indirect addressing is necessary, "2-byte chained mode specifying part+0 to 4-byte addressing modifying part" is extended by a necessary number instead of extending the addressing modifying part. In some instructions, 2 or 4-byte extension part proper to the instruction may be affixed to its end.

In order to efficiently process the instructions with variable length format shown in FIG. 19, each instruction is divided into one or a plurality of processing units (step codes) at the instruction decoding stage in the data processor 100 related to the present invention. One step code is basically generated as the result of decoding the "2-byte instruction base part+0 to 4-byte addressing modifying part" or "chained mode specifying part+addressing modifying part", and the instruction decoder outputs one step code in one clock cycle. However, when the head operand has no addressing modifying part or the first instruction base part has no operand specifier, two instruction base parts (32 bits length) are decoded in one clock cycle. In the data processor 100 related to the present invention, some inter-register Operation instructions can be decoded in parallel with a preceding instruction, that is, two instructions can be decoded simultaneously.

Figure 20:
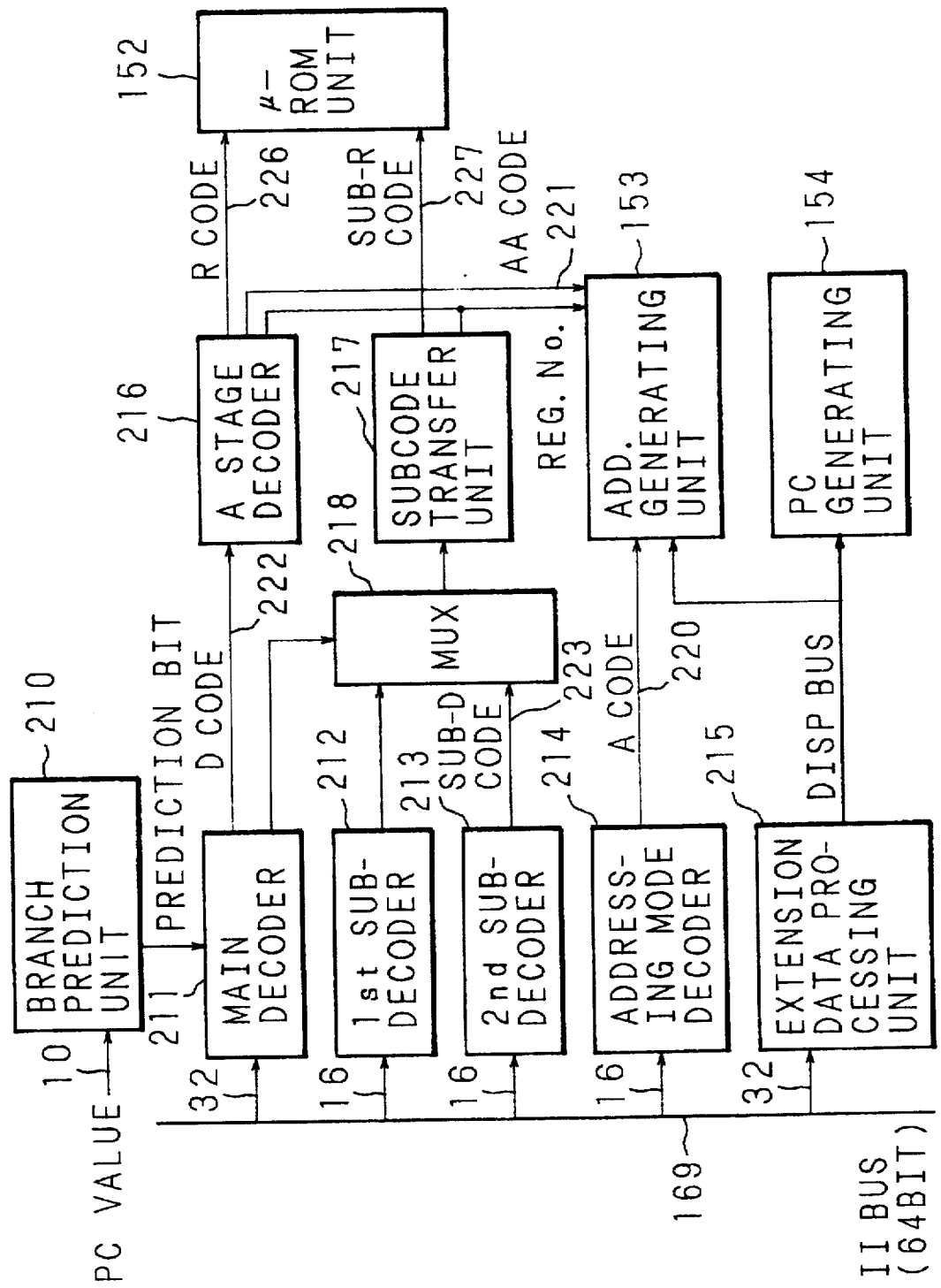
FIG. 20 is a block diagram showing a configuration example of an instruction decoding unit of the data processor related to the present invention.

The block diagram of the instruction decoding unit 151 of the data processor 100 related to the present invention is shown in FIG. 20. The micro-ROM unit 152, address generating unit 153 and PC generating unit 154 are also shown in FIG. 20.

The instruction decoding unit 151 operates in the two pipeline stages: the instruction decoding stage 401 (D stage), and the operand address generating stage 402 (A stage) following the D stage 401. The pipeline stage will be described in detail with reference to FIG. 27. Among the components of the instruction decoding unit 151, a branch prediction unit 210, main decoder 211, first subdecoder 212, second subdecoder 213, addressing mode decoder 214 and extended data processing unit 215 operate in the D stage 401. Among the components of the instruction decoding unit 151, an A stage decoder 218 and subcode transfer unit 217 operate in the A stage 402.

The main decoder 211 decodes the instruction base part of maximum 4-byte and a branch prediction bit of one bit. An output (D code 222) of the main decoder 211 is transferred to the A stage decoder 216.

The branch prediction unit 210 holds the branch hysteresis (1 bit×1K entries) of the conditional branch instructions and outputs the branch prediction bit according to the lower address of the PC value of the instruction which has been decoded immediately before the conditional branch instruction.

The first subdecoder 212 and second subdecoder 213 decode the 16-bit inter register operation instruction following the instruction to be decoded by the main decoder 211. The first subdecoder 212 decodes the third and fourth bytes of the II bus 169 assuming that the length of the instruction to be decoded by the main decoder 211 is 16 bits. The second subdecoder 213 decodes the fifth and sixth bytes of the II bus 169 assuming that the length of the instruction to be decoded by the main decoder 211 is 32 bits. When the instruction decoded by the main decoder 211 and the instruction decoded by the subdecoder satisfy the parallel decoding conditions later described, either one of the outputs of the two subdecoders 212 or 213 is selected by a multiplexer (MUX) 218 and then transferred to the subcode transfer unit 217. Selection by the multiplexer 218 is controlled by the main decoder 211.

The addressing mode decoder 214 decodes the addressing mode part of the instruction specified by an 8-bit operand specifier or 16-bit chained mode field and outputs an A code 220 for controlling the address generating unit 153.

The extended data processing unit 215 takes out the addressing modifying part such as a displacement of an immediate from the instruction code and transfers it to the address generating unit 153 and PC generating unit 154 via the DISP bus 165.

The A stage decoder 216 further decodes a D code 222 resulting from the intermediate decoding of the instruction outputted from the main decoder 211 and outputs entry addresses and parameters of a microprogram to the micro-ROM unit 152. The A stage decoder 216 decomposed the instruction such as the LDM and STM, which transfers a plurality of operands between the register and memory, into a plurality of memory register transfer instructions (step codes) for transferring data of 8 bytes or less at one time. At this time, the A stage decoder 216 outputs an AA code 221 to the address generating unit 153 and controls the address calculation of the decomposed operands.

The subcode transfer unit 217 transfers the decode result outputted from the subdecoder 212 or 213 to the micro-ROM unit 152 synchronously with the instruction to be decoded in the A stage decoder 216.

The register number whereto an operand is written in is transferred from the A stage decoder 216 and subcode transfer unit 217 to the scoreboard register 480 (see FIG. 54) of the address generating unit 153, so as to control for avoiding RAW (read-after-write) data hazard caused by that the subsequent instruction uses the register value whereon writing is not terminated by the pipeline interlock mechanism for the operand address calculation.

(3.5) PC generating unit

Figure 21:
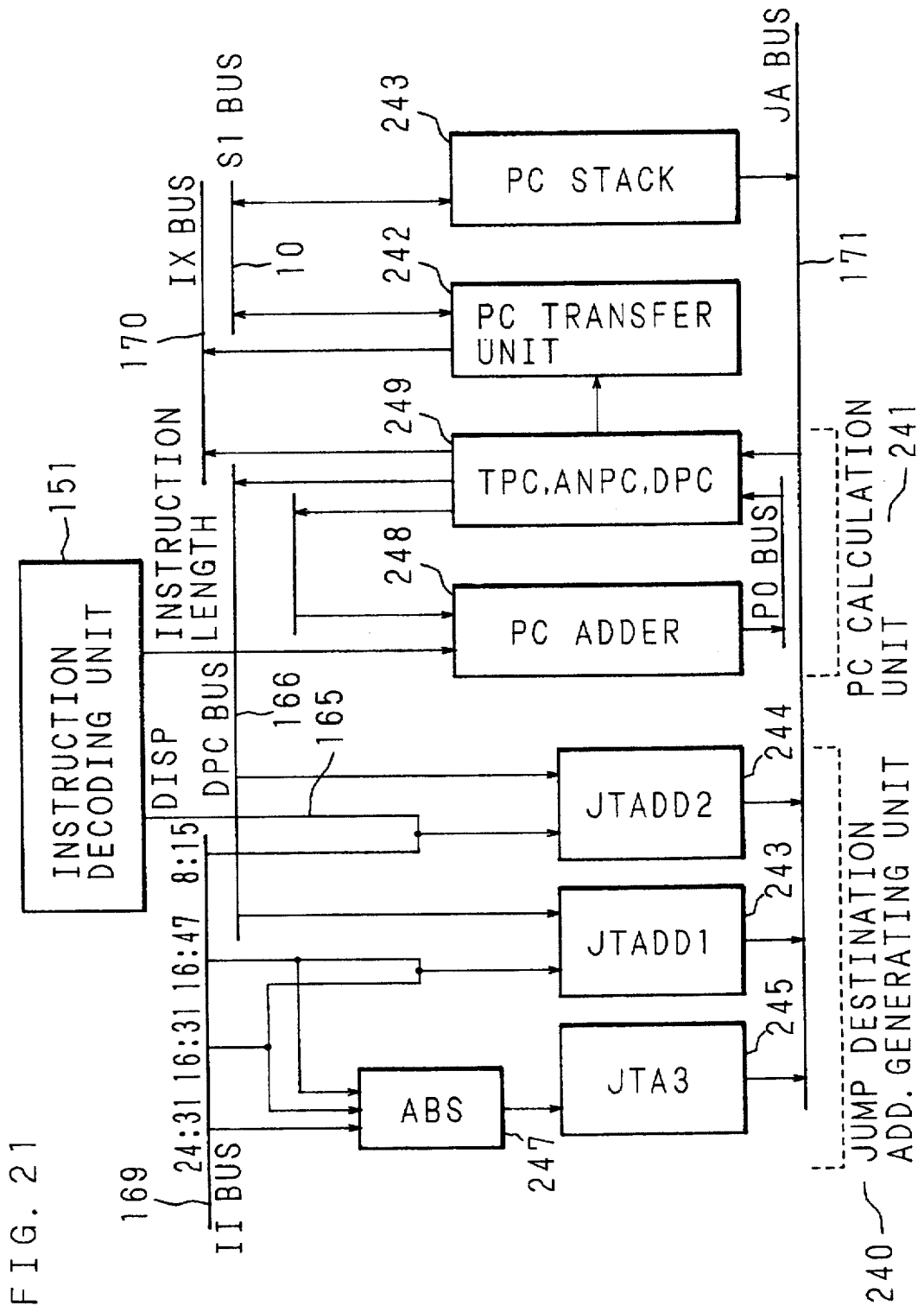
FIG. 21 is a block diagram showing a configuration example of a PC generating unit of the data processor related to the present invention.

The block diagram of the PC generating unit 154 is shown in FIG. 21. The instruction decoding unit 151 is also shown in FIG. 21.

The PC generating unit 154 has a jump destination address generating unit 240 which calculates the pre-jump destination address in the instruction decoding stage 401, a PC calculation unit 241 which calculates the PC value of the decoded instruction, a PC transfer unit 242 which transfers the PC values synchronously with the flow of the instructions to be processed in the pipeline, and a PC stack 243 which manages the pre-return destination address from a subroutine.

The jump destination address generating unit 240 calculates the address of the jump destination instruction when a PC relative jump or absolute address jump takes place in the instruction decoding stage 401. The jump destination address generating unit 240 has two adders (JTADD1 and JTADD2) 243 and 244 which are connected to the II bus 169 and DPC bus 166. Three fields (24:31, 16:31, 16:47) which could become the branch displacement field of the II bus 169, one of the bits 8:15, and the decoding start instruction address transferred from the DPC bus 166 are added in parallel with instruction decoding.

A sign extender (ABS) 247 executes sign extension of the three fields (24:31, 16:31, 16:47) which could become the absolute address transferred from the II bus 169. When the decoded instruction is the one which performs a PC relative jump (BRA, BSR, Bcc, JMP @(disp:32, PC), JSR @(disp:32, PC)) or an absolute address jump instruction (JMP @abs, JSR @abs), a correct jump destination address is selected from either the result of addition in the two adders 243 and 244 or the result of sign extension in the sign extender 247, and outputted to the JA bus 171.

For some jump instructions (part of the ACB, SCB) whereby a branch takes place to an address other than the jump destination address obtained simultaneously with instruction decoding, the jump destination address is determined by adding the branch displacement transferred from the DISP bus 165 and the PC value in the adder JTADD2 244 after decoding the instruction and then outputted to the JA bus 171 by the reason of decoder hardware.

The PC stack 243 holds the copy of a return destination address from a subroutine jump instruction (BSR, JSR) in the 16-entry stack and outputs the return destination address to the JA bus 171 when a subroutine return instruction (RTS, EXITD) is decoded. When a subroutine jump instruction is executed, the return destination address is transferred from the SI bus 10 to the PC stack 243 and is pushed. When the stack is switched by a task switch or a subroutine nesting higher than the level 16 is generated, the return destination address outputted from the PC stack 243 to the JA bus 171 is no more a correct address. Consequently, the pre-return address is read from the PC stack 243 to the S1 bus 10 again at the moment the subroutine return instruction reaches the execution stage 404 of the pipeline, and compared with the correct return destination address that has been read from the memory.

The PC calculation unit 241 comprises a PC adder 248 and working registers (TPC, ANPC, DPC) 249, and calculates the PC value of the instruction to be decoded in the instruction decoding unit 151. The PC calculation at the PC calculation unit 241 is executed by adding the instruction code length consumed in the instruction decoding unit 151 and the address of the instruction decoded one cycle before. When the sequence of instruction execution is changed by a jump instruction or EIT, the address of the jump destination instruction is transferred from the JA bus 171 to the PC calculation unit 241. The calculation result obtained in the PC calculation unit 241 is outputted together with the decode result of instruction synchronously with the flow of pipeline to the PC transfer unit 242 as well as to the address generating unit 153 from the IX bus 170 for calculating the PC relative address and the jump destination address generating unit 240 from the DPC 166 for calculating the instruction address.

The PC transfer unit 242 has many registers for holding PCs corresponding to the individual pipeline stages of the data processor 100 related to the present invention. The PC value which is calculated by the PC calculation unit 241 and is the start address of the instruction is transferred through the registers of the PC transfer unit 242 together with the step codes to be processed in the individual pipeline stages of the data processor 100 related to the present invention. In the PC transfer unit 242, the PC value to be transferred for activating the trace operation or the instruction address break for the debug support, the value of instruction breakpoint address (IBA0, IBA1), and the value of trigger start instruction address (TGIA) are compared.

(3.6) Address generating unit

The address generating unit 153 is hard wired controlled by the control information relating to the address generation of the operand which is outputted from the addressing mode decoder 214 or A stage decoder 216 of the instruction decoding unit 151 and generates the address of the operand. The instruction decoding unit 151 performs the pre-jump processing by a jump instruction in the register indirect addressing mode which occurs no pre-jump, calculation of the instruction address on the opposite side of the branch prediction by the conditional branch instruction, or calculation of the return destination address of the sub-routine jump instruction.

Figure 22:
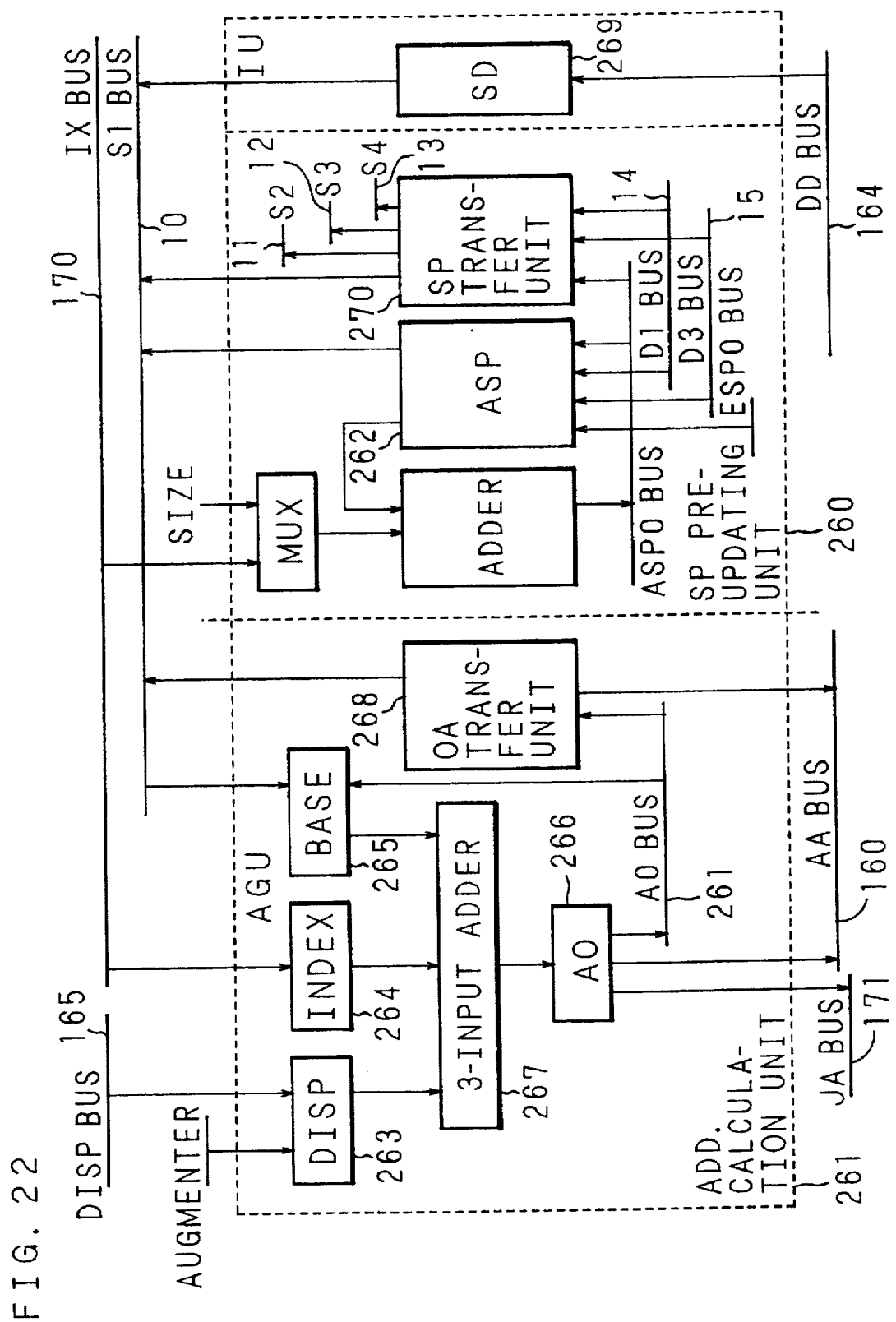
FIG. 22 is a block diagram showing a configuration example of an address generating unit of the data processor related to the present invention.

The block diagram of the address generating unit 153 is shown in FIG. 22.

The address generating unit 153 basically comprises an SP pre-updating unit 260 and an address calculation unit 261.

The SP pre-updating unit 260 comprises an SP (ASP) 262 for generating the operand address for executing the instructions without pipeline interlock when stack pop addressing (@SP+) or stack push addressing (@-SP) is performed consecutively, and a register group (SP transfer unit) 270 which transfer the SP values updated at the operand address generation synchronously with the flow of the instruction in the pipeline. The address calculation unit 261 performs operand address calculation by the 3-input adder 267 in the addressing modes other than the "@SP+" and "@-SP".

The ASP 262 is updated to a new value when the operand size is decreased or increased by the @SP+ or @-SP and the SP is corrected by the 1 size value or adjst value by an ENETR instruction or EXITD instruction. In FIG. 16, for simplification to facilitate understanding on hookup, the portion described "within AGU" in FIG. 22 is included in the address generating unit 153 and the portion described "within IU" is included in the integer operation unit 155.

The displacement value specified by the addressing mode is transferred from the instruction decoding unit 151 to the address calculation unit 261 via the DISP bus 165 and held in a displacement register (DISP) 263. For calculating the return destination address of the subroutine jump instruction or for calculating the nonbranch side instruction address of a predicted conditional branch instruction, the instruction code length (augment) which is transferred from the instruction decoding unit 151 can be inputted to the DISP 263. For the scaled index addressing, a value which is transferred from a register which the integer operation unit 155 via the IX bus 170 is inputted to the index register (INDEX) 264 and held there. The INDEX 264 can outputs the value of 1, 2, 4 and 8 times of inputted value to the 3-input adder 267. When the result of address calculation up to the previous stage by the chained addressing is employed as the base address for the next chained addressing, the output of 3-input adder 267 is transferred from the address output register (AO) 266 to the base register (BASE) 265. In the register relative mode, PC relative mode, register base chained mode and PC base chained mode, the general-purpose register or the PC value specified as the base address is loaded from the IX bus 170 to the BASE 265 via the INDEX 264, 3-input adder 267 and AO 266. In the memory indirect addressing mode, the result of address calculation performed in the 3-input adder 267 is outputted from the AO 266 to the AA bus 160 via an OA transfer unit 268, the address is fetched from the memory to an SD register 291 of the integer operation unit 155 via the DD bus 164, and the object address is transferred to the BASE register 265 via the S1 bus 10. The three values held in the DISP 263, INDEX 264 and BASE 265 are added by the 3-input adder 267 and outputted to the AO 266.

The result of address calculation is outputted from the AO 266 to the AA bus 160 and is used as the address for accessing the operand. The operand address outputted from the AO 266 is transferred to the OA transfer unit 268 and is managed by the OA transfer unit 268 synchronously with the flow of instruction in the pipeline. The immediate is also inputted from the instruction decoding unit 151 to the OA transfer unit 268 via the DISP 263, 3-input adder 267 and AO 266 and is managed by the OA transfer unit 268 synchronously with the flow of instruction in the pipeline in the same way as for the operand address.

The calculation result of the jump destination address of a jump instruction in addressing mode except for the PC relative with 32-bit displacement and the PC absolute is outputted from the AO 266 to the JA bus 171 and is used for a pre-jump at the address generation stage that is the third stage of the pipeline.

The predicted branching destination of a conditional branch instruction and the address calculation on the opposite side are calculated for a case where the branch prediction is incorrect and are used to initialize the PC generating unit 154 after the conditional branch instruction is executed.

The SP pre-updating unit 260 updates the SP value by the ASP 262 which is the exclusive working SP for the addressing mode of the "@SP+" and "@-SP" and manages the updated SP value in the SP transfer unit 270 synchronously with the flow of instruction in the pipeline. The ASP 262 is updated to a new value also when the SP value is controlled by the 1 size value or adjst value together with the execution of the ENETR instruction or execution EXITD instruction.

When the address calculation unit 261 refers the SP value, it refers the value of ASP 262 via the IX 170. Consequently, in the data processor 100 related to the present invention, an instruction which updates the SP value in the "@SP+" or "@-SP" mode, or an instruction following the ENETR instruction or EXITD instruction can calculate the address using the SP value without pipeline stall.

When writing is executed in the SP at an instruction execution stage, the updating value is written in the working SPs (ESP) for the instruction execution stage of the ASP 262 and SP transfer unit 270 from the D1 bus 14 or D3 bus 15. When a jump takes place at the instruction execution stage and the pipeline is cleared, the value of the ESP is transferred to the ASP 262 via the ESPO bus.

(3.7) Operand access unit

Figure 23:
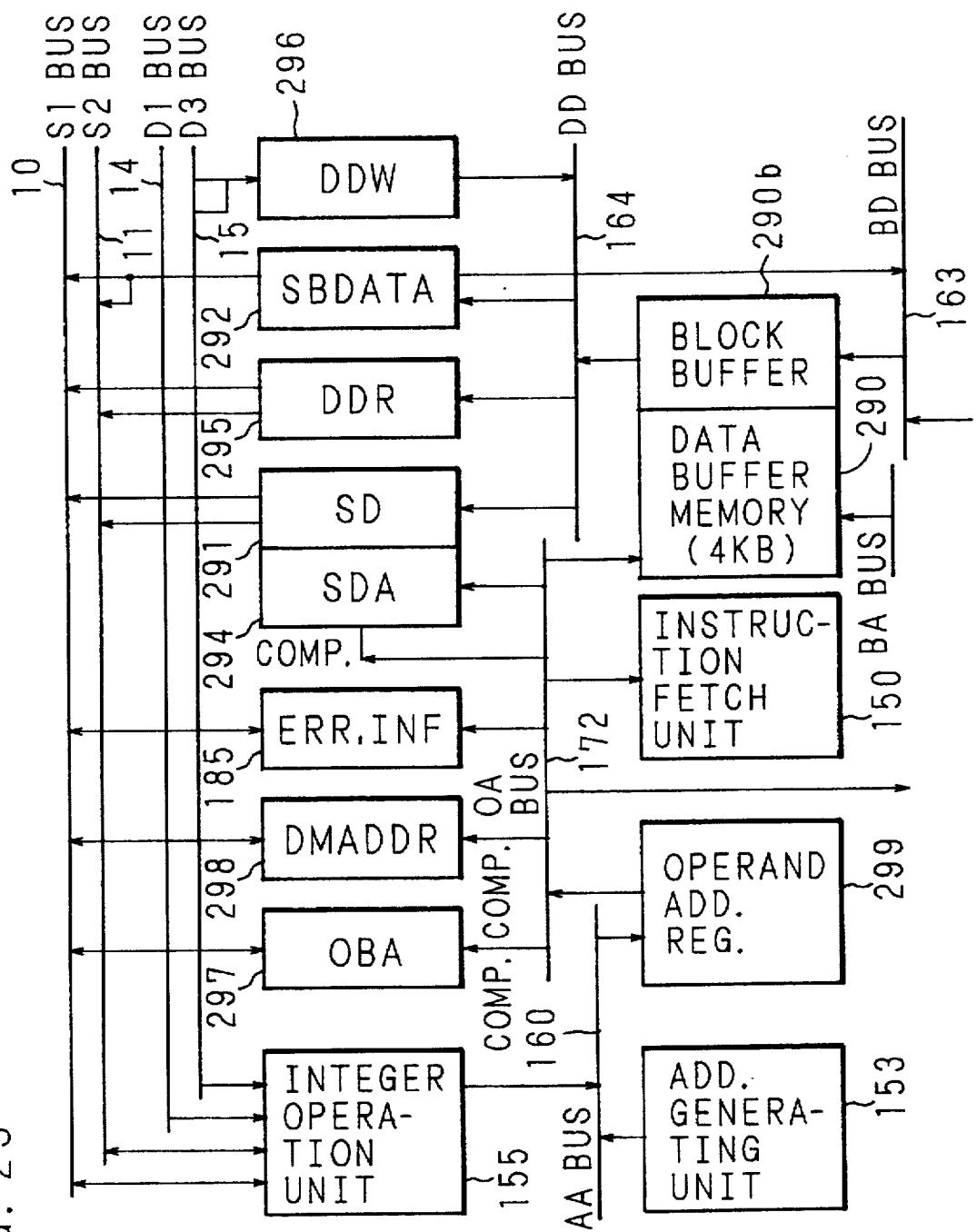
FIG. 23 is a block diagram showing a configuration example of an operand access unit of the data processor related to the present invention.

The block diagram of the operand access unit 156 is shown in FIG. 23. The instruction fetch unit 150, address generating unit 153, integer operation unit 155 and bus interface unit 157 are also shown in FIG. 23.

The operand access unit 156 comprises the 4KB data buffer memory 290, 2-entry operand prefetch queues (SD) 291 and (SDA) 294, store buffer (SBDATA) 292, data input/output circuits (DDR) 295 and (DDW) 296 from/to the integer operation unit 155, operand break check circuit (OBA) 297 and DMADDR register 298.

The DDR 295 is a register for transferring the read data to the integer operation unit 155. The DDW 296 is a register for the integer operation unit 155 to output the write data.

The operand address register 299 temporarily holds the operand address sent from the AA bus 160 when the operand access unit 156 is accessed, and outputs it to the OA bus 172.

The OA bus 172 is also connected to the instruction fetch unit 150 and checks whether the operand access enters an I/O area or non-cache area by use of the IOADDR, IOMASK and NCADDR of the instruction fetch unit 50.

The data buffer memory 290 operates as the 16-byte× 256-entry data cache, 4KB built-in data RAM, or 1k-step execution instruction address trace memory by switching a mode.

At the read operation of the data, by transferring the data address to be read, which is outputted from the address generating unit 153 or integer operation unit 155, to the operand address register 299, data is fetched from the data buffer memory 290 via the DD bus 164 and transferred to the SD 291 or DDR 295. When data is fetching into the SD 291, the data addresses of every 8-byte boundaries of the fetch data is transferred to the SDA 291 and held there to check overlap with the store operand.

When the data buffer memory 290 is used as a data cache, the cache address tag and data are outputted according to the lower 12 bits of the data address transferred from the OA bus 172. The cache address tag is compared with the higher 20 bits of the data address. When they are equal, the data cache is hit. When the cache is missed, the data address is outputted from the OA bus 172 to the bus interface 157, the external memory (main storage 103) is accessed by block transfer to fetch data from the BD bus 163, and the entry of data cache is updated. Block read is performed starting from the data necessary as the operand by wrapping around the addresses in the ascending order, and the data necessary as the operand is transferred from the DD bus 164 to the SD 291 or DDR 295 in parallel with registering to the data cache.

When the data buffer memory 290 is used as a built-in data RAM, the contents of the DMADDR register 298 is compared with the higher 20 bits of the data address. When they are equal, the data read from the data buffer according to the lower 12-bit address becomes valid. When they are not equal, the external memory (main storage 103) is accessed.

The data buffer memory 290 has a 16-byte block buffer 290B. It checks whether the data access, including the access to the non-cache area specified by a NCADDR register 300, hits data of the block buffer 290B or not. The block buffer 290B performs 8-byte data read from the non-cache area specified by the NCADDR register 300 by block transfer in 16-byte unit, and holds the 16-byte read data. When next data is executed from the same 16-byte boundaries, it outputs data from the block buffer 290B. By this function, data in the non-cache area can be accessed in a high speed in the 16-byte unit by a string operation instruction or bit map instruction.

At the store operation of data, the address of the data to be stored which has been outputted from the address generating unit 153 to the AA bus 160 is transferred to the operand address register 299, so that the data outputted from the DDW 296 is transferred via the DD bus 164. Unless the data buffer memory 290 is used as the built-in data RAM and its area is accessed, store operation is necessary executed with respect to the external memory (main storage 103). The store data address is transferred to the SBADDR 183 of the bus interface unit 157, and the store data is transferred to the store buffer (SBDATA) 292. When data which overlaps the store data is held in the SD 291 or data cache at the time data is transferred from the DDW 396 to the store buffer (SBDATA) 292, the data contents are rewritten. The overlap of the SD 291 is checked by the SD 294 and that of data cache is checked by the tag in the cache. The write-through method is employed for the data cache. When a miss occurs at write operation (there are no overlaps), the contents of cache do not change.

At the store operation for the built-in data RAM, the higher 20 bits of the store address are compared with the DMADDR 298 of the address decoding mechanism. When they are equal, the store data is written in the built-in data RAM according to the address of the lower 12 bits.

During the bus interface unit 157 is writing the data of the store buffer (SBDATA) 292 in an external memory, the operand access unit 156 receives the subsequent read access or write access. Consequently, even when there is unprocessed data in the store buffer (SBDATA) 292, at the data cache hits or built-in data RAM access, the operand access unit 156 can continue the subsequent processings.

When the operands is read or written and data is read for memory indirect addressing, whether all the data enter into the I/O area or not is checked. A memory indirect access to the I/O area is an address conversion exception. The operand prefetch from the I/O area is suppressed until all the executions of the preceding instructions in the pipeline are completed. When a memory area other than the built-in data RAM area is accessed for the operand prefetch for the instruction subsequent to a conditional branch instruction (Bcc, ACB, SCB) or the cache is missed, the external memory (main storage 103) cannot be accessed until the preceding conditional branch instruction has been executed.

The ERR and INF 185 are the blocks which hold the error address, IOINF, etc. in the case where the operand access generates an EIT.

During the data processor 100 related to the present invention is performing a bus snoop operation, the address of data to be invalidated is transferred from the bus interface unit 157 to the operand access unit 156 via the BA bus 162. The data cache invalidates all the data in the 16-byte block wherein the address is hit. When the data buffer memory 290 is used as the built-in data RAM, the bus snoop operation is not performed. Note must be taken on this regard.

(3.8) micro-ROM unit

The micro-ROM unit 152 comprises a micro-ROM 320 wherein many microprogram routines for controlling the integer operation unit 155 are stored, microsequencer 321 and microinstruction decoder 322. The ROM 152 controls the operations of the integer operation unit 155 by the microprogram according to the R code 226 and sub-R code 227 which have been outputted from the instruction decoding unit 151.

The microsequencer 321 performs the sequence operations for microprogram executions in relation to instruction executions and also receives exceptions, interrupts and traps (EIT), and performs sequence operations of the microprograms corresponding to each EIT.

Figure 24:
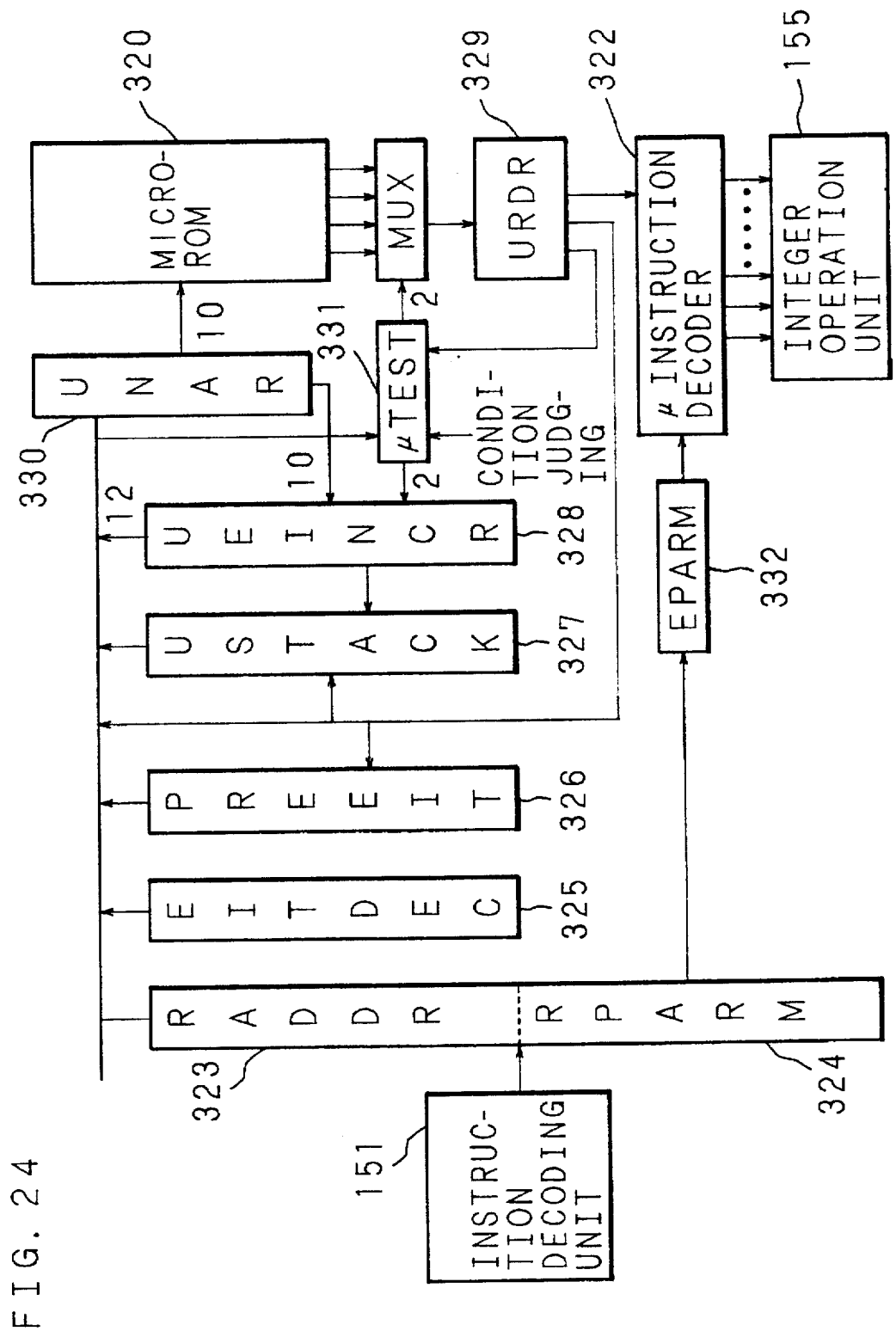
FIG. 24 is a block diagram showing a configuration example of a micro-ROM unit of the data processor related to the present invention.

The block diagram of the micro-ROM unit 152 is shown in FIG. 24. The instruction decoding unit 151 and integer operation unit 155 are also shown in FIG. 24.

The input latch of the R code 228 is a 2-entry queue comprising a microentry address register (RADDR) 323 and parameter register (RPARM) 324. The sub-R code 227 is handled as a part of a parameter of the R code 226.

An EIT decoder (EITDEC) 325 is the decoder for outputting the entry address of the corresponding microprogram routine according to the type of EIT.

A register (PREEIT) 326, when the EIT is received during an instruction execution, holds the entry address of the microprogram routine which performs the EIT preprocessing depending on the instruction. The address depending on the instruction is set in the PREEIT 326 when an instruction which accepts the EIT is executed during the execution of the arbitrary length bit field instruction or string operation instruction.

A stack (USTACK) 327 is the one of the 2-entry for the microprograms and holds the return destination address from the subroutines of the microprogram. The return destination address is an address subsequent to a subroutine call instruction that is set from an incrementer (UEINCR) 328 in some cases and an address which is explicitly set from a latch (URDR) 329 by a microprogram in the other cases.

A latch (UNAR) 330 is the one for holding the 10 bits which becomes input of the X decoder of the micro-ROM 320. The latch (µTEST) 331 is the latch for holding the 2 bits which becomes input of the Y decoder of the micro-ROM 320.

A UEINCR 328 is an incrementer which increments the value of 12-bit that is concatenating the UNAR 330 and µTEST 331. The URDR 329 is an output latch for the microinstructions. Four words are read from the micro-ROM 320 at one time when a conditional jump of the microprogram takes place so that it may take place without delay slot and one of the two bits specified by the µTEST 331 selects one word of abovementioned 4 words according to the result of condition determination.

The micro-ROM 320 (IROM) is a 155 bits×4K words ROM. The microinstruction decoder 322 decodes the microinstruction outputted from the URDR 329 and the parameter EPARM 332 transferred from the RPARM 324 and outputs the control signals for the integer operation unit 155. When two instructions are decoded simultaneously in the instruction decoding unit 151, the decode result of the preceding instruction is outputted as the R code 226 and the decode result of the subsequent instruction is included in the RPARM 324 as the sub R code 227 and then inputted to the microinstruction decoder 322. The sub R code 227 is decoded by the instruction decoder 322 together with the last microinstruction of the preceding instruction and then executed by using the sub-ALU 27 and subbarrel shifter 352 later described.

A microinstruction is read from the micro-ROM 320 in each clock cycle and one inter-register operation is performed by one microinstruction. Consequently, a basic instruction such as for transfer, comparing, addition, subtraction and logical operation is executed in one clock cycle. When the RPARM0:1 of the basic instruction includes the sub R code 227, a basic instruction for the R code 226 and inter register operation instruction for the sub R code 227 are executed in one clock cycle and instruction execution speed becomes two instructions per clock cycle.

When an EIT is received during an instruction execution, the value of the PREEIT 326 is transferred to the UNAR 330 and a microprogram jumps to the microaddress held in the PREEIT 328 to perform the preprocessing of the EIT and then control jumps to the processing routines of the individual EITs outputted from the EITDEC 325. When the EIT is received at the time when the instruction has been executed, the PREEIT 326 is not used and control jumps directly to the EIT processing routine outputted from the EITDEC 325.

(3.9) Integer operation unit

The integer operation unit 155 is controlled by the microprogram stored in the micro-ROM 320 of the micro-ROM unit 152 and performs operations necessary for executing the integer operation instructions by using the register file 20 and operation unit.

Figure 25:
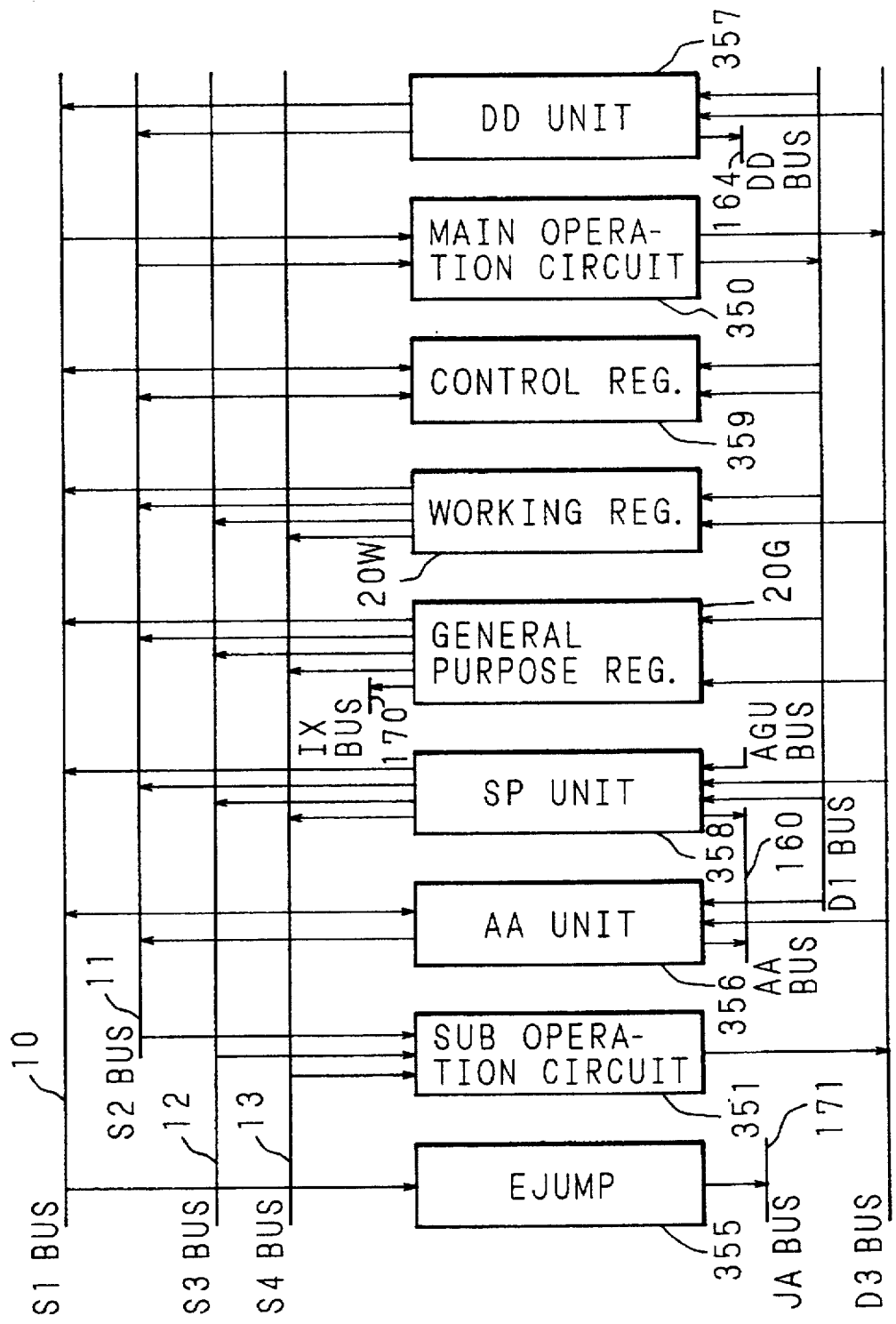
FIG. 25 is a block diagram showing a configuration example of an integer operation unit of the data processor related to the present invention.

The block diagram of the integer operation unit 155 is shown in FIG. 25.

An EJUMP 355 is a register which stores the jump destination address when a jump takes place in the instruction execution stage 404 of the pipeline. When an EIT is detected or the subroutine return instruction pre-return destination address is error is executed, the jump destination address is inputted to this register by a microprogram and then an execution stage jump is executed. When the execution stage jump takes place, the pipeline is flushed, therefore a dead time of 3–4 clock cycles is generated to fill the pipeline again.

A sub-operation circuit 351 has a sub-ALU (SALU) 27 and a sub-barrel shifter 352. The main operation circuit 350 has the main ALU (MALU) 23, main barrel shifter 29, multiplier 353, priority encoder 354, counter and the like.

The sub-operation circuit 361 and main operation circuit 350 is connected to each of the general-purpose register 20G and working register 20W by three 32-bit buses respectively, can perform two inter-register operations simultaneously. The S1 bus 10, S2 bus 11 and D1 bus 14 are provided for the main operation circuit 350, and the S3 bus 12, S4 bus 13 and D3 bus 15 are provided for the sub-operation circuit 351. Two instructions which are simultaneously decoded in the instruction decoding unit 151 are simultaneously executed in the sub-operation circuit 351 and main operation circuit 350. When executing a high-performance instruction, 8-byte data can be processed at one time or perform two operations are performed in parallel by operating the sub-operation circuit 351 and main operation circuit 350 in parallel by a microprogram.

The AA unit 356 and DD unit 357 are the registers for the integer operation unit 155 to communicate with the operand access unit 156; the former handles the addresses and the latter handles data. The AA unit 356 has two address registers with increment/decrement functions and a bit address calculation circuit which calculates the byte address of the bits to be operated with reference to the base address and bit offset. The DD unit 357 has three 8-byte data registers, two for reading and one for writing, and transfers data to/from the operand access unit 156 in 8-byte unit via the DD bus 164.

The SP unit 358 has the working stack pointer (ESP) for the instruction execution stage 404 and the stack pointers (SPI, SP0, SP1, SP2, SP3) corresponding to the individual rings. The SP value of the instruction execution stage 404 is transferred from the address generating unit (AGU) 153 synchronously with the instruction via the pipeline. The ESP has an output path to the AA bus 160 and can access the memory by its value not via the AA unit 356.

A control register group 359 has the control registers such as PSW, DMC or the like, and a constant ROM.

The general-purpose register 20G has 14 general-purpose registers other than the R15 which is a stack pointer. The general-purpose register 20G simultaneously outputs two data to each of the main operation circuit 350 and sub-operation circuit 351, and has four output ports and two input ports to simultaneously write the results of two operations. Furthermore, the general-purpose register 20G has one more output port connecting to IX bus 170 which transfers the data for the address calculation of operand to the address generating unit 153. The working register 20W comprises 16 registers and has four output ports and two input ports connected to the main operation circuit 350 and sub-operation circuit 351 as same as the general-purpose register 20G does.

Figure 26:
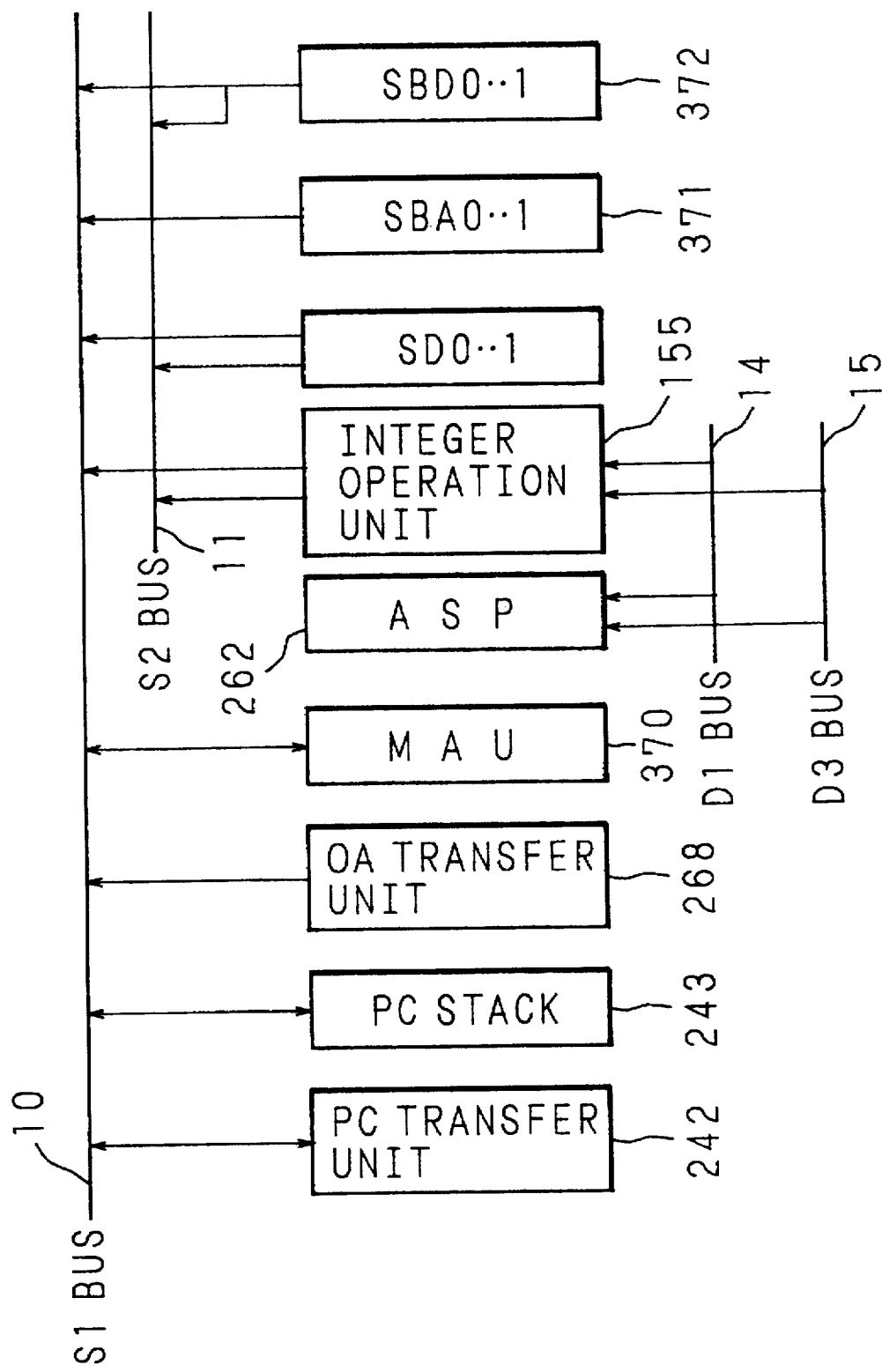
FIG. 26 is a block diagram showing a configuration example of peripheral devices of the integer operation unit of the data processor related to the present invention.

The block diagram of the integer operation unit 155 operated by the microprograms stored in the micro-ROM unit 152 and its peripheral devices is shown in FIG. 26. The integer operation unit 155 accesses each peripheral device via the S1 bus 10, S2 bus 11, D1 bus 14 and D3 bus 15 to execute the instructions or process the EIT.

The PC value of instruction is transferred from the PC transfer unit 242. When the PC value of the instruction in execution or that of the next instruction is needed by the EIT, the values are read from the PC transfer unit 242. When the RTS instruction or EXITD instruction is executed, the pre-return address is read from the PC stack 243 and compared with the true return destination addresses fetched from the memory; thus whether the pre-return is made to the correct address or not is checked. The PC transfer unit 242 also has registers IBAO:1 and TGIA for debug supporting.

An operand address or an immediate calculated in the address generating unit 153 is read from the OA transfer unit 268. The ASP 262 is a working stack pointer of the operand generating unit. When the stack pointer of the execution stage 404 is rewritten by an instruction execution or EIT processing, the ASP 262 is rewritten simultaneously with the stack pointer of the SP unit 358 shown in FIG. 25.

An MAU 370 shown in FIG. 26 includes the address decoding mechanisms for both the instruction fetch unit 150 and operand access unit 156. It also has registers (IOADDR, IOMASK, NCADDR, DMADDR, OBA0:1) relating to memory accessing and registers (EITADDR, IOINF) for holding EIT information relating to memory accessing. These registers can be accessed by a microprogram.

The SD 291 outputs a prefetch operand. The prefetch operand of 32-bit or less can be outputted to both the S1 bus 10 and S2 bus 11. When a 64-bit prefetch operand is outputted, the S7 bus 10 and the S bus 11 are used by connecting with each other.

A SBA0:1 371 and SBD0:1 372 are registers for holding the address and data of the store buffer (SBDATA) 292. When the EIT is generated in the store buffer (SBDATA) 292, its contents are read by a microprogram.

(4) Hardware operations in the data processor related to the present invention

The operations of hardware in the data processor 100 related to the present invention are described as follows.

(4.1) Pipeline processing (4.1.1) Configuration of pipeline

Figure 27:
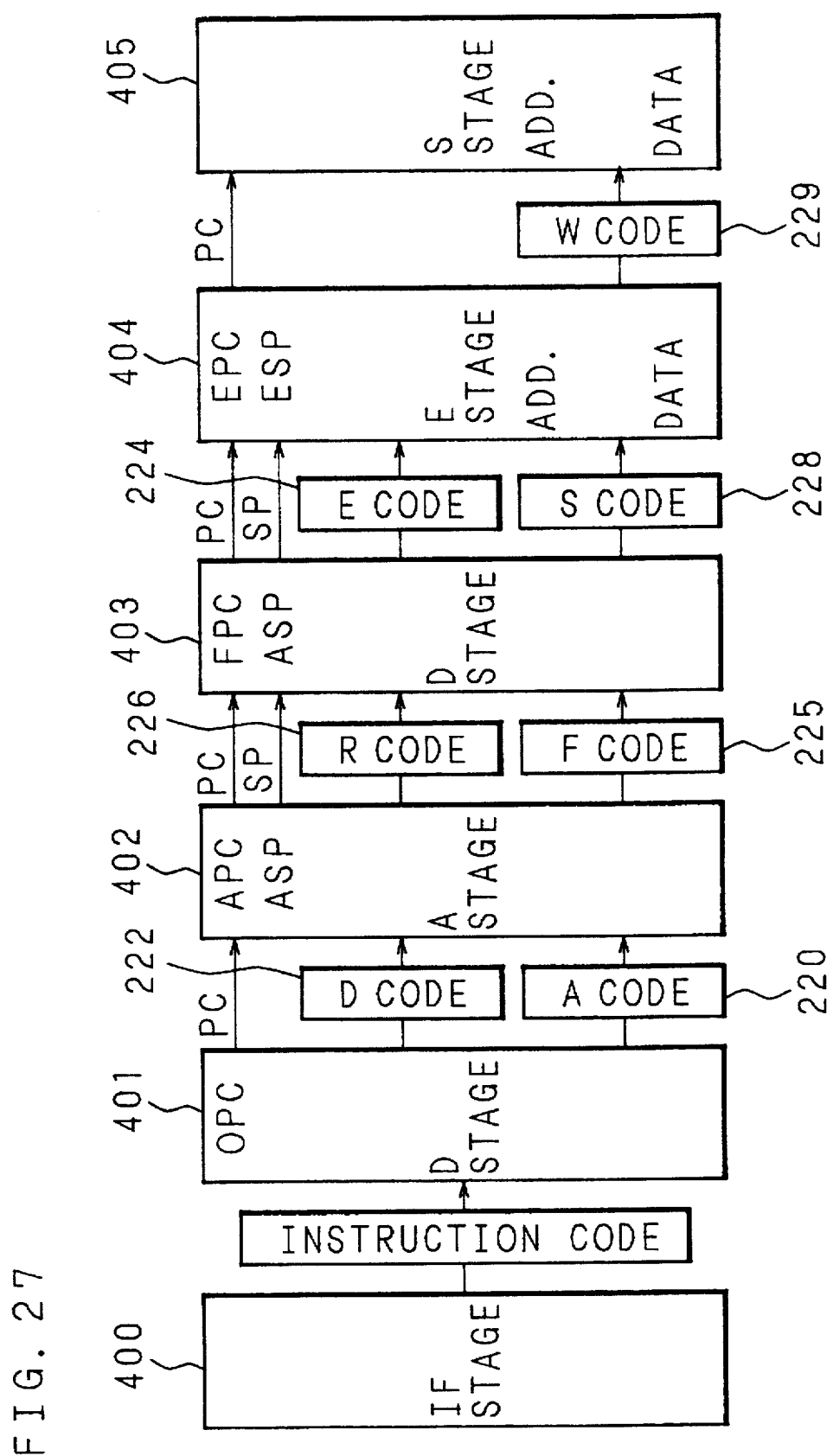
FIG. 27 is a schematic diagram showing a concept of an instruction pipeline of the data processor related to the present invention.

The concept of the instruction pipeline in the data processor 100 related to the present invention is schematically shown in FIG. 27.

The pipeline processing is performed in the following six stages: the instruction fetch stage (IF stage) 400 for executing instruction prefetch, the decoding stage (D stage) 401 for decoding instructions, the address generating stage (A stage) 402 for generating operand addresses, the operand fetch stage (F stage) 403 for executing access of the micro-ROM 320 (termed R stage) and prefetch of memory operands (termed OF stage), the execution stage (E stage) 404 for executing instructions, and the store stage (S stage) 405 for storing memory operands.

The IF stage 400 includes a 32-byte instruction prefetch queue. The F stage includes the 2-entry operand prefetch queue 291. The S stage 405 includes the 2-entry store buffer (SBDATA) 292.

The above six stages theoretically operate independently of each other. The stages other than the S stage 405 performs one operation in one clock cycle at minimum. The S stage 405 performs one operand store operation in one clock cycle when the store buffer (SBDATA) 292 has a vacancy and does the same in two clock cycles at minimum when the SBDATA 292 has no vacancy. Consequently, the instruction pipeline of the data processor 100 related to the present invention consecutively executes the instructions at the rate of one instruction in one clock cycle in an ideal state.

The data processor 100 related to the present invention has some instructions wherein the memory-memory operation or memory indirect addressing cannot be performed by one basic pipeline processing. However, the instruction pipeline of the data processor 100 related to the present invention is so configured that well-equilibrated pipeline processing may be performed for these operations. For the instruction having a plurality of memory operands, one instruction is divided into a plurality of pipeline processing units (step codes) on the basis of the number of memory operands in the decoding stage to perform the pipeline processing.

The input/output step codes of the individual pipeline stages are named for the sake of convenience as shown in FIG. 27. Each step code performs the processing of the operation codes. There are two operation code groups, one of which becomes the entry address of the micro-ROM 320 and the parameter for the E stage 404, and the other becomes the operands to be processed by the E stage 404. The program counter value of the instruction in execution is transferred from the D stage 401 to the S stage 405 and the stack pointer value (further, scoreboard register value) is transferred from the A stage 402 to the E stage 404.

An information transferred from the IF stage 400 to the D stage 401 is the instruction code itself. An information transferred from the D stage 401 to the A stage 402 includes an information relating to the operation specified by an instruction (termed D code 222), an information relating to the operand address generation (termed A code 220), and an information on the program counter value (PC value) of the instruction in execution. An information transferred from the A stage 402 to the F stage 403 is the R code 226 including the entry address of the microprogram routine and the parameters for the microprogram, the F code 225 including the operand address and access method specifying information, the program counter value of the instruction in execution, and stack pointer value. The information transferred from the F stage 403 to the E stage 404 is the E code 224 including the operation control information and literal, the S code 228 including the operand and operand address, the program counter value (PC value) of the instruction in execution, and the stack pointer. The S code 228 is composed of the address and data. An information transferred from the E stage 404 to the S stage 405 is the W code 229 which is the operation result to be stored and the program counter value (PC value) of the instruction which outputs the result of operation. The W code 229 is composed of the address, data and store-related information.

The E stage 404 is the original instruction execution stage. The other stages (IF, D, A, F) are provided for the preprocessing for instruction execution, wherein the instruction codes or operands are read but the contents of the memory or registers are not changed. Consequently, the operations performed in these stages (IF, D, A, F) may be canceled according to the result of operation performed in the E stage 404.

(4.1.2) Instruction fetch stage

The instruction fetch unit 150 operates in the instruction fetch stage (IF stage) 400. The IF stage 400 fetches the instructions from the built-in instruction cache 200 or the external memory (main storage 103), and then inputs it to the instruction queue 201, and the instruction codes are outputted to the D stage 401 in 2 to 8-byte unit. The instruction is inputted to the instruction queue 201 in 8-byte unit within the aligned 16 bytes when the instruction cache 200 is hit, and in the aligned 4-byte unit when it is missed. The instruction queue 201 has the two elements A and B (201A and 201B) as shown in FIG. 18 in order to fetch both the instruction subsequent to a conditional branch instruction and the branch destination instruction.

When the instruction is fetched from the external memory by single transferring, two clock cycles at minimum are necessary for each of aligned four bytes. In the block transfer by the burst mode, five clock cycles at minimum are necessary for each of 16 bytes. When an instruction is fetched from the external memory, whether the address of the fetch destination instruction is placed in the non-cache area specified by the NCADDR register 300 or not is checked and whether it is placed in the I/O area specified by the IOADDR and IOMASK or not is checked. Instruction fetch from the I/O area is inhibited; an EIT is generated when so specified.

When the built-in instruction cache 200 hits, an arbitrary 8-byte instruction within the aligned 16 bytes is fetched in one clock cycle. The output length from the instruction queue 201 is variable in very 2-byte unit and eight bytes at maximum can be outputted in every clock cycle.

Control of the built-in instruction cache 200, management of the prefetch destination instruction addresses, and control of the instruction queue 201 is executed by the IF stage 400. The processings performed in the IF stage are given as follows.

Prefetch and output of instruction code to the D stage 401 management of two instruction queues (A, B) 201

Increment of instruction prefetch address
Management of instruction cache 200
Check whether the address of instruction enters the non-cache area or not
Check whether the address of instruction enters the I/O area or not

(4.1.3) Instruction decoding stage

The instruction decoding unit 151 and PC generating unit 154 operate in the instruction decoding stage (D stage) 401. The D stage 401 performs pre-decoding of the operation code of the instruction inputted from the IF stage 400, and decoding the addressing mode. At the instruction decoding processing in the D stage 401, the main decoder 211, first subdecoder 212, second subdecoder 213, addressing mode decoder 214 and extended data processing unit 215 of the instruction decoding unit 151 operate. One decoding operation is performed in one clock cycle, wherein 0 to 8 byte instruction codes are consumed (No instruction code is consumed of outputting processing of a step code including the return destination address of a subroutine return instruction). An instruction, which has two memory operands or uses chained mode and cannot be decoded in one decoding operation, is decomposed into a plurality of step codes in the D stage 401. Consequently, the D code 222, A code 220 and the PC value of instruction are outputted in the decoding operation in each clock cycle even when the entire instruction has not been decoded.

In the D stage 401, the PC value of each instruction is calculated in the PC generating unit 154 on the basis of the instruction length consumed accompanying with the instruction decoding processing. Pre-jump processing (D stage jump) takes place in the PC generating unit 154 for a conditional branch instruction, jump instruction (including a subroutine jump instruction) to an absolute address or PC relative address, and subroutine return instruction.

When an unconditional jump instruction is decoded and a pre-jump takes place, the IF stage 400 is instructed to cancel the contents of the instruction queue 200A or 200B currently used, fetch an instruction from the jump destination address to input it to the queue, and output its code to the instruction decoding unit 151. When a conditional branch instruction is decoded, the IF stage 400 is requested to keep the currently-used instruction queue 200A or 200B intact and fetch an instruction from the branch destination to input it to the other instruction queue regardless of the branch prediction. For a conditional branch instruction which is predicted to be branched, the IF stage 400 is required to output an instruction code from a new instruction queue to the instruction decoding unit 151.

The A code 220 which is the address calculation information, D code 222 which is the intermediate decode result of operation code, and the PC value of the instruction are outputted to the A stage 402 in one decoding processing. The processing performed in the D stage 401 are given as follows.

Pre-decoding of the operation code of instruction
Decoding of the addressing mode
Decomposing of instruction into step codes
Calculation of PC value
Branch destination address calculation of conditional branch instruction
Branch prediction and pre-branch processing of conditional branch instruction
Pre-jump processing of absolute address or PC relative address
Pre-return processing of Subroutine Return instruction

(4.1.4) Address generating stage

The instruction decoding unit 151 and address generating unit 153 operate in the address generating stage (A stage) 402. In the A stage 402, the D code 222 transferred from the D stage 401 is decoded and the R code 226 is outputted and an operand address is generated according to the A code 220 and the F code 225 is outputted. The PC value transferred from the D stage 401 is transferred to the F stage 403 intact. The stack pointer value of the instruction in execution is calculated and transferred to the F stage 403 independently of the instruction execution stage 404.

In an instruction decoding processing performed in the A stage 402, the A stage decoder 216 and the subcode transfer unit 217 of the instruction decoding unit 151 operate. The intermediate decode result of the operation code outputted from the D stage 401 is further decoded, and the entry address of the micro-ROM 320 and the parameters for the microprogram are outputted as the R code 226.

The address generating unit 153 generates the operand addresses according to the A code 220. The value of the general-purpose register 20G is referred via the IX bus 170 for the register indirect mode and register relative mode. A displacement value, immediate and absolute address value are transferred from the instruction decoding unit 151 via the DISP bus 165 as a part of the A code 220. For the memory indirect mode, the system stays in a wait state until the step code which is generated in response to the indirect address generated fetches the objective address value from the memory via the F stage 403 and E stage 404. In the PC relative mode, the PC value (APC) of the instruction in execution transferred from the D stage 401 is used. In the stack pop mode and stack push mode, the SP value is calculated in the dedicated working stack pointer. Th calculated SP value is outputted to the F stage 403 together with the F code 225.

For the absolute jump instruction such as register indirect jump or memory indirect jump and the jump instruction other than PC relative jump, the jump destination address is calculated in the address generating unit 153 and a pre-jump processing (A stage jump) takes place. The return destination address of the subroutine jump instruction is calculated by adding the instruction length transferred from the DISP bus 185 and the APC value. For the conditional branch instruction, the instruction address on the opposite side of the branch predicted side address is calculated to initialize the PC generating unit 154 when the branch prediction is wrong.

The address generating unit 153 has the scoreboard register 480 which interlocks the pipeline by detecting a data hazard generated when the register or memory used for address calculation conflicts. In the A stage 402, the data hazard, at registering the destination operand to the scoreboard register 480 (write reservation) and reading data from the register or memory in order to address generating is checked. In the scoreboard register 480, 16 flags are provided corresponding to each one of the 16 general-purpose registers.

Since the chained mode is used in the data processor 100 related to the present invention, the operand address of the instruction which has been divided into a plurality of step codes in the D stage 401 is calculated in the A stage 402 and the instruction shrinks to one step code.

The instructions (LDM, STM, ENTER, EXITD), using the register list, indicate the register numbers which become the transfer operands are divided into a plurality of step codes in the A stage 402. These instructions are divided into the step codes which transfer the data of one or two registers in the A stage 402 and undergo the pipeline processing in the F, E and S stages. The register numbers of the operands to be transferred by the individual step codes can be obtained by encoding the register list by the A stage decoder 216. The memory addresses accessed by the individual step codes are generated by the address generating unit 153 in response to the control signal (AA code) outputted from the A stage decoder 216. The processings performed in the A stage 402 are summarized as follows.

Post-decoding of the operation code of instruction
Operand address generation
Stack pointer value calculation
Branch prediction of conditional branch instruction and calculation of instruction address on the opposite side
Return destination address calculation for subroutine jump instruction
Pre-jump processings for the jump instructions in the addressing mode such as register indirect and register relative
Write reservation of destination to the scoreboard register 480
Data hazard check for address generation and pipeline interlocking
Decomposing of the instruction having register list step codes (4.1.5) Operand fetch stage The micro-ROM unit 152 and the operand access unit 156 operate in the operand fetch stage 403 (F stage). The access operation to the micro-ROM 320 of the micro-ROM unit 152 for the R code 226 and the operation of the operand access unit 156 are performed under the independent controls. When the above two operations are handled separately, the former is especially termed R stage operation and the latter OF stage operation. The R code 226 is inputted to the R stage wherefrom the E code 224 is outputted. The F code 225 is inputted to the OF stage wherefrom the S code 228 is outputted. The F code 225 is not queued but the R code 226 is queued up to two. The E code 224 is not queued but the S code 228 is queued to up to two.

The access processing for the micro-ROM 320 as the processing of the R stage includes the access to the micro-ROM 320 to generate the E code 224 which is the execution control code used for the operation to be performed in the next E stage 404 for the R code 226, and microinstruction decoding processing.

When the operations performed on the R code 226 are decomposed into two or more microprogram steps, the micro-ROM unit 152 is used in the E stage 404 and the next R code 226 waits for the access to the micro-ROM 320 in some cases. The micro-ROM 320 is accessed for the R code 226 when it is not accessed in the E stage 404. In the data processor 100 related to the present invention, since many integer operation instructions can be executed in one microprogram step, successively to the micro-ROM 320 by the R code 226 in most cases.

In the operand fetch stage 403, the built-in data cache, built-in data RAM or external memory is accessed by the data address of the F code 225 to fetch the operand, and then the operand and the data address of the F code 225 are combined to generate the S code 228 to output it.

The 8-byte boundary can be crossed by one F code 225, but an operand fetch of 8 bytes or less must be specified. The F code 225 includes the specification whether the operand is to be accessed or not. When the operand address itself or immediate calculated in the A stage 402 is transferred to the E stage 404, operand fetch is not but the contents of the F code 225 are transferred as the S code 228. Since the S code 228 is queued up to two, up to two operands can be prefetched. When the operand is fetched from the external memory by single transferring, two clock cycles a minimum are needed for the aligned four bytes. For the block transferring in the burst mode, five clock cycles at minimum are necessary for the aligned 16 bytes.

When the operand is fetched from the external memory, whether the fetch destination address is within the non-cache area specified by the NCADDR register 300 or within the I/O area specified by the IOADDR, IOMASK is checked. The operand prefetch is not from the I/O area. In this case, the operand fetch is executed after all the preceding instructions have been executed and it is confirmed that the instructions which access the I/O area will be executed. When the data cache is missed in an instruction subsequent to the conditional branch instructions (Bcc, ACB, SCB) or the conditional trap instruction (TRAP), or when data fetch is executed from an area other than the built-in RAM area, the operand fetch is not executed until the preceding conditional branch instruction or conditional TRAP instruction are executed. This is to prevent the operand prefetch of the instruction which cannot be executed logically for the exterior.

When the built-in data cache hits, the operand is fetched in one clock cycle for the aligned 8 bytes.

Control of the built-in data cache and built-in data RAM, and management of the prefetch destination operand address, and control of the S code queue are executed in the OF stage. The processings performed in the F stage 403 are given as follows.

Accessing to micro-ROM 320
Operand prefetch
Management of operand prefetch queue 291
Management of data buffer (cache or RAM)
Checking whether the operand address is in the non-cache area or not
Checking whether the operand address is in the I/O area or not
Suppression from the I/O area
Suppression of accesses to an external memory by the subsequent instructions until the preceding conditional branch instruction and conditional trap instruction have been executed (4.1.6) Execution stage In execution stage (E stage) 404, the E code 224 and S code 228 are inputted, and the integer operation unit 155 operates. The E stage 404 is the stage which executes instruction and all the processings performed in the F stage 403 or before are preprocessings for the E stage 404. When a jump takes place or an EIT processing starts in the E stage 404, all the processings performed in the IF stage 400 to F stage 403 are invalidated. The E stage 404 is controlled by microprograms. The instruction is executed by executing a series of microinstructions starting with the entry address of the microprogram routine indicated by the R code 226.

Reading of the micro-ROM 320 and the execution of the microinstruction are pipelined. Since a conditional branch of a microprogram is executed by the Y decoder (for selecting the objective microinstruction from four microinstructions read from the micro-ROM 320 at the same time) of the micro-ROM 320, the next microinstruction is executed with no intermission even when the conditional branch of the micro-program is generated. The E stage 404 executes releasing of the write reservation to the scoreboard register 480 which is made by the A stage 402, rewriting of the branch prediction table 450 in the case where an branch prediction makes an error in the D stage 401, and checking whether the pre-eturn address is correct or not.

Various interrupts are received in the intervals between the instructions in the E stage 404, and the necessary processings are performed by the microprogram. The processings for various EITs are also performed by the microprogram in the E stage 404.

When the result of operation must be stored in the memory, the E stage 404 outputs the W code 229 and the program counter value of the instruction for performing the store operation to the S stage 405. Operand store in the memory is executed in the sequence which is logically specified by the program.

When store processing in the memory is executed, tags of the data cache is checked in the E stage 404 in order to determine whether the data cache needs to be rewritten or not. For this purpose, at the operand store operation, the E stage 404 occupies the data cache in one clock cycle before the actual store operation.

When a simple instruction is executed, the operand is read in the F stage 403, the operations are performed in the E stage 404, and the operand is stored in the S stage 405. However, when a string operation instruction or bit map operation instruction is executed, memory accessing is executed with use of block transfer efficiently by the burst mode in the E stage 404. Consequently, in these instructions, data is processed in the unit of blocks wherein one block is 16 bytes. The processing performed in the E stage are given as follows.

Execution of the instruction operation specified by the operation code by microprograms Updating of general-purpose register value and control register value Updating of flag in the PSW Updating of stack pointers specified by each ring Receiving and execution of EIT, and E stage jump Release of write reservation of the scoreboard register 480

Updating of branch prediction table 450

Checking of pre-return address

E stage jump for correcting a wrong pre-jump

E stage jump due to updating of control register and execution of instruction (4.1.7) Store stage The operand access unit 156 operates in the store stage (S stage) 405. When the data buffer memory 290 is used as a built-in data RAM, the S stage 405 stores the data of the W code 229 into the built-in data RAM when the higher 20 bits of the address of the W code 229 are the same as the contents of the DMADDR register 298 according to the address thereof, and inputs the data of the W code 229 and program counter value to the store buffer (SBDATA) 292 and stores the data of the W code 229 into the external memory when they are not the same.

When the data buffer memory 290 is used as the cache, the S stage 405 stores the data of the W code 229 into the built-in data cache according to the address of the W code 229 and, at the same time, inputs the W code 229 to the store buffer (SBDATA) 292 and stores the data of the W code 229 into the external memory.

The store buffer (SBDATA) 292 has two entries and can queue up to two 8-byte data items. In the single transfer, operand store is executed from the store buffer (SBDATA) 292 to the external memory at the rate of the aligned four bytes in at least two clock cycles. In the block transferring by the burst mode, operand store is executed from the store buffer (SBDATA) 292 to the external memory at the rate of the aligned 16 bytes in at least 5 clock cycles.

The operations of the S stage 405 are performed in the operand access unit 156. When the built-in data cache is missed, the exchange operation is not done.

When an EIT is detected in the operand storing operation, the EIT is informed to E stage 404 while the store buffer (SBDATA) 292 holds the W code 229. When an EIT is generated in the store buffer (SBDATA) 292, the hit entry of the data cache may have been changed and may possibly be used in the next instruction. Note should be taken on this point. The hit entry of the data cache is not automatically invalidated by the EIT of the store buffer (SBDATA) 292 by hardware. This is also the point to pay attention. The processings performed in the S stage 405 are given as follows.

Storing of data into the data buffer memory 290 and main storage 103

Management of the store buffer (SBDATA) 292

(4.2) Supper scaler processing (4.2.1) Outline of super scaler operation

The data processor 100 related to the present invention executes two-instruction supper scalar processing in which a frequently-used short format instruction and its preceding instruction are decoded in parallel and executed in parallel. When both the pipeline processed and super scaler processing are performed most efficiently, the data processor 100 related to the present invention processes two instructions in one clock cycle and has the 80MIPS processing capability at 40 MHz operation.

When decoding two instructions in parallel, the main decoder 211 of the instruction decoding unit 151 shown in FIG. 20 decodes the preceding instruction and the first subdecoder 212 or second subdecoder 213 of the same decodes the subsequent instruction. When executing two instructions in parallel, the main operation circuit 350 executes the preceding instruction in the integer operation unit 155 shown in FIG. 25, and the sub-operation circuit 351 executes the subsequent instruction. Furthermore, when executing two instructions in parallel, the sub-operation circuit 351 executes the subsequent instruction by the hard wired control. When the preceding instruction is executed by a microprogram of two or more microinstructions, the subsequent instruction is executed in parallel with the last microinstruction.

Figure 28:
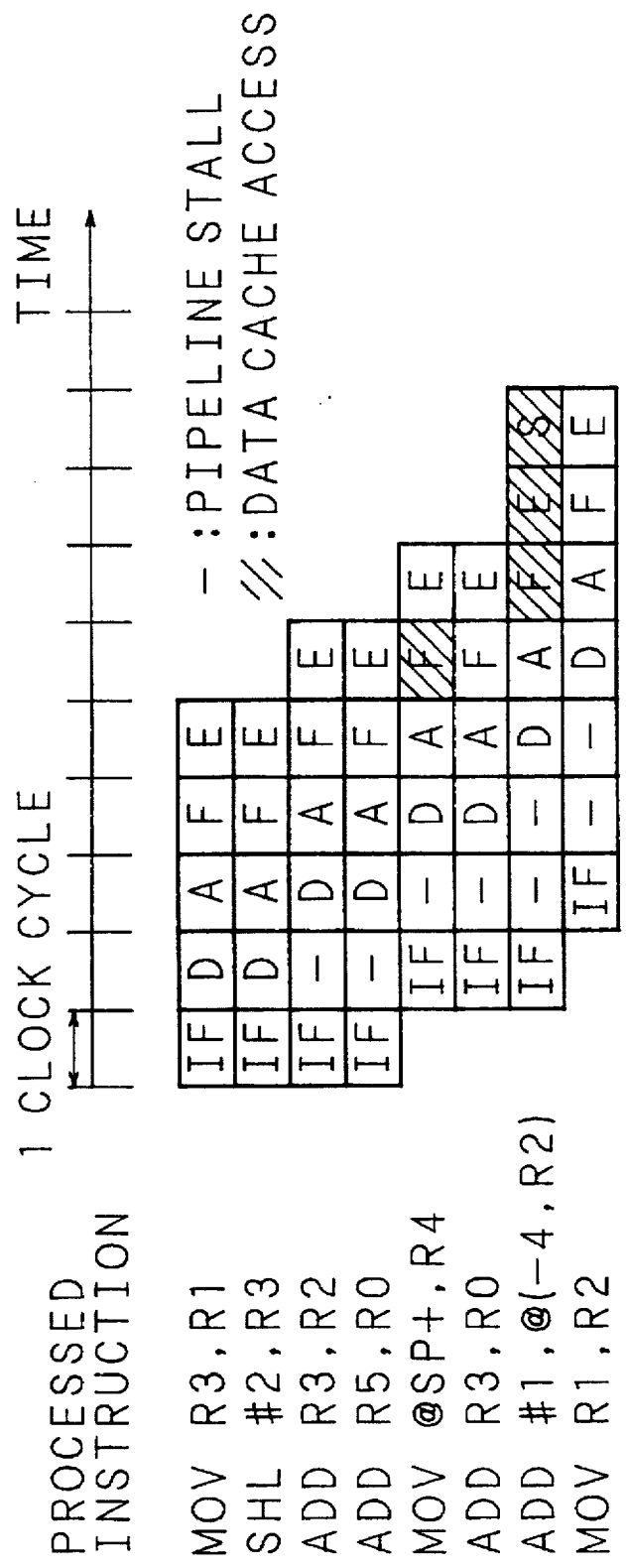
FIG. 28 is a timing chart for executing a super scaler operation in the data processor related to the present invention.

An example of timing chart in the case where the super scaler processing of two instructions is performed in the pipeline is schematically shown in FIG. 28.

In this example, the following three pairs of instructions: "MOV R3,R1" and "SHL #2,R3", "ADD R3,R2" and "ADD R5,R0", and "MOV @SP+,R4" and "ADD R3,R0" are executed in parallel in each of stage of instruction fetch (IF), instruction decoding (D), address generating (A), operand fetch (F), instruction execution (E) and operand store (S). In these pairs, the subsequent instruction is a register operand only and does not conflict with the operand of the preceding instruction, therefore parallel decoding and parallel execution of two instructions are executed.

The instruction fetch unit 150 of the data processor 100 related to the present invention has a 16-byte instruction prefetch queue, and the instruction cache 200 is connected to the instruction queue 201 via an 8-byte bus, therefore eight bytes of instructions can be fetched at one time. The example in FIG. 28 shows a state in which the preceding four instructions are fetched simultaneously and then subsequent three instructions are fetched at one time. In FIG. 28, "-" indicates that each instruction is stalled in the pipeline and wait for being processed, and hatching indicates the access processing to the data memory (data cache).

(4.2.2) Parallel decoding processing

The instruction decoding unit 151 of the data processor 100 related to the present invention has the main decoder 211 and two subdecoders for decoding two instructions in parallel. When decoding two instructions, the main decoder 211 decodes the preceding 16-bit or 32-bit instruction (including the last decoding processing of the case where it is decomposed into a plurality of step codes), and the first subdecoder 212 decodes the instruction stored in "address of preceding instruction+two addresses" assuming that the preceding instruction decoded by the main decoder 211 is 16 bits. The second subdecoder 213 decodes the instruction stored in "address of the preceding instruction+four addresses" assuming that the preceding instruction is 32 bits.

Figure 29:
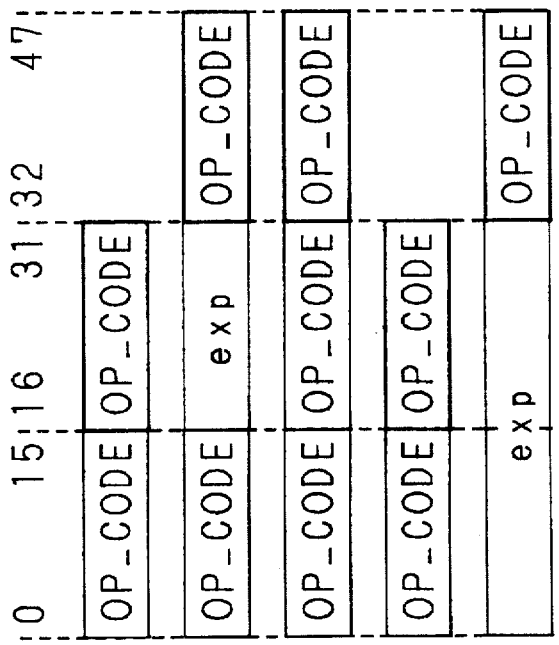
FIG. 29 is a schematic diagram showing combination conditions of parallel-decodable instruction codes in the data processor related to the present invention.

The decoding result by the two subdecoders are determined to be valid or invalid at the time when the length of the preceding instruction is known by the decoding result of the main decoder 211. FIG. 29 shows the combination conditions for the instruction codes which can be decoded in parallel.

The fetched instruction code is shifted by the instruction queue 201 and fed to the instruction decoder, therefore the first address shown in FIG. 29 can be an arbitrary even-number address. However, it is desirable that the jump destination instruction positions at 8-byte boundary from the standpoint of instruction fetch efficiency.

(4.2.3) Parallel execution processing

Two instructions decoded in parallel in the instruction decoding unit 151 are executed in parallel in the integer operation unit 155. When the preceding instruction is the integer operation instruction, the subsequent instruction is executed in parallel when the last microstep of the preceding instruction is executed.

Figure 30:
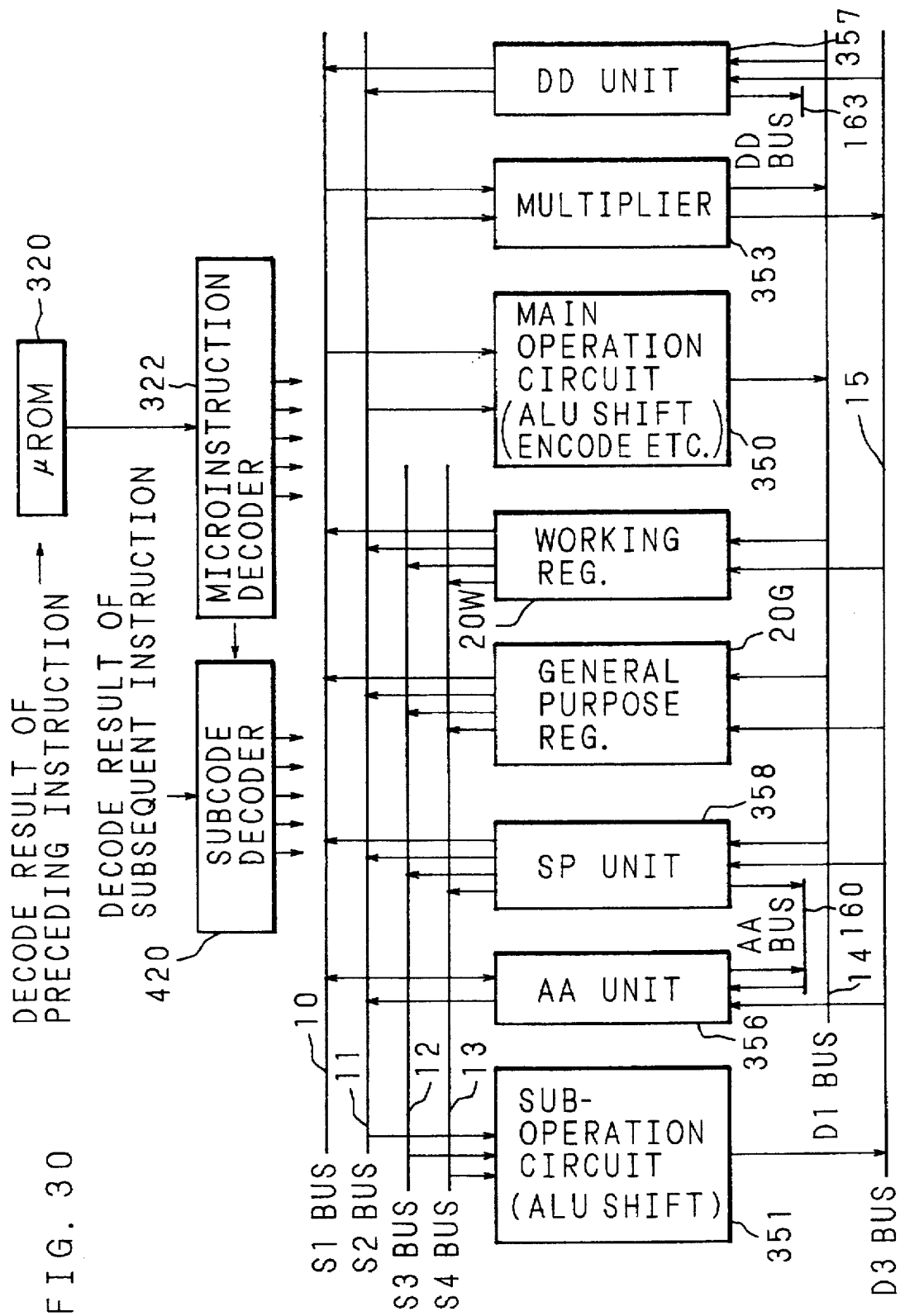
FIG. 30 is a block diagram showing portions relating to the parallel execution mechanism for the micro-ROM unit and integer operation unit for the data processor related to the present invention.

Each of the main operation circuit 350 and sub-operation circuit 351 is connected to the register file 20 via three buses in order to execute two instructions in parallel in the integer operation unit 155. The block diagram relating to the parallel execution mechanisms of the micro-ROM unit 152 and integer operation unit 155 is shown in FIG. 30.

The main operation circuit 350 is connected to the register file 20 comprising the general-purpose register 20G and working register 20W, AA unit 356 and DD unit 357 via the S1 bus 10, S2 bus 11 and D1 bus 14 and performs operations of the preceding instruction between the register operand, immediate and memory operand. Only the multiplier 353 of the main operation unit is connected also to the D3 bus 15. The sub-operation circuit 351 is connected to the general-purpose register 20G and SP unit 358 via the S3 bus 12, S4 bus 13 and D3 bus 15 and operates the subsequent instruction between the register operands in parallel with the main operation circuit 350.

When a microinstruction for executing the preceding instruction is decoded, the sub-R code 227 of the subsequent instruction is decoded by the subcode decoder 420. The sub-operation circuit 351 accesses and operates the register operand by a bus which is independent of the bus used to operate the preceding instruction according to the result of decoding by the subcode decoder 420. Consequently, unless the operation result of subsequent instruction affects the execution of the preceding instruction and unless the operation result of preceding instruction affects the execution of the subsequent instruction, the two operations can be performed in parallel. The interference between the operands of the preceding instruction and subsequent instruction has been checked by the instruction decoding unit 151, and the two instructions decoded in parallel in the instruction decoding unit 151 can always be executed in parallel.

(4.2.4) Combinations of instructions executable in parallel

When a super scaler processing is performed, in the instruction decoding unit 151, the main decoder 211 decodes the preceding instruction of 32 bits or less and the first subdecoder 212 or second subdecoder 213 decodes the 16-bit subsequent instruction. The operand address generating unit 153 generates an address of the memory operand of the preceding instruction but not the operand address of the subsequent instruction. The operand access unit 156 fetches the operand of the preceding instruction but not that of the subsequent instruction. In the integer operation unit 155, the main operation circuit 350 executes the preceding instruction by the microprogram control, and the sub-operation circuit 351 executes the subsequent instruction by the hard wired control.

Since the super scaler processing is performed within the range of the above stated hardware operations, it is not applicable to all the pairs of two instructions. The list of the instructions by which the super scaler processing can be performed is given below.

The preceding instruction can take any kind of instruction, however the subsequent instruction is limited to the short format not including the memory operand. When the sequence of the preceding instruction and subsequent instruction is reversed, the date processor 100 related to the present invention does not perform the parallel operations. Note should be taken on this point. It is desirable that the compiler outputs object codes wherein successive two instructions satisfying the following conditions to improve the execution efficiency of the super scaler processing.

1) Preceding instruction

The following instructions which do ot include the chained mode and 32-bit addressing extension part:

Transfer instruction:
all the instructions except for the LDM and STM
Compare instruction:
all the instructions except for the CHK
Arithmetic operation instruction:
all the instructions except for MULX and DIVX
Logical operation instruction:
instruction except for MTST
Shift instruction:
all the instructions
Bit operation instruction:
all the instructions
Fixed-length bit field operation instruction:
all the instructions
Arbitrary-length bit field operation instruction:
none
Decimal instruction:
all the instructions except for UNPK
Queue instruction:
QINS and QDEL
Control space/physical space operation instruction:
all the instructions except for LDC and LDPSB
OS-related instruction:
STCTX 2) Subsequent instruction The following instructions wherein the addressing mode is Rn and without operand interference with the preceding instruction:

Transfer instruction:
MOV:L, MOV:S, MOV:Q and MOV:Z
Compare instruction:
CMP:L, CMP:Q and CMP:Z Arithmetic operation instruction:
ADD:L, ADD:Q, SUB:L, SUB:Q and NEG
Shift instruction:
SHA:Q and SHL:Q
Logical operation instruction:
AND:R, OR:R, XOR:R and NOT (4.3) Parallel processing of plurality of operands (4.3.1) Parallelizing integer operation unit The integer operation unit 155 of the data processor 100 related to the present invention has the two pair of operation units, register ports and buses, and performs the two-parallel super scaler processing in parallel; and processes two 32-bit data in parallel when executing the instructions such as the LDM, STM, ENTER, EXITD or context switch instructions wherein a plurality of operands are transferred between the register file 20 and memory.

When the integer operation unit 155 executes a string instruction or arbitrary length bit field instruction, it accesses the memory in 16-byte unit and performs the internal processings in 8-byte unit. For example, it accesses the memory in 16-byte unit in the processing of byte string and its the operation unit processes the 8 characters as one unit in parallel.

For the LDM, STM, ENTER and EXITD instructions, the instruction decoding unit 151 encodes the register list and decomposes these instructions into a plurality of internal codes (step codes) which process one or two 4-byte operands. The pipeline of the F stage 403 and the subsequent stages process these step codes.

For the context switch instruction, string instruction and arbitrary length bit field instruction, one microinstruction controls the main operation circuit 350 and sub-operation circuit 351 in parallel for realizing the parallel processing of a plurality of operands.

When processing a plurality of operands in parallel, the main operation circuit 350 and sub-operation circuit 351 are controlled by a microprogram using the VLIW (Very Long Instruction-Word) technique in the integer operation unit 155 of the data processor 100 related to the present invention. The microinstruction word of the data processor 100 related to the present invention, wherein the VLIW technique is used, is 155 bits per one word. Of the 155 bits, 115 bits are used for the field for controlling the main operation circuit 350 and the other 40 bits are used for the field for controlling the sub-operation circuit 351.

Figure 31:
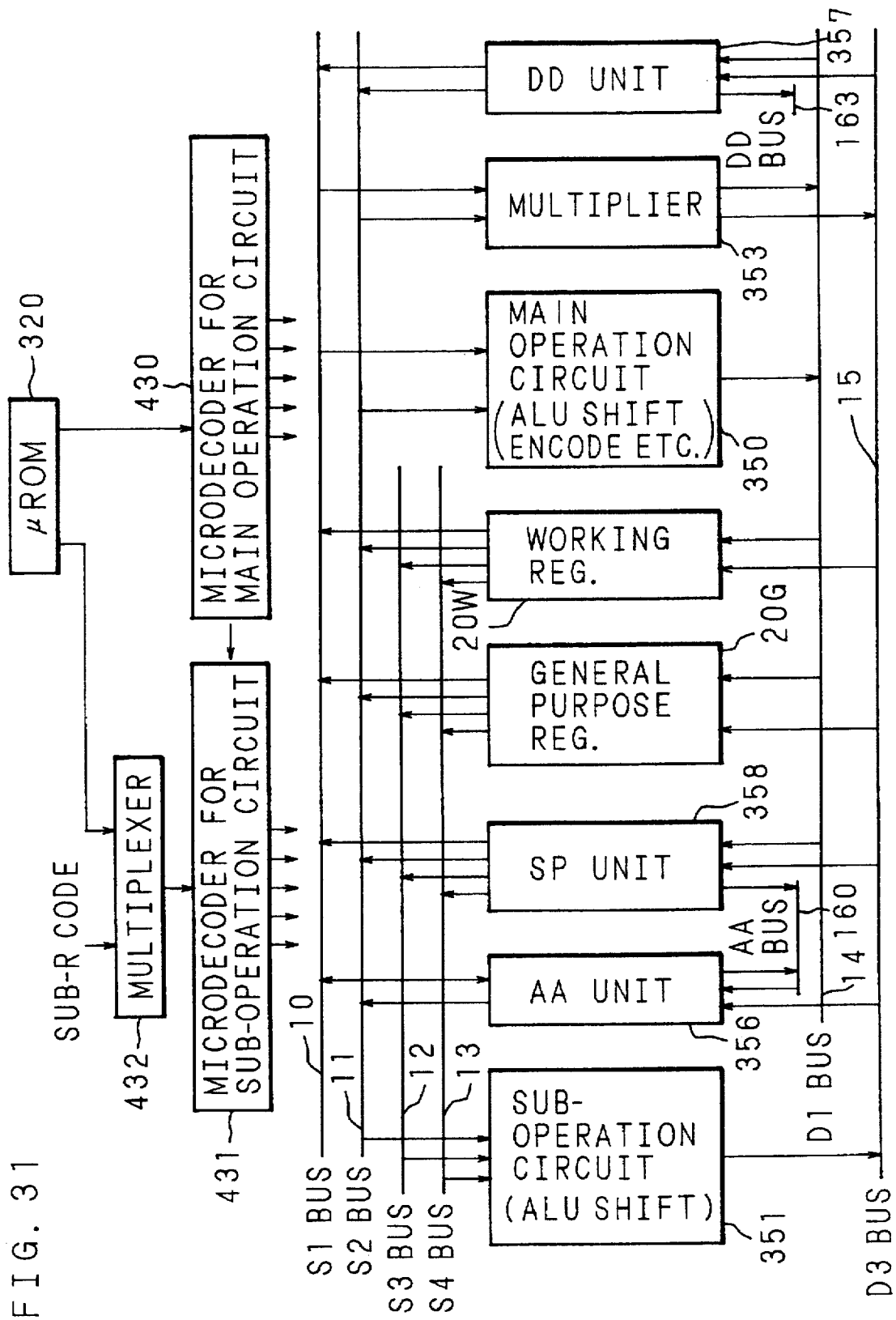
FIG. 31 is a block diagram showing a configuration example of the integer operation unit controlled by micro-instructions using the VLIW technique of the data processor related to the present invention.

A configuration example of the integer operation unit 155 controlled by the microinstructions using the VLIW technique is shown in a block diagram of FIG. 31. A microinstruction outputted from the micro-ROM 320 is decoded by the microinstruction decoder 430 for the main operation circuit and microinstruction decoder 431 for the sub-operation circuit. At this time, the multiplexer 432 shown in FIG. 31 selects the control field of the microinstruction for the sub-operation circuit 351 outputted from the micro-ROM unit 152 but does not select the sub-R code 227. The sub-operation circuit 351 does not perform the super scaler processing according to the sub-R code 227 when executing a microinstruction which uses the VLIW technique, but performs the operations specified by the control field of the microinstruction for the sub-operation circuit 351.

The main operation circuit 350 fetches the operands from the register file 20 via the S1 bus 10 and S2 bus 11, performs the operations with the operation units such as the main ALU 23, main barrel shifter 29, or the like, and rewrites the operation results into the register file 20 via the D1 bus 14. The main operation circuit 350 transfers/receives the operands to/from the DD unit 357 via the S1 bus 10 or D1 bus 14 when handling the memory operands.

The sub-operation circuit 381 fetches the operands from the register file 20 via the S3 bus 12 and S4 bus 13, performs the operation in the sub-ALU 27 or sub-barrel shifter 352, and rewrites the operation result into the register file 20 via the D3 bus 15. The sub-operation circuit 351 transfers/receives the operands to/from the DD unit 357 via the S2 bus 11 or D3 bus 15 when handling the memory operands.

(4.3.2) Transfer instruction of a plurality of operands

When executing the LDM, STM, ENTER and EXITD instructions, the data processor 100 related to the present invention decomposes these instructions into a plurality of step codes in the A stage 402. In the F and E stages, each step code is processed as an instruction which transfers one or two operands. When loading two 32-bit operands from the memory to the register file 20, one 64-bit data is fetched from the memory in the F stage 403, and it is decomposed into two 32-bit operands by the DD unit 357 in the E stage 404 and then they are transferred to the two general-purpose registers 20G via the two 32-bit buses. When storing two 32-bit operands from the register file 20 and storing into the memory, the two 32-bit operands are fetched from the two general-purpose registers in the E stage 404 and then they are concatenated to each other to be one 64-bit data in the DD unit 357. It is stored into the memory in the S stage 405.

The operation sequence of the integer operation unit 155 at the time when the two 32-bit operands are loaded in parallel from the memory to the registers are described as follows.

1) One 64-bit data is fetched from the memory and inputted to the DD unit 357.

2) One 64-bit data is decomposed into two 32-bit operands in the DD unit 357.

3) One of the two 32-bit operands is transferred from the DD unit 357 to the register file 20 via the S1 bus 10, main ALU 23 and D1 bus 14, and the other one of them is transferred from the DD unit 357 to the register file 20 via the S2 bus 11, sub-ALU 27 and D3 bus 15.

The operation sequence of the integer operation unit 155 at the time when the two 32-bit operands are stored in parallel from the registers into the memory are described as follows.

1) One of the two 32-bit operands is transferred from the register file 20 to the DD unit 357 via the S1 bus 10, main ALU 23 and D1 bus 14, and the other one of them is transferred from the register file 20 to the DD unit 357 via the S2 bus 11, sub-ALU 27 and D3 bus 15.

2) The two 32-bit operands are concatenated to each other to make one 64-bit data in the DD unit 357.

3) One 64-bit data is transferred from the DD unit 357 and stored into the memory.

Figures 32A, 32B:
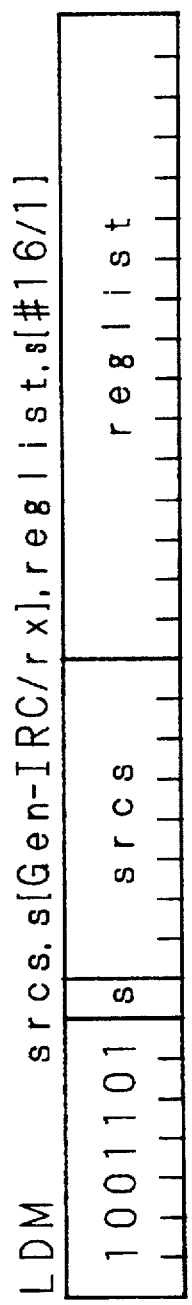
FIGS. 32A and 32B are schematic diagrams showing a bit pattern of LDM instruction as an example of an instruction having a register list of the data processor related to the present invention.

A bit pattern of the LDM instruction as an example of an instruction having the register list is shown in schematically in FIG. 32.

The LDM instruction is the one which loads a plurality of 32-bit operands from the memory area specified by the general addressing mode to the general-purpose register specified by the register list. Each bit of the 16-bit register list corresponds to each of the register 0 (R0) to register 15 (R15) of the general-purpose registers 20G, and a 32-bit operand is loaded to the general-purpose register corresponding to the position of the bit "1" of the register list. When the two 32-bit operands placed in the same 8-byte boundaries are loaded to the two successively-numbered general-purpose registers, the two operands are transferred simultaneously. When the operands are loaded to the general-purpose registers which are not successively numbered, they are loaded one by one.

Figure 33B:
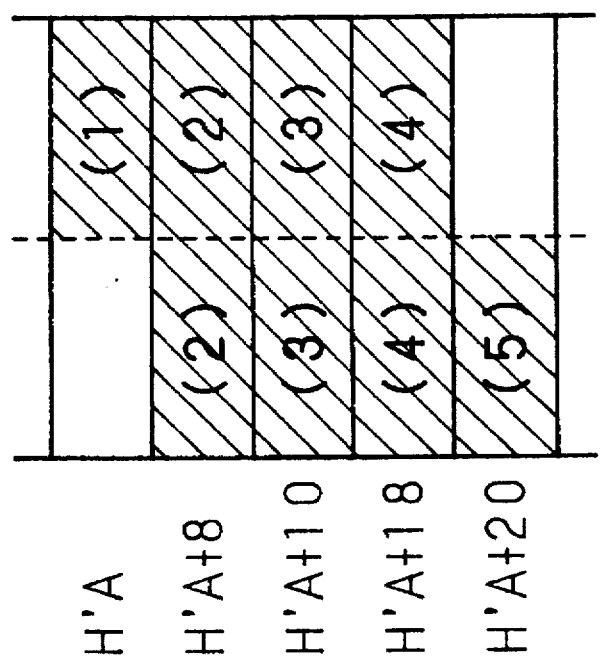
FIGS. 33A and 33B are schematic diagrams showing an operand to be transferred in the case where SP=H'(A+4), and A is the double word boundary address when "LDM @SP+ ,(R4–R11)" instruction is executed by the data processor related to the present invention.
Figure 33A:
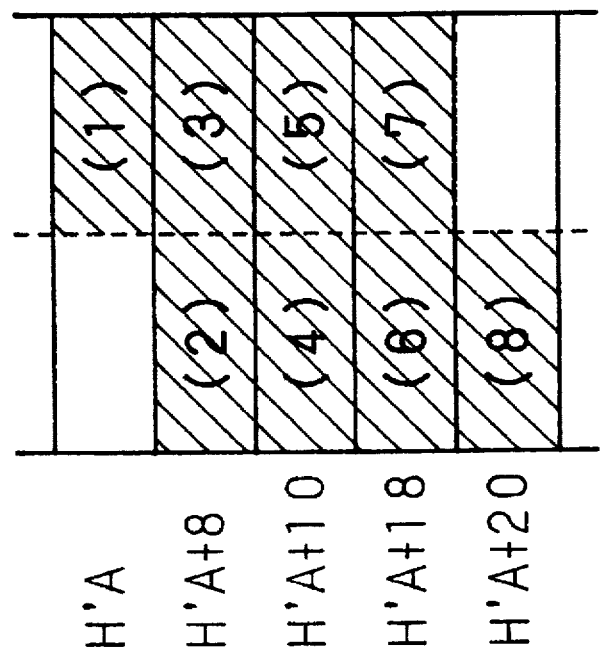

For example, when an "LDM @SP+,(R4–R11)" instruction is executed, the operands to be transferred are those hatched in FIG. 33 in the case where SP=H' (A+4) and A is an address of double word boundary. The instruction loads eight 4-byte operands to the eight general-purpose registers R4 to R11. In the conventional method in which the operands are loaded one by one, eight times memory accessing is requested as shown in FIG. 33(a). However, in the data processor 100 related to the present invention, one 4-byte operand is transferred at first to the R4, next six operands are transferred two operands by one transfer at three times to the R5 to R10, and one operand is transferred to the R11 at last. This means that eight operands are loaded to the registers by first time accessing of the memory in this example as showing accessing times by (1) through (5) in FIG. 33(b).

Figure 34:
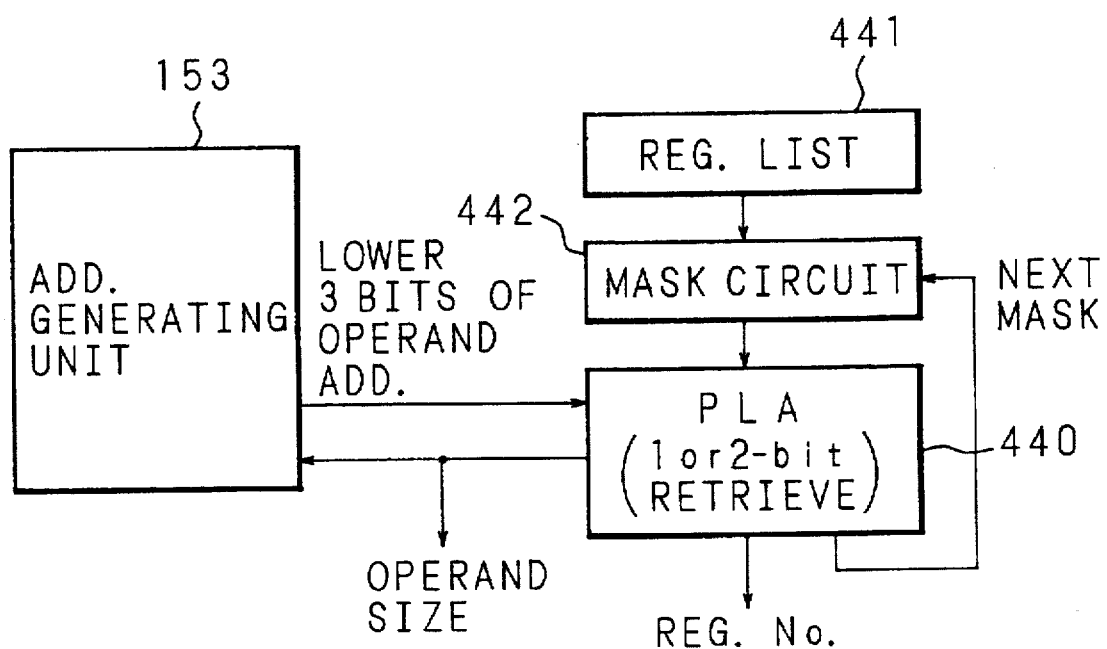
FIG. 34 is a block diagram showing a configuration for encoding positions of two consecutive "1" from the register list of the data processor related to the present invention.

The instruction decoding unit 151 of the data processor 100 related to the present invention has a PLA circuit 440 as shown in FIG. 34 in order to encode the position of two successive "1" from the register list. The 16-bit bit train wherein the bits which do not need to be retrieved are masked by the masking circuit 442 and the lower 3 bits of the operand address are inputted to the PLA circuit 440 from the register list 441 specified by the instruction, and whether the two operands can be transferred in parallel or not is determined. The conditions wherein two operands can be transferred in parallel are given in FIG. 35.

When transferring between successively-numbered registers and the addresses other than word boundaries, the memory is accessed three times for eight bytes in the case where the cache is missed although two data can be transferred simultaneously between the registers. Note should be taken on this aggravated efficiency. The conditions given in FIG. 35 are applicable to the STM, ENTER and EXITD instructions.

In order to utilize the 2-operand simultaneous transfer function of the data processor 100 related to the present invention, efficiently the LDM, STM, ENTER and EXITD instructions must be used by considering the 2-operand simultaneous transfer conditions shown in FIG. 35.

(4.3.3) "Context switch instruction"

Figure 36:
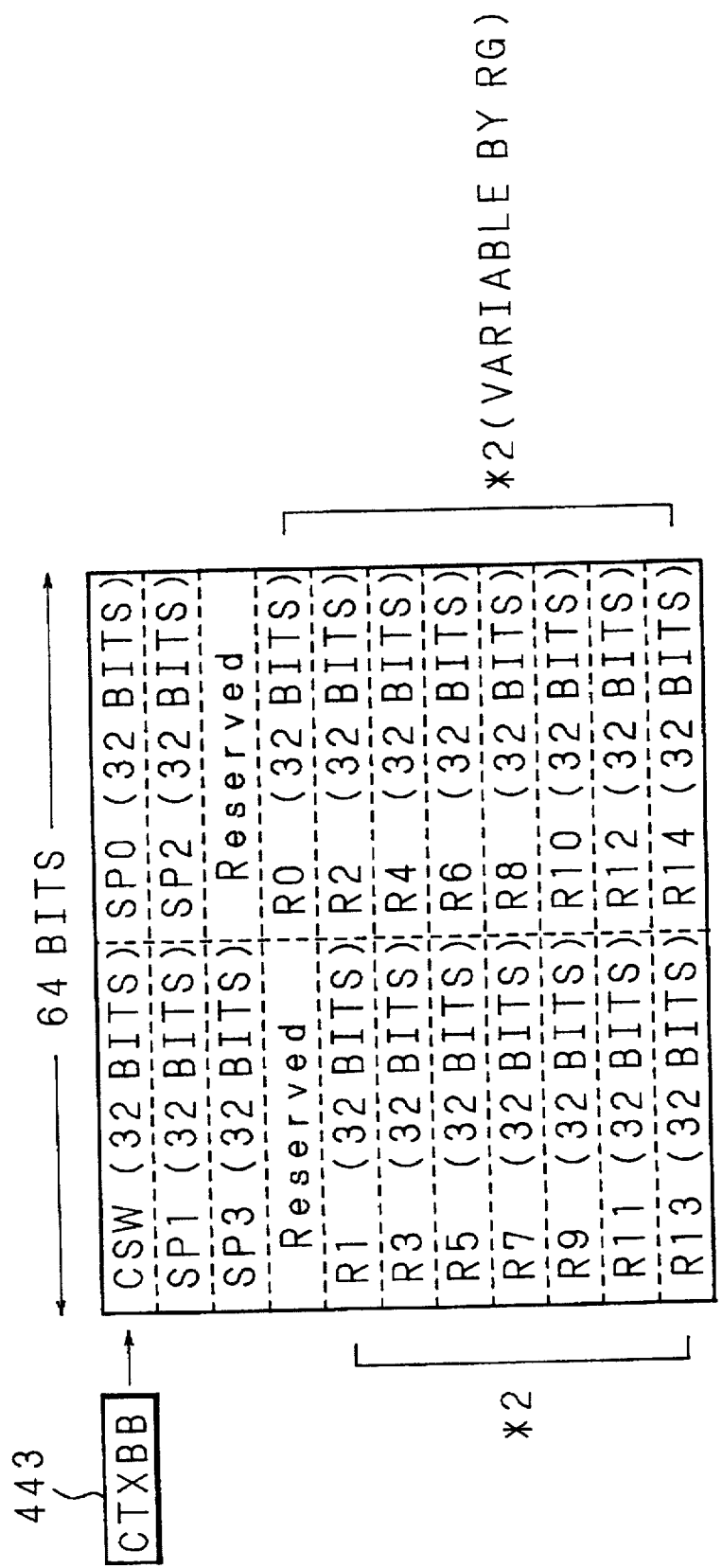
FIG. 36 is a block diagram showing a context block which are a register group used for context switching in the data processor related to the present invention.

A context block which is a register group used for the context switching of the data processor 100 related to the present invention is shown schematically in FIG. 36.

When executing a LDCTX instruction, the data processor 100 related to the present invention pairs the two adjacent registers shown in FIG. 36 and loads data in 8-byte unit. In this case, memory accessing is always executed by the block transfer in 16-byte boundary unit regardless of the cache area and non-cache area.

When executing a STCTX instruction, an operation differs depending on whether the CTXBB register 443 indicates an address of 16-byte boundaries or the other address. When the context block is arranged on a 16-byte boundary, data in the context block are stored four-word unit by the block transfer. Concretely, the contents of the registers CSW, SP0, SP1 and SP2 shown in FIG. 36 are transferred at first by the block transfer, the contents of the registers SP3 and R0 are transferred by the single transfer, the three groups of data (the contents of the registers R1, R2, R3, R4; contents of the registers R5, R6, R7, R8; and contents of the registers R9, R10, R11, R12) are transferred by the block transfer, and the contents of the registers R13 and R14 are transferred at last by the single transfer. When the context block is not placed on the 16-byte boundary, the contents of the two adjacent registers shown in FIG. 36 is stored in 8-byte unit by the single transfer. The hardware determines whether to use the block transfer or single transfer in 8-byte unit.

When R0:14 is not transferred by the context switch instruction in the case where RG=0 of the CXTBFM, the contents of the registers CSW, SP0, SP1, SP2 and SP3 are transferred by the block transfer at least two times for the LDCTX instruction. For the STCTX instruction, when a CTXBB register 443 indicates an address with 16-byte boundaries, the contents of the registers CSW, SP0, SP1 and SP2 are transferred by the block transfer and then the contents of the register SP3 is transferred by the single transfer. When the CTXBB register 443 indicates an address other than 16-byte boundaries in the STCTX instruction, the registers CSW and SP0 and the registers SP1 and SP2 are paired data writ is executed twice in 8-byte unit and then the contents of the register SP3 is written as 4-byte data.

(4.3.4) "String instruction"

In the integer operation unit 155 of the data processor 100 related to the present invention, the string instructions (SMOV, SCMP, SSCH, SSTR) which transfers, compares, or retrieves strings composed of a plurality of 8-bit/16-bit/32-bit elements is executed, it operates two operation circuit, that is, the main operation circuit 350 and sub-operation circuit 351 in parallel to process strings in 8-byte unit. Consequently, eight, four and two elements are processed in parallel for the 1-byte element, 2-byte element and 4-byte element, respectively. Memory accessing is executed in 16-byte unit in order to efficiently use the buses by the block transfer in the burst mode. At data loading, 8-byte data read is executed twice successively. At data storing, 16-byte block write operation is executed.

A case where a byte string ending with a null byte (=H'00) is transferred by the SMOV instruction is described here as an example of string instruction execution.

Figure 37:
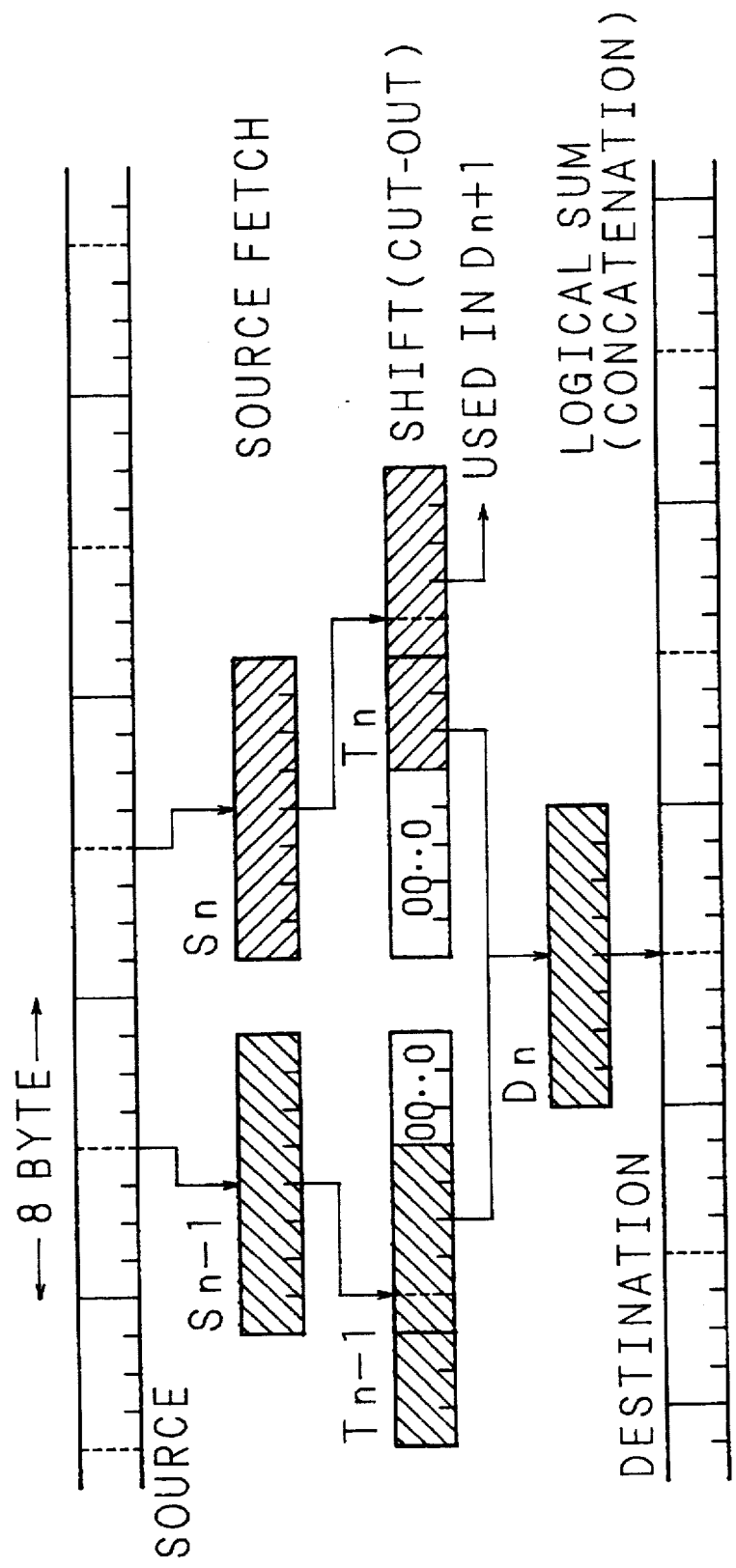
FIG. 37 is a schematic diagram showing a status of a first half 8-byte processing of a loop of n-th 16-byte processing of the microprogram executing the SMOV instruction of the data processor related to the present invention.

The first half 8-byte processing of the n-th 16-byte processing loop by a microprogram for processing the SMOV instruction is schematically shown in FIG. 37.

For the SMOV instruction, the start address A0 of the source string is held in the register R0 and the start address A1 of the destination string is held in the R1. The two 8-byte source strings S2n and S2n+1 are fetched from the memory and held in the DDR0 and DDR1 of the DD unit 357. The source string S2n−1 has already been fetched in the previous loop and held in the working register. The A0 and A1 are arbitrary addresses and not on the word boundaries generally. Consequently, in order to shift the source string to the position of the destination string in the data processor 100 related to the present invention which performs string processing in the 8-byte boundary unit, the source byte string must be shifted by m bytes which is the remainder produced when the difference between the addresses of the source string and destination string is divided by 8. When the source string S2n−1 is shifted leftward by (64−8m) bits and the source string S2n is shifted rightward by 8m bits by the 64-bit barrel shifter, T2n−1 and T2n are obtained. Then the two 32-bit ALUs are operated in parallel to obtain the destination string D2n aligned in the 8-byte boundary as the logical sum of the T2n−1 and T2n and store it into the working register. When obtaining the destination string D2n, the zero output of the logical sum of each byte is detected in parallel in the ALU to retrieve the null string. In the second half 8-byte processing in the n-th 16-byte processing loop by the microprogram, the destination string D2n+1 is obtained from the source strings S2n and S2n+1 in the same way as in the first half processing. Then, the 16-byte boundary data (D2n+D2n+1) is stored in the memory by the block transfer in the burst mode.

The data processor 100 related to the present invention performs the above stated one loop operation in six clock cycle. Consequently, when a byte string ending with the null string is processed by the SMOV instruction, the processing speed is 16 bytes/6 clock cycles=2.7 bytes/clock cycle.

When processing the string instruction other than the SMOV instruction and when processing the SMOV instruction in a condition other than the above, the data processor 100 related to the present invention processes two 32-bit data in parallel by controlling the main operation circuit 350 and sub-operation circuit 351 by one microinstruction. The memory is efficiently accessed by the block transfer by the burst mode in 16-byte unit. The peak values of the processing speeds of each string instruction is shown in FIG. 38. The string instruction needs a processing time of several clock cycles for the preprocessings and postprocessing in addition to the loop operation of the microprogram, therefore it may take a longer processing time than using a simple instruction for a short string does in some cases. Note should be taken on this regard.

(4.3.5) "Arbitrary-length bit field instruction"

In the data processor 100 related to the present invention, the memory accessing is executed by the block transfer in the burst mode in 16-byte unit, and data is processed in 64-bit unit in the integer operation unit 155. In this way, the arbitrary length bit field instructions (BVSCH, BVMAP, BVCPY, BVPAT) are efficiently executed in the same manner as for the string instructions.

When processing the arbitrary length bit field instruction, the two operation circuit, that is, the main operation circuit 350 and sub-operation circuit 351 of the integer operation unit 155 are operated in parallel by one microinstruction in the same way as above to operate the operands in 64-bit unit. Thus, the processing performance for every clock cycle of the arbitrary length bit field instruction of the data processor 100 related to the present invention is two times higher than that for the conventional data processor. The peak values of operation speeds of the arbitrary length bit field instructions of the data processor 100 related to the present invention are shown in FIG. 39. Additionally, the arbitrary length bit field instruction needs an operation time of several to ten and several clock cycles in addition to the loop processing by the microprogram like the string instruction, therefore it may take a longer processing time than a simple instruction does for a short bit field in some cases.

(4.4) "Processing of jump instruction"
(4.4.1) "Outline of Pre-jump processing"

The instruction pipeline of the data processor 100 related to the present invention is configured in six stages, wherein the E stage 404 for instruction execution is the fifth stage. Consequently, when the jump is executed at the other instruction execution, all the processing in the IF stage 400, D stage 401, A stage 402 and F stage 403 prior to the E stage 404 are canceled. Stage processing time in each stage is at least one clock cycle, therefore at least four clock cycles of dead time is generated when the case where the jump instruction is executed in the E stage 404.

In order to minimize the disruption of the pipeline caused by the execution of the jump instruction, the hysteresis of the conditional branch instructions is stored and the conditional branch instruction is executed in the instruction decoding stage 401 (D stage) which is the second stage in the pipeline by the branch prediction according to the hysteresis or the copy of the return destination address of the subroutine is held in the PC stack 243 in the chip to execute the subroutine return instruction also in the D stage 401 as the pre-jump processing in the conventional data processor.

Now in the data processor 100 related to the present invention, the pre-jump takes place also in the operand address generating stage (A stage) 402 which is the third stage in the pipeline or the pre-jump processing mechanism is further strengthened by using the two instruction queues 201 in order to fetch the instruction codes of the conditional branch instruction in the two systems, that is, on the branching side and non-branching side in addition to the configuration of the conventional data processor.

Figure 41:
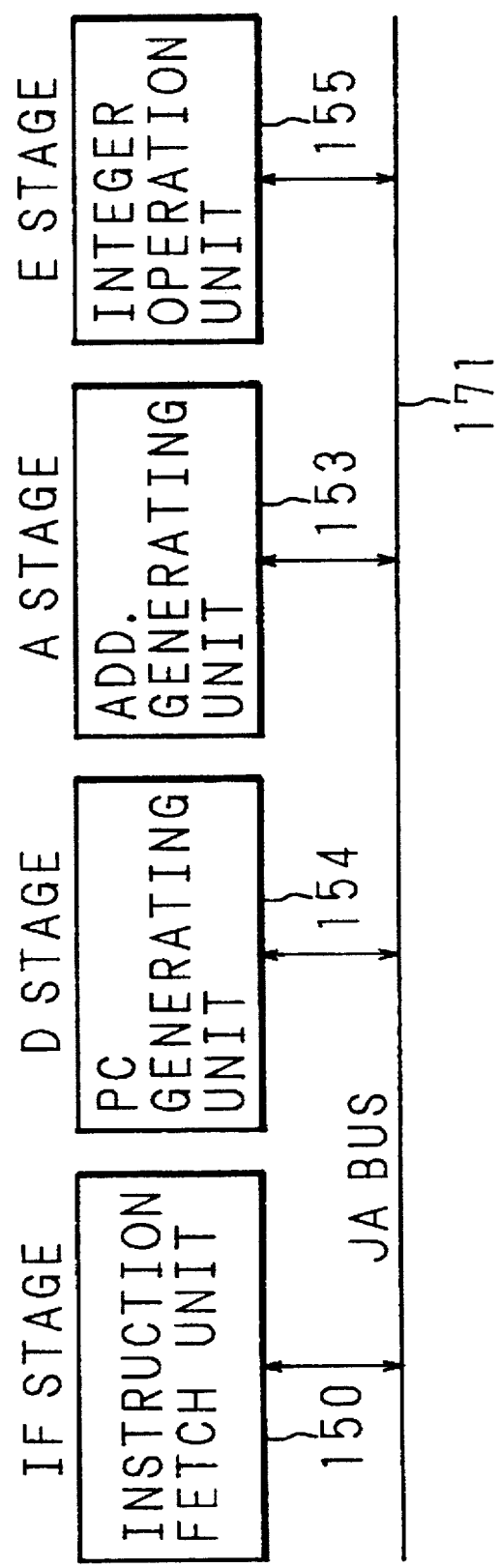
FIG. 41 a block diagram showing a relation of stages wherein jump instructions are processed in the data processor related to the present invention.

The instructions by which the pre-jump processings are performed and the hardware which are used for the pre-jump for the data processor 100 related to the present invention are listed in the table given in FIG. 40. The relations between the stages wherein the jump processings are performed in the data processor 100 related to the present invention are shown in the block diagram in FIG. 41.

The jump instruction is executed in the PC generating unit 154, address generating unit 153 or integer operation unit 155. The jump destination address is transferred to the instruction fetch unit 150 via the JA bus 171 (jump destination address bus) in order to fetch the instruction from the jump destination and also transferred to the PC generating unit 154 in order to calculate the PC value of the instructions subsequent to the jump destination instruction.

The PC generating unit 154 operates in the D stage 401 for processing the pre-jump therein. The address generating unit 153 operates in the A stage 402 for processing the pre-jump therein. In the A stage 402, address calculation processing of the instruction string on the opposite side of the operations (branching or non-branching) in the D stage 401 for a conditional branch instruction are executed. The integer operation unit 155 operates in the E stage 404 and executes returning from the incorrect pre-jump, jump processing to start the EIT or the like.

The flow of the instructions in the pipeline in the case where a jump takes place in the E stage 404 for an unconditional branch instruction (BRA) is shown in the timing chart in FIG. 42. The flow of the instructions therein in the case where a pre-jump takes place in the D stage 401 is shown in the timing chart in FIG. 43.

When a jump takes place in the E stage 404, a dead time of four clock cycles elapses until execution of the jump destination instruction. However, when the jump takes place in the D stage 401, the dead time decreases to one clock cycle. In the data processor 100 related to the present invention, the BRA instruction by which a pre-jump has taken place is not executed in the A, F and E stages.

(4.4.2) "Classification of jump instructions"

In the data processor 100 related to the present invention more than ten types of jump instructions are provided. When the pre-jumps take place for all the jump instructions in the instruction decoding stage (D stage) 401 or operand address generating stage (A stage) 402, a heavy load is applied to the hardware. It is not necessary from the standpoint of execution frequency. The pre-jump processings do not take place for the jump instructions which are not executed frequently in the data processor 100 related to the present invention. The presence or absence of pre-jump processing for each jump instruction and the minimum operation times in the data processor 100 related to the present invention are shown in the table in FIG. 44.

(4.4.3) "Jump processing to PC relative address and absolute address"

When the BRA and BSR instructions and the JMP and JSR instructions to the PC relative address are decoded in the D stage 401, the data processor 100 related to the present invention calculates the branch destination address in the PC generating unit 154 and the pre-branch takes place. When decoding the Bcc instruction which is predicted to jump in the branch prediction table 450, and ACB and SCB instructions in the D stage 401, the branch destination address is calculated in the PC generating unit 154 and the pre-branch takes place. When the JMP and JSR instructions for jumping to the absolute address are decoded, the pre-jump takes place to the absolute address cut-off from the instruction field.

When a pre-branch takes place or a pre-jump takes place to the absolute address, the branch destination address calculation wherein the branch displacement pcdisp and PC value are added or cutting-off absolute address abs is performed in parallel with decoding. T e pcdisp field position and abs field position are not known at the moment of starting of instruction decoding. To solve this problem, the data processor 100 related to the present invention predicts the positions of the pcdisp field and abs field simultaneously with the start of decoding of the above instructions and starts generation of jump destination address. In some ACB and SCB instructions, the pcdisp field can hardly be predicted and the branch destination address is calculated after decoding the instruction.

For jumping to the PC relative address, the address is calculated for the four types of pcdisp fields shown in FIG. 45. For the JMP and JSR instructions for jumping to the absolute address, the two types of abs fields are cut-off and the sign is extended as shown in FIG. 45. At the moment instruction decoding terminates, one value is selected among the three generated values which can be jump destination addresses and transferred to the IF stage 400.

Each pcdisp field and abs field of the instruction are transferred from the instruction queue 201 to the branch destination address calculation unit via the 48-bit II bus 169. On the other hand, the PC value of the instruction which is being decoded is transferred from the PC calculation unit 241 to the branch destination address calculation unit via the PI bus 173. As the result of instruction decoding, the ascertained pre-jump destination address is read to the JA bus 171 and then transferred to the instruction fetch unit 150.

Figure 46:
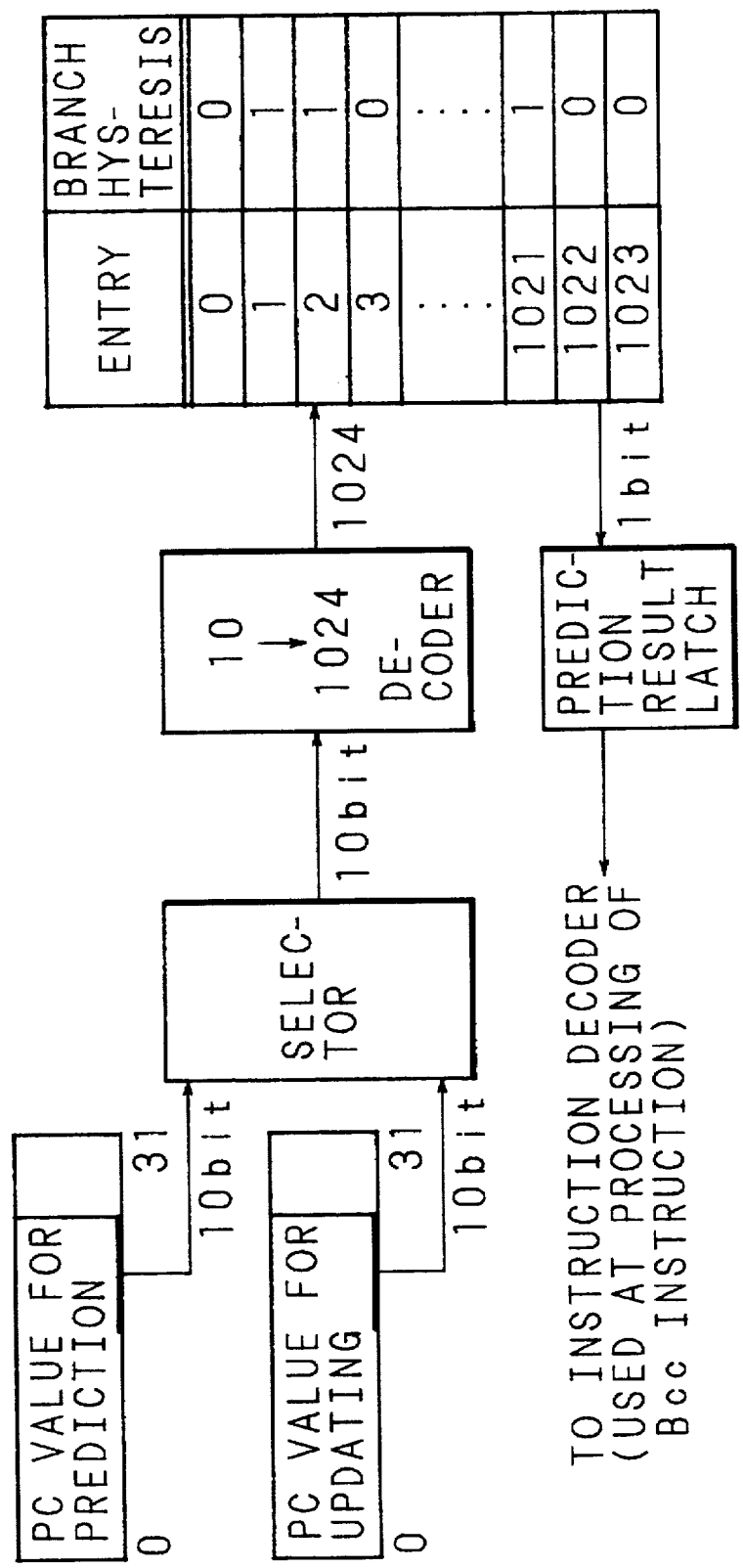
FIG. 46 is a block diagram showing a configuration example of for storing the execution hysteresis of the Bcc instruction of the data processor related to the present invention.

Branch prediction for the Bcc instruction is executed according to the one-time execution hysteresis. The execution hysteresis is stored in 1 bit×1K bit branch prediction table 450 shown in FIG. 46. One of the values of the prediction table 450 is selected and read according to the lower 11 bits (bit 0 is always "0") of the PC value of the instruction decoded immediately before the Bcc instruction. When the Bcc instruction is executed in the instruction execution stage 404 and the branch prediction is incorrect, the branch prediction table 450 is updated on the basis of the value of the lower 11 bits (bit 0 is always "0") of the PC value of the instruction executed immediately before the Bcc instruction.

The initial values of the branch prediction table 450 are all "Not branch". The branch prediction table 450 is controlled by the BMC register and BMP register. When an M bit of the BMC register is set to "1", the branch prediction table 450 operates in the rings 1 to 3 and the dynamic branch prediction is made for the Bcc instruction. When a BP bit of the BMP register is set to "1", the branch prediction table 450 is purged and the branch hysteresis is all "Not branch".

The branch prediction table 450 does not operate in a DBGACK mode or ring 0 of all the modes regardless of the value of the BMC register and all the Bcc instructions are predicted not to branch.

The branch is always predicted for the ACB and SCB instructions, and the pre-branch processing takes place. The branch prediction for these instructions cannot be controlled by software.

(4.4.4) "Pre-return processing"

For the two subroutine return instructions (RTS and EXITD) by which returned from the subroutine is executed, the data processor 100 related to the present invention makes a pre-return when decoding the instruction in the D stage 401.

The data processor 100 related to the present invention builds in is a 16-entry stack memory which holds the return address from the subroutine. When the subroutine jump instruction (BSR and JSR) is executed, the copy of the return address from the subroutine to be pushed into the stack in the external memory is also pushed into the PC stack 243.

Figure 47:
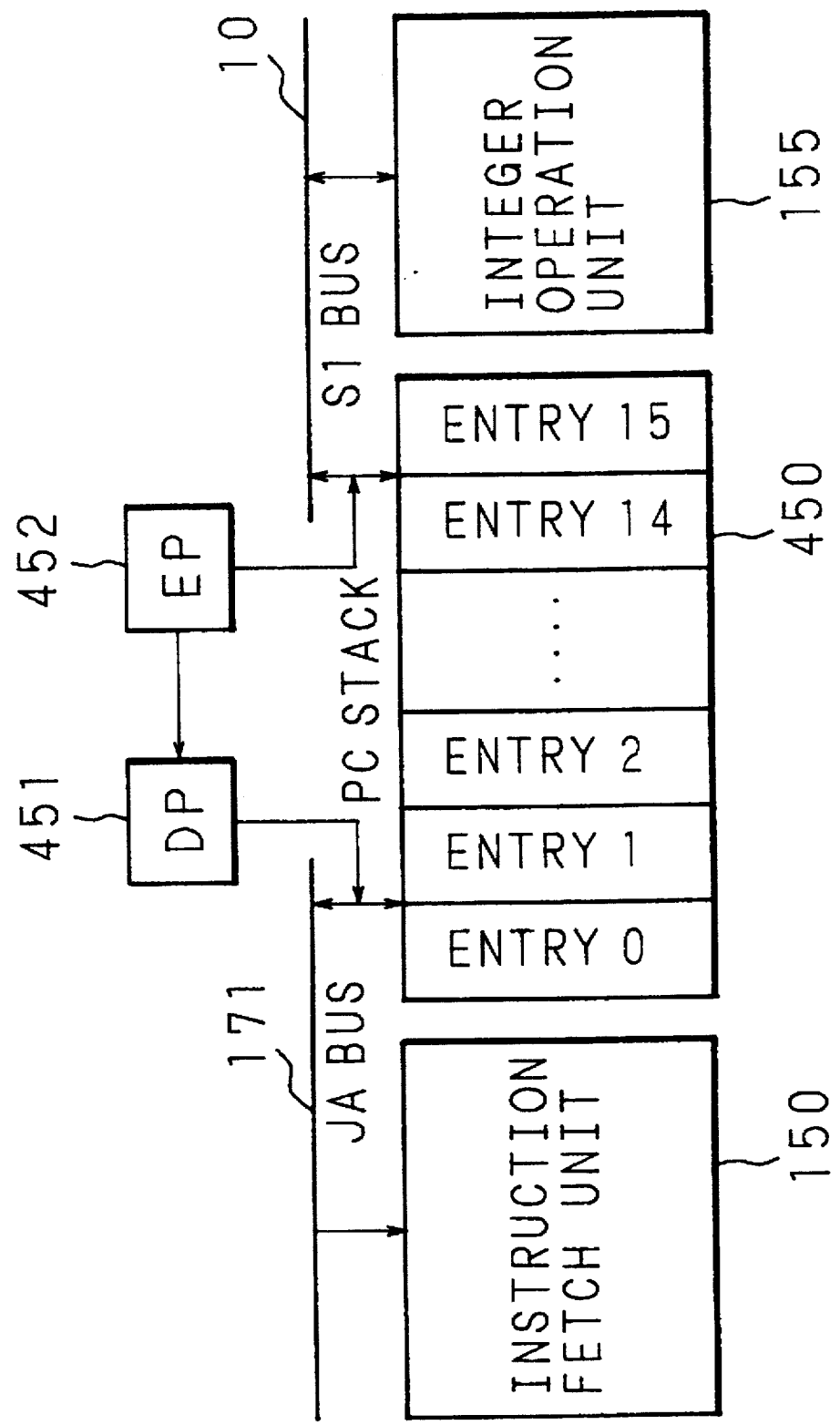
FIG. 47 is a block diagram showing a configuration example of a PC stack of the data processor related to the present invention.

The configuration of the PC stack 243 is shown in the block diagram in FIG. 47.

The PC stack 243 holds the copy of the PC values which are pushed into the external memory by the last executed 16 subroutine jump instructions. When a subroutine return instruction is decoded in the D stage 401, the return address is popped from the PC stack 243 and the pre-jump takes place to the popped address.

The PC stack 243 has only 16-entry data capacity, therefore when the nesting level of the subroutine exceeds 16, it wraps around and overwrites data it in the entry in which the old data is held. Since the PC stack 243 is accessed by the D stage 401 and E stage 404, it has stack pointers (DP 451 and EP 452) for the respective stages. The DP 451 is used when the subroutine return instruction pops the PC value from the PC stack 243 for the pre-return in the D stage 401. The EP 452 is used when the subroutine jump instruction pushes the PC value into the PC stack 243, and the subroutine return instruction pops the PC value from the PC stack 243 in the E stage 404 in order to verify the pre-return. When the subroutine return instructions come successively, there are the instants when the values of the pointers 451 and 452 are not the same. Consequently, when a jump takes place in the E stage 404, the contents of the EP 452 is overwritten into the DP 451 in order that the subsequent processings be not performed in the condition that the DP 451 is not equal to EP 452.

The pre-return destination address fetched from the PC stack 243 is correct in most cases. However, when a task switch occurs while the subroutine is being executed or the nesting level of the subroutine exceeds 16, it may not be true. In order to avoid this situation, the subroutine return instruction which has made pre-return fetches the true return destination address from the external memory and pops the address used in pre-return from the PC stack 243 and then compares them in the E stage 404. When the two address are not equal, a jump takes place to the true return destination address which is fetched from the external memory.

Figure 48:
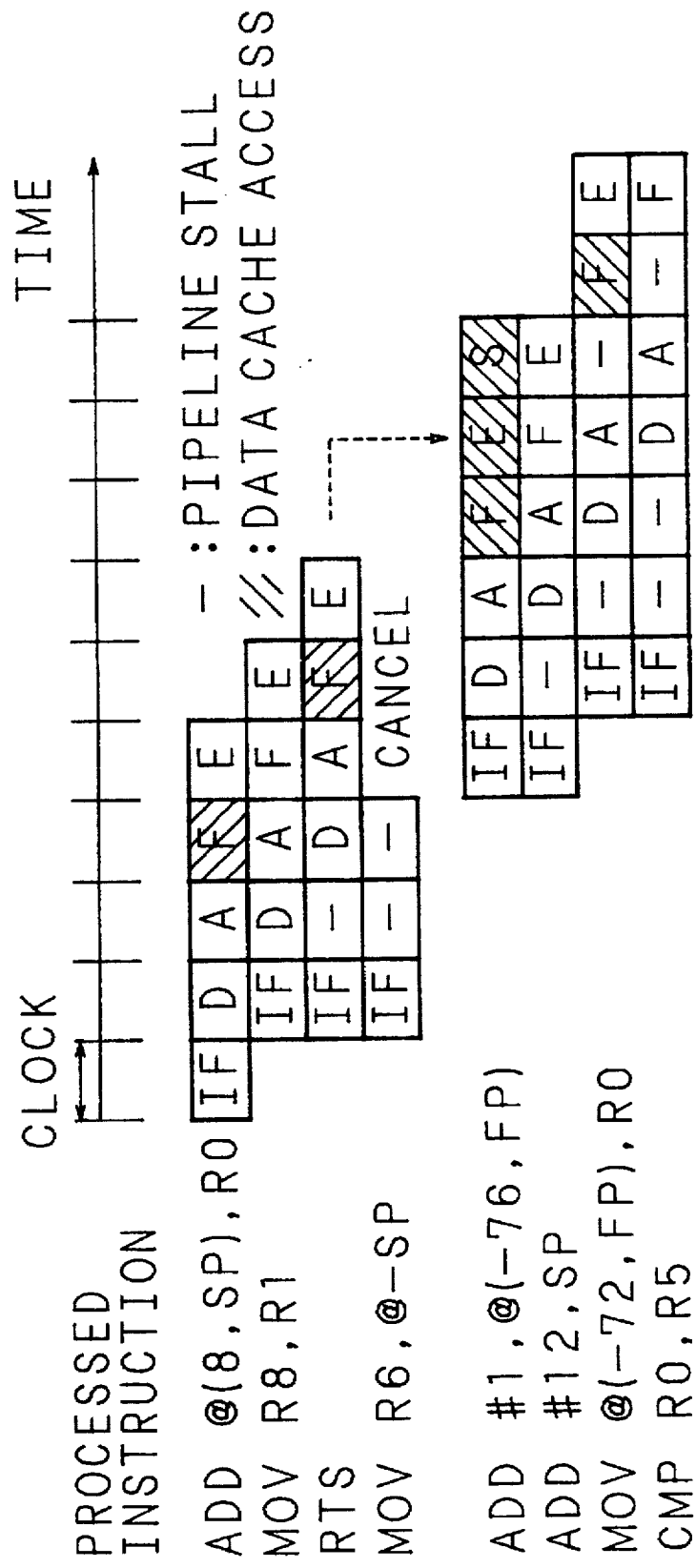
FIG. 48 is a timing chart showing a flow of instructions in the pipeline in the case where a pre-return is done by an RTS instruction in the data processor related to the present invention.
Figure 49:
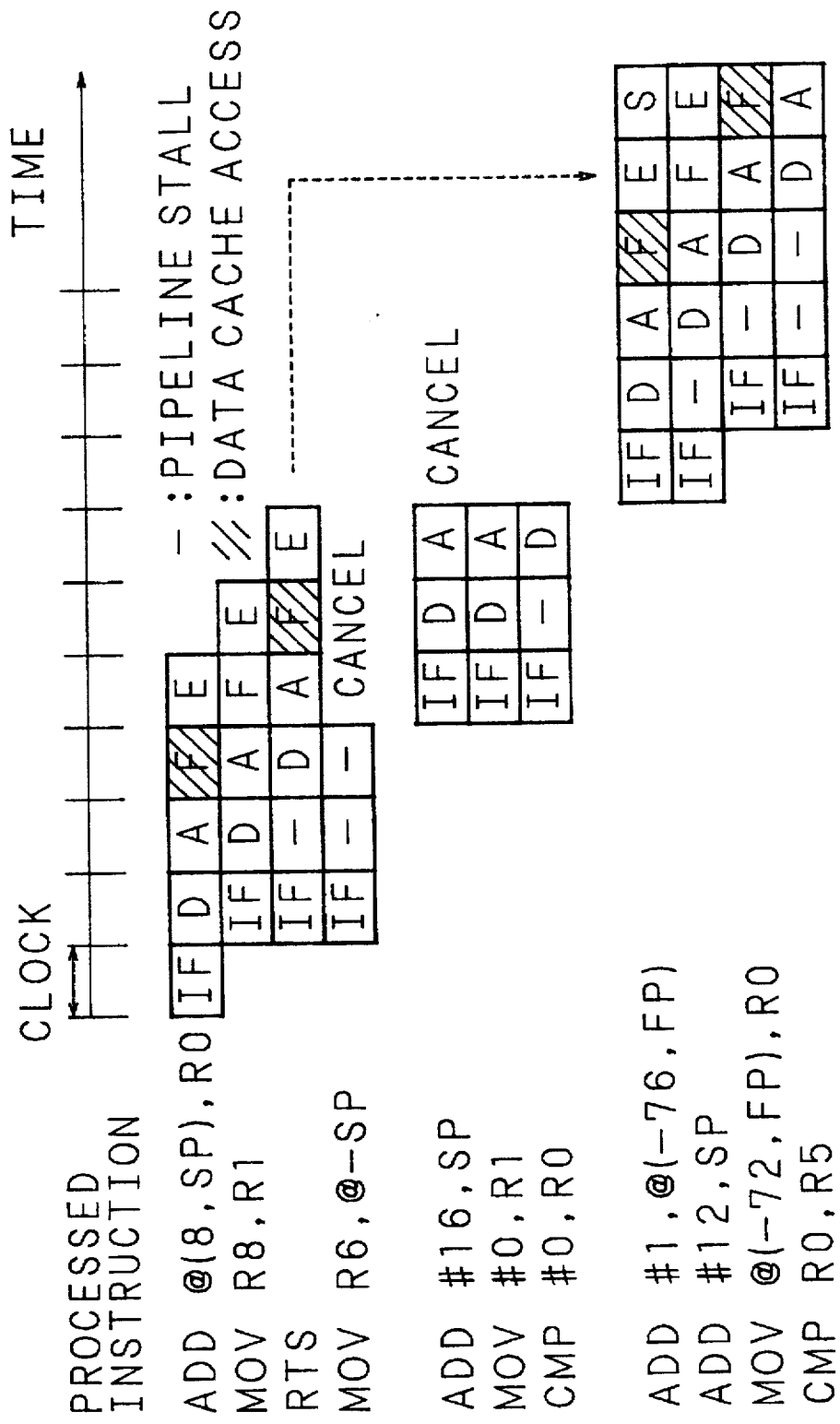
FIG. 49 is a timing chart showing a flow of instructions in the pipeline in the case where a pre-return is done by an RTS instruction in the data processor related to the present invention.

The flow of instructions in the case where a pre-return takes place for the RTS instruction is shown by the timing chart in FIG. 48 and FIG. 49.

When the pre-return address is correct as shown in the timing chart in FIG. 48, the dead time between execution of the RTS instruction and execution of the "ADD #1,@(−76, FP)" instruction which is the return destination instruction is one clock cycle. On the other hand, when the pre-return address is incorrect as shown in the timing chart in FIG. 49, the jump takes place in the E stage 404 for the RTS instruction, therefore four clock cycles of dead time is generated.

The PC stack 243 does not operate in the DBGACK mode. It surely operates in the other modes. It cannot be controlled by software and its contents cannot be changed.

(4.4.5) "Instruction prefetch queue"

Since the Bcc instruction and ACB and SCB instructions are the conditional branch instructions, the correct pre-branch does not always take place in the data processor 100 related to the present invention. When it is predicted that the conditional branch instruction a branches and a pre-branch takes place but the branch does not actually take place, a branch takes place to the next instruction in the E stage 404 and thus control returns to the normal sequence. When it is predicted that the conditional branch instruction does not branch but a branch actually takes place, the branch takes place to the branch instruction when executing the instruction.

Figure 50:
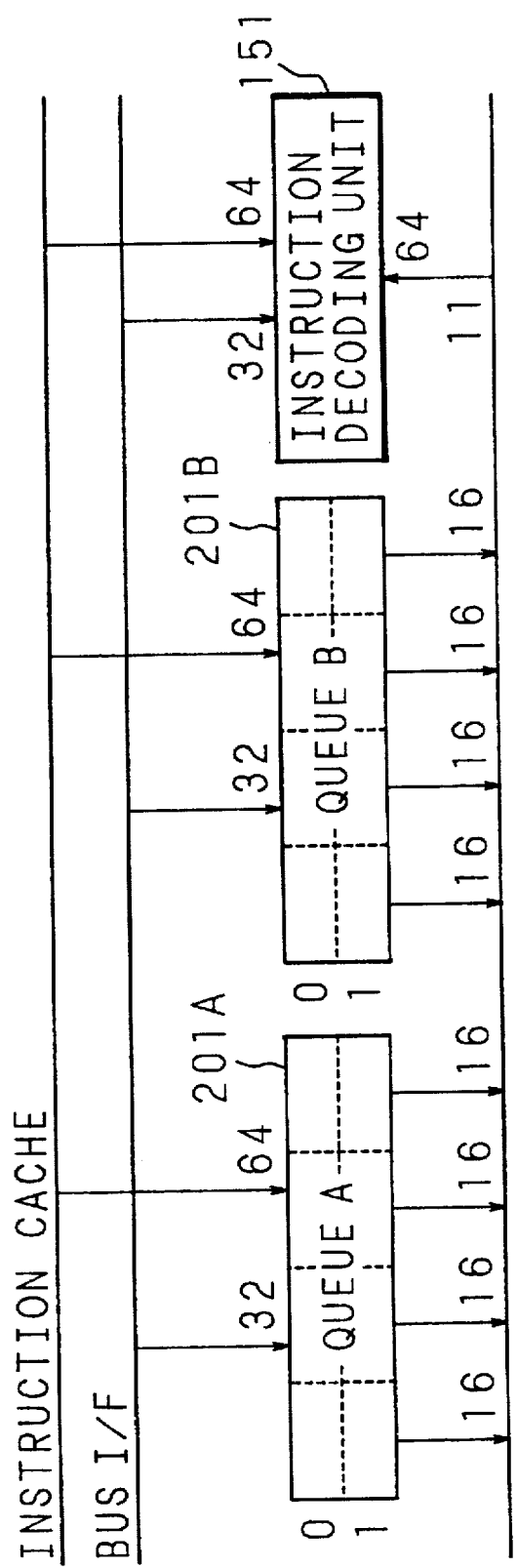
FIG. 50 is a block diagram showing a configuration example of an instruction prefetch queue of the data processor related to the present invention.

For speeding up the execution of the conditional branch instruction, the data processor 100 related to the present invention has the following two instruction prefetch queues the instruction queue A 201A whereto the instruction string on the nonbranch side is prefetched, and the instruction queue B 201B whereto the instruction string on the branch side is prefetched. Each of the instruction prefetch queue A 201A and instruction prefetch queue B 201B has a 16-byte capacity as shown in a block diagram of FIG. 50, fetches the instructions from the instruction cache 200 in 8-byte unit (an arbitrary eight bytes in the 16-byte boundaries can be fetched at one time), fetches the instructions from the external memory in 4-byte unit (only aligned four bytes), and outputs the instructions in 2 to 8-byte units according to the instruction code quantity decoded by the instruction decoding unit 151.

When the conditional branch instruction outputted from the instruction queue A 201A (or instruction queue B 201B) is decoded in the D stage 401 and a pre-branch takes place, the contents of the instruction queue A 201A (or instruction queue B 201B) is kept intact, and the instruction queue B 201B (or instruction queue A 201A) is cleared and the instruction of branch destination address is prefetched thereto. The instruction decoding unit 151 decodes the instruction code outputted from the instruction queue B 201B (or instruction queue A 201A). The 8-byte instruction code placed in the first 16-byte boundary of the branch destination instruction is transferred also to the instruction decoding unit 151 bypassing the instruction queue B 201B (or instruction queue A 201A).

When the branch prediction is incorrect at processing of the conditional branch instruction by which a pre-branch has taken place in the A stage 402, nonbranch destination address (an address of the next instruction) is calculated in the operand address generating unit 153 to initialize the PC generating unit 154. When the branching condition for the conditional branch instruction by which the pre-branch has been taken is evaluated in the instruction execution stage 404 and it is determined no branch will take place for the conditional branch instruction, the data processor 100 related to the present invention cancels the instruction queue B 201B (or instruction queue A 201A) and instructions which are being executed in the D, A and F stages, and returns the flow of instruction processing to the next instruction string. Then the instruction decoding unit 151 decodes the instruction code outputted from the instruction queue A 201A (or instruction queue B 201B). Therefore, even when the branch prediction was incorrect and a wrong pre-jump has taken place, the flow of instruction processing smoothly returns to the original instruction string in the instruction queue A 201A (or instruction queue B 201B).

Figure 51:
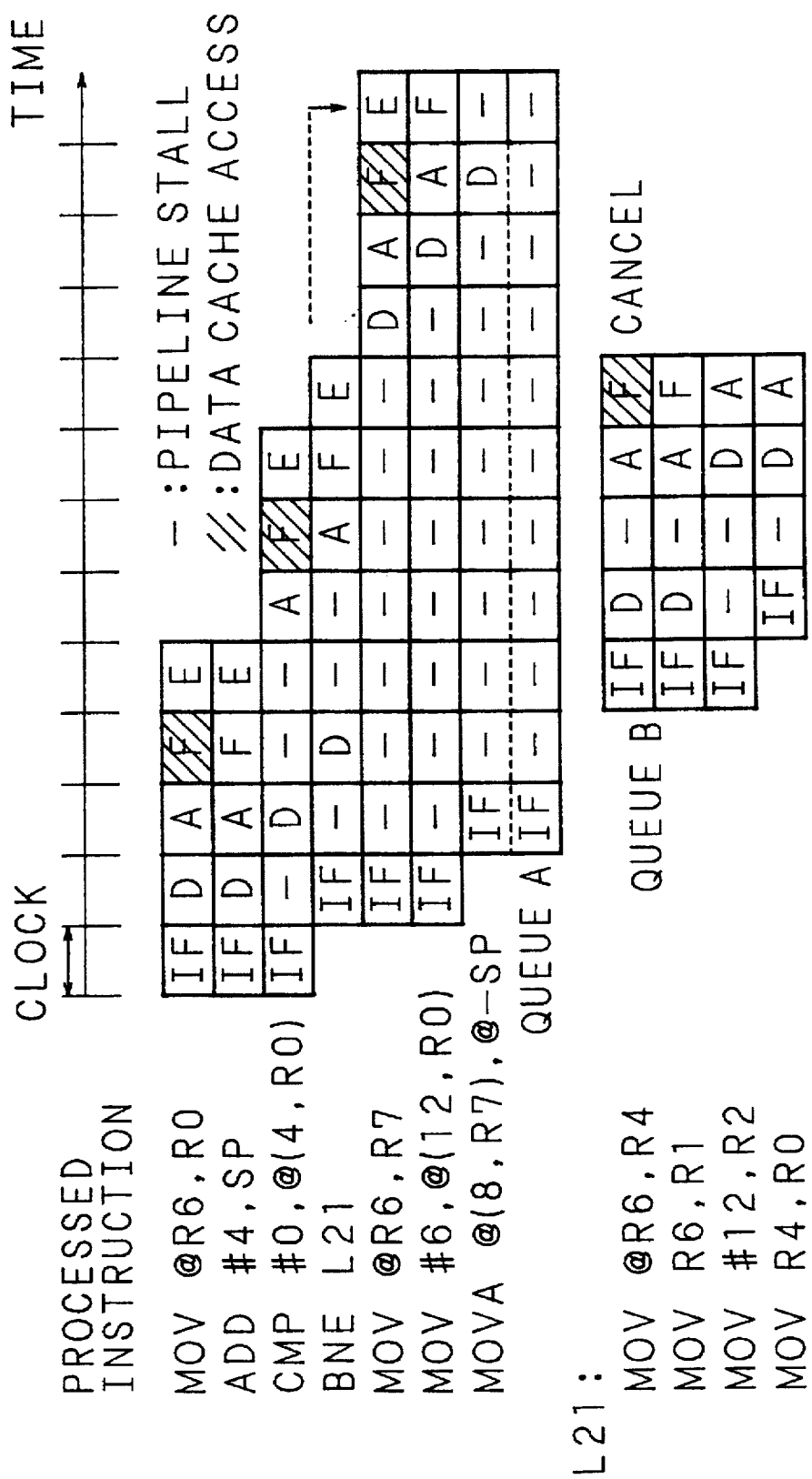
FIG. 51 is a timing chart showing a flow of instructions in the pipeline in the case where a pre-branch has occurred according to an incorrect branch prediction for a BNE instruction in the data processor related to the present invention.

The flow of the instructions in the pipeline in the case where a pre-branch is taken according to a wrong branch prediction for the BNE instruction is shown by the timing chart in FIG. 51.

The BNE instruction makes a pre-branch in the D stage 401. The instruction queue B 201B fetches the instruction string of the "MOV @R6,R4" starting from the label L21 which is the branch destination instruction and following strings while the instruction queue A 201A holds the instruction string which starts with the "MOV @R6,R7" following the BNE instruction, and then the pipeline operations subsequent to the D stage 401 start. When the BNE instruction is executed in the E stage 404 and the branch prediction is known to be incorrect, the execution of the branch destination instruction is canceled and the pipeline processing on the instruction strings of "MOV @R6,R7" and following on the nonbranch side in the D stage 401 starts. Since the instruction string on the nonbranch side is still held in the instruction queue A 201A even after the pre-branch has taken place by the BNE instruction, a new instruction does not need to be fetched when the BNE instruction performs the operation in the E stage 404 so that control may return to the instruction string on the nonbranch side.

When decoding the conditional branch instruction outputted from the instruction queue A 201A (or instruction queue B 201B) in the D stage 401 does not result in a pre-branch, the instruction decoding unit 151 continuously decodes the output of the instruction queue A 201A (or instruction queue B 201B). The instruction queue B 201B (or instruction queue A 201A) fetches the instructions according to the branch destination addresses calculated in the D stage 401 to cope with a case of a wrong branch prediction. When a conditional branch instruction without pre-branching is to be executed in the A stage 402 in the case where the branch prediction is incorrect, the PC generating unit 154 must be initialized, therefore the branch destination address is calculated in the operand address generating unit 153. When the condition code of the conditional branch instruction without pre-branching is evaluated in the instruction execution stage 404 and the conditional branch instruction is judged to be the one which makes a branch, the data processor 100 related to the present invention cancels the instruction queue A 201A (or instruction queue B 201B) and the instructions which are currently executed in the D, A and F stages and gives flow of instruction processing to the instruction string of the branch destination addresses. The instruction decoding unit 151 decodes the instruction code outputted from the instruction queue B 201B (or instruction queue A 201A). Consequently when the branch prediction is incorrect and the pre-jump does not take place, flow of instruction processing smoothly goes to the instruction string of the branch destination held in the instruction queue B 201B (or instruction queue A 201A).

Figure 52:
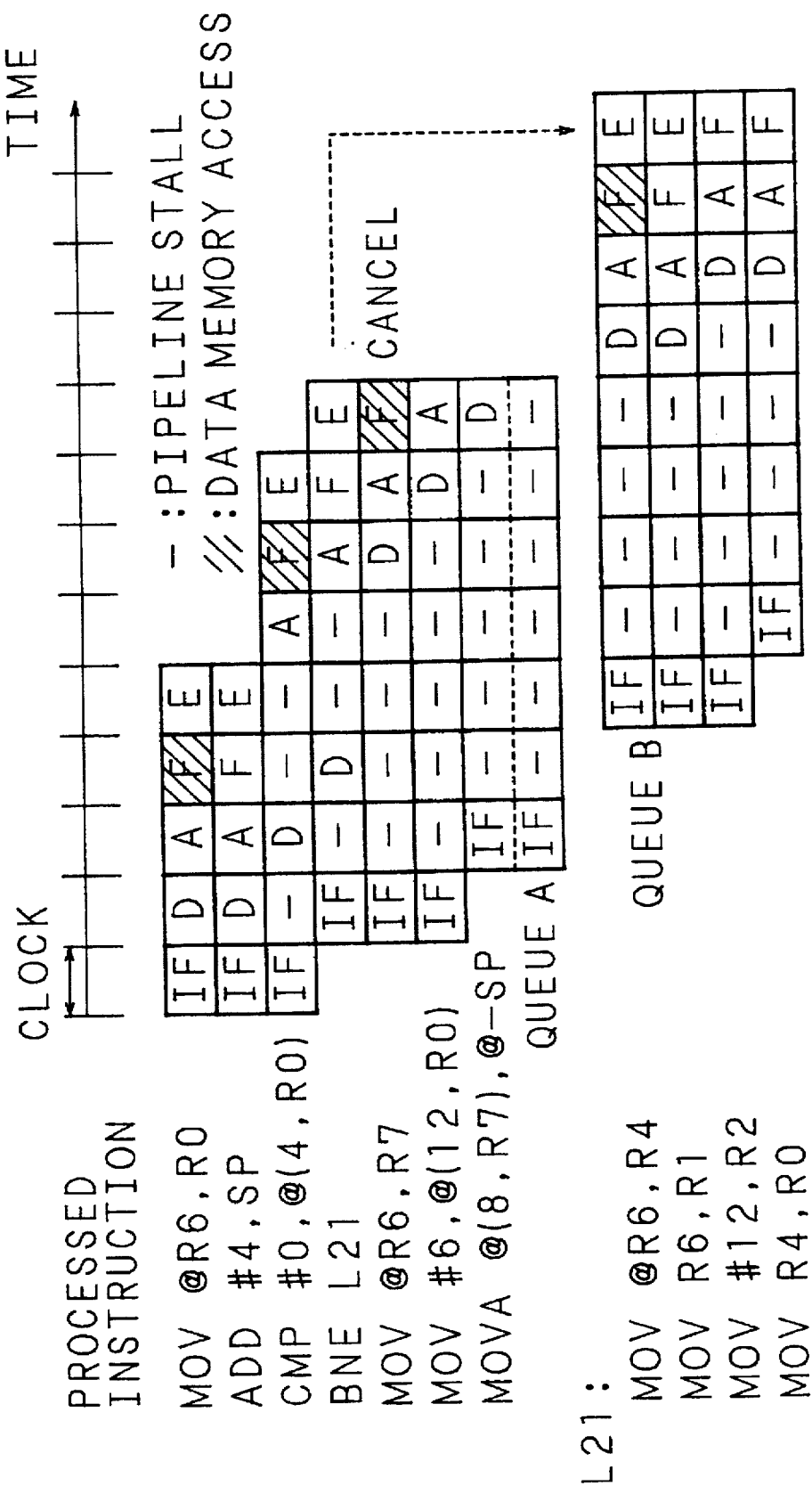
FIG. 52 is a timing chart showing a flow of instructions in the pipeline in the case where a pre-branch has occurred according to an incorrect branch prediction for a BNE instruction in the data processor related to the present invention.

The flow of the instructions in the case where a pre-branch does not take place according to an incorrect branch prediction for the BNE instruction is shown in a timing chart of FIG. 52.

Since the BNE instruction does not make a pre-branch in the D stage 401, the pipeline continues processing on the instruction string on the nonbranch side following the BNE instruction. The branch destination address of the BNE instruction is calculated in the D stage 401 providing for the BNE instruction makes a branch in the E stage 404. The instruction fetch unit 150 fetches the instruction string of the "MOV @R6,R4" starting from the label L21 and following strings into the instruction queue B 201B instead of the instruction queue A 201A holding the instructions on the nonbranch side. When the condition code of the BNE instruction is evaluated in the instruction execution stage 404 and the conditional branch instruction is determined to be the one which makes a branch, the processing of the nonbranch instruction is canceled and the pipeline processing on the instruction string of the "MOV @R6,R4" and following strings on the branch side in the D stage 401 and thereafter starts. The instruction string on the branch side is fetched into the instruction queue B 201B immediately after the BNE instruction is executed in the A stage 402, a new branch destination instruction does not need to be fetched when the BNE instruction makes a branch in the E stage 404.

When two conditional branch instructions are executed successively or with a least interval executed, an instruction fetch request from branch destination of the subsequent conditional branch instruction may be issued in some cases before the preceding conditional branch instruction reaches the instruction execution stage 404. In this case, the two instruction queues must hold their contents until the preceding conditional branch instruction is executed and branching or non-branching is determined, therefore they cannot fetch the branch destination instruction for the subsequent conditional branch instructions. In order to solve this problem, the data processor 100 related to the present invention has the exclusive branch destination address register 202 in its instruction fetch unit 150 which is used only to register the branch destination address of the subsequent conditional branch instruction. When the preceding conditional branch instruction is executed and the processing of the subsequent conditional branch instruction is effective, the instruction fetch unit 150 prefetches the instruction from the address held in the branch destination address register 202 to the instruction queue which becomes free.

Only one instruction queue is used for the subroutine return instruction and unconditional jump instruction. When a pre-jump takes place in the D stage 401 or in the A stage 402 for the unconditional jump instruction, the contents of the instruction queue being used are cleared and the instruction of the jump destination is prefetched to the instruction. In this case, the other instruction queue continues holding the instruction on the opposite side to the branch prediction for the preceding conditional jump instruction. When an instruction which executes an unconditional jump instruction is decoded, the instruction decoding unit 151 of the data processor 100 related to the present invention stops decoding of the subsequent instructions until a jump is executed.

When a pre-jump is wrong or when a jump takes place in the E stage 404 because the EIT is started, the two instruction queues are cleared.

(4.4.6) "Operations of each jump instruction"

The operations of each jump instruction provided in the data processor 100 related to the present invention are described as follows.

1) BRA instruction

The BRA instruction always makes a pre-jump in the D stage 401. The branch destination address of the BRA instruction is calculated in parallel with decoding of the BRA instruction in the PC generating unit 154 and the pre-jump takes place immediately after decoding of the BRA instruction. Consequently, the processing time of the BRA instruction is two clock cycles for the instruction fetching and decoding. For the BRA instruction, the currently-used instruction queue is cleared and a new instruction is fetched from the branch destination address thereto. The BRA instruction is not processed in the A stage 402 and following stages and disappears in the pipeline after it is processed in the D stage 401. However it does not disappear therein in order to transfer the PC value while self debugging or DBG debugging is done and processed in the A stage 402 and thereafter.

2) JMP instruction

The JMP instruction makes a pre-jump in the D stage 401 or A stage 402 according to the jump destination addressing mode.

The JMP instruction of the absolute addressing mode or PC relative mode with a 32-bit displacement makes a pre-jump in the D stage 401. Since the jump destination address is calculated in parallel with the instruction decoding in the D stage 401 for the JMP instruction, the processing time of the JMP instruction making the pre-jump in the D stage 401 is two clock cycles as same as the BRA instruction. Since the JMP instruction of the PC relative mode with the 16-bit displacement makes the pre-jump in the A stage 402, its processing time is three clock cycles.

The JMP instruction of an addressing mode other than the absolute addressing mode and PC relative mode always makes the pre-jump in the A stage 402. Since the processing time in the A stage 402 varies depends on the addressing mode, the JMP instruction which makes the A stage pre-jump takes three clock cycles and the longer is the processing time when the more complicated is the addressing mode.

3) Bcc instruction

The Bcc instruction makes a pre-jump or does not make it in every case in the D stage 401 according to the branch prediction based on the past one-time execution hysteresis. The execution hysteresis is stored in the 1K-byte table and referred according to the value of the lower 11 bits (the least-significant bit is always "0") of the instruction decoded immediately before the Bcc instruction, and the branch prediction of Bcc instruction is executed.

The PC generating unit 154 calculates the branch destination address in the D stage 401 in parallel with decoding of the Bcc instruction regardless of the presence or absence of pre-jump and transfers the calculated branch destination address to the instruction fetch unit 150. When branching is predicted, the branch destination instruction is fetched into one of the instruction queues and decoding processing is started while the other instruction queue holds the instruction code of the nonbranch destination. Consequently, the processing time of the Bcc instruction which makes the pre-jump in the case where the branch prediction is correct is two clock cycles. When no branching is predicted, the instruction code of the branch destination is fetched into one instruction queue with the instruction code of the nonbranch destination is being outputted from the other instruction queue currently used. Consequently, the processing time of the Bcc instruction which makes no pre-jump in the case where the branch prediction is correct is one clock cycle.

The true branching condition of the Bcc instruction is evaluated in the E stage 404. When the branch prediction is correct, the processing terminates without disrupting the pipeline. When the branch prediction is incorrect, processing is switched to the nonbranch destination instruction held in the standby queue or to the branch destination instruction. Consequently, the processing time of the Bcc instruction in the case where the branch prediction is wrong is four clock cycles independent of the result of the branch prediction. When the branch prediction is incorrect, the branch hysteresis is updated on the basis of the value of the lower 11 bits (the least-significant bit is always "0") of the instruction executed in the E stage 404 immediately before the Bcc instruction.

When the Bcc instruction is executed in the A stage 402, the instruction address on the opposite side to the branch prediction is calculated to prepare for the case it is wrong and used to initialize the PC generating unit 154 by issuing the E stage jump when the branch prediction is incorrect.

4) ACB and SCB instructions

The ACB and SCB instructions are the conditional branch instructions which are always predicted branching and make the pre-jumps in the D stage 401 regardless of the M bit of the BMC register, the executed ring and branch hysteresis. The data processor 100 related to the present invention cannot disable the pre-jump made by the ACB and SCB instructions.

The ACB and SCB instructions have a plurality of instruction formats. The time required for the pre-jump processing varies depending on the instruction format and pcdisp length.

When the pcdisp is eight bits in the Q and R formats, the branch destination addresses are calculated in the D stage 401 in parallel with decoding the ACB and SCB instructions. The branch destination instruction is fetched to one of the instruction queues and decoding starts while the other queue holds the nonbranch destination instruction. Consequently, the instruction processing time is two clock cycles when a branch takes place. When the branching condition is evaluated in the E stage 404 and no branch is determined, processing to resume decoding of the nonbranch destination instruction held in the instruction queue is executed; therefore the instruction processing time is seven clock cycles.

When the pcdisp is eight bits in the G and E formats, the ACB and SCB instructions are decoded in three clock cycles in the D stage 401 and then the branch destination address is calculated. The branch destination instruction is fetched to one of the instruction queues and decoding processing starts while the other instruction queue holds the nonbranch destination instruction. Consequently, the instruction execution time in the case where a branch takes place is four clock cycles. When the branching condition is evaluated in the E stage 404 and no branching is determined, processing to resume decoding of the nonbranch destination instruction held in the instruction queue is executed; therefore the instruction processing t me is eight clock cycles.

When the pcdisp is other than eight bits, the instruction processing time does not depend on the format. In this case too, the ACB and SCB instructions are decoded in the D stage 401 and branch destination address is calculated. The branch destination instruction is fetched into one of the instruction queues and decoding processing starts while the other instruction queue holds the nonbranch destination instruction. The instruction processing time in the case where a branch takes place is three clock cycles. When the branching condition is evaluated in the E stage 404 and no branching is determined, processing to resume decoding of the nonbranch destination instruction held in the instruction queue is executed; therefore the instruction processing time is eight clock cycles.

5) BSR instruction

For the BSR instruction, depending on the addressing mode of the jump destination, the branch destination address is always calculated in parallel with decoding of the BSR instruction in the D stage 401. In the A stage 402, the address, which is the return destination address from the subroutine, of the instruction subsequent to the BSR instruction is calculated. The E stage 404 and S stage 405 push the return destination addresses to the PC stack 243 and the stack top of the memory, respectively. Consequently, the instruction processing time of the BSR instruction is two clock cycles.

6) JSR instruction

The JSR instruction, depending on the addressing mode of the jump destination, makes a pre-jump in the D stage 401 or A stage 402.

The JSR instruction of the absolute addressing mode or PC relative mode with a 32-bit displacement makes a pre-jump in the D stage 401. For the JSR instruction, the jump destination address is calculated in parallel with instruction decoding in the D stage 401, therefore the pre-jump takes place in the D stage 401. The processing time of the JSR instruction is two clock cycles as same as the BSR instruction. The JSR instruction of the PC relative mode with a 16-bit displacement makes the pre-jump in the A stage 402, therefore its processing time is three clock cycles. The return destination address from the subroutine is calculated in the A stage 402 by the address adder in the clock cycle next to the jump destination address calculation and pushed into the PC stack 243 and the stack top of the memory in the E and S stages, respectively.

A pre-jump always takes place in the A stage 402 for the JSR instruction of an addressing mode other than the absolute addressing mode and PC relative mode. Since the processing time in the A stage 402 varies depending on the addressing mode, the processing time of the JSR instruction which makes the A stage pre-jump is at least three clock cycles and the longer is the processing time when the more complicated is the addressing mode. The return destination address from the subroutine is calculated by the PC generating unit 154 in the D stage 401 and pushed into the PC stack 243 and the stack top of the memory in the E and S stages, respectively.

7) RTS instruction

The RTS instruction makes a pre-jump in the D stage 401 by fetching the return destination address from the PC stack 243. When the instruction decoding unit 151 decodes the RTS instruction, the return destination address is popped from the PC stack 243 of the PC generating unit 154 and the pre-return takes place to that address in the D stage 401. The stack pointer is pre-decremented in the A stage 402 and the true return destination PC value is popped from the stack of the memory in the F stage 403. The address used for the pre-return is popped again from the PC stack 243 in the E stage 404 and compared with the true return destination address popped from the memory in the F stage 403. When the pre-return address is equal to the true return destination address, it means that the pre-return took place correctly and so the jump operation does not take place in the E stage 404. When they are not equal, the pre-return is determined to be incorrect and so the jump takes place to the true return destination address in the E stage 404. Consequently, the processing time of the RTS instruction is two clock cycles when the pre-return is correct and six clock cycles when incorrect.

8) EXITD instruction

The EXITD instruction makes a pre-jump in the D stage 401 by fetching the return destination address from the PC stack 243 as same as the RTS instruction. When the instruction decoding unit 151 decodes the EXITD instruction, the return destination address is popped from the PC stack 243 of the PC generating unit 154 and the pre-return takes place to that address in the D stage 401. The EXITD instruction is decomposed into a plurality of step codes in the A stage 402 and processed. The true return destination PC value is popped from the stack of the memory by the F stage operation corresponding to the last step code. The address used for the pre-return is popped again from the PC stack 243 in the E stage 404 and compared with the true return destination address popped from the memory in the F stage 403. When they are equal, it means that the pre-return was made correctly and the jump does not take place in the E stage 404. When they are not equal, the pre-return is determined to be incorrect and the jump takes plate to the true return destination address in the E stage 404. The processing time of the EXITD instruction varies depending on the number of the registers to be returned. The time required only for the return operation is two clock cycles when the pre-return is correct, and six clock cycles when incorrect.

(4.5) "Pipeline interlock"

The instruction pipeline of the data processor 100 related to the present invention has the pipeline interlock mechanism by hardware in order to prevent the RAW (Read-After-Write) data hazard which occurs between data writing of the preceding instruction and data reading of the subsequent instruction.

The RAW data hazard is likely to occur when writing of the operation result of the preceding instruction and reading data of the subsequent instruction for operand address generating are executed between the neighboring instructions, and writing of the operation execution result of the preceding instruction into the memory and reading of memory data of the subsequent instruction are executed between the neighboring instructions. These two types of RAW data hazards are avoided in the data processor 100 related to the present invention by means of the scoreboard register 480 and operand prefetch queue 291 with the tag address. The system configuration to avoid the above two types of RAW data hazards and the dead time incurred by the pipeline interlock are described as follows.

(4.5.1) "Operand address generation"

Figure 53:
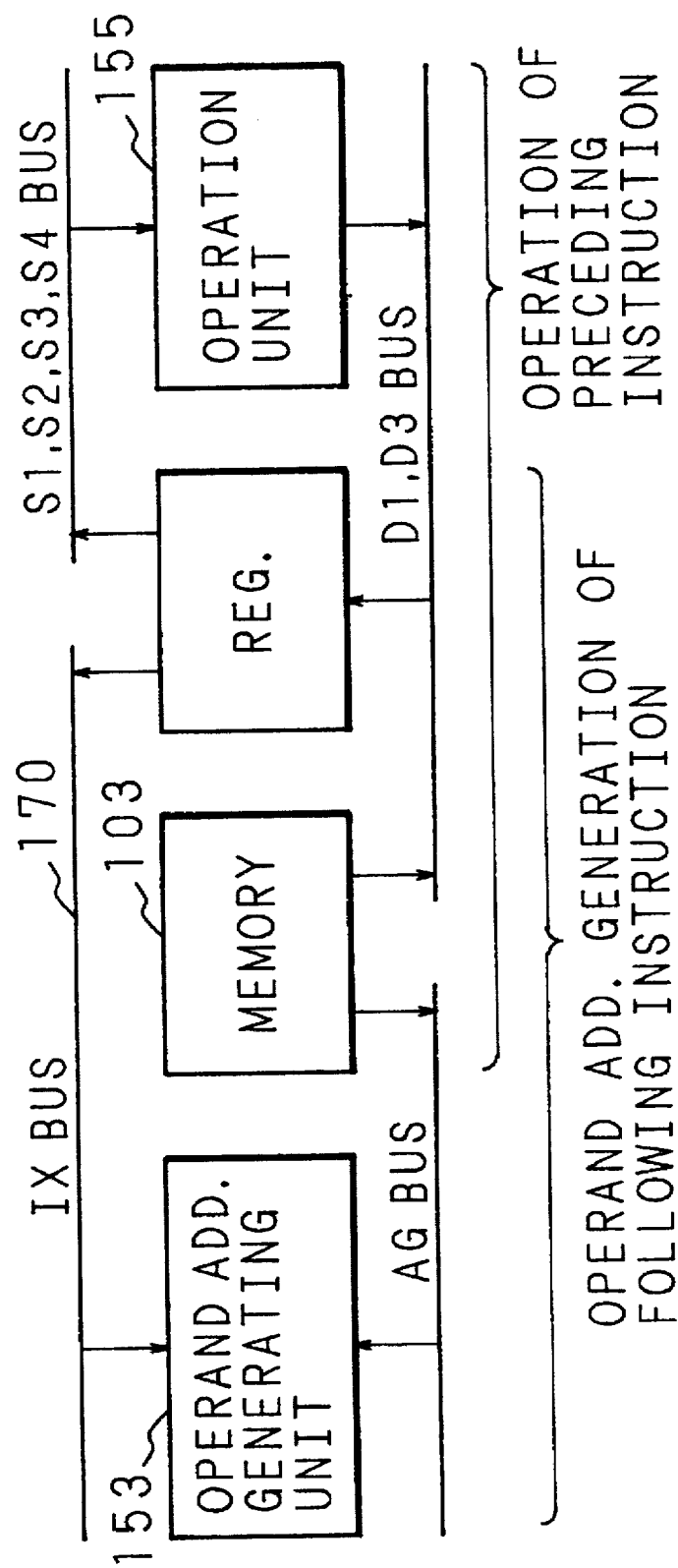
FIG. 53 is a block diagram showing a configuration example of an operand address generating mechanism of the data processor related to the present invention.

A configuration example of the operand address generation mechanism of the data processor 100 related to the present invention is shown by the block diagram in FIG. 53.

The A stage 402 which generates the operand address in the instruction pipeline precedes the E stage 404 which executes writing of the operation result into the register by two stages and the S stage 405 which executes writing of the operation result into the memory by three stages. Consequently, when the operation result of the preceding instruction is likely to be written in the register or memory, the subsequent instruction cannot be read from the same register or memory area.

Figure 54:
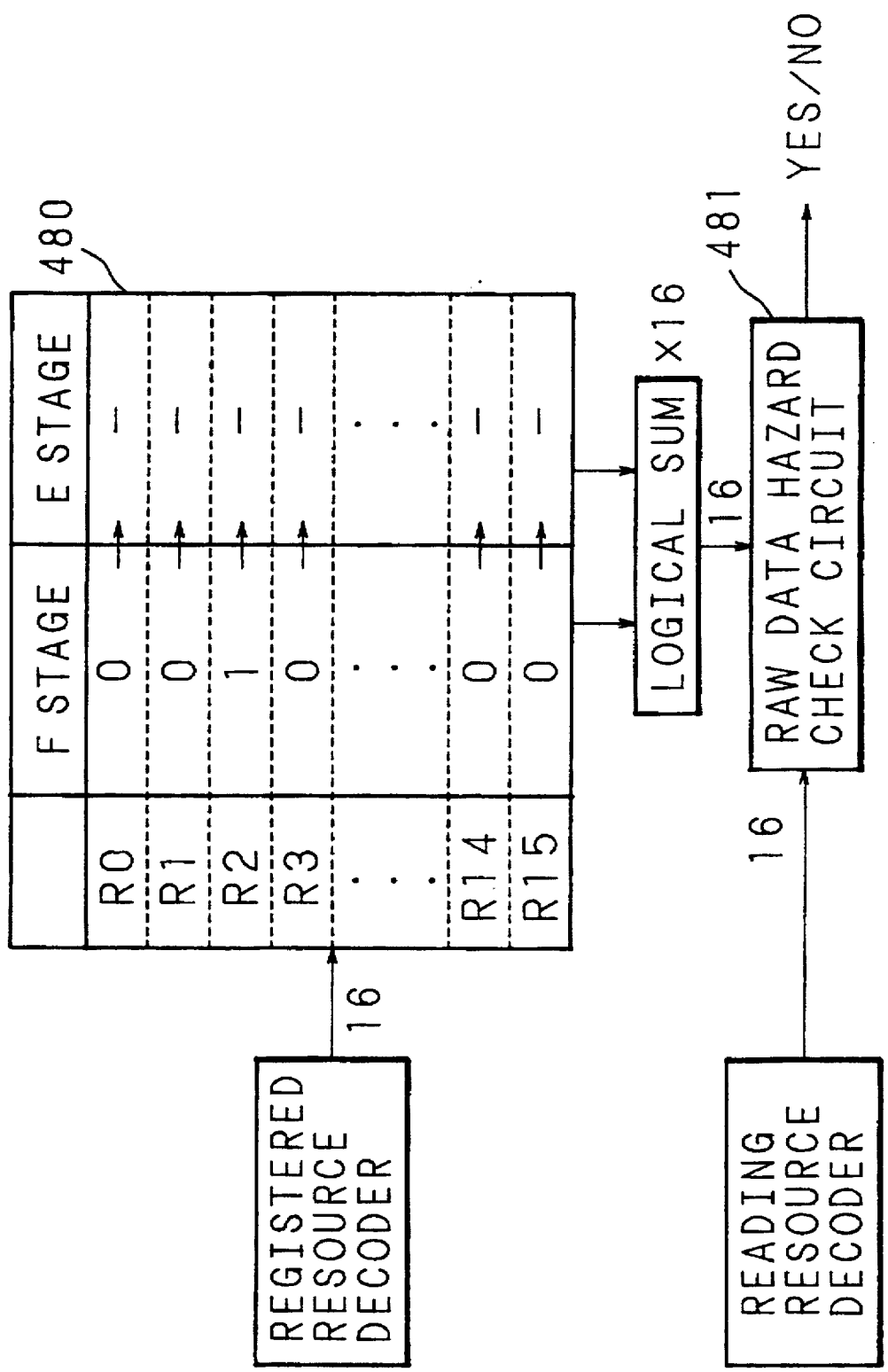
FIG. 54 is a block diagram showing a configuration example of a score board register of the data processor related to the present invention.

In the data processor 100 related to the present invention, the RAW data hazard which occurs during the operand address generation is detected by the hardware to interlock the pipeline. The operand write position of the preceding instruction is registered in the scoreboard register 480 which is schematically shown in FIG. 54 when the instruction is processed in the A stage 402. When A stage processing of the subsequent instruction is executed, the hardware checks the scoreboard register 480 on whether the RAW data hazard occurs or not in the data used for the operand address generation and the write operand of the preceding instruction. When the RAW data hazard is detected, the processing of the subsequent instruction is stalled in the A stage 402 until the operand of the preceding instruction has been written.

The scoreboard register 480 checks each of the 16 general-purpose registers 20G on whether data is written therein or not. When data is written, the write reservation bit "1" is registered in the corresponding position in the A stage 402. The write reservation bit shifts in the scoreboard register 480 synchronously with the instruction in the pipeline. Since writing of the operand into the general-purpose register 20G is performed in the E stage 404, the registered bit in the register shifts out from the scoreboard register 480 after the instruction is executed in the E stage 404. One unit of the scoreboard register 480 is provided for each of the E and F stages for the sake of simplification for explanation as schematically shown in FIG. 54. However, the scoreboard register 480 actually used works also for the R code 226 to be queued and the working latch between the pipelines, and so four units of them in total are used.

When the subsequent instruction reads data from the general purpose register 20G or memory in order to generate the operand address in the A stage 402, the RAW data hazard check circuit 481 checks whether a write reservation is made or not on the read resource. When it is detected, the processing of the preceding instruction proceeds and the subsequent instruction is stalled in the A stage 402 until the write reservation bit is shifted out from the scoreboard register 480.

Figure 55:
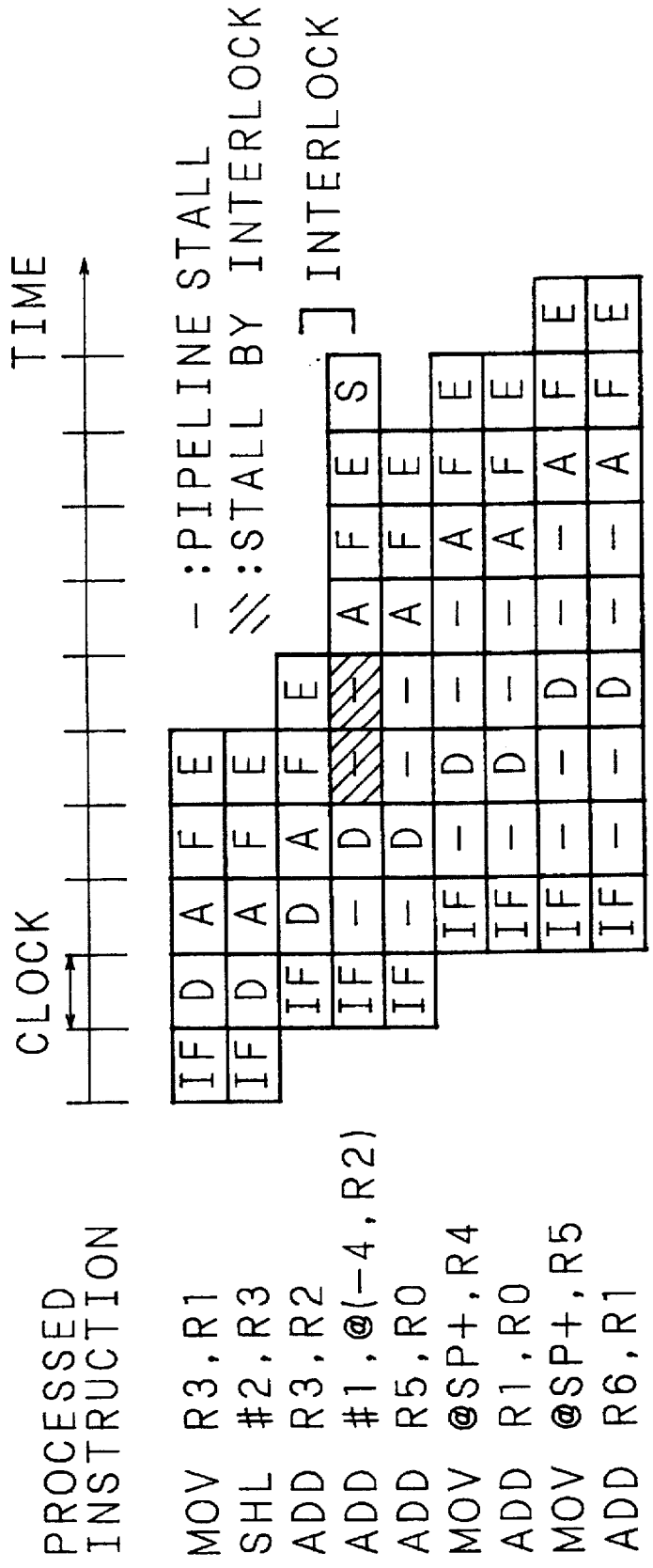
FIG. 55 is a timing chart showing a flow of instructions in the pipeline in the case where the instructions are stalled in an A stage by pipeline-interlocking due to a RAW data hazard in the data processor related to the present invention.

The flow of the pipeline processing in the case where the instructions are stalled in the A stage 402 due to the pipeline interlock caused by the RAW data hazard is shown by the timing chart in FIG. 55. The flow of pipeline processings in the case where the compiler has changed the sequence of the instructions in order to avoid from being stalled in the pipeline is shown by the timing chart in FIG. 56.

Figure 56:
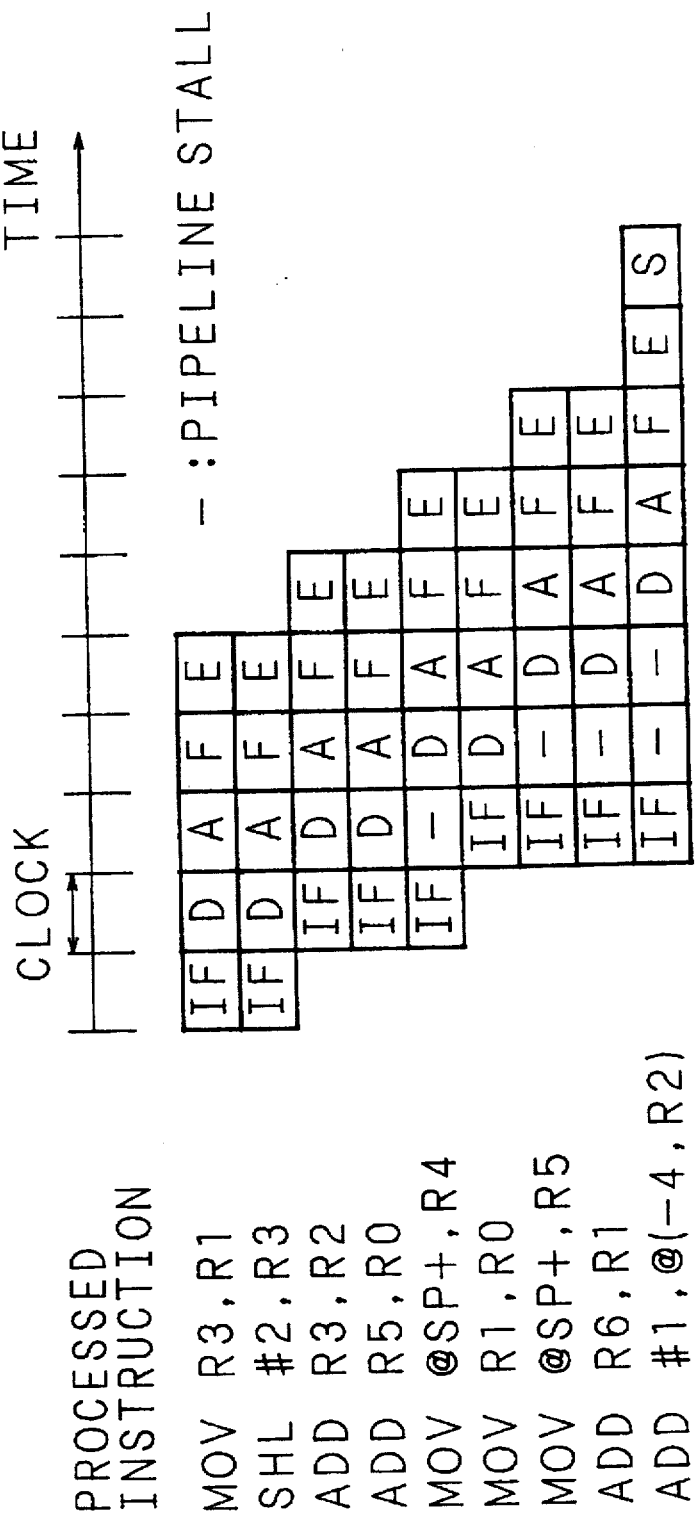
FIG. 56 is a timing chart showing a flow of pipeline processing in the case where a compiler has changed the sequence of instruction to avoid pipeline stall in the data processor related to the present invention.

FIG. 55 shows the status wherein the RAW data hazard is detected, the pipeline is interlocked, and the "ADD #1,@(-4,R2)" instruction is stalled in the A stage 402 for two clock cycles because the destination register storing the operation result of the "ADD R3,R2" instruction and the base register used for calculating the operand address of the following "ADD #1,@(-4,R2)" instruction are the same. On the other hand, FIG. 56 shows that the sequence of the instructions is changed, the five instructions which are executed independently of the above two instructions are inserted between these instructions which generate the RAW data hazard to prevent the stall caused by the pipeline interlock, and the time required for instruction processing is reduced by two clock cycles. The compiler must arrange the instructions so that the pipeline interlock accompanying the operand address generation shown in FIG. 55 may not occur.

Figure 57:
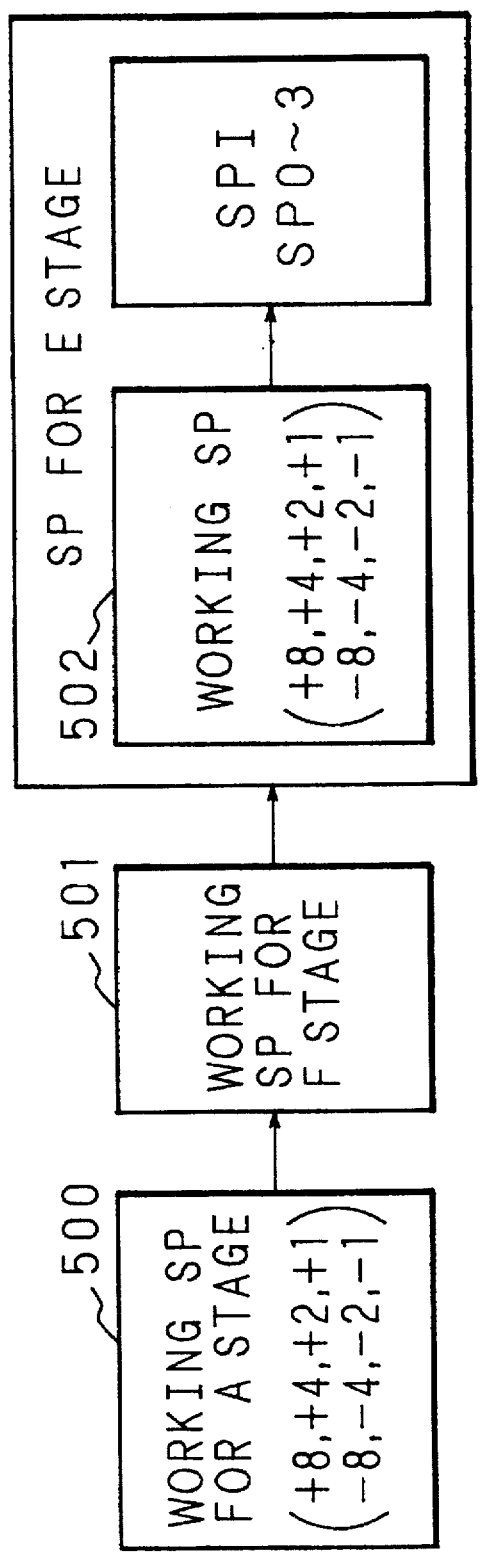
FIG. 57 is a schematic diagram showing a working stack pointer provided in each pipeline stage to eliminate a RAW data hazard accompanying a stack push and stack pop in the data processor 100 related to the present invention.

In addition to the above stated RAW data hazard problem, the instruction pipeline of the data processor 100 related to the present invention has the same problem with respect to the change of the stack pointer value by the stack pop or stack push and operand address generation. Moreover, it is highly probable that the stack push addressing or stack pop addressing be successively used for argument push or register save/return. Consequently, the data processor 100 related to the present invention has the working stack pointers for the pipeline stages from the A stage 402 to the E stage 404 as shown in FIG. 57 in order to avoid the RAW data hazard accompanying the stack push and stack pop. The working stack pointers for the A stage 402 and E stage 404 can increment and decrement by 1, 2, 4 and 8 and independently changes the working SP value by the stack push or stack pop.

The stack pointer value calculated in the A stage 402 is transferred in the sequence of the working SP 501 for F stage and the working SP 502 for E stage as shown in FIG. 57 in the flow of instructions through the pipeline and stored in the SP (SPI, SP0, SP1, SP2, or SP3) of the current SMRNG at the end of the instruction execution. Consequently, the subsequent instruction can immediately read the latest stack pointer value from the working SP 500 for A stage when generating the operand address in the A stage 402, therefore the pipeline stall does not occur.

The combinations of the operands of the preceding instructions and the addressing modes of the subsequent instructions, and the presence or absence of pipeline stall for each combination are shown in FIG. 58.

When calculating the jump destination address for the jump instruction by which it is specified in the general addressing mode like a jump to a register relative address, the RAW data hazard may occur as it does when calculating the operand address. Since the pipeline interlock mechanism operates when calculating the jump destination address for the jump instruction as it does when calculating the operand address in the data processor 100 related to the present invention, a wrong address is not calculated.

(4.5.2) "Read/write of memory operand"

Figure 59:
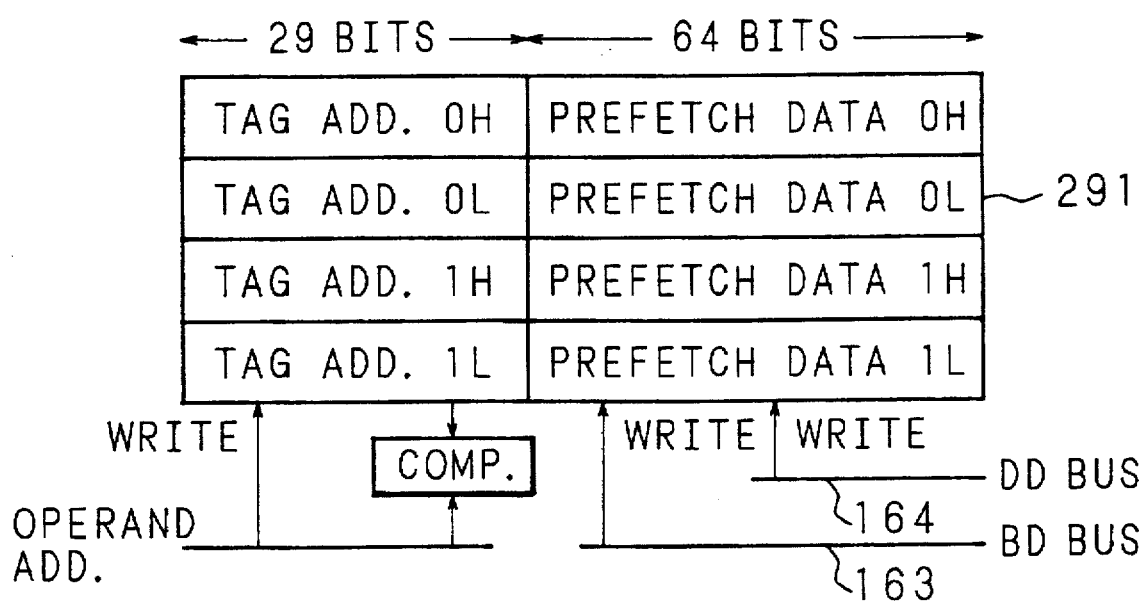
FIG. 59 is a block diagram showing a configuration example of an operand prefetch queue of two-entry storing the prefetched operand in the data processor related to the present invention.

The instruction pipeline of the data processor 100 related to the present invention has the F stage 403 which fetches memory operand preceding the E stage 404 which executes instructions to prefetch the memory operand of the subsequent instruction while executing the preceding instruction. The operand prefetched is stored in the 2-entry operand prefetch queue 291 which is schematically shown in FIG. 59. Since the memory operand prefetch is executed regardless of the type of the preceding instruction (when the preceding instruction is the conditional branch instruction Bcc or conditional trap instruction and the data cache is missed, the memory operand of the subsequent instruction is not prefetched), whether there is an overlapping portion or not between the prefetch data and store data must be checked in the case where the preceding instruction stores data in the memory.

Consequently, the data processor 100 related to the present invention holds the prefetch operands in 8-byte unit wherein they are aligned with the address tags and checks the data overlapping at the time when the preceding instruction is stored. The operands in the 8-byte boundaries fetched in the F stage 403 are held in the prefetch queue together with their addresses. When the preceding instruction writes the memory operand in the store buffer (SBDATA) 292, the address of the write data is checked and the overlapped-byte data is overwritten from the DD bus 164.

Figure 60:
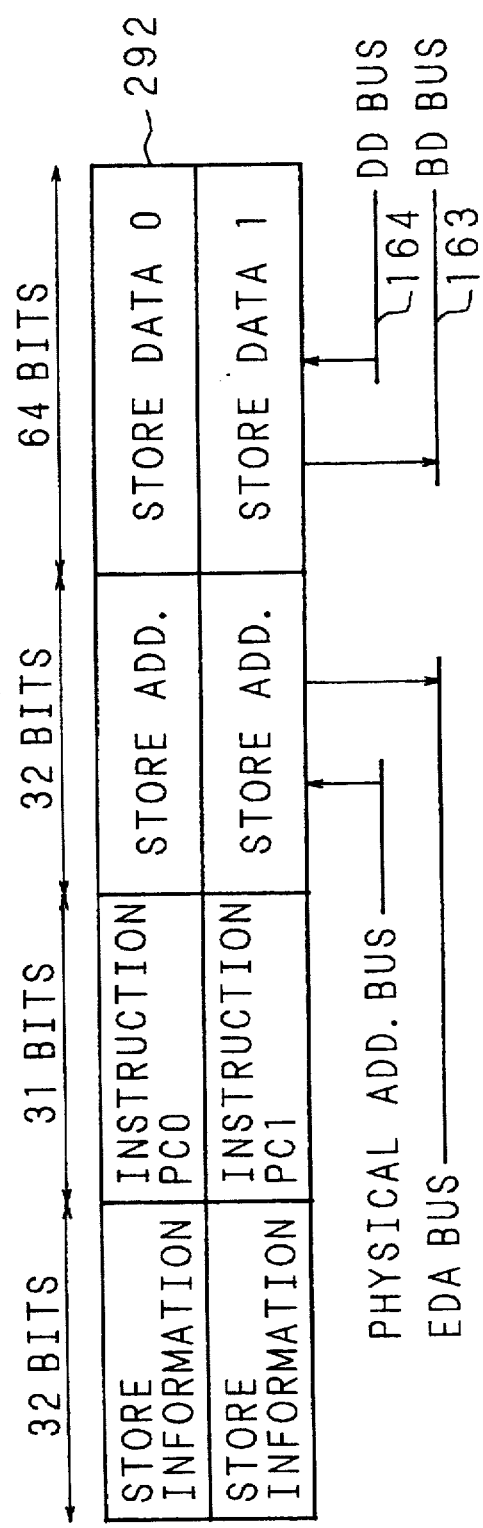
FIG. 60 is a block diagram showing a configuration example of a store buffer wherein store address, store data, PC value and store information are stored when cache is hit in the data processor related to the present invention.

When the operand is stored, the tag of the data cache is accessed in the E stage 404 to check whether the cache is hit or missed. When the cache is hit, the data unit of the data cache is accessed in the S stage 405 and the hit entry is overwritten and, at the same time, the store address, store data, PC value and store information are stored in the store buffer (SBDATA) 292 which is schematically shown in FIG. 60. Consequently, the data cache becomes in busy for two clock cycles (E and S stages) for one store operation. When there is an instruction which fetches the operand from the memory immediately after it, the instruction is stalled for two clock cycles.

When data is stored in the memory consecutively, the operations of the preceding instruction in the S stage (access to the data unit of the data cache) are performed simultaneously with those for the subsequent instruction in the E stage 404 (acces to the tag unit of the data cache), therefore the store operation is done every clock cycle as long as the store buffer (SBDATA) 292 has a vacant space. The store buffer (SBDATA) 292 holds the store operands in every 8-byte boundary and their physical addresses as well as the PC value of the instruction which performed the store operation and the store-related information. When storing data in the memory, the data processor 100 related to the present invention rewrites the data cache and, at the same time, registers the data in the 2-entry store buffer (SBDATA) 292. Consequently, the contents of data cache of the address which overlaps the data of the store buffer (SBDATA) 292 are already rewritten. Since data is written from the store buffer (SBDATA) 292 into the memory with a higher priority than other memory accesses, no RAW data hazard occurs between the data in the store buffer (SBDATA) 292 and the fetch data of the subsequent instruction.

Figure 61:
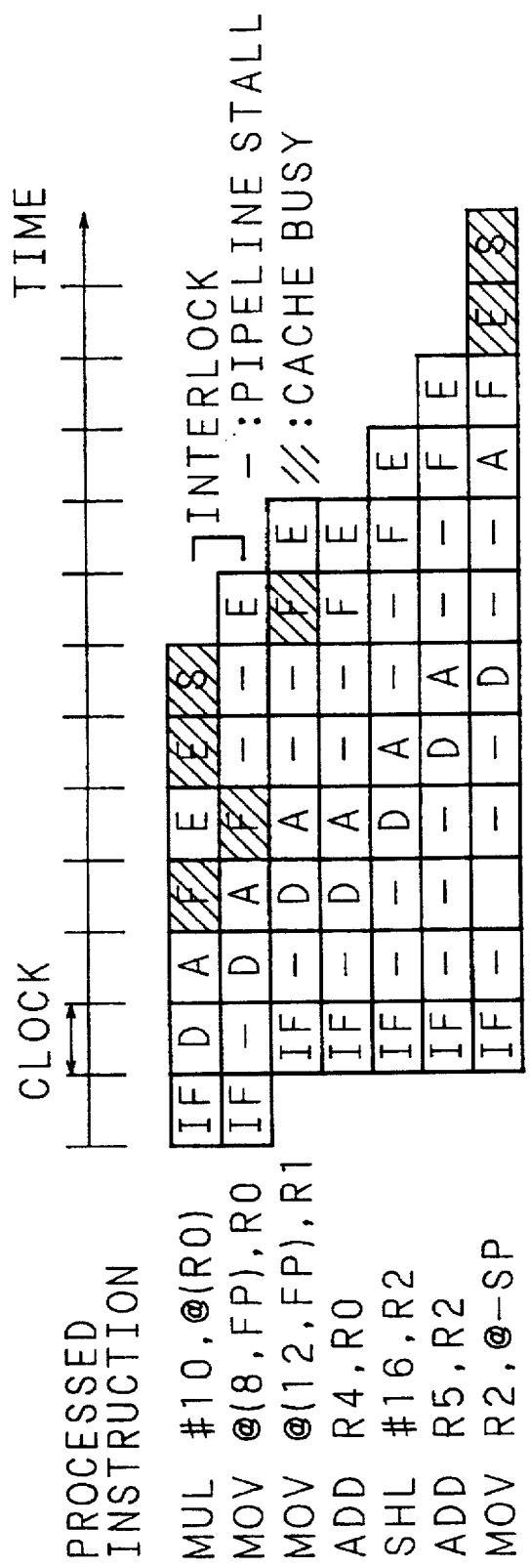
FIG. 61 is a timing chart showing a flow of pipeline processing when a subsequent instructions are stalled in the pipeline to avoid the RAW data hazards between memory operands in the data processor related to the present invention.

The flow of pipeline operations in the case where the subsequent instruction is stalled in the pipeline in order to avoid the RAW data hazard between the memory operands is shown by the timing chart in FIG. 61. The flow of pipeline processings in the case where the compiler changes the sequence of the instructions to avoid the stall is shown by the timing chart in FIG. 62.

Figure 62:
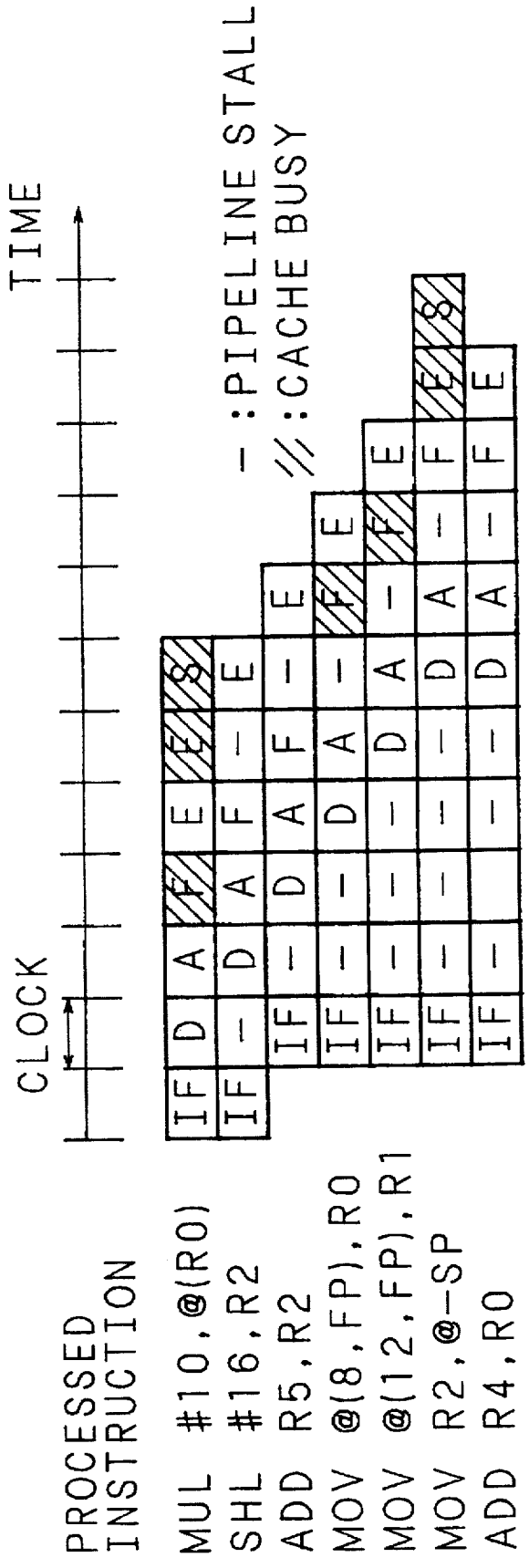
FIG. 62 is a timing chart showing a flow of pipeline processing when the compiler changes the sequence of instructions to avoid the abovementioned stall in the data processor related to the present invention.

When the preceding instruction "MUL #10,@(R0)" stores data in the memory and the subsequent instruction "MOV @(8,FP),R0" fetches data from the memory, the subsequent instruction "MOV @(8,FP),R0" cannot use the contents of the operand prefetch queue 291 but is stalled in the pipeline until the preceding instruction "MUL #10,@(R0)" terminates data storing in the store buffer (SBDATA) 292 in order to avoid the RAW data hazard between the two instructions as shown in FIG. 61. The next instruction "MOV @(12,FP), R1" cannot fetch the operand but is stalled for two clock cycles until the F stage 403 starts because the preceding instruction uses the data cache. On the other hand, by changing the sequence of the instructions, the instruction stall due to the pipeline interlock caused by the RAW data hazard between the memory operands is avoided and the processing time is reduced by one clock cycle as shown in FIG. 62.

When an instruction which store the operand in the memory and an instruction which fetch the operand memory come successively, the stall time of the subsequent instruction depends on whether the store data of the preceding instruction crosses the 8-byte boundaries or not. The stall times caused by the RAW data hazards between the memory operands in the data processor 100 relating to the present invention are shown in the table in FIG. 63.

(4.5.3) "Preprocessing for jump instruction and subsequent instruction"

The instruction pipeline of the data processor 100 relating to the present invention has the IF stage 400 which executes the instruction prefetch and the F stage 403 which executes the memory operand fetch prior to the E stage 404 which is the executing stage of the instruction is executed, and prefetches the subsequent instruction while executing the preceding instruction and further may prefetch its memory operand in some cases. Since a pre-branch takes place by a branch prediction in the instruction decoding stage in the data processor 100 relating to the present invention, the subsequent instruction can be on both the branch side and nonbranch side. The instruction processing in these two cases are described here.

All prefetches are the read operation and the contents of the memory is not destroyed when the operation is performed from the areas other than the I/O area. However, the prefetch leads to the read operation to the memory address which should be kept intact from programmer's viewpoint; no response may be sent back to the address from the bus and the bus cycle may be occupied for a long time until the watchdog timer responds; this aggravates the performance of the entire system. This is true particularly when an instruction accesses an unreasonable address immediately after the jump instruction (Bcc, ACB, SCB, TRAP) is executed.

In order to cope with the above stated problem, the data processor 100 relating to the present invention adopts the following methods to avoid the read operation from an unreasonable address. However, since many of the instruction prefetches (nonbranch side address and PC relative jump destination address) are not avoided in these methods, care should be taken so that an instruction prefetch request may not be issued to an unreasonable address.

1) An instruction (nonjump side instruction) following an unconditional jump instruction is not executed. However, the nonjump side instruction is fetched. (See the schematic diagram of the instruction string in FIG. 64.)

2) For the instruction which executes conditional jump (Bcc, ACB, SCB, TRAP), the operands of all the subsequent instructions are not prefetched from the external memory until jump or nonjump is confirmed. (See the schematic diagram of the instruction string in FIG. 65.)

3) For the instruction which executes conditional jump (Bcc, ACB, SCB, TRAP), the jump destination address calculation is not executed except for the absolute address and PC relative address is not calculated for the subsequent jump instructions until jump or nonjump is confirmed. (See the schematic diagram of the instruction string in FIG. 66.)

The instructions which are originally scheduled not to be executed are not executed; this is all in method 1) above. In order to prevent performance aggravation due to the pipeline interlock caused by 1), the only way available is to decrease the number of the unconditional jump instructions.

When a load instruction from a non-cache area is to be executed immediately after an instruction which executes a conditional jump, method 2) above causes a problem. However, reading accessing by which the built-in data cache is hit and read accessing to the built-in data RAM is no problem because these operations are performed before the conditions for the conditional jump instruction are determined.

It seems case 3) above seldom happens. In this case, a dead time of two clock cycles is generated by the pipeline interlock, and the subsequent jump instruction is stalled in the A stage 402 until the preceding conditional jump instruction is processed in the E stage 404 in the data processor 100 related to the present invention.

(5) "External access operation"

(5.1) "Input/output signal lines"

Figure 67:
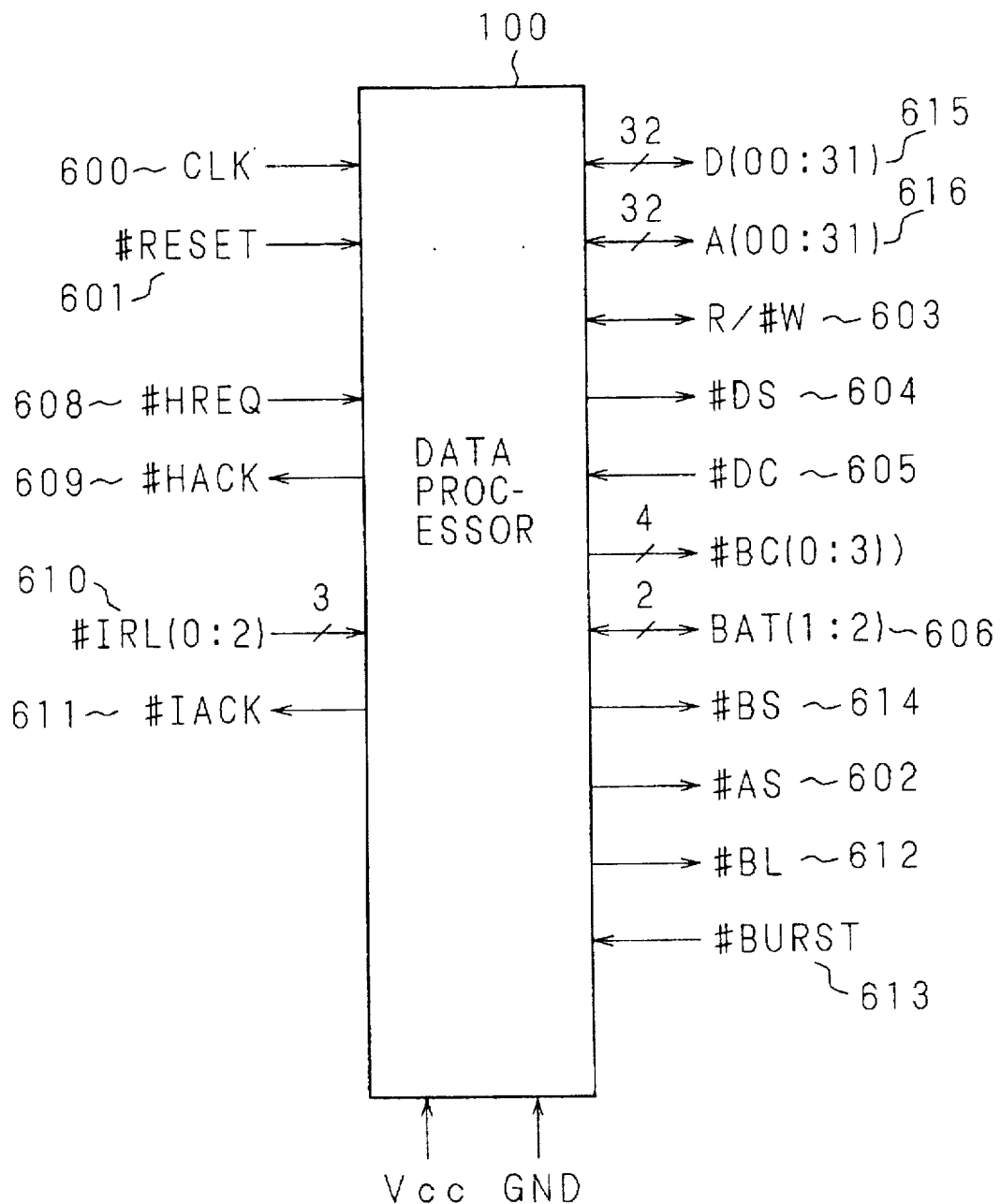
FIG. 67 is a schematic diagram showing input/output signals of the data processor related to the present invention.

The input/output signals of the data processor 100 related to the present invention are schematically shown in FIG. 67.

The data processor 100 related to the present invention has the power supply Vcc pin, ground GND pin, 32 data pins, 32 address pins, input clock CLK pin and various control signal pins.

In FIG. 67 and the following description, "#" indicates a negative logic signal.

A CLK 600 is an externally input clock whose frequency is same as that of the operation clock of the data processor 100 related to the present invention.

A #RESET is a signal which initializes the data processor 100 related to the present invention.

A address strobe #AS 602 indicates that the data address outputted to the address pin is valid.

A read/write signal R/#W 603 discriminates whether the bus cycle at the data pin is an input or output.

A data strobe signal #DS 604 indicates that the data processor 100 related to the present invention finishes preparation of data inputting, and data has been outputted from the data processor 100 related to the present invention.

A #DC 605 notifies the data processor 100 related to the present invention to terminate the data access cycle.

A 2-bit signal BAT1:2 606 indicates the type of the address outputted to the address pin.

A 3-bit byte control signal BC0:3 607 indicates whether each byte data of the data bus 102 of 4-byte width is valid or invalid.

A hold request signal #HREQ 608 requests the data processor 100 related to the present invention for the bus right.

A #HACK 609 indicates that the data processor 100 related to the present invention received the hold request signal #HREQ 608 and gave the bus right to the other device.

A 3-bit IRL0:2 610 is an external interrupt request signal.

A #IACK 611 indicates that the data processor 100 related to the present invention has received the external interrupt in response to the external interrupt request signal IRL0:2 610 and is performing the interrupt vector access cycle.

A block transfer request signal #BL 612 is a signal which requests the bus cycle in four-time burst transfer.

A #BURST 613 is a signal which indicates that the burst transfer has received.

(5.2) "External device access"

In an example of a system wherein the data processor 100 related to the present invention is used as shown in FIG. 1, the data processor 100 related to the present invention, main storage 103, peripheral circuit 105 and ASIC 104 are connected to each other via the data bus 102 connecting to the data pin, address bus 101 connected to the address pin, BAT1:2 606, #BC0:3 607, #AS 602, R/#W 603, #DS 604, #DC 605, #BL 612 and #BURST 613. The CLK 600 is supplied to the entire system and determines basic timing of the system.

The bus cycle starts by the #BS 614 signal in the data processor 100 related to the present invention. The basic bus operations of the data processor 100 related to the present invention are shown in the timing charts of FIG. 68 to FIG. 73. The timing charts of FIG. 68 and FIG. 69 show the examples of the signal transfer, and those in FIG. 70 to FIG. 73 show the examples of the block transfer in the burst mode.

When the bus cycle starts, that is, the signal #BS 614 is asserted synchronously with the rising edge of the clock CLK 600, and information relating to accessing is outputted to the following signals R/#W 603, BAT1:2 606, #BC0:3 607, A00:31 616, #BC0:3 607 and #BL 612. Then the signal #AS 602 is asserted synchronously with the rising edge of the CLK 600 and the signal #DS 604 is asserted synchronously with the rising edge of the next CLK 600. The low-level output of the signal #AS 602 indicates that the above signals are valid and the external circuits can receive these signals at the falling edge of the signal #AS 602. In a write cycle, data is outputted to the data signal D00:31 615 simultaneously with the assertion of the signal #DS 604.

The signal #BS 614 is negated at the rising edge of the CLK 600 following the first clock cycle in the bus cycle and the signal #AS 602 is negated at the falling edge of the next CLK 600. The signal #DC 605 is sampled at every clock cycle starting with the rising edge of the CLK 600 following the second clock cycle and the signal #DS 604 is negated synchronously with the rising edge of the CLK 600 at which low level has been inputted to the signal #DC 605. The access signals are valid until the signal #DS 604 is negated. The circles in each figure indicate the sampling timings.

Figure 68:
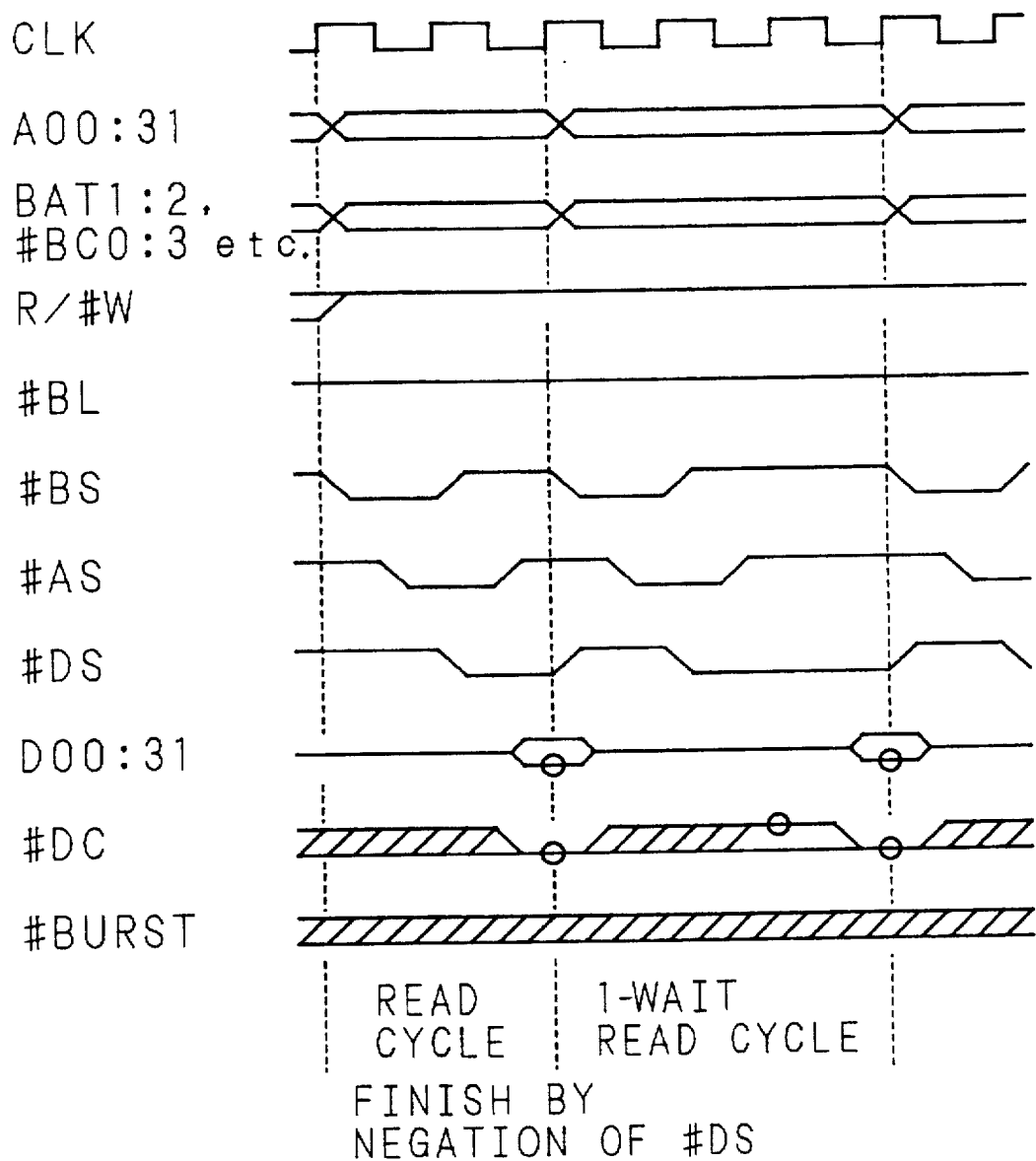
FIG. 68 is a timing chart showing timings of zero-wait and one-wait read operations by a single transfer in the basic bus operations of the data processor related to the present invention.
Figure 69:
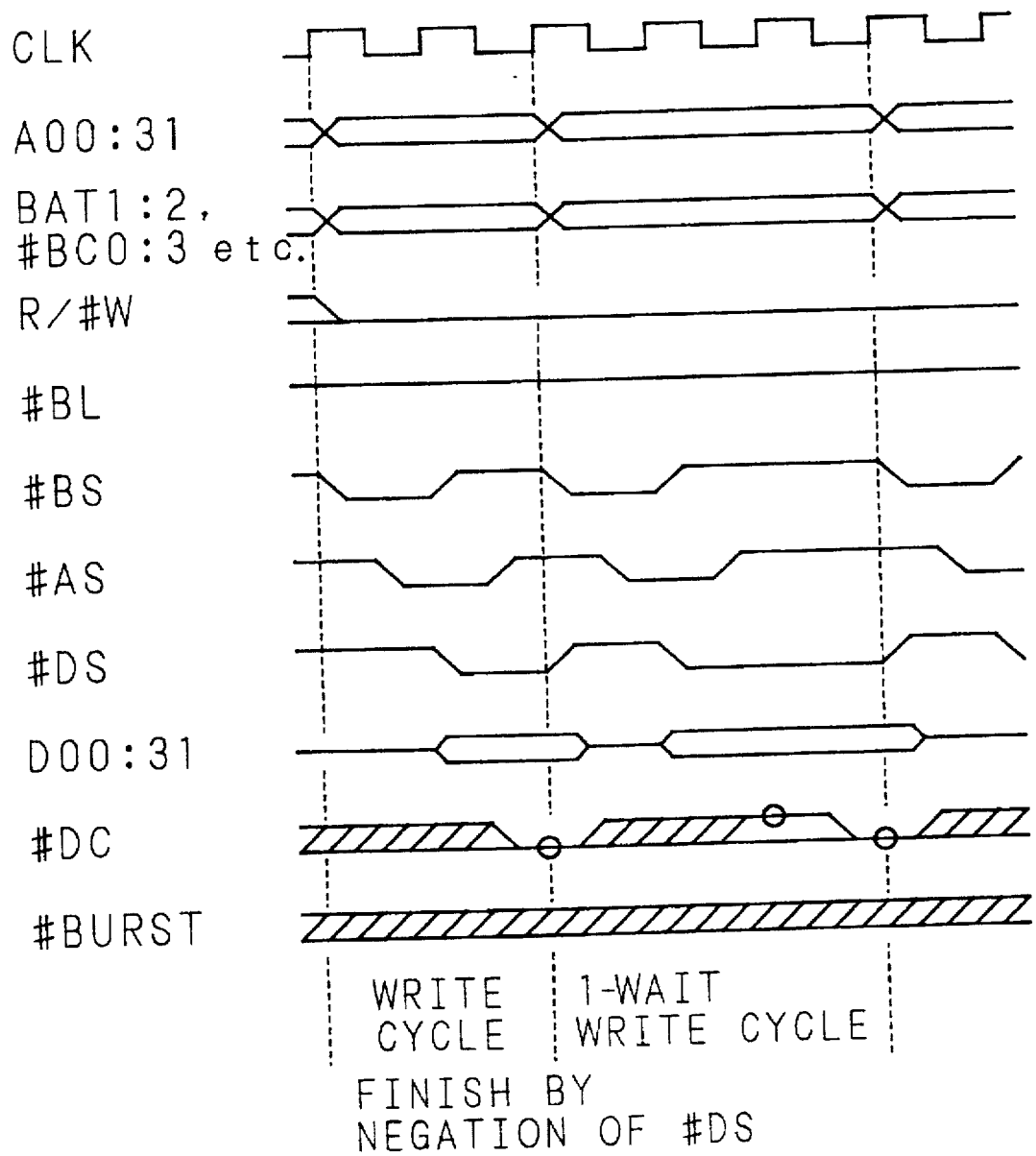
FIG. 69 is a timing chart showing timings of zero-wait and one-wait write operations by a single transfer in the basic bus operations of the data processor related to the present invention.

The timing charts of FIG. 68 show the timing of zero-wait and one-wait read operations by the single transfer.

The timing charts in FIG. 69 show the zero-wait and one-wait write operations by the single transfer. The signal #BL 612 is negated and the signal #BURST 613 is ignored in the single transfer.

The timing charts in the FIG. 70 to FIG. 73 show the bus cycles in the burst mode. The burst mode is used to input and output 4-word data in a short time, and 4-word data can be transferred in five clock cycles in the zero-wait burst mode. The burst mode is specified by asserting the signal #BURST 613 in the first transfer cycle of the bus cycle at which the signal #BL 612 is asserted, and the 4-word data in the same 16-byte boundaries is transferred for one address output.

The signal #DC 605 is sampled at every clock cycle starting with the rising edge of the CLK 600 two clock cycles after the timing at which the signal #BS 614 is asserted in the burst mode and the bus cycle terminates at the moment when the signal #DC 605 is asserted for the fourth time.

Figure 70:
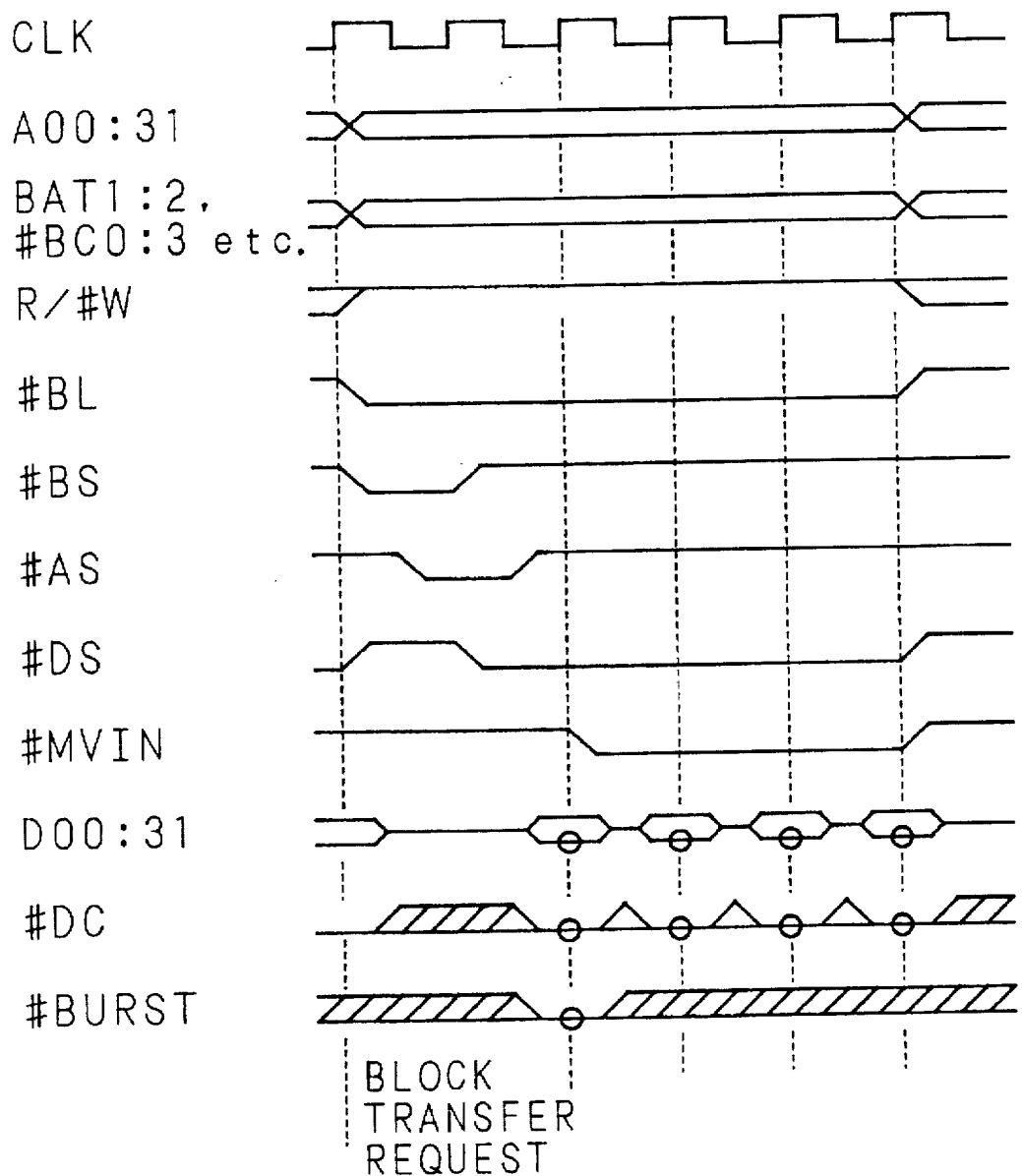
FIG. 70 is a timing chart showing timings of zero-wait read operation by a burst mode in the basic bus operations of the data processor related to the present invention.
Figure 71:
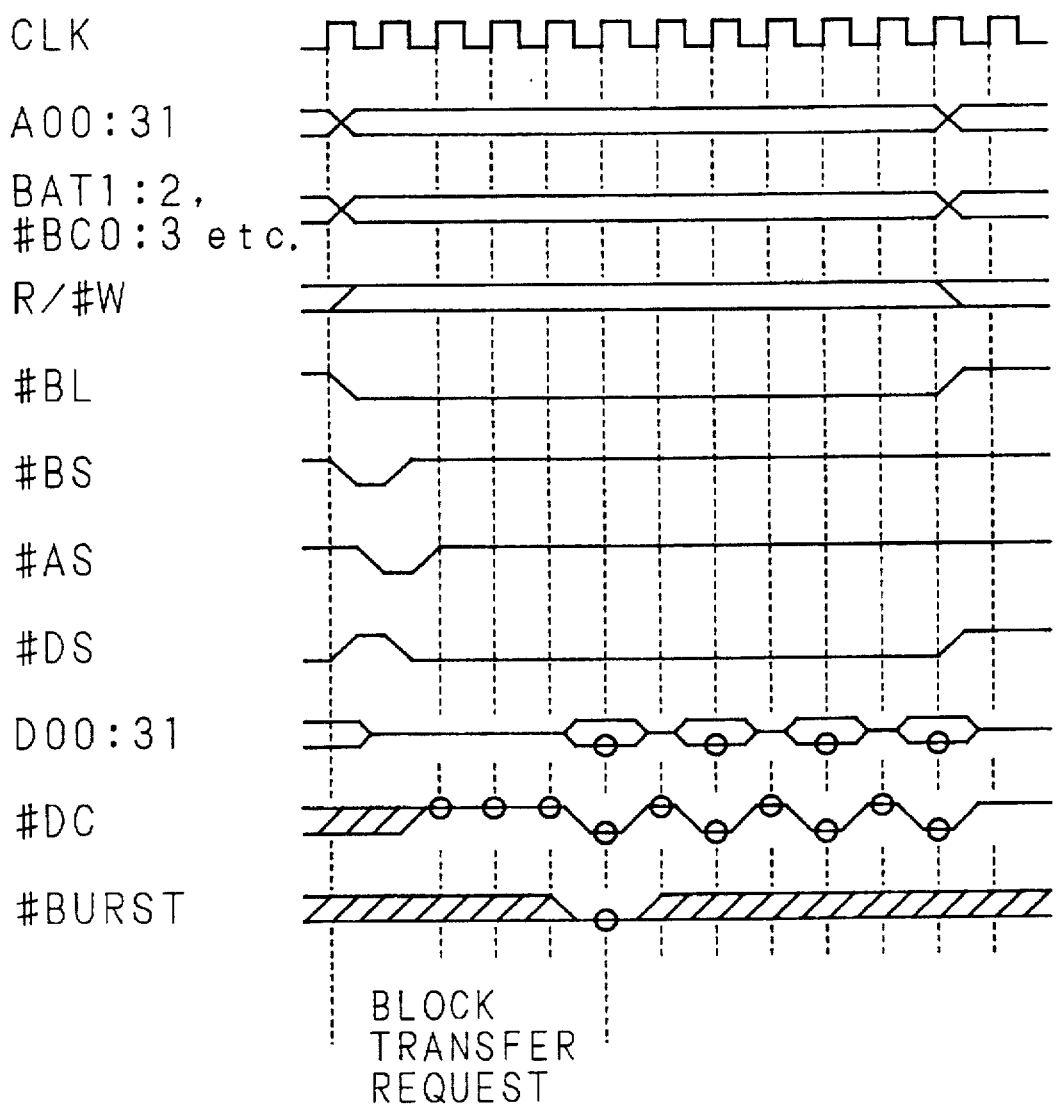
FIG. 71 is a timing chart showing timings of read operation wherein a first cycle is three-wait and second to fourth cycles are one-wait in the basic bus operations of the data processor related to the present invention.

FIG. 70 shows the timings of the zero-wait read operation in the burst mode. FIG. 71 shows the timings of the read operation wherein the first cycle is three-wait and the second to fourth cycles are one-wait.

Figure 72:
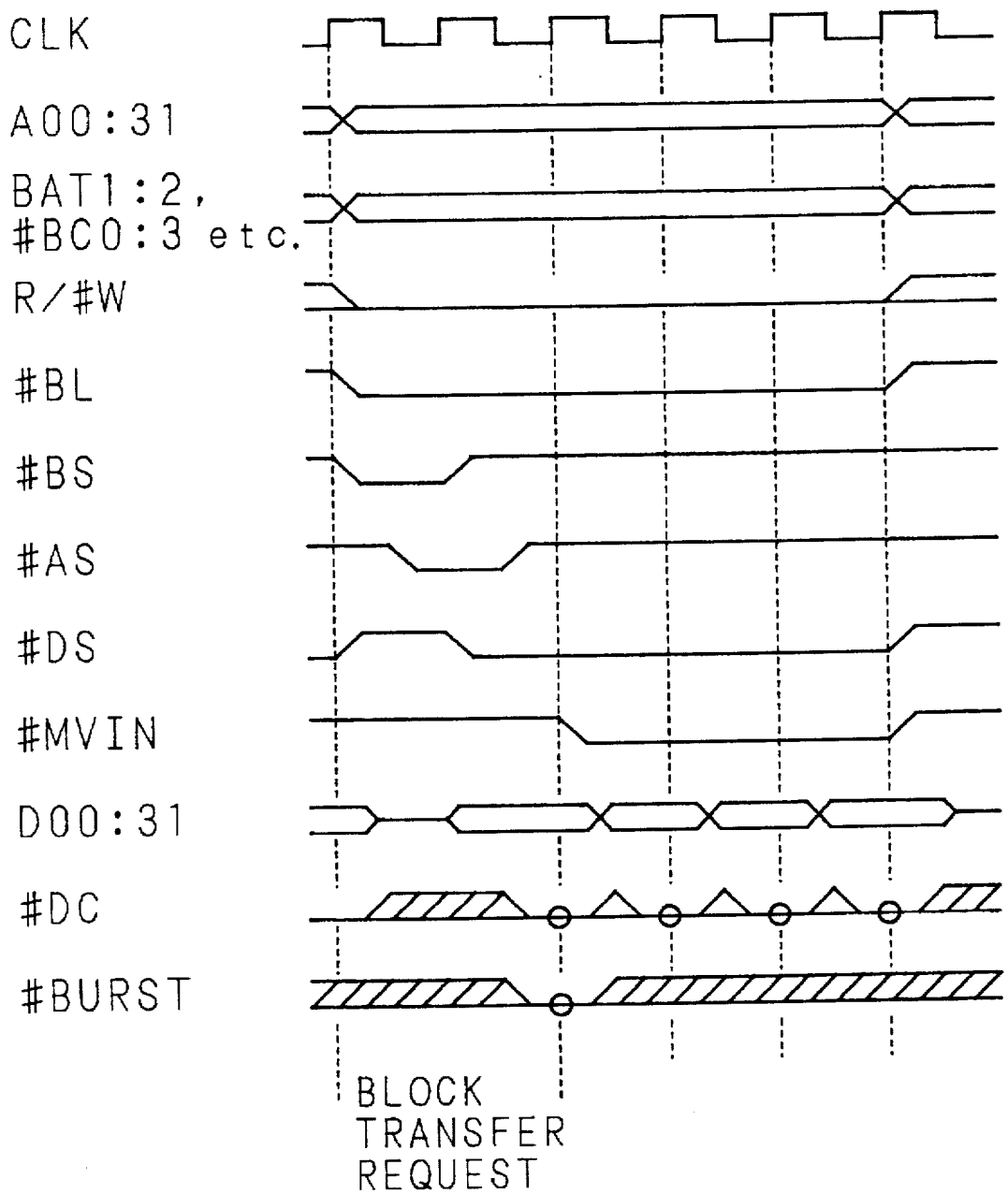
FIG. 72 is a timing chart showing timings of zero-wait write operation by a burst mode in the basic bus operations of the data processor related to the present invention.
Figure 73:
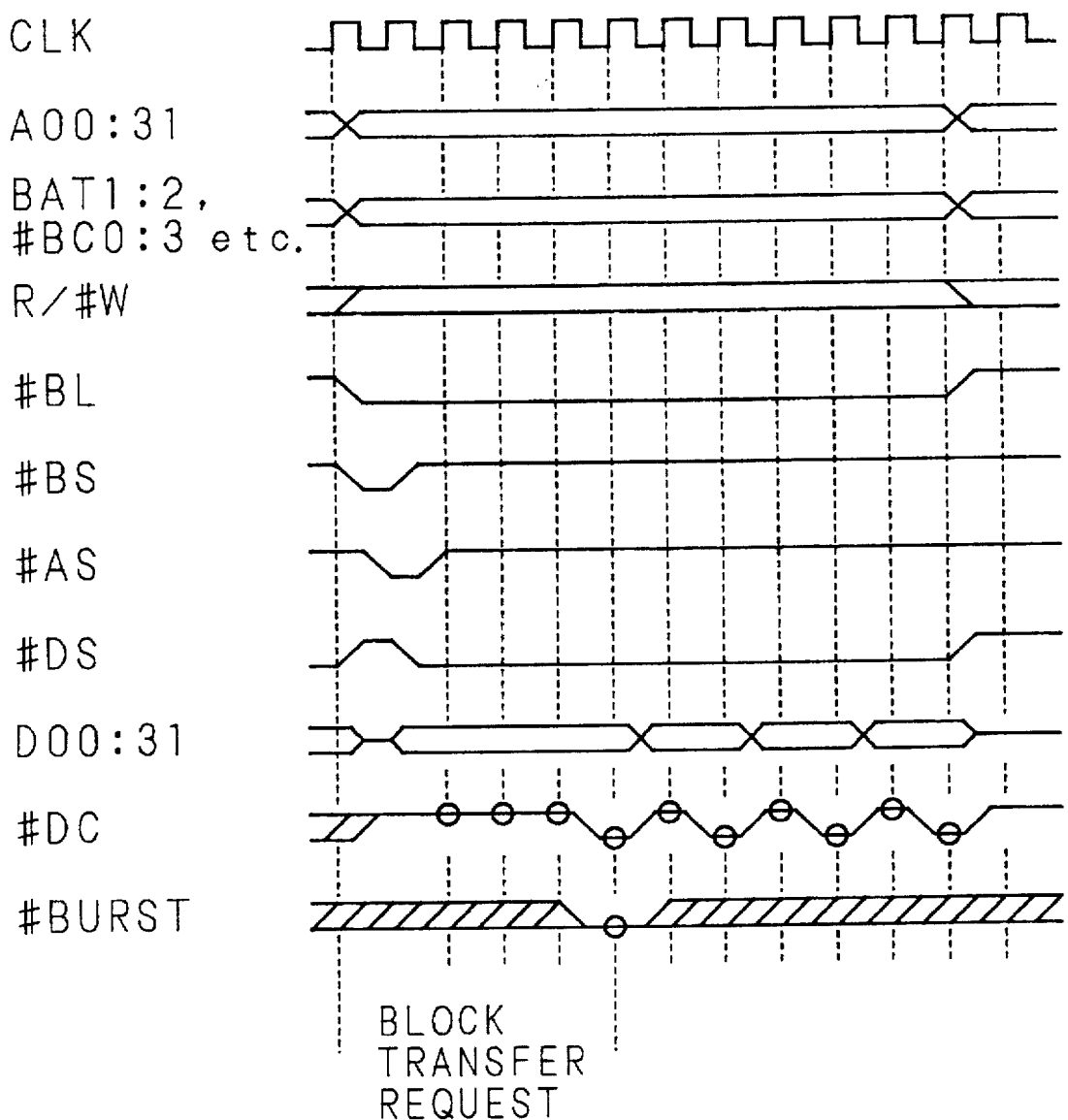
FIG. 73 is a timing chart showing timings of write operation wherein a first cycle is three-wait and second to fourth cycles are one-wait in the burst mode in the basic bus operations of the data processor related to the present invention.

FIG. 72 shows the timings of the zero-wait write operation in the burst mode. FIG. 73 shows the timings of the write operation wherein the first cycle is three-wait and the second to fourth cycles are one-wait.

(6) "Configuration of data operating unit related to string operation instruction and bit map operation instruction"

Figure 74:
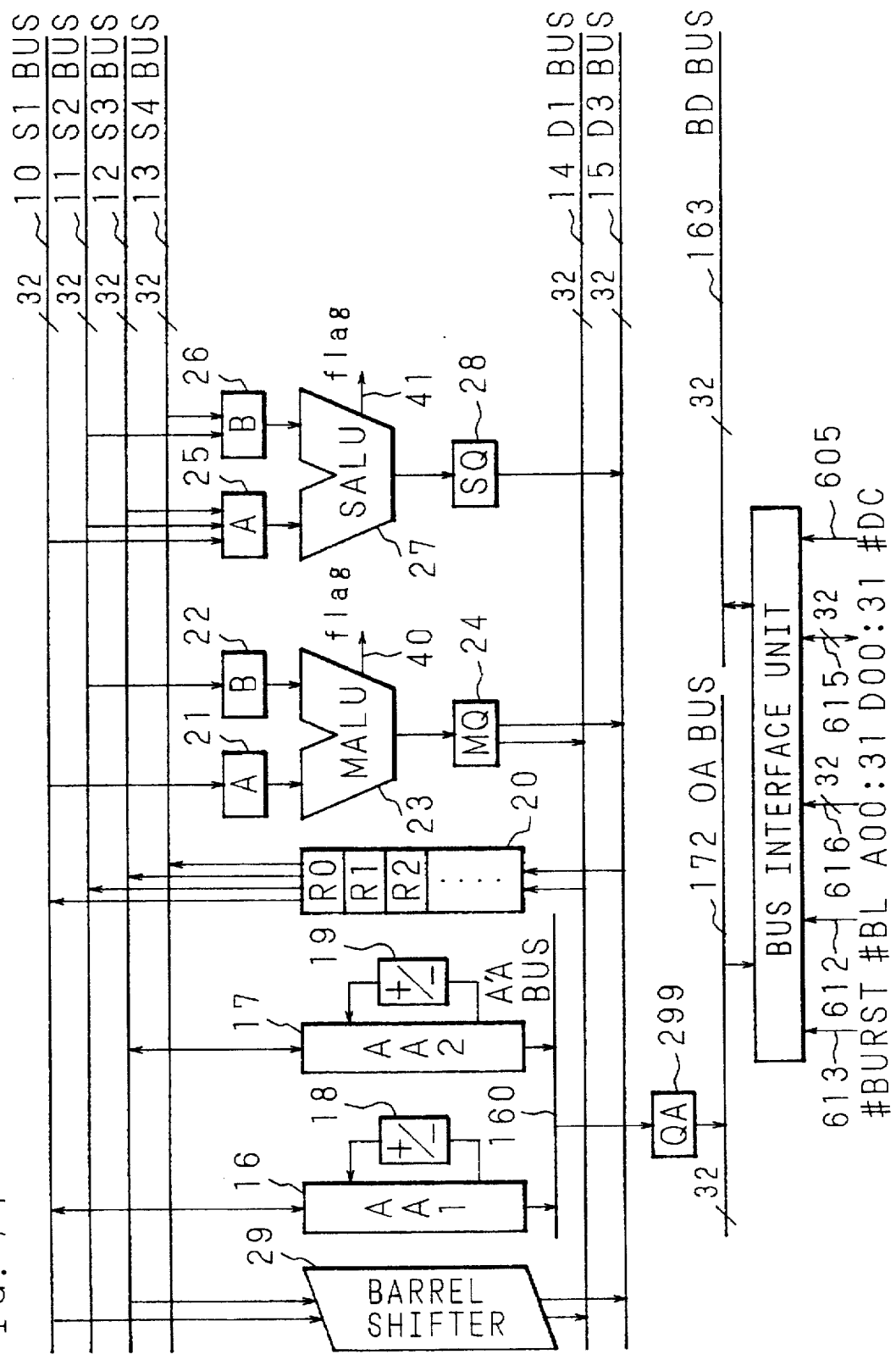
FIG. 74 is a block diagram showing a configuration of a principle portion necessary for executions of the string operation instruction and bit map operation instruction of the data processor related to the present invention.
Figure 75:
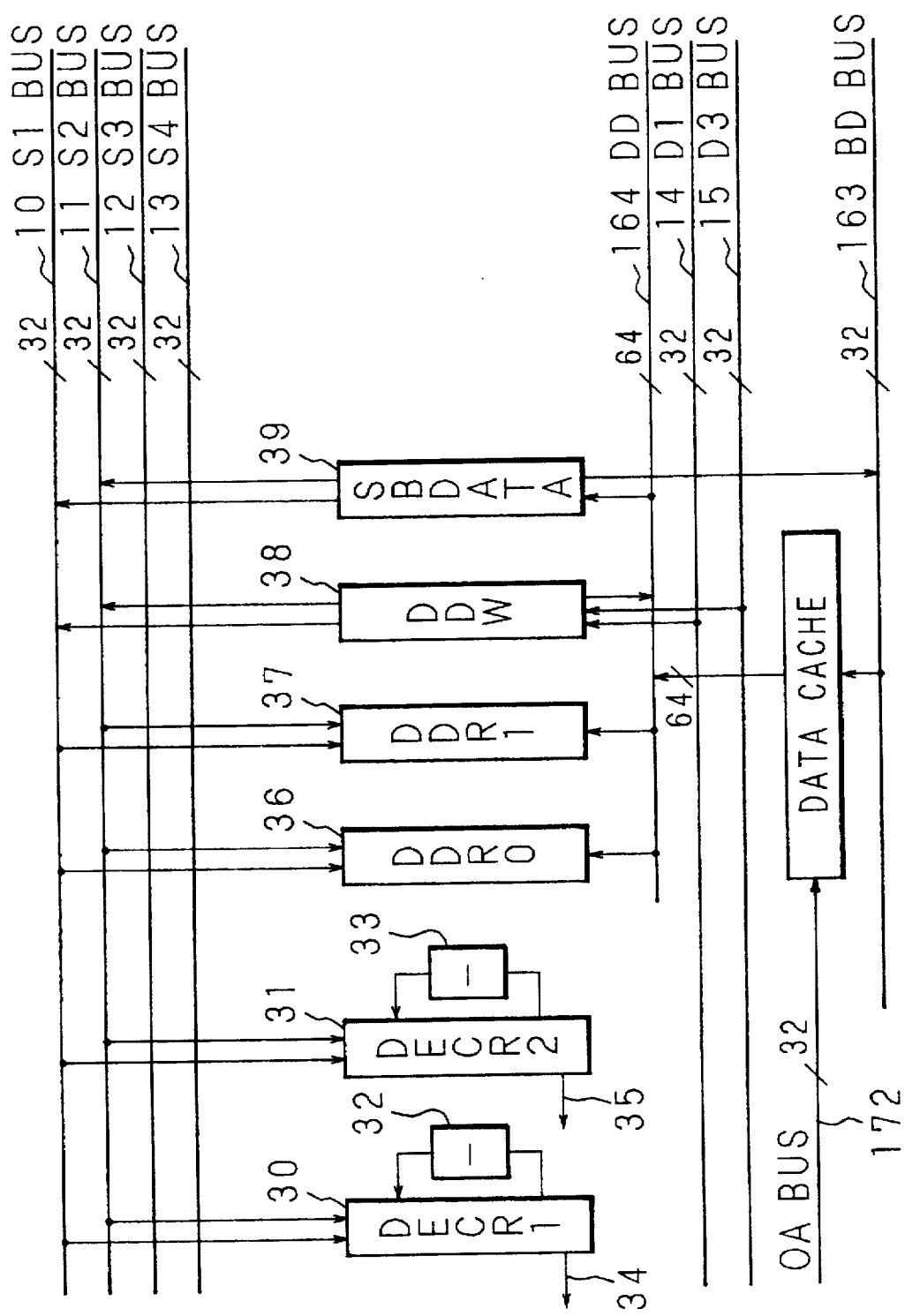
FIG. 75 is a block diagram showing a configuration of a principal portion necessary for executions of the string operation instruction and bit map operation instruction of the data processor related to the present invention.

FIG. 74 and FIG. 75 show the block diagrams of the principal portion necessary for executing the string operation instruction and bit map operation instruction of the data processor 100 related to the present invention.

The execution control of the instructions performed sequentially reading out the microinstructions stored in the micro-ROM 320 by means of microsequencer 321 in the data processor 100 related to the present invention. Each block described as follows functions by control of the microinstructions. The configuration is explained first.

(6.1) "Configuration of data operating unit"

Reference numerals 10, 11, 12, 13, 14 and 15 indicate the 32-bit buses and termed S1 bus, S2 bus, S3 bus, S4 bus, D1 bus and D3 bus, respectively.

Reference numerals 16 and 17 indicate the 32-bit memory address registers wherein the addresses to be accessed are set when accessing an external storage, that is, main storage 103. Reference numeral 16 is termed AA1 register and reference numeral 17 is termed AA2 register. Address setting and reading out for the AA1 register 16 and AA2 register 17 are executed via the S1 bus 10 and S2 bus 11, respectively. The AA1 register 16 and AA2 register 17 have the count value specifying registers 18 and 19, respectively. They can increment/decrement by "1", "2", "4" and "8". The memory address values indicated by the AA1 register 16 and AA2 register 17 are outputted from the AA bus 160 to the OA bus 172 via the operand address register 299 and inputted to the bus interface 157.

Reference numeral 20 indicates the register file composed of 30 32-bit registers: R0 register to R29 register. Each of these registers has the input paths from the D1 bus 14 and D3 bus 15 and the output paths to the S1 bus 10, S2 bus 11, S3 bus 12 and S4 bus 13.

The first ALU register A 21 and first ALU register B 22 are the 33-bit width registers having "32 bits+1 bit of extended bit". Each of them has the input paths from the S1 bus 10 and S2 bus 11 and the output path to the first ALU 23 and sign-extends the input data to the 33-bit data according to its size and signs.

The first ALU 23 performs the addition/subtraction, logical operations, and the like on the data sent from the first ALU register A 21 and first ALU register B 22, and outputs the results to the M0 register 24. At this time, each flag information corresponding to the result of the operation is outputted as a trap detection flag 40. The flag information is inputted to the microsequencer 321 which controls the execution sequence of the microprograms according to the flag information inputted therein. The first ALU 23 also detects the coincidence/uncoincidence of data in 8-bit unit in order to efficiently execute the string instruction and outputs the result to the M0 register 24. The functions of the first ALU 23 will be described in details later.

The second ALU register A 25 and second ALU register B 26 are the 33-bit width registers having "32 bits+1 bit of extended bit". The second ALU A 25 has input paths from the S1 bus 10, S2 bus 11 and S3 bus 12. The second ALU register B 26 has the input paths from the S2 bus 11 and S4 bus 13. Both the second ALU register A 25 and second ALU register B 26 have the output paths to the second ALU 27, and sign-extend or zero-extend the input data to the 33-bit data according to its size and signs.

The second ALU 27 performs the addition/subtraction, logical operations and the like on the data sent from the second ALU register A 25 and second ALU register B 26, and outputs the results to the S0 register 28. At this time, each flag information corresponding to the result of operation is outputted as the trap detection flag 41. The flag information is inputted to the microsequencer 321 which controls the execution sequence of the microprograms according to the flag information inputted therein. The second ALU 27 also detects the coincidence/uncoincidence of data in 8-bit unit in order to efficiently execute the string instruction and outputs the result to the S0 register 28.

The first ALU 23 and second ALU 27 can operate in parallel because of independently controlled by the microprograms, and process 64-bit (8-byte) data in one cycle.

Reference numeral 29 indicates the barrel shifter which concatenates the data inputted from the S1 bus 10 and S2 bus 11 and executes shift operation by up to 64 bits. The shift result is outputted to the D1 bus 14 and D3 bus 15.

Reference numerals 30 and 31 are the decrementers named as DECRI1 and DECRI2, respectively. They have the input paths from the S1 bus 10 and S2 bus 11 and output paths to the D1 bus 14 and D3 bus 15, and can decrement by 1, 2, 3, 4, 8, 32 and 64 at one time according to the values held in the count value Specifying registers 32 and 33. When the values held in the DECRI1 and DECRI2 become less than the specified value, they notify the fact to the other parts of the system by the flag signals 34 and 35. The flag information is inputted to the microsequencer 321. The microsequencer 321 controls the execution sequence of the microprograms according to the inputted flag information.

Reference numerals 36 and 37 indicate the memory data registers 0 and 1 which temporarily store the data read from the memory and termed DDR0 and DDR1, respectively. Each of them has the 64-bit (8-byte) capacity.

Reference numeral 38 indicates the register which temporarily stores the data to be written in the memory and termed DDW. The DDW 38 has a 64-bit (8-byte) capacity.

Reference numeral 39 indicates the store buffer data unit termed SBDATA. The store data for the memory is outputted to the BD bus 163 via the SBDATA 39 and then inputted to the bus interface unit 157. The SBDATA 39 has a 128-bit (16-byte) capacity.

Reference numeral 290 indicates the data cache which has 4 KB capacity. When the memory address cache on the OA bus 172 is hit at fetching of data from the memory, the data cache 290 outputs the accessed memory data to the DD bus 164 and the DDR0 36 or DDR1 37 holds it. The output of the data cache 290, DD bus 164, DDR0 and DDR1 are 64-bit (8-byte) width, therefore 8-byte data can be fetched in one cycle.

The bus interface unit 157 accesses the memory by the memory address inputted from the OA bus 172. Data accessing to the memory is executed via the 32-bit (4-byte) width bus D00:31 615, and the address is outputted to the bus A00:31 616. When the operating unit requests the memory for a 16-byte block transfer, it asserts the signal #BL 612 by the specifying of the microprogram. The memory asserts the signal #BURST 613 when it receives the request and notifies to the bus interface unit 157 that data can be transferred in the burst mode.

(6.2) "Functions of first ALU and second ALU"

As stated above, the data processor related to the present invention executes control of the instruction by the microprogram control method.

Microprogram fields provided to control the first ALU 23 and the contents of the microoperations which can be specified therein are shown in FIG. 76. The microprogram fields provided to control the second ALU 27 and the contents of the microoperations which can be specified therein are shown in FIG. 77.

An maai field and mabi field specify the input control of the first ALU register A 21 and first ALU register B 22, respectively.

An maop field defines the operations performed in the first ALU 23. The coincidence/uncoincidence operation for efficiently executing the string instruction as well as the arithmetic operations and logical operations are defined. The details of the coincidence/uncoincidence operation is described later.

An masu field specifies the sign extension/zero extension of the first ALU 23. The first ALU 23 performs the sign extension/zero extension when the operand is transferred to the first ALU register A 21 or first ALU register B 22.

An maaz field specifies the size of the sign extension/zero extension when the first ALU 23 fetches the operand from the S1 bus 10 into the first ALU register A 21.

An mabz field specifies the size of the sign extension/zero extension when the first ALU 23 fetches the operand from the S2 bus 11 to the first ALU register B 22.

An mafz field specifies the size which becomes a base when the first ALU 23 outputted various flags corresponding to the results of operations.

An maot field specifies to which the D1 bus 14 or D3 bus 15 should the results of the operations performed in the first ALU 23 be outputted.

An saai field and sabi field specify the input control of the second ALU register A 25 and second ALU register B 26, respectively.

An saop field defines the operations performed in the second ALU 27. The coincidence/uncoincidence operation for efficiently executing the string instruction as well as the arithmetic operations and logical operations are defined. The details of the coincidence/uncoincidence operation is described later.

An sasu field specifies the sign extension/zero extension of the second ALU 27. It performs the sign extension/zero extension when the second ALU 27 fetches the operand into the second ALU register A 25 or second ALU register B 26.

An saaz field specifies the size of the sign extension/zero extension when the second ALU 27 fetches the operands from the S1 bus 10, S2 bus 11 and S3 bus 12 into the second ALU register A 25.

An sabz field specifies the size of the sign extension/zero extension when the second ALU 27 fetches the operands from the S2 bus 11 and S4 bus 13 into the second ALU register B 26.

An saot field specifies whether should the results of the operations performed in the second ALU 27 be outputted to the D3 bus 15 or not.

(6.3) "Coincidence/uncoincidence detection operation in first ALU and second ALU"

The procedure of the coincidence/uncoincidence detection operation by using the first ALU is schematically shown in FIG. 78.

It is assumed that a data string is positioned on the memory. When looking at an arbitrary 64 bits (8 bytes) of the data string, the data stored in each byte is named "A", "B", "C" . . . "H" as shown in FIG. 78. The coincidence/ uncoincidence detection operation is provided to check whether a predetermined string exists in the data string or not. The contents of the operation is described as follows.

It is assumed that the predetermined string is "G" of one byte. The condition whether to perform the coincidence detection operation or uncoincidence detection operation is called "trap condition". It is assumed that "coincidence" is specified as the trap condition.

The predetermined 1-byte string "G" is evolved in the R3 of the register file 20 in the 4-byte size as shown in FIG. 78. Then an 8-byte data string is read from the memory; the higher 4 bytes of the address is inputted to the first ALU 23 and the lower 4 bytes thereof are inputted to the second ALU 27. In the operation of the first ALU 23 and second ALU 27, the coincidence operation in the forward direction are performed by specifying the eopf_e in the maop field as shown in FIG. 76 and the eopf_e in the saop field as shown in FIG. 77. That is, the bytes are looked in the sequence from the lower side to higher side in the given data string; when a string which coincides with the value of the R3 is detected, the data indicating the byte location is outputted to the MO register 24 and SO register 28.

Since the predetermined string "G" is detected in the string "EFGH" inputted to the first ALU 23 in the example shown in FIG. 78, the first ALU 23 outputs the 32-bit outputs "h' 00000006" indicating that the location wherein "G" is detected is the sixth byte of the 8-byte data to the MO register 24. At the same time, it outputs the flag information indicating that the predetermined string is detected as the trap detection flag 40.

On the other hand, since the predetermined string "G" is not detected in the string "ABCD" inputted to the second ALU 27, it outputs the 32-bit signal "h' ffffffff" indicating the no detection to the SO register 28. At the same time, it outputs the flag information 41 indicating that the predetermined string is not detected.

(7) "Explanation on SMOV instruction processing"

As an example of the string operation instruction, the execution procedure of the SMOV instruction of the data processor 100 related to the present invention is described here. The outline of the SMOV instruction execution is explained first.

Figure 79:
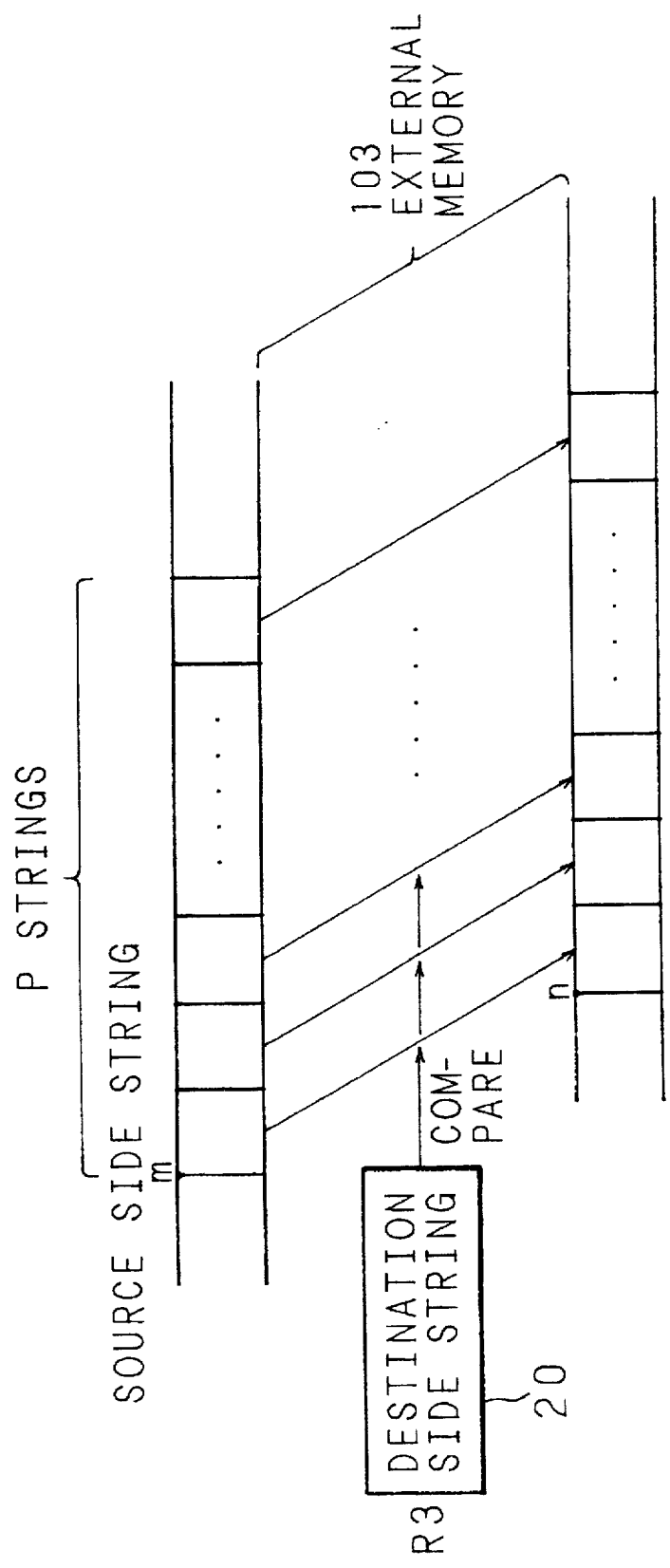
FIG. 79 is schematic diagram showing execution procedure of the SMOV instruction by the data processor related to the present invention.

FIG. 79 is a schematic diagram showing the procedure of the SMOV instruction.

The SMOV instruction transfers p data strings from the area starting with the address m in the memory to the other area starting with the address n. The size of one string can be specified from among 8 bits (1 byte), 18 bits (2 bytes) and 32 bits (4 bytes).

During the transfer, whether the string data satisfies the trap condition or not is checked; when the trap is detected, the instruction execution terminates at the moment when the trap is detected. Unless the trap is detected in any string, all the p data are transferred to terminate the instruction execution.

Figure 80:
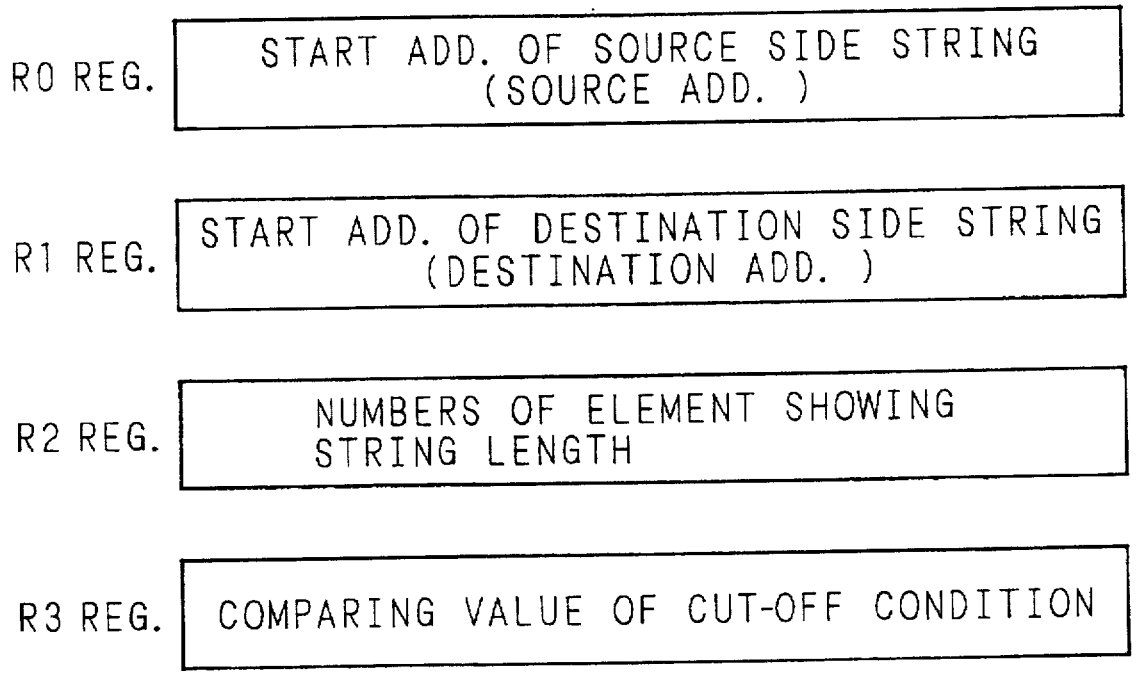
FIG. 80 is a schematic diagram showing operands of the SMOV instruction of the data processor related to the present invention.

FIG. 80 is a schematic diagram showing the operand of the SMOV instruction.

The operand of the SMOV instruction is stored into the R0, R1, R2 and R3 registers in the register file 20. The start address of the source side string is set in the R0 register. The start address of the destination side is set in the R1 register. The number of elements indicating the string length is set in the R2 register. The comparing value for the trap condition is set in the R3 register.

FIGS. 81(*a*), (*b*) and (*c*) are the schematic diagrams showing the operations of the R3 register when the comparing value is set from the D1 bus 14 to the R3 register while executing the SMOV instruction.

Figure 81A:
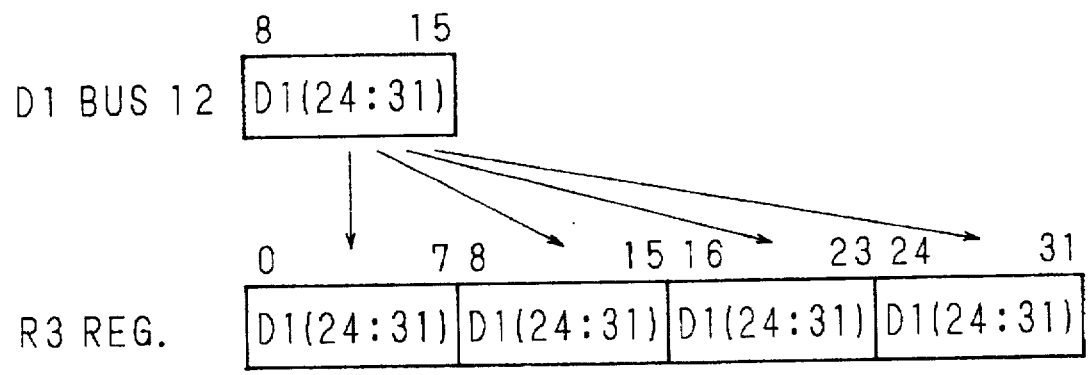
FIGS. 81A, 81B and 81C are schematic diagrams showing an operation of an R3 register when setting a reference value from a D1 bus to the R3 register at the execution of the SMOV instruction by the data processor related to the present invention.

When the size of comparing value is 8-bit as shown in FIG. 81(a), the data D1 (24:31) on the D1 bus 14 is set to the R3(0:15), R3(8:15), R3(16:23) and R3(24:31) of the R3 register.

Figure 81B:
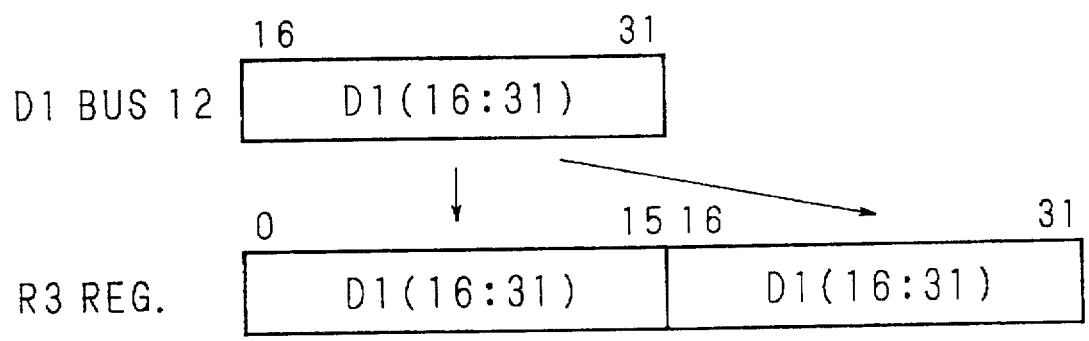

When the comparing value is 16-bit as shown in FIG. 81(b), the data D0(16:31) on the D1 bus 14 is set to the R3 (0:15) and R3(16:31) of the R3 register.

Figure 81C:
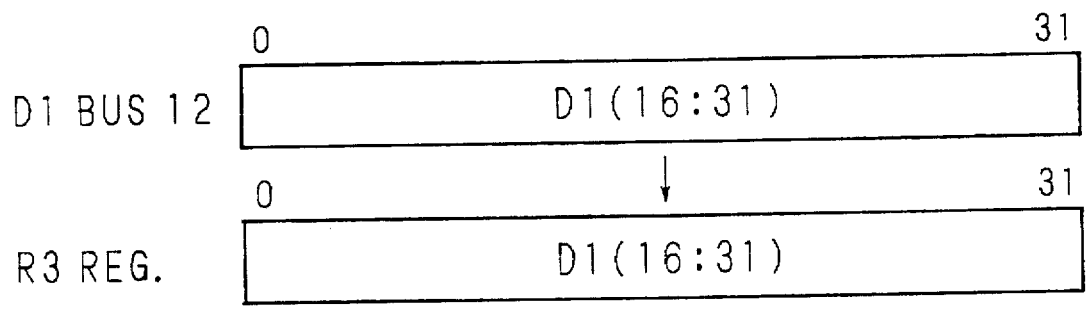

Further, when the size of comparing value is 32-bit as shown in FIG. 81(c), the data D0(0:31) on the D0 bus 14 is set to the R3(0:31) of the R3 register.

In the execution example of the SMOV instruction described below, the source data and destination data to be operated are limited to those which are on the 32-bit (word) aligned boundaries. When the data to be operated crosses the 32-bit (word) aligned boundaries, the number of accesses to the memory by the bus interface unit 157 increases, therefore the data shift operation and concatenating operation must be executed to the read data and write data to align the data. The applicant of the present invention discloses this method in Japanese Patent Application Laid-Open No. 64-88837 (1989).

(7.1) "Algorithm of SMOV instruction processing"

The operations performed when processing a 224-bit (28-byte) size string data wherein one element is 8 bits (1 byte) in the ascending order of addresses by the SMOV instruction in the data processor 100 related to the present invention are explained with reference to the flowcharts in FIG. 82.

In the data processor 100 related to the present invention, when the length of a string is more than a certain value, data is processed in 16-byte unit regardless of the element size of the string. Source data fetching and checking trap is executed twice for 8 bytes each and the data storing into the destination is exacted by the block transfer in 16-byte unit.

It is assumed that the data string to be operated does not include elements which satisfy the trap condition, and the address of the source data is "m" and the address of the destination data is "n" which are set in the R0 register and R1 register, respectively; further the addresses "m" and "n" are on the 32-bit (4-byte) aligned boundaries as stated above, and 32-bit boundary following the address "n" is on the 64-bit (8-byte) aligned boundary. It is also assumed that the number of the elements "28" indicating the string length is set in the R2 register and the comparing value of the trap condition is set in the R3 register; further "coincident" is assumed to be specified as the trap condition.

In step S1, the contents of the R0 register is set in the AA1 register 16 and the contents of the R2 register is set in the decrementer DECR1 30.

In step S2, the contents of the R1 register is set in the AA1 register 17 and the trap comparing value held in the R3 register is evolved to the 32-bit size as shown in FIG. 81 and then stored in the R3 register again.

Further, the data with the size reaching the 8-byte boundary next to the destination is fetched from the memory and stored in the DDR0 36. The start address "n" of the destination is on the 4-byte aligned boundary and the next 4-byte boundary is on the 8-byte aligned boundary, therefore the size of the data read from the memory is 4 bytes. Since 4-byte data is read out, "4" is set to the count value specifying registers 32 and 18 in order to update the values of the DECR1 30 and AA1 16 and the value of the DECR1 is decremented by "4" to be "24" and the value of the AA1 is incremented by "4" to be "m+4".

In step S3, the coincidence detection operation on the value stored in the DDR0 36 in the previous step is performed by using the first ALU 23 and second ALU 27. Note that the data stored in the DDR0 36 is 4-byte length, therefore data is not inputted to the second ALU 27. On the other hand, since the 4-byte data inputted to the first ALU 23 does not include an element which satisfies the trap condition, the first ALU 27 outputs this information to the M0 register 24 as the trap detection flag 40.

In step S4, the value of the DDR0 36 is transferred to the DDW 38 via the S1 bus 10, first ALU 23 and D1 bus 14 and the preparation for writing data in the memory on the destination side is made later.

When the trap detection flag 40 of the previous step is "1", or when the value of the flag 34 indicating that the value of the DECR1 30 is less than 8 bytes is "1", the sequence is controlled by the microprogram and a branch takes place to the execution address of the microprogram which executes terminating processing of the instruction. Here, the value of the DECR1 30 is "20" and trap was not detected in the previous step, therefore a branch does not take place to the terminating processing.

In step S5, the source data is fetched by 8 bytes from the memory and stored in the DDR0 38. In order to update the values of the DECR1 30 and AA1 16 as the data is read out by 8 bytes, "8" is set to the count value specifying registers 32 and 18, the value of the DECR1 is decremented by "8" to "16", and the value of the AA1 is incremented by "8" to be "(m+4)+8".

In step S6, the data which was prepared in the store data register (trap detection flag 40) in step S4 is written into the memory according to the address of the AA2. Since the 4-byte data is written in the memory, "4" is specified in the count value specifying register 19 and the value of the AA2 register is incremented by "4" to "n+4".

Further, the coincidence detection operation on the value stored in the DDR0 36 in the previous step is performed by using the first ALU 23 and second ALU 27. Since the data stored in the DDR0 36 is 8-byte length, the first ALU 23 performs the coincidence detection on the higher 4 bytes of the memory address and the second ALU 27 performs the coincidence detection on the lower 4 bytes of the memory address. The 8-byte data for which coincidence detection is to be done does not include element which satisfies the trap condition, the first ALU 23 and second ALU 27 outputs the information to the M0 register 24 and S0 register 28 as the trap detection flags 40 and 41.

In step S7, the 8-byte data stored in the DDR0 36 is transferred to the DDW 38 in 4-byte unit via the S1 bus 10, first ALU 23 and D1 bus 14, and S2 bus 11, second ALU 27 and D3 bus 15, and the preparation for writing data into the memory on the destination side is made later.

When the trap is detected in the previous step or the value of the flag 34 indicating that the value of the DECR1 30 is less than 8 bytes is "1", the sequence is controlled by the microprogram and a branch takes place to the execution address of the microprogram which terminates the instruction. Here, the value of the DECR1 30 is "16" and the trap was not detected in the previous step, therefore a branch does not take place to the terminating processing.

In step S8, the source data is fetched by 8 bytes from the memory and stored in the DDR1 37. In order to update the values of the DECR1 30 and AA1 16 as the data is read out by 8 bytes, "8" is set in the count value specifying registers 32, and 18 and the value of the decrementer is decremented by "8" to "8" and the value of the AA1 is incremented by "8" to be "(m+4+8)+8".

In step S9, the coincidence detection operation is performed on the value which was stored in the DDR1 37 in the previous step by using the first ALU 23 and second ALU 27. Since the 8-byte data is stored in the DDR1 37, the first ALU 23 performs the coincidence detection operation on the higher 4 bytes of the memory address and the second ALU 27 performs the coincidence detection operation on the lower 4 bytes thereof. The 8-byte data on which the coincidence is to be detected does not include an element which satisfies the trap condition, therefore the first ALU 23 and second ALU 27 output the information to the MO register 24 and SO register 28 as the trap detection flags 40 and 41.

In step S10, when the trap was detected or the value of the flag 34 indicating that the value of the DECR1 30 is less than 8 bytes is "1" in the previous step, the sequence is controlled by the microprogram and a branch takes place to the execution address of the microprogram which executed terminating processing. Here, the value of the DECR1 30 is "8" and the trap was not detected in the previous step, therefore a branch does not take place to the terminating processing.

In step S11, the source data is read out by 8 bytes from the memory and stored in the DDR0 36. In order to update the values of the DECR1 30 and AA1 16 as the data is read out by 8 bytes, "8" is set in the count value specifying registers 32 and 18, and the value of the decrementer is decremented by "8" to be "0" and the value of the AA1 register is incremented by "8" to be "(m+4+8+8+8)".

In step S12, the 8-byte data which was prepared in the DDW 38 in step S7 is stored in the memory. At this time, the memory is notified that the data is stored therein by the block transfer.

Further, "8" is specified in the count value specifying register 19 of the AA2 register and the value of the AA2 register is incremented by "8" to be "(n+4)+8".

Further, the coincidence detection operation is performed on the value which was stored in the DDR0 36 in the previous step by using the first ALU 23 and second ALU 27. Since the 8-byte data is stored in the DDR0 36, the first ALU 23 performs the coincidence detection operation on the higher 4 bytes of the memory address and the second ALU 27 performs the coincidence detection operation on the lower 4 bytes thereof. Since the 8-byte data on which the coincidence is to be detected does not include an element which satisfies the trap condition, the first ALU 23 and second ALU 27 output the information to the MO register 24 and SO register 28 as the detection flags 40 and 41.

In step S13, the 8-byte data stored in the DECR1 37 is transferred in 4-byte unit to the DDW 38 via the S1 bus 10, first ALU 23 and D1 bus 14, and S2 bus 11, second ALU 27 and D3 bus 15, and then stored in the memory intact. Since the block store is specified in the previous step, this writing is regarded to be following data by block store.

"8" is specified in the count value specifying register of the AA2 register and the value of the AA2 register is incremented by "8" to be "(n+4+8)+8".

When the above operations are completed, a branch takes place to step S7.

(7.2) "External bus cycle in SMOV instruction processing"

Figure 82A:
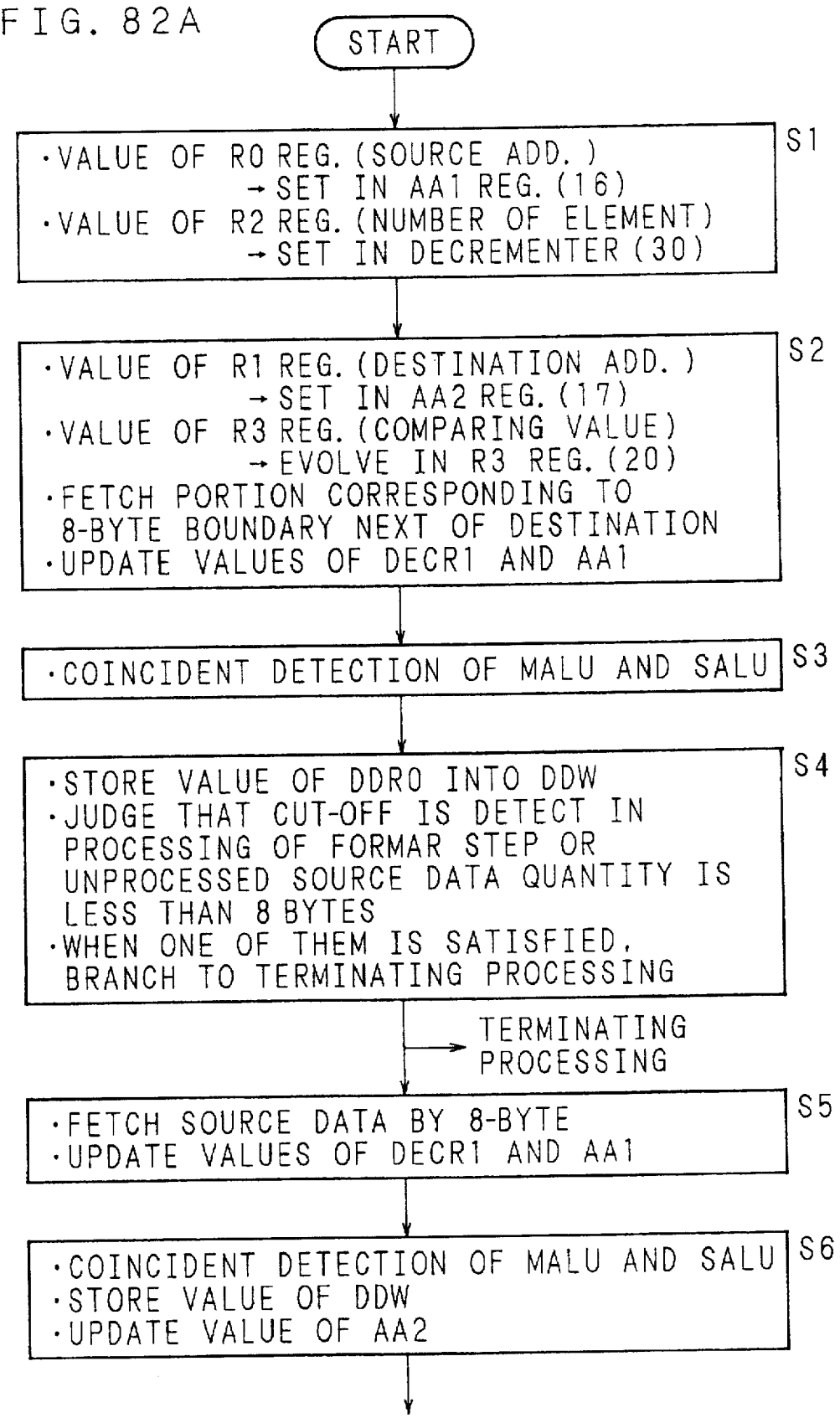
FIGS. 82A and 82B are flowcharts showing an execution procedure of the SMOV instruction by the data processor related to the present invention.
Figure 82B:
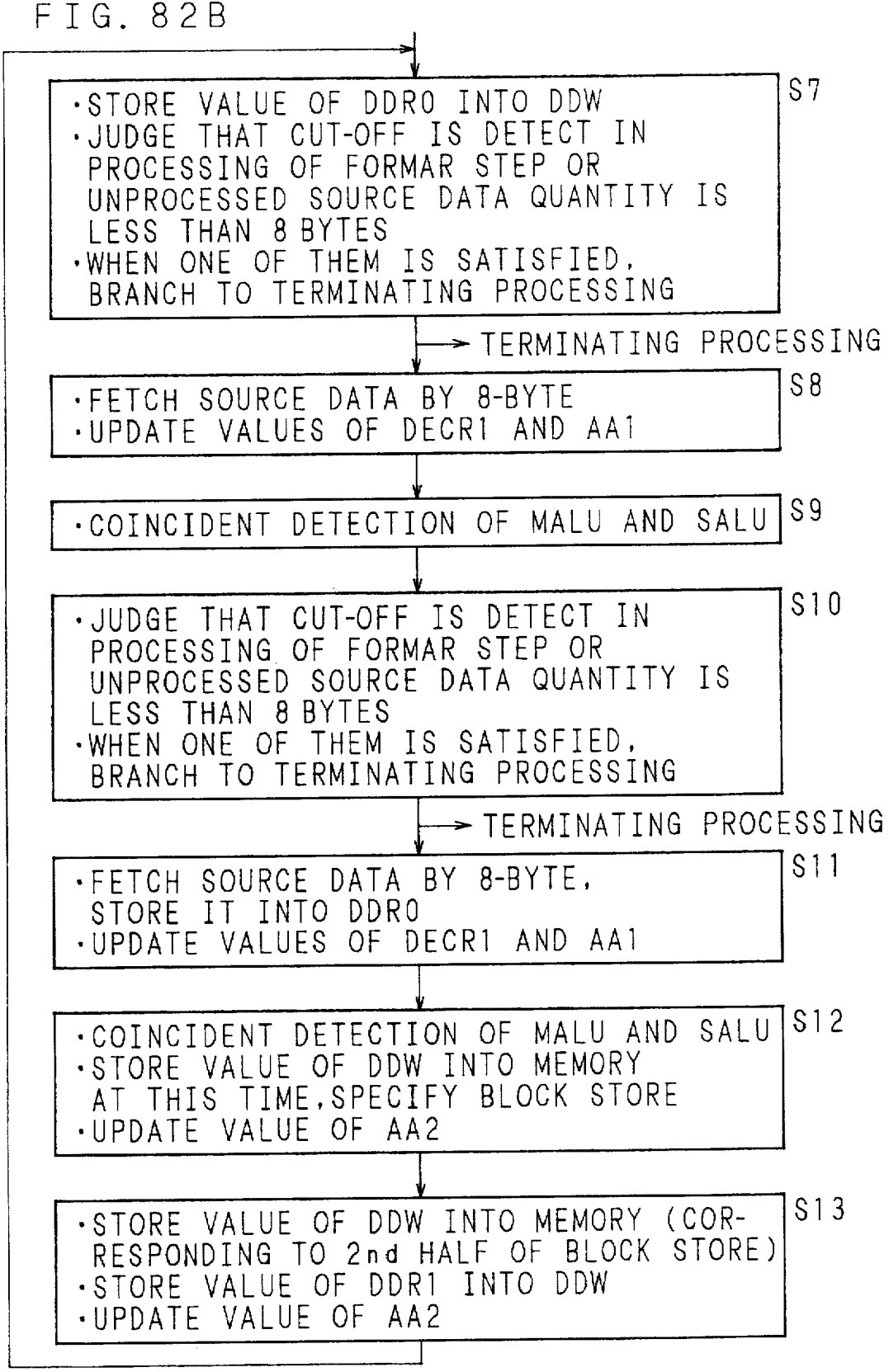
Figure 83:
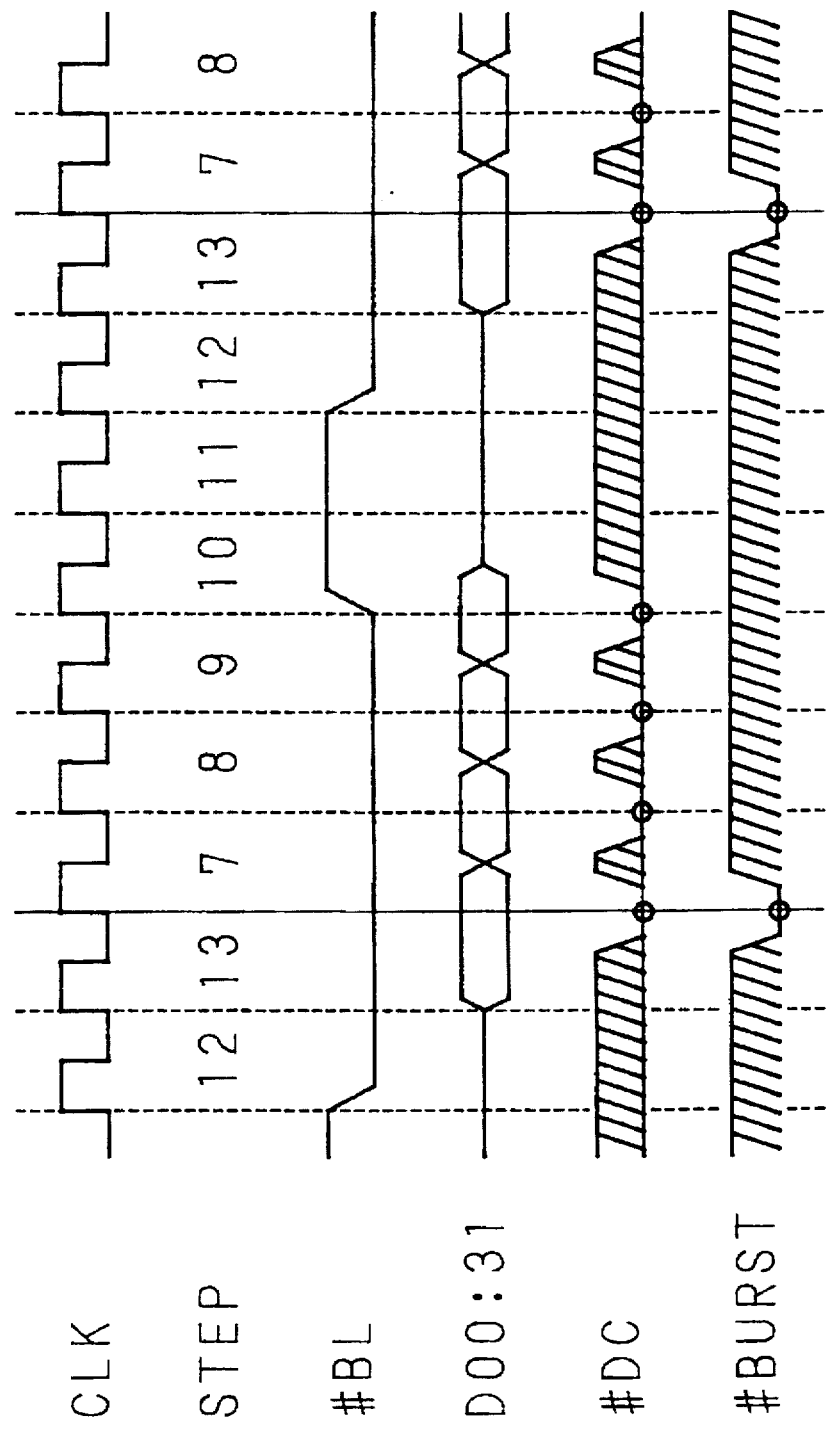
FIG. 83 is a timing chart showing an external bus cycle at a burst write operation in the case where wait number of the memory is 0-0 in the execution of the SMOV instruction by the data processor related to the present invention.
Figure 84:
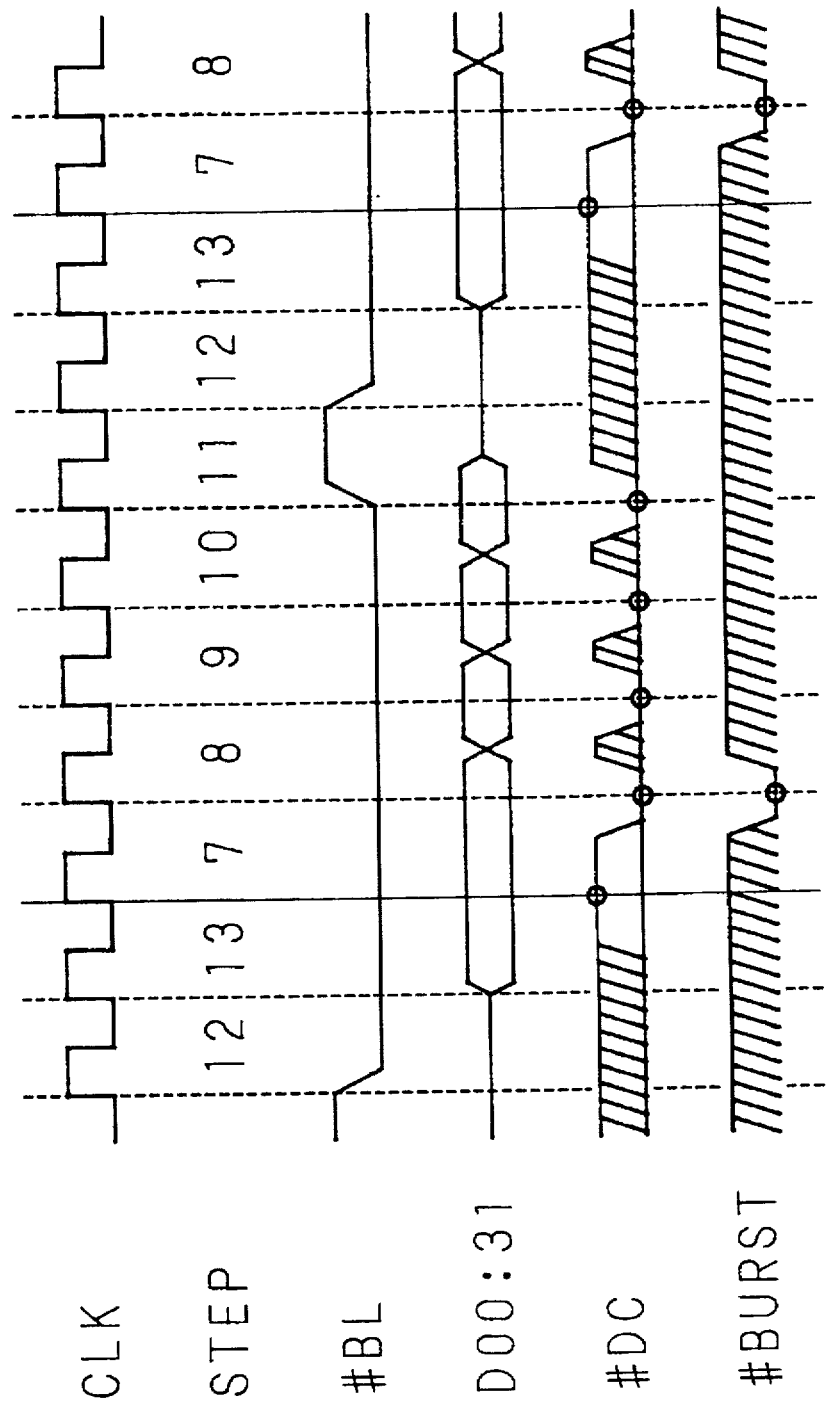
FIG. 84 is a timing chart showing an external bus cycle at a burst write operation in the case where wait number of the memory is 1-0 in the execution of the SMOV instruction by the data processor related to the present invention.

When the strings to be transferred are long enough and no trap is detected in the processing of the SMOV instruction using the above stated algorithm, the processing in step S7 to S13 repeat and the string data are transferred according to the flowcharts shown in FIG. 82.

The external bus cycle at the time when the data is written in the burst write in the above cases in the data processor 100 related to the present invention is shown by the timing charts in FIG. 83 to FIG. 86.

The wait numbers of the memory are 0-0, 1-0, 2-0 and 3-0 in FIG. 83, FIG. 84, FIG. 85 and FIG. 86, respectively. It is assumed that the memory is not accessed when fetching the source data because the source string data has been stored in the data cache built in the data processor 100 related to the present invention.

In FIG. 83 to FIG. 86, the CLK indicates the clock signal which drives the data processor 100 related to the present invention, the D00:31 indicates the data to be written in the memory, a #BL indicates the block transfer request signal, a #BURST indicates the burst transfer acknowledge signal outputted from the memory, and a #DC indicates the data complete signal outputted from the memory.

Figure 85:
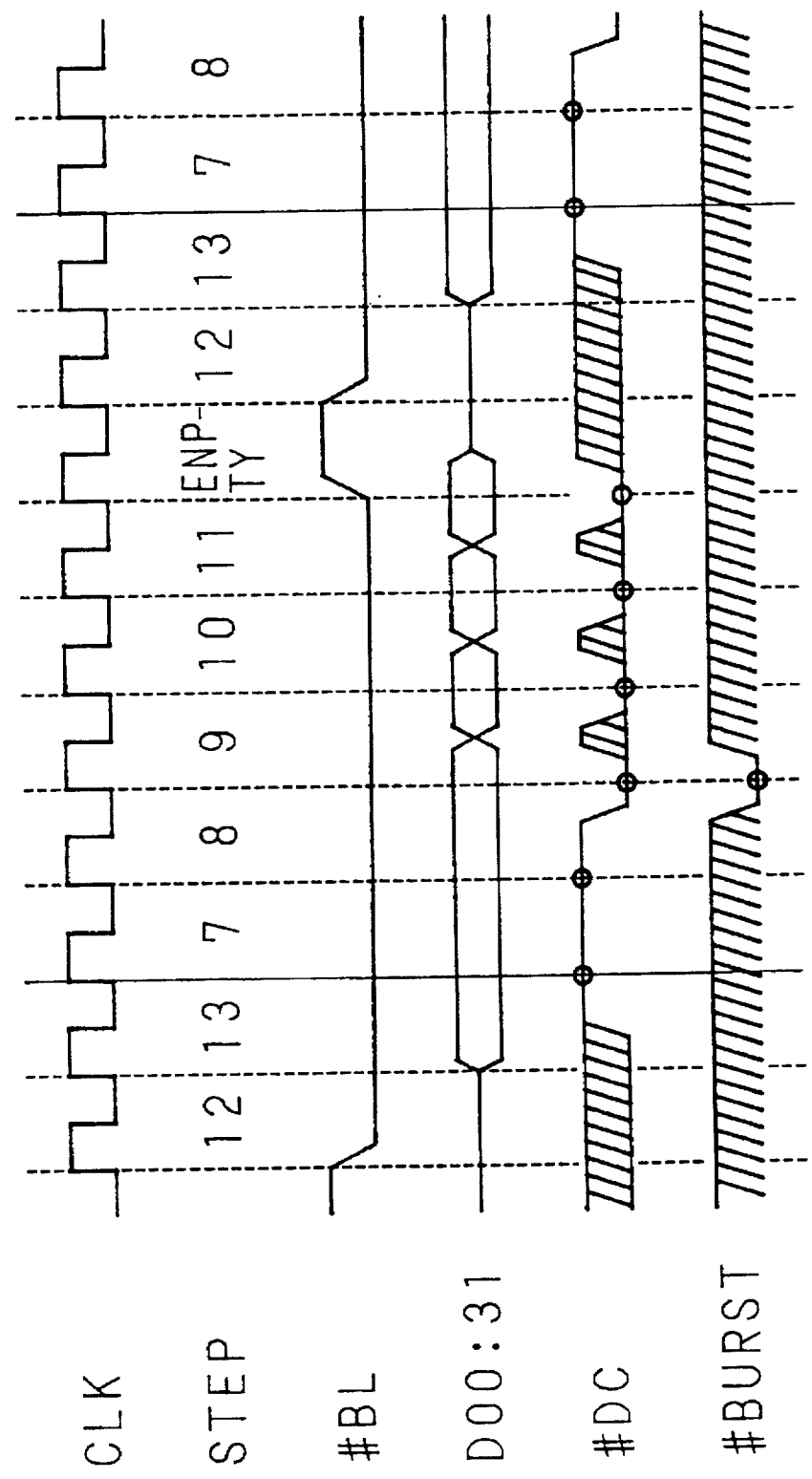
FIG. 85 is a timing chart showing an external bus cycle at a burst write operation in the case where wait number of the memory is 2-0 in the execution of the SMOV instruction by the data processor related to the present invention.
Figure 86:
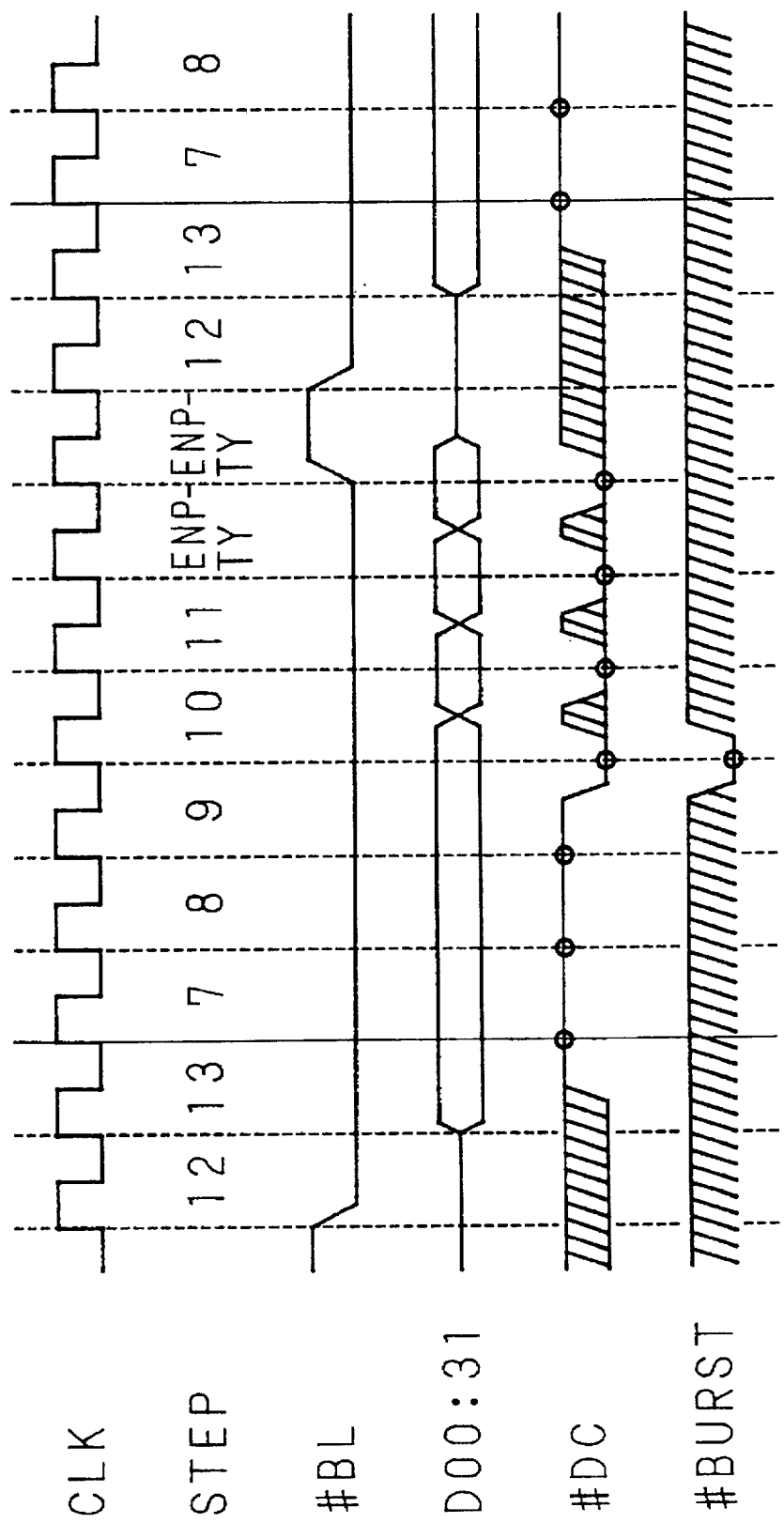
FIG. 86 is a timing chart showing an external bus cycle at a burst write operation in the case where wait number of the memory is 3-0 in the execution of the SMOV instruction by the data processor related to the present invention.

In the data processor 100 related to the present invention, the microprogram can specify the block store operation in the clock cycle after the signal #DC is received from the memory in the case where the last data of the block store operation specified immediately before has been written. Consequently, when the wait number of the memory is 3 or more, the dead cycle as shown in FIG. 85 and FIG. 86 is automatically inserted until control proceeds to step S17 wherein the microprogram specifies the next block store operation.

As stated above, when the SMOV instruction is executed, the data processing efficiency for each wait number in the data processor 100 related to the present invention wherein the 128-bit (16-byte) bit map data string is transferred by repeating the control by the 8-step microinstructions is shown in table of FIG. 87.

(8) "Explanation on BVMAP instruction processing"

The BVMAP instruction of the data processor 100 related to the present invention is taken as an example of a bit map operation instruction to describe the procedure of its execution. The outline of processing of the BVMAP instruction is explained at first.

Figure 88:
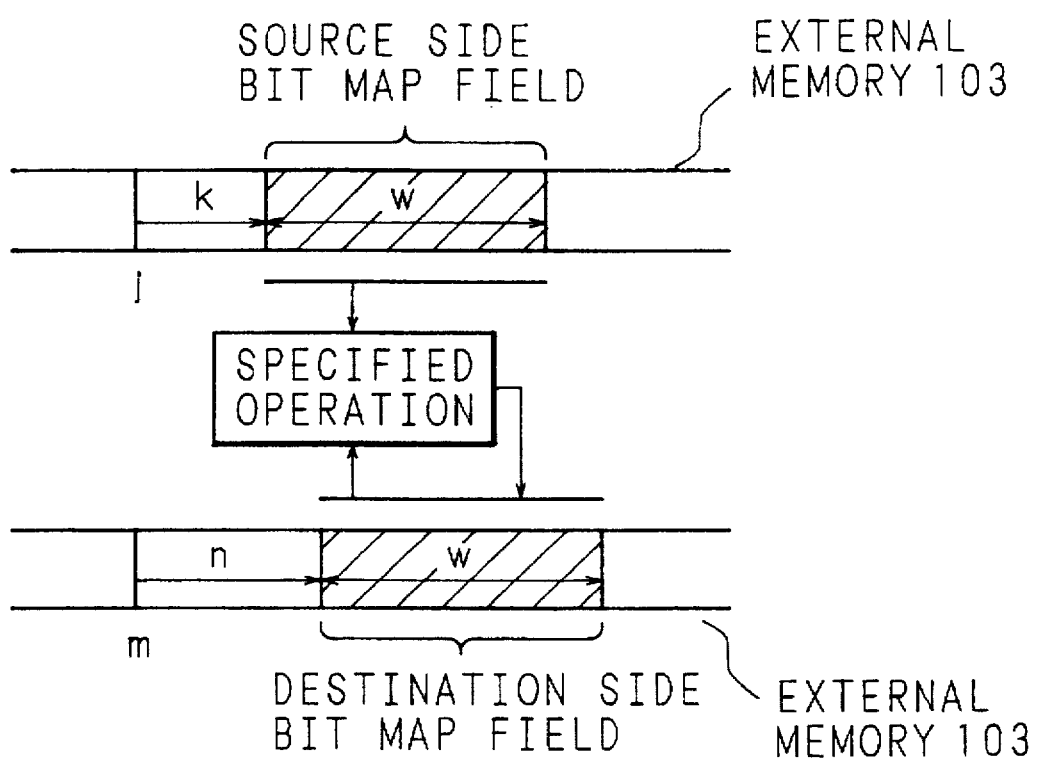
FIG. 88 is a schematic diagram showing an execution procedure of the BVMAP instruction by the data processor related to the present invention.

FIG. 88 is a schematic diagram showing the processing procedure of the BVMAP instruction.

The BVMAP instruction performs the predetermined operations in 1-bit unit between the source bit map data string of w bits starting with an address having an offset from the memory address j to k, and the destination bit map data of w bits starting with an address having an offset from the memory address m to n, and then transfers the results of the operations sequentially to the bit map data area on the destination side. Note that, when a value 0 or less is specified as w, no operations are performed and the instruction terminates.

FIG. 89 is a schematic diagram showing the operand of the BVMAP instruction.

The operand of the BVMAP instruction is stored in the R0 register, R1 register, R2 register, R3 register, R4 register and R3 register in the register file 20. An address of the source side bit field is set in the R0 register. A bit offset of the source side bit field is set in the R1 register. A length (number of bits) of the bit field to be processed is set in the R2 register. An address of the destination side bit field is set in the R3 register. A bit offset of the destination side bit field is set in the R4 register. An information specifying the type of operation is set in R5 register.

(8.1) "Algorithm of BVMAP instruction processing"

Figure 90:
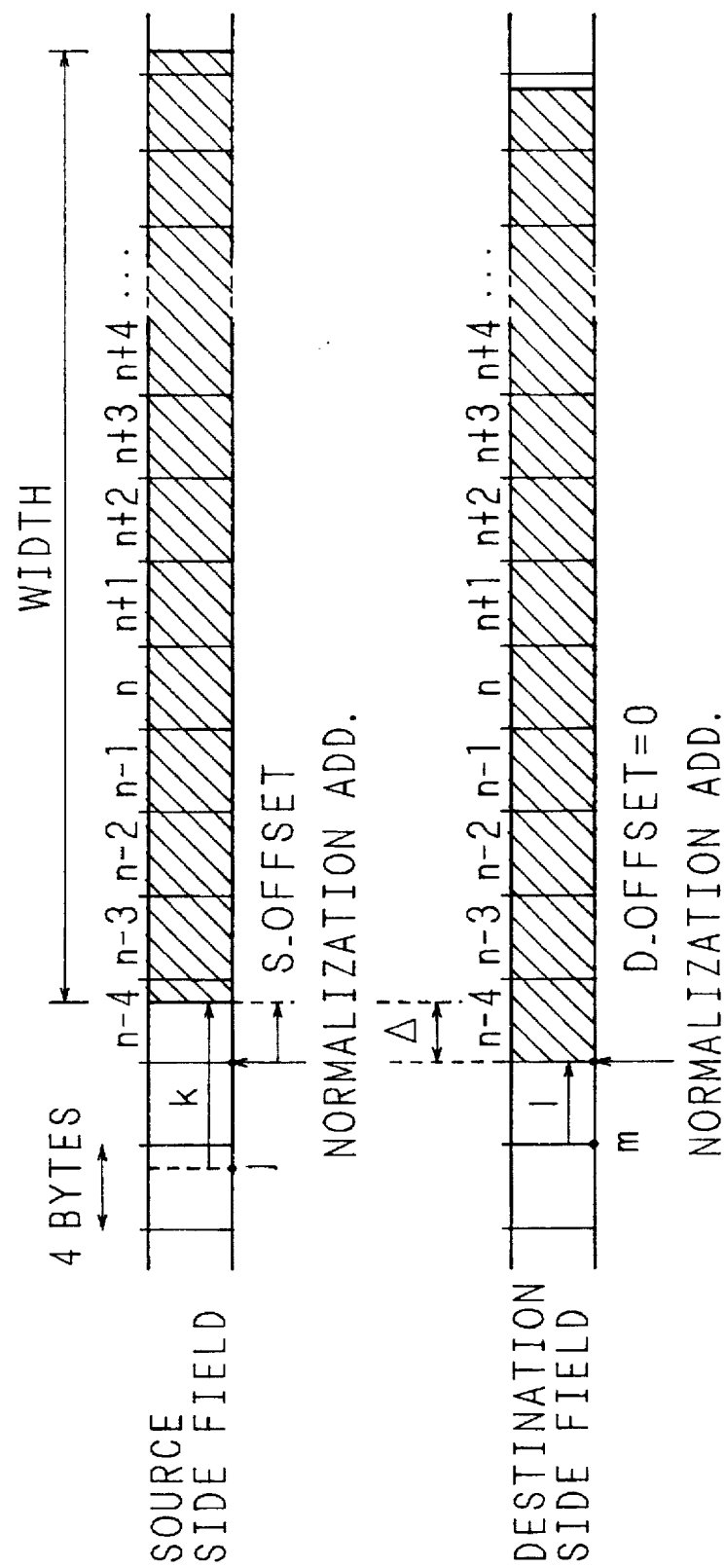
FIG. 90 is a schematic diagram showing an example of bit map data string which is long enough to be executed by the BVMAP instruction of the data processor related to the present invention.

The operation performed in the data processor 100 related to the present invention when processing the long-enough bit map data string as shown in FIG. 90 by the BVMAP instruction in the ascending order of addresses are explained with reference to the flowchart in FIG. 91.

When the length of the bit map data string is more than a certain value in the data processor 100 related to the present invention, processing is executed in 16-byte unit. Fetching of the source data and checking of terminating processing are twice in 8-byte unit each, and data is stored in the destination by the block transfer in 16-byte unit.

It is assumed that the address of the source data is "j" and the offset thereof is "k", the address of the destination data is "m" and the offset thereof is "l", and these values are set in the R0 register, R1 register, R2 register and R3 register, respectively.

It is also assumed that the start address given by "m+1" of the bit field on the destination side is placed on the 64-bit (8-byte) aligned boundary.

Further, it is assumed that the length of the bit field "width" to be processed is set in the R2 register, and the bit pattern information specifying "and" as the operation specification is set in the R5 register.

In step S1, whether the value of the "width" set in the R2 register is 0 or less or not is checked.

Further, the source address J and offset "k" stored in the R0 and R1 registers respectively are normalized. The address normalization, here, means the operation wherein the least-significant bit (LSB) position of the bit field is expressed by the address whose 64 bits (8 bytes) including the LSB are aligned and the offset value for the address. Consequently, it is accomplished by converting the lower 3 bits of the value "address value+quotient of (offset value/ 64)" to zeros. The offset is normalized by obtaining the remainder of "offset/64".

The normalized address is set in the AA2 17 and the normalized offset becomes D_OFFSET.

In step S2, the value of "width" stored in the R2 is set in the DECR2 31. The value of the DECR2 is decremented with the progress of processing and expresses the number of unprocessed bits of the bit map data on the destination side.

Further, the source address m and offset "l" stored in the R3 register are normalized. The normalized address obtained is set in the AA1 16 and normalized offset becomes S_OFFSET.

When "width"<=0 is determined at the checking in the previous step, the execution of the instruction terminates.

In step S3, the value of "width" stored in the R2 is set to the DECR1 30. The value of DECR1 is decremented with the progress of the processing and expresses the number of unprocessed bits of the bit map data on the source side.

Further, the difference between the S_OFFSET and D_OFFSET is calculated and the results becomes Δ.

In step S4, the 64 bits (8 bytes, n–4 and "n–3" in FIG. 90) including the starting portion of the source data is fetched according to the address of the AA1 16 and stored in the DDR0 36. The data becomes src(n–4).

Further, the AA1 16 and DECR1 30 are updated by corresponding to the length of the fetched source data. That is, the AA1 16 is incremented by "8" and the DECR1 30 is decremented by "64".

In step S5, the src(n–4) is shifted leftward by Δ by using the barrel shifter 29. The result becomes src'(n–4).

Further, the source data is fetched by 8 bytes from the memory and stored in the DDR0 38. The data becomes src(n–2).

Further, the values of the AA1 16 and DECR1 30 are updated by 64 bits (8 bytes).

In step S6, the src(n–2) is shifted rightward by (64–Δ) by using the barrel shifter 29. The result becomes src"(n–2).

In step S7, the logical sum of the src'(n–4) and src"(n–2) is obtained. The data becomes src(n–4|n–2).

In step S8, the src(n–2) is shifted leftward by Δ by using the barrel shifter 29. The result becomes src'(n–2).

Further, the source data is fetched by 8 bytes from memory and stored in the DDR0 36. The data becomes src(n).

Further, the values of the AA1 16 and DECR1 30 are updated by 64 bits (8 bytes).

In step S9, the src(n) is shifted rightward by (64–Δ) by using the barrel shifter 29. The result becomes src"(n).

Further, the starting of 8 bytes of the destination data ("n–4" and "n–3" in FIG. 90) is fetched from the memory and stored in the DDR0 36. The data becomes dest(n–4).

In step S10, the operation specified in the R5 register is performed between the src(n–4|n–2) and dest(n–4). The result is stored in the DDW 38 and is stored on the destination side intact by 8-byte store.

Further, the values of the AA2 16 and DECR2 31 are updated by 64 bits (8 bytes). That is, the AA2 16 is incremented by "8", and the DECR2 31 is decremented by "64".

In step S11, the logical sum of the src'(n–2) and src"(n) is obtained. The data becomes src(n–2|n).

In step S12, the src(n) is shifted leftward by Δ by using the barrel shifter 29. The result becomes src'(n).

Further, the source data is fetched by 8 bytes from the memory and stored in the DDR0 36. The data becomes src(n+2).

Further, the values of the AA1 16 and DECR1 30 are updated by 64 bits (8 bytes).

In step S13, the src(n+2) is shifted rightward by 64–Δ) by using the barrel shifter 29. The result becomes src'(n+2).

Further, the destination data is fetched by 8 bytes from the memory and stored in the DDR0 38. The data becomes dest (n–2).

In step S14, the operation specified in the R8 register is performed between the src(n–2|n–1) and dest(n–2). The result is stored in the DDW 38.

In step S15, the logical sum of src'(n) and src"(n+2) is obtained. The data becomes src(n|n+2).

Further, the source data is fetched by 8 bytes from the memory and stored in the DDR0 36. The data becomes src(n+4).

Further, the values of the AA1 16 and DECR1 30 are updated by 64 bits (8 bytes).

In step S16, the src(n+2) is shifted leftward by Δ by using the barrel shifter 29. The result becomes src'(n+2).

Further, the destination data is fetched by 8 bytes from the memory and written in the DDR1 37. The data becomes dest (n).

In step S17, the src(n+4) is shifted rightward by (64–Δ) by using the barrel shifter 29. The result becomes src"(n+4).

Further, the 8 bytes of the data stored in the DDW 38 in step S14 is stored by 8-byte store into the store buffer 8 and, at the same time, a 16-byte block transfer to the memory is specified.

In step S18, the operation specified in the R5 register is performed between the src(n|n+2) and dest(n). The result is stored in the DDW 38 and is stored in the store buffer 8 intact by 8-byte store. Since the 16-byte block transfer is specified in just before the step S17, the store operation in this step is also regarded as the block writing.

In step S19, the logical sum of the src'(n+2) and src"(n+4) is obtained. The data becomes src(n+2|n+4).

Further, the n=n+4 operation is performed and a branch takes place to step S12.

(8.2) "External bus cycle in BVMAP instruction processing"

Figure 91A:
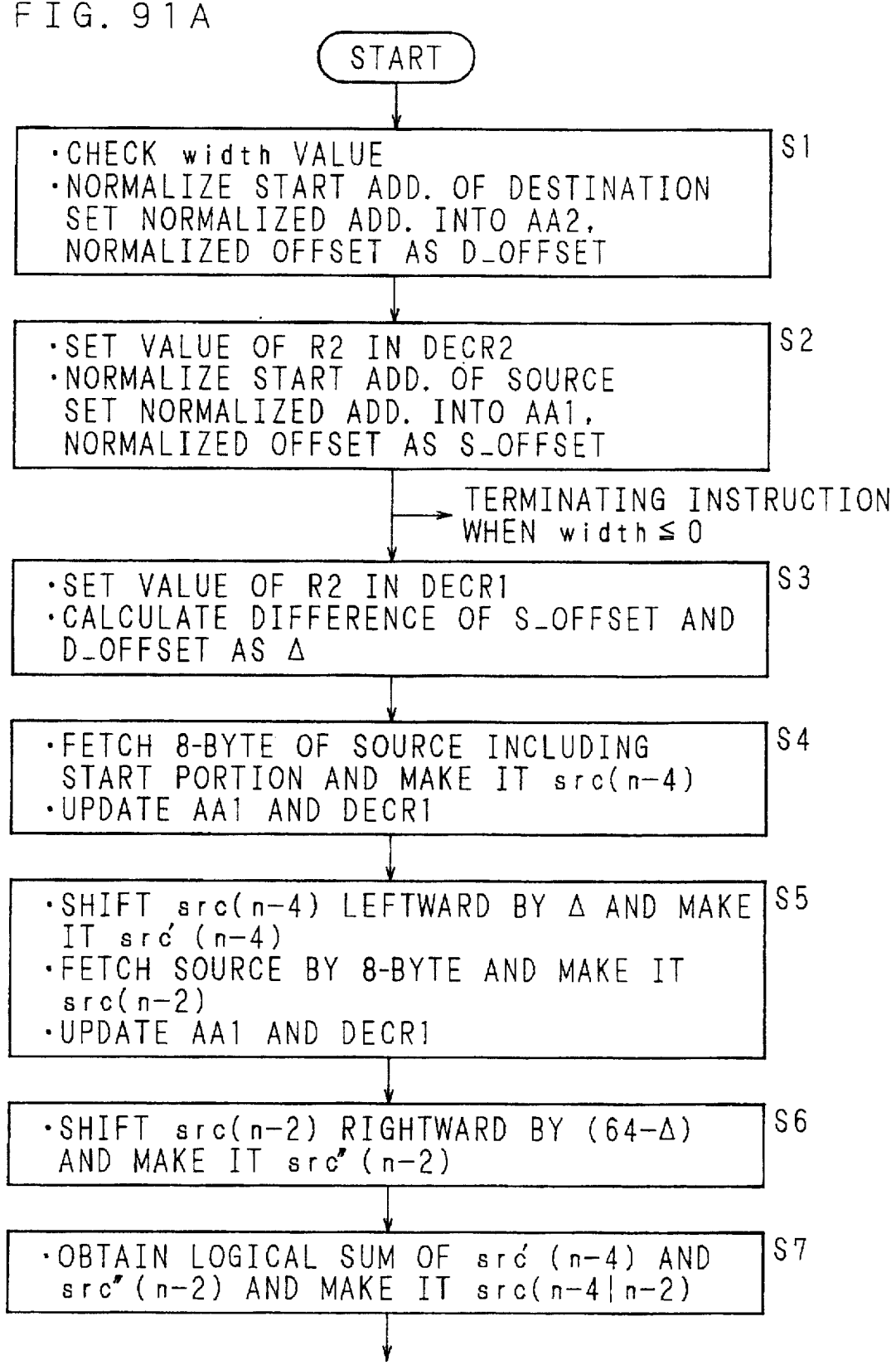
FIGS. 91A, 91B and 91C are flowcharts showing an execution procedure of the BVMAP instruction by the data processor related to the present invention.
Figure 91B:
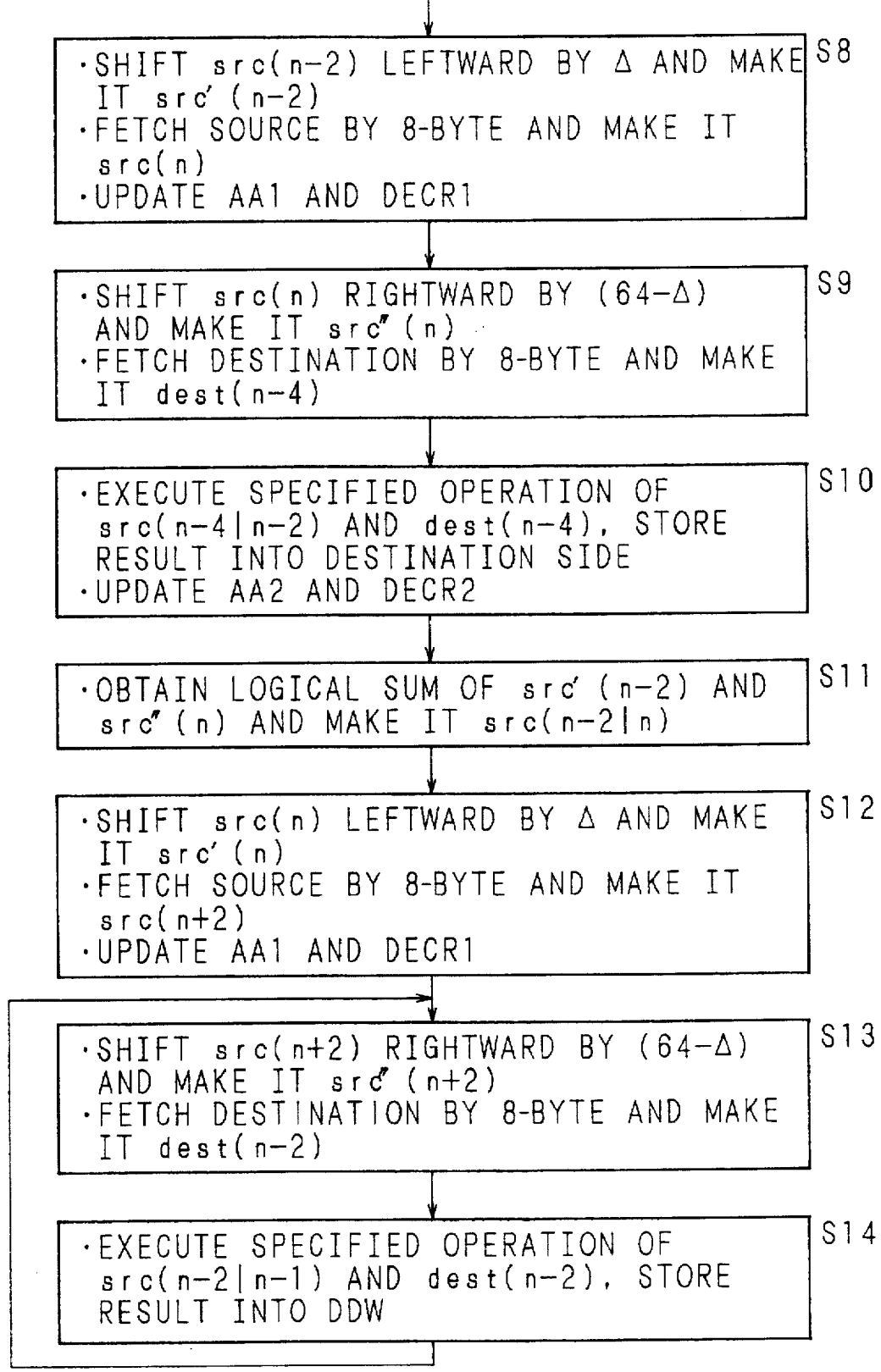
Figure 91C:
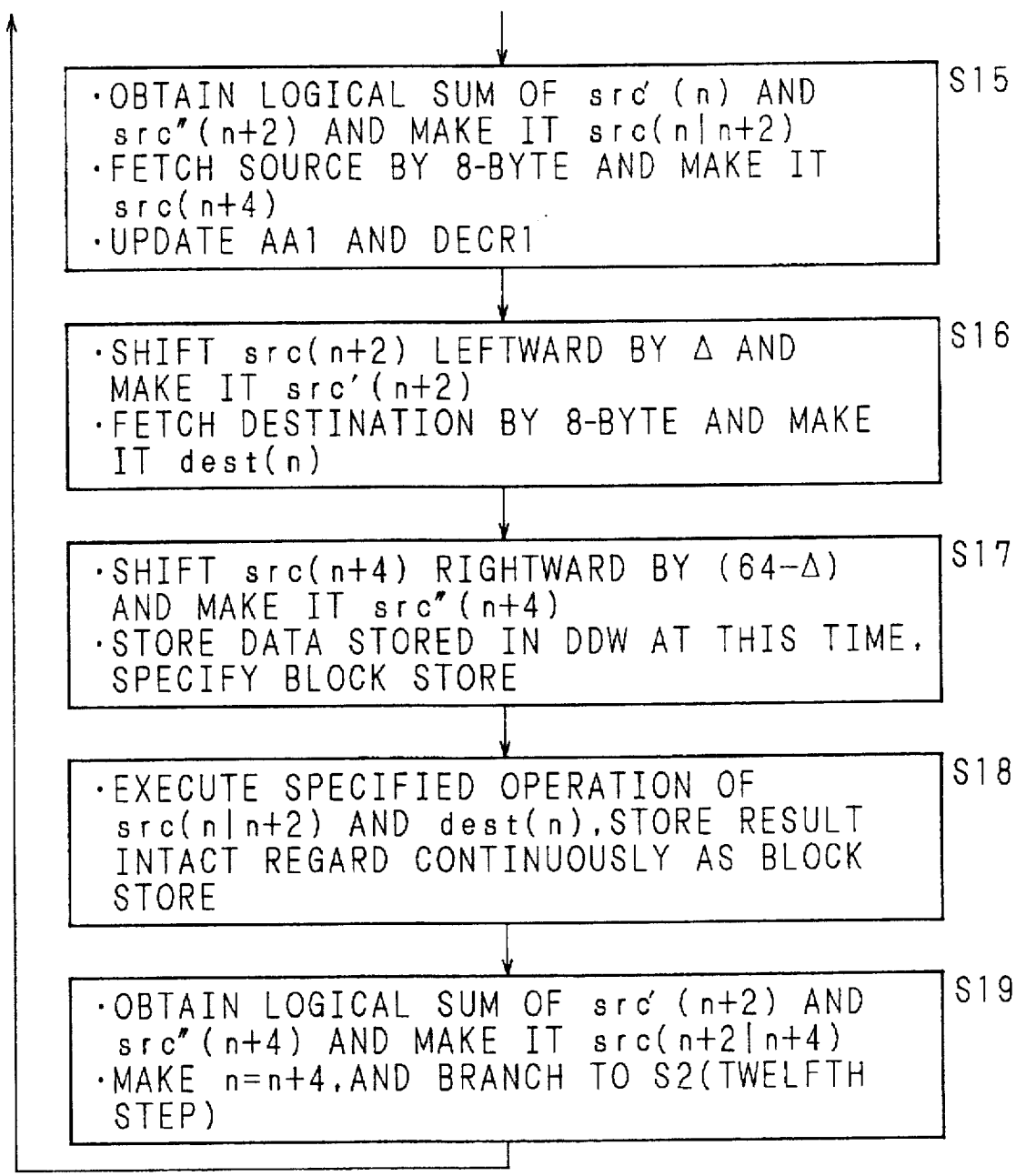
Figure 92:
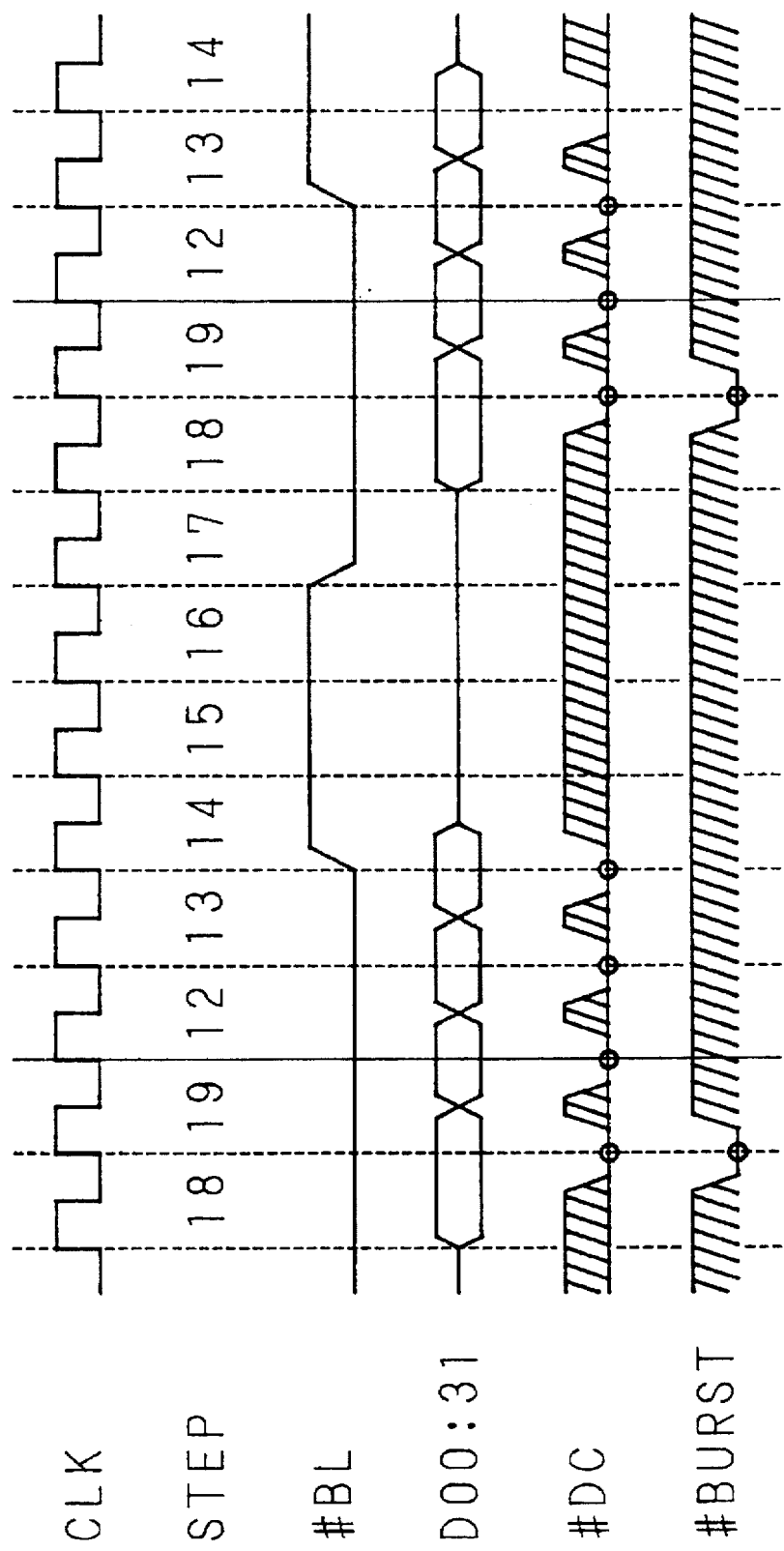
FIG. 92 is a timing chart showing an external bus cycle in the case where wait number of the memory is 0-0 during the execution of the BVMAP instruction by the data processor related to the present invention.
Figure 93:
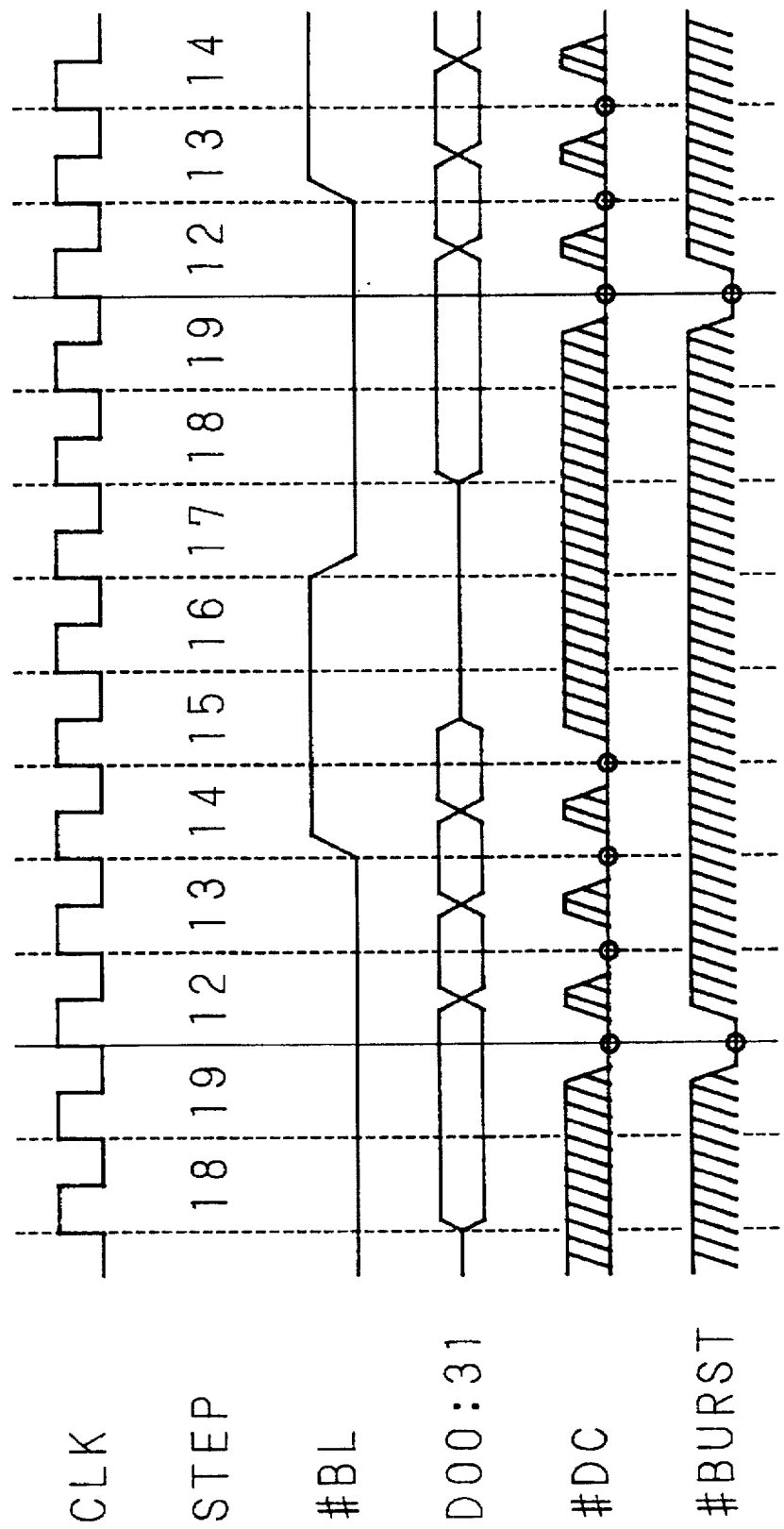
FIG. 93 is a timing chart showing an external bus cycle in the case where wait number of the memory is 0-1 during the execution of the BVMAP instruction by the data processor related to the present invention.
Figure 94:
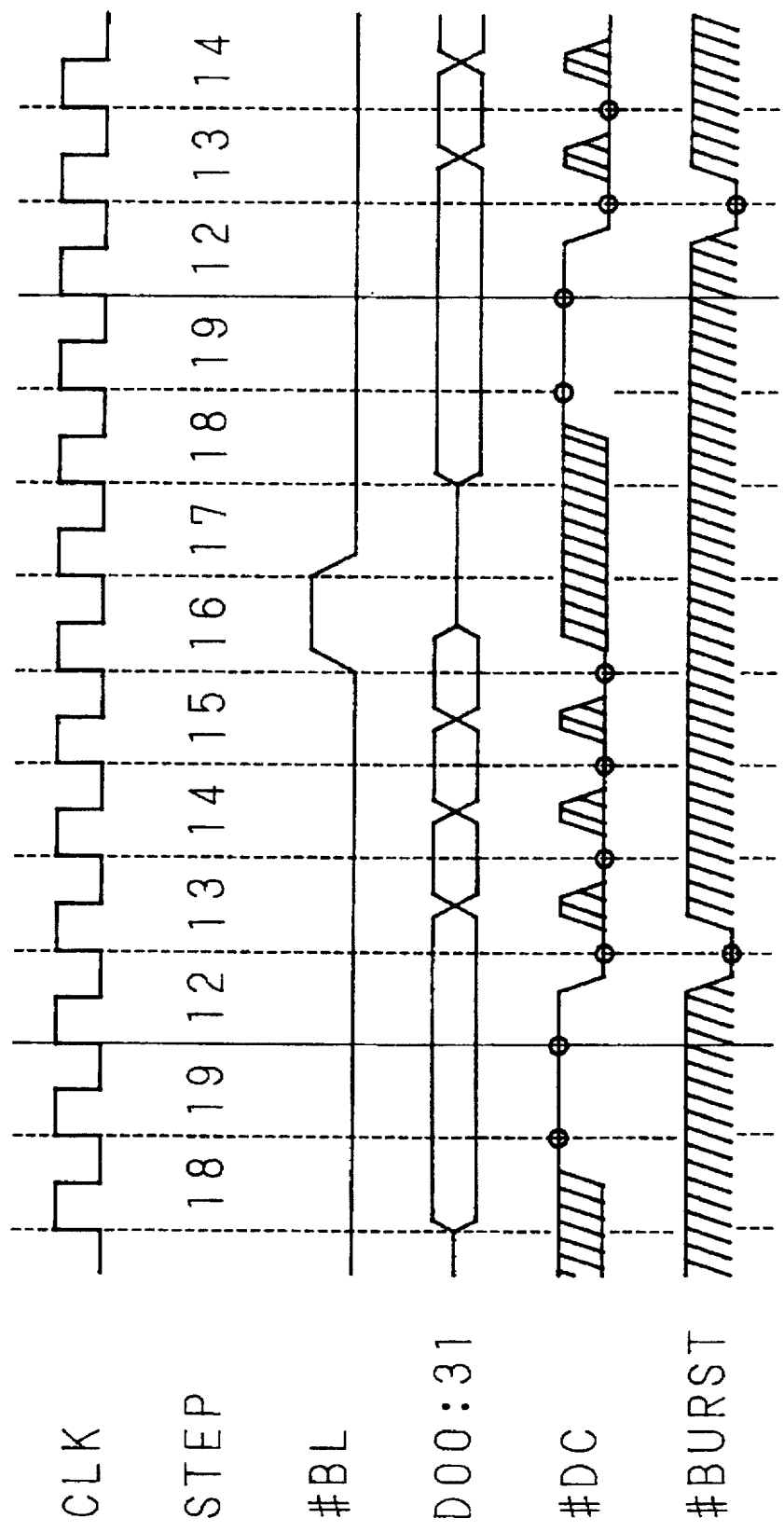
FIG. 94 is a timing chart showing an external bus cycle in the case where wait number of the memory is 0-2 during the execution of the BVMAP instruction by the data processor related to the present invention.

When the bit map field to be processed is long enough in the processing of the BVMAP instruction by using the above stated algorithm, the bit map data string is processed by repeating the processing in step S12 to S19 according to the flowcharts shown in FIG. 91.

The external bus cycle of the data processor 100 related to the present invention in above stated status is shown in the timing charts in FIG. 92 to FIG. 95.

The wait numbers of the memory are 0-0, 0-1, 0-2 and 0-3 in FIG. 92, FIG. 93, FIG. 94 and FIG. 95, respectively. Since the bit map data string to be processed is already stored in the data cache 290 built in the data processor 100 related to the present invention, assessing to the memory is not accessed for data fetching.

Figure 95:
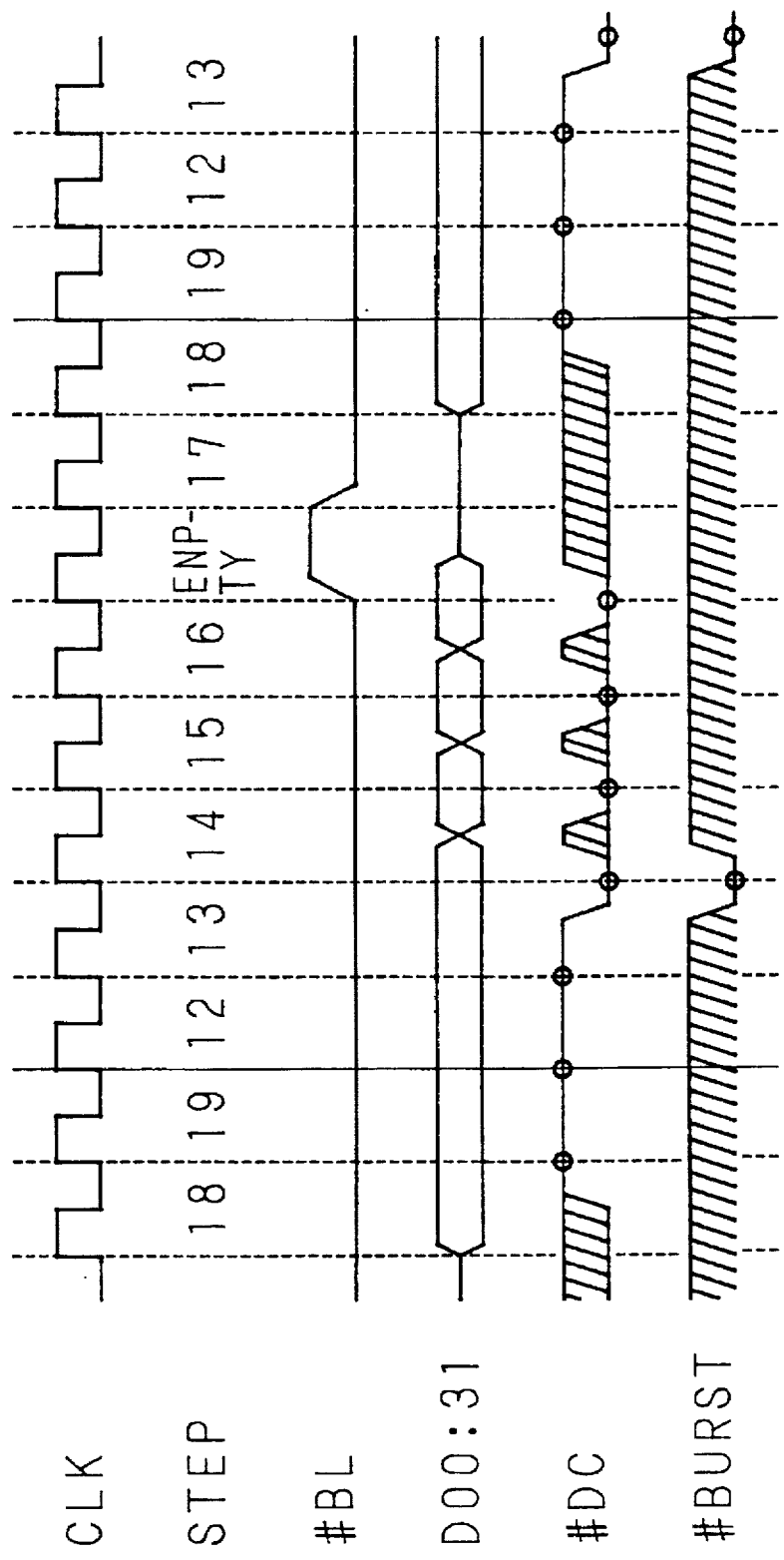
FIG. 95 is a timing chart showing an external bus cycle in the case where wait number of the memory is 0-3 during the execution of the BVMAP instruction by the data processor related to the present invention.

In the data processor 100 related to the present invention, the microprogram can specify the block store operation in the clock cycle after the signal #DC is received from the memory in the case where the last data of the data by which the block store operation is specified immediately before has been written. Consequently, when the wait number is 3 or more, a dead cycle as shown in FIG. 95 is automatically inserted until control proceeds to step S17 wherein the microprogram specifies the next block store operation.

At the execution of the BVMAP instruction as stated above, the data processing efficiency for each wait number in the data processor 100 related to the present invention wherein the 128-bit (16-byte) bit map data string is transferred by repeating the control by the 8-step microinstructions is shown in FIG. 96.

(10) "Other embodiments of the present invention"
(10.1) "Application to a data processor without data cache"

In the above stated embodiment of the present invention, it is premised that the data processor builds in a data cache. However, when its cost is taken into consideration, a data processor without data cache can be another solution. The data processor related to the present invention which has the data cache can invalidate it. When the data cache is negated, the data processor related to the present invention performs the same operations as a data processor without it.

When data is fetched from an external memory in the above case, the instructions can be processed without changing the algorithm shown in FIG. 82, FIG. 91 by fetching a successive data of 18 bytes beforehand in the burst transfer mode and holding it in the two memory data registers: DDR0 36 and DDR1 37. That is, when an 8-byte size data is fetched from the memory in the repeated operations shown in the above FIG. 82 and FIG. 91, the burst transfer is requested in the first fetch. Upon receiving the request, the bus interface unit 157 acquires the 8-byte data to be fetched and the next 8-byte data successively by the burst transfer. In this case, since the second half of the data already acquired can be used for the second fetch, the bus access to the external memory does not occur.

Consequently, when the wait number of the external memory is great, a higher performance can be attained by the present invention than the operations of data fetch→operations→data store in 4-byte unit or 8-byte unit.

(10.2) "Processing on unaligned data string"

In the above embodiments of the present invention, it is premised that the data string or bit map data string is aligned on the 4-byte boundary or 8-byte boundary to facilitate explanation on the processing method. However, since it is not must that the data string to be processed be placed on the aligned boundary for the string operation instruction and bit map operation instruction, unaligned data may have to be processed.

When processing unaligned data, the operations can be performed without changing the algorithm of the repeated operations shown in FIG. 82, FIG. 91 by processing the data up to the first 16-byte aligned boundary beforehand separately. The performance in this case is same as the operations in FIG. 90 and FIG. 96. The details of processing unaligned data are disclosed in the Japanese Patent Application Laid-Open No. 64-88837 (1989) of the applicant of the present invention.

In the data processor related to the present invention stated above, when the instruction decoder decodes a string transfer instruction or bit map operation instruction which transfers a byte string or bit string from the source area of an external memory to the destination area, the instruction execution unit, by the control of the execution control unit, decomposes the byte string or bit string into the 64-bit data groups for example and inputs/outputs these data groups from/to the bus interface unit by using the data register and address register and the bus interface unit accesses the destination area and transfers two data groups (128-bit data) at one time in the burst transfer mode, therefore the byte string or bit string which is stored in the successive memory area can be inputted/outputted in a high speed. Consequently, the string transfer instruction or bit map operation instruction can be executed efficiently.

Further, in the data processor related to the present invention, when the instruction decoder decodes a pattern filling instruction which writes a plurality of 32-bit pattern data in the destination area of an external memory, for example, the instruction execution unit, by the control of the execution control unit, outputs two pattern data in parallel to the bus interface unit by using the data register and address register and the bus interface unit can write four pattern data at one time by the burst transfer in the destination area of the external memory. Consequently, pattern data can be written in a high speed in the successive area of the external memory and thus the pattern filling instruction can be executed efficiently.

Further, in the data processor related to the present invention, when the instruction decoder decodes a push instruction which successively stores the data indicating the internal status held in the register group in an arbitrary memory area of said external memory, the instruction execution unit, by the control of the execution control unit, outputs data in 64-bit unit, for example, from the registers to the bus interface unit by using the data register and address register and the bus interface unit accesses the destination area in the burst transfer mode, and when the instruction decoder decodes a pop instruction which transfers the data that is thus stored in the successive area in the external memory to the register, the bus interface unit, by the control of the execution control unit, receives data in 64-bit unit for example from the source area of the external memory in the burst transfer mode by using the data register and address register and transfers it by accessing the registers; thus the push instruction and pop instruction can be executed in high speeds.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A data processor, comprising:
   an external memory connected to a data bus having a first bit width;
   an instruction decoder for decoding instructions;
   an execution control unit for generating control signal to control the execution of the instructions by being given the signal indicating the results of instruction decoding by said instruction decoder;
   an instruction execution unit which has a data register for holding the data to be processed of the instruction to be executed, an address register for holding the address of said data to be processed in said external memory and at least one operation unit for performing the operation on data of a second bit width equal to or longer than said first bit width, and which executes the instructions according to the control signal outputted from said execution control unit; and a bus interface unit which inputs/outputs the data necessary to execute said instruction by burst transferring data having a third bit width longer than said second bit width from/to said external memory by outputting one address n times (n≧2) to fetch the data n consecutive times;

wherein, when said instruction decoder decodes a multi-bit data string operation instruction which stores each bit, resultant from a predetermined operation which is executed successively between each bit of a first multi-data string continuously stored in a first memory area of said external memory and a second multi-bit data string continuously stored in a second memory area of said external memory, into said first or second memory area, said execution control unit performs a first control for, by setting an address for sequentially reading data from said first and second memory areas in said address register in response to the signal given from said instruction decoder, reading each of first and second multi-bit data strings stored in said first and second memory areas respectively from said external memory by said third bit width by burst transferring via said bus interface unit, and for storing the data strings in said data register, according to the address set in said address register, a second control for, giving the signal specifying said predetermined operation to said operation unit based on the signal given from said instruction decoder, performing said predetermined operation between the first data string of the third bit width and the second data string of the third bit width, previously stored in said data register with said second bit width, and for storing the operation result again in said data register as a third data string of the third bit width, a third control for, by setting an address for sequentially storing data in said first or second memory area in said address register in response to the signal sent from said instruction decoder, storing said third data string of the third bit width having been stored in said data register in said first or second memory area by burst transferring via said bus interface unit, according to the address set in said address register, and a fourth control for, by repeating said first, second and third controls for predetermined times in response to the signal sent from said instruction decoder, storing said third data string successively into said first or second memory area.

2. A data processor, comprising:

an external memory connected to a data bus having a first bit width;

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, an address register for holding the address of said data to be processed in said external memory and at least one operation unit for performing the operation on data of a second bit width equal to or longer than said first bit width, and which executes the instructions according to the control signal outputted from said execution control unit; and a bus interface unit which inputs/outputs the data necessary to execute said instruction by burst transferring data having a third bit width longer than said second bit width from/to said external memory by outputting one address n times (n≧2) to fetch the data n consecutive times;

wherein, when said instruction decoder decodes a multi-bit data string operation instruction which stores each bit, resultant from a predetermined operation which is executed successively on a multi-bit data string continuously stored in a first memory area of said external memory, into said first memory or a second memory area other than said first memory area, said execution control unit performs a first control for, by setting an address for sequentially reading data from said first memory area in said address register in response to the signal sent from said instruction decoder, reading said multi-bit data string stored in said first memory area from said external memory by said third bit width by burst transferring via said bus interface unit, and for storing the data string in said data register, according to the address set in said address register, a second control for, by giving the signal specifying said predetermined operation to said operation unit based on the signal given from said instruction decoder, performing said predetermined operation on a first data string of the third bit width stored in said data register with said second bit width, and store the operation result again as a second data string of the third bit width, a third control for, by setting an address for sequentially storing data in said first or second memory area in said address register in response to the signal sent from said instruction decoder, storing said second data string of the third bit width having been stored in said data register in said first or second memory area by burst transferring via said bus interface unit, according to the address set in said address register, and a fourth control for, by repeating said first, second and third control for predetermined times in response to the signal sent from said instruction decoder, and storing said second data string successively into said first or second memory area.

3. A data processor, comprising;

an external memory connected to a data bus having a first bit width;

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, and address register for holding the address of said data to be processed in said external memory and at least one operation unit for performing the operations in unit of a second bit width equal to or longer than said first bit width, and which executes the instructions according to the control signal outputted from said execution control unit; and a bus interface unit which inputs/outputs the data necessary to execute said instruction by burst transferring data having a third bit width longer than said second bit width from/to said external memory by outputting one address n times (n≧2) to fetch the data n consecutive times;

wherein, when said instruction decoder decodes a multi-bit data string operation instruction which repeatedly stores a predetermined bit pattern into an arbitrary memory area of said external memory, said execution control unit performs a first control for, based on the signal given from said instruction decoder, making said operation unit store said predetermined bit pattern in said data register with said second bit width as a data string of the third bit width, a second control for, by setting an address for sequentially storing data in said arbitrary memory area in said address register in response to the signal given from said instruction decoder, storing said data string of the third bit width having been stored in said data register in said arbitrary memory area by burst transferring via said bus interface unit, according to the address set in said address register, and a third control for, by repeating said first and second controls for predetermined times based on the signal given from said instruction decoder, successively storing said data string stored in said data register into said arbitrary memory area.

4. A data processor, comprising:

an external memory connected to a data bus having a first bit line width;

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, an address register for holding the address of said data to be processed in said external memory and at least one operation unit for performing the operations in unit of a second bit width equal to or longer than said first bit width, and which executes the instructions according to the control signal outputted from said execution control unit;

a bus interface unit which inputs/outputs the data necessary to execute said instruction by burst transferring data having a third bit width longer than said second bit width, from/to said external memory, by outputting one address n times (n≧2) to fetch the data n consecutive times; and a plurality of internal registers for holding internal status;

wherein, when said instruction decoder decodes a multi-bit data string operation instruction which successively stores the data held in said plurality of internal registers into an arbitrary memory area of said external memory, said execution control unit performs a first control for, based on the signal given from said instruction decoder, making said operation unit store the data held in said plurality of internal registers into said data register in unit of said second bit width as a data of the third bit width, a second control for, by setting an address for sequentially storing data into said arbitrary memory area in said address register in response to the signal given from said instruction decoder, storing said data string of the third bit width having been stored in said data register into said arbitrary memory area by burst transferring via said bus interface unit, according to the address set in said address register, and a third control for, by repeating said first and second controls for predetermined times in response to the signal given from said instruction decoder, successively storing said data string stored in said data register into said arbitrary memory area, and when said instruction decoder decodes a multi-bit data string operation instruction which successively stores the data stored in said arbitrary memory area of said external memory into said plurality of internal registers by said third control, said execution control unit performs a fourth control for, by setting an address for sequentially reading data from said arbitrary memory area in said address register in response to the signal given from said instruction decoder, reading the multi-bit data string having been stored in said arbitrary memory area from said external memory by said third bit width by burst transferring via said bus interface unit, and for storing it into said data register, according to the address set in said address register, a fifth control for, based on the signal given from said instruction decoder, making said operation unit store the data string having been stored in said data register into said plurality of internal registers in unit of said second bit width, and a sixth control for, by repeating said first and second controls for predetermined times in response to the signal given from said instruction decoder, successively storing said data string stored in said data register into said plurality of internal registers.

5. A data processor, comprising:

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, an address register for holding the address of said data to be processed in an external memory coupled to the data processor through a data bus and at least one operation unit for performing the operation on data of a first bit width and which executes the instructions according to the control signal outputted from said execution control unit; and a bus interface unit which inputs/outputs the data necessary to execute said instruction by burst transferring data having a second bit width longer than said first bit width from/to said external memory by outputting one address n times (n≧2) to fetch the data n consecutive times;

wherein, said instruction decoder decodes a multi-bit data string operation instruction which stores each bit, resultant from a predetermined operation which is executed successively between each bit of a first multi-data string continuously stored in a first memory area of said external memory and a second multi-bit data string continuously stored in a second memory area of said external memory, into said first or second memory area, said execution control unit performs

- a first control for, by setting an address for sequentially reading data from said first and second memory areas in said address register in response to the signal given from said instruction decoder, reading each of first and second multi-bit data strings stored in said first and second memory areas respectively from said external memory by said second bit width by burst transferring via said bus interface unit, and for storing the data strings in said data register, according to the address set in said address register,
- a second control for, giving the signal specifying said predetermined operation to said operation unit based on the signal given from said instruction decoder, performing said predetermined operation between the first data string of the second bit width and the second data string of the second bit width, previously stored in said data register with said first bit width, and for storing the operation result again in said data register as a third data string of the second bit width,
- a third control for, by setting an address for sequentially storing data in said first or second memory area in said address register in response to the signal sent from said instruction decoder, storing said second data string of the second bit width having been stored in said data register in said first or second memory area by burst transferring via said bus interface unit, according to the address set in said address register, and
- a fourth control for, by repeating said first, second and third control for predetermined times in response to the signal sent from said instruction decoder, storing said third data string successively into said first or second memory area.

6. A data processor comprising:

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, an address register for holding the address of said data to be processed in an external memory coupled to the data processor through a data bus and at least one operation unit for performing the operation on data of a first bit width and which executes the instructions according to the control signal outputted from said execution control unit; and a bus interface unit which inputs/outputs the data necessary to execute said instruction by burst transferring data having a second bit width longer than said first bit width from/to said external memory by outputting one address n times (n≧2) to fetch the data n consecutive times;

wherein, when said instruction decoder decodes a multi-bit data string operation instruction which stores each bit, resultant from a predetermined operation which is executed successively on a multi-bit data string continuously stored in a first memory area of said external memory into said first memory or a second memory area other than said first memory area, said execution control unit performs

- a first control for, by setting an address for sequentially reading data from said first memory area in said address register in response to the signal sent from said instruction decoder, reading said multi-bit data string stored in said first memory area from said external memory by said second bit width by burst transferring via said bus interface unit, and for storing the data string in said data register, according to the address set in said address register,
- a second control for, by giving the signal specifying said predetermined operation to said operation unit based on the signal given from said instruction decoder, performing said predetermined operation on a first data string of the second bit width stored in said data register with said first bit width, and store the operation result again as a second data string of the second bit width,
- a third control for, by setting an address for sequentially storing data in said first or second memory area in said address register in response to the signal sent from said instruction decoder, storing said second data string of the second bit width having been stored in said data register in said first or second memory area by burst transferring via said bus interface unit, according to the address set in said address register, and
- a fourth control for, by repeating said first, second and third controls for predetermined times in response to the signal sent from said instruction decoder, and storing said second data string successively into said first or second memory area.

7. A data processor, comprising:

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, and address register for holding the address of said data to be processed in an external memory coupled to the data processor through a data bus and at least one operation unit for performing the operations in unit of a first bit width and which executes the instructions according to the control signal outputted from said execution control unit; and a bus interface unit which inputs/outputs the data necessary to execute said instruction by burst transferring data having a second bit width longer than said first bit width from/to said external memory by outputting one address n times (n≧2) to fetch the data n consecutive times;

wherein, when said instruction decoder decodes a multi-bit data string operation instruction which repeatedly stores a predetermined bit pattern into an arbitrary memory area of said external memory, said execution control unit performs

- a first control for, based on the signal given from said instruction decoder, making said operation unit store said predetermined bit pattern in said data register with said first bit width as a data string of the second bit width,
- a second control for, by setting an address for sequentially storing data in said arbitrary memory area in said address register in response to the signal given from said instruction decoder, storing said data string of the second bit width having been stored in said data register in said arbitrary memory area by burst transferring via said bus interface unit, according to the address set in said address register, and a third control for, by repeating said first and second controls for predetermined times based on the signal given from said instruction decoder, successively storing said data string stored in said data register into said arbitrary memory area.

8. A data processor comprising:

an instruction decoder for decoding instructions;

an execution control unit for generating control signal to control the execution of the instructions by being given the signal indicating the results of instruction decoding by said instruction decoder;

an instruction execution unit which has a data register for holding the data to be processed of the instruction to be executed, an address register for holding the address of said data to be processed in an external memory coupled to the data processor through a data bus and at least one operation unit for performing the operations in unit of a first bit width and which executes the instructions according to the control signal outputted from said execution control unit;

a bus interface unit which inputs/outputs the data necessary to execute said instruction by burst transferring data having a second bit width longer than said first bit width, from/to said external memory, by outputting one address n times (n≧2) to fetch the data n consecutive times; and a plurality of internal registers for holding internal status;

wherein, when said instruction decoder decodes a multi-bit data string operation instruction which successively stores the data held in said plurality of internal registers into an arbitrary memory area of said external memory, said execution control unit performs a first control for, based on the signal given from said instruction decoder, making said operation unit store the data held in said plurality of internal registers into said data register in unit of said first bit width as a data of the second bit width, a second control for, by setting an address for sequentially storing data into said arbitrary memory area in said address register in response to the signal given from said instruction decoder, storing said data string of the second bit width having been stored in said data register into said arbitrary memory area by burst transferring via said bus interface unit, according to the address set in said address register, and a third control for, by repeating said first and second controls for predetermined times in response to the signal given from said instruction decoder, successively storing said data string stored in said data register into said arbitrary memory area, and when said instruction decoder decodes a multi-bit data string operation instruction which successively stores the data stored in said arbitrary memory area of said external memory into said plurality of internal registers by said third control, said execution control unit performs a fourth control for, by setting an address for sequentially reading data from said arbitrary memory area in said address register in response to the signal given from said instruction decoder, reading the multi-bit data string having been stored in said arbitrary memory area from said external memory by said second bit width by burst transferring via said bus interface unit, and for storing it into said data register, according to the address set in said address register, a fifth control for, based on the signal given from said instruction decoder, making said operation unit store the data string having been stored in said data register into said plurality of internal registers in unit of said first bit width, and a sixth control for, by repeating said first and second controls for predetermined times in response to the signal given from said instruction decoder, successively storing data string stored in said data register into said plurality of internal registers.

* * * * *